US006611301B2

United States Patent
Murade et al.

(10) Patent No.: US 6,611,301 B2
(45) Date of Patent: *Aug. 26, 2003

(54) ELECTRO-OPTICAL APPARATUS HAVING FACES HOLDING ELECTRO-OPTICAL MATERIAL IN BETWEEN FLATTENED BY USING CONCAVE RECESS, MANUFACTURING METHOD THEREOF, AND ELECTRONIC DEVICE USING SAME

(75) Inventors: Masao Murade, Suwa (JP); Ryoichi Yoneyama, Yamanash-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/153,804

(22) Filed: May 24, 2002

(65) Prior Publication Data

US 2002/0145683 A1 Oct. 10, 2002

Related U.S. Application Data

(63) Continuation of application No. 09/216,872, filed on Dec. 21, 1998.

(30) Foreign Application Priority Data

| Dec. 19, 1997 | (JP) | 9-351813 |
| Jan. 30, 1998 | (JP) | 10-20001 |
| Jan. 30, 1998 | (JP) | 10-20002 |
| Sep. 3, 1998 | (JP) | 10-250128 |

(51) Int. Cl.$^7$ .......................... G02F 1/136; G02F 1/345
(52) U.S. Cl. ........................ 349/43; 349/44; 349/110; 349/152
(58) Field of Search ............. 349/39–44, 110, 349/152

(56) References Cited

U.S. PATENT DOCUMENTS

| 4,894,695 A | 1/1990 | Ishii et al. |
| 5,111,259 A | 5/1992 | Teng et al. |
| 5,163,220 A | 11/1992 | Zeto et al. |
| 5,317,432 A | 5/1994 | Ino |
| 5,488,005 A | 1/1996 | Han et al. |
| 5,759,879 A | 6/1998 | Iwasaki |
| 5,879,973 A | 3/1999 | Yanai et al. |
| 5,883,399 A | 3/1999 | Yin et al. |
| 6,034,432 A | 3/2000 | Karasawa et al. |
| 6,091,470 A | * 7/2000 | Fujikawa et al. ............ 349/122 |

FOREIGN PATENT DOCUMENTS

| JP | 63-246728 | 10/1988 |
| JP | 6-067202 | 3/1994 |
| JP | 6-130418 | 5/1994 |
| JP | 6-216158 | 8/1994 |
| JP | 8-095062 | 4/1996 |
| JP | 055356 A | * 2/2002 |
| JP | 056509 A | * 2/2002 |

* cited by examiner

Primary Examiner—Julie Ngo
(74) Attorney, Agent, or Firm—Oliff & Berridge, PLC

(57) ABSTRACT

The electro-optical apparatus of the invention has a pair of substrates and an electro-optical material held between these substrates. The TFT array substrate may be formed into a concave shape in non-aperture areas containing the data line, the scanning line, the capacitor line and the TFT. Further, the areas opposite to the connecting lines in the sealed area may be formed into a concave shape. In the electro-optical apparatus having such a configuration, it is possible to reduce steps resulting from the presence of various wiring lines and elements in the image display area and the sealed area, by the use of a relatively simple configuration.

11 Claims, 77 Drawing Sheets

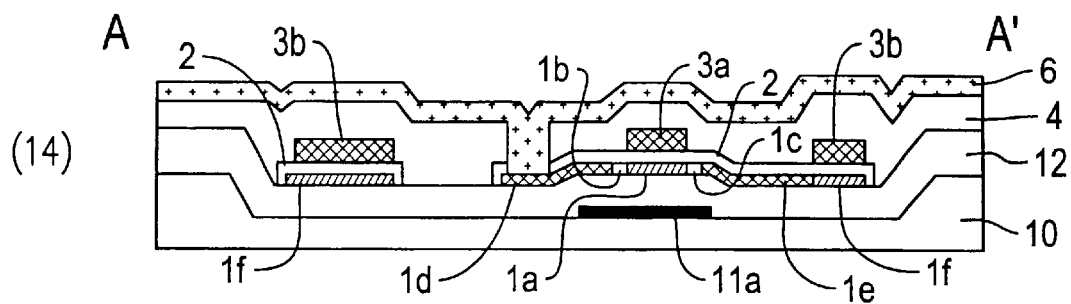
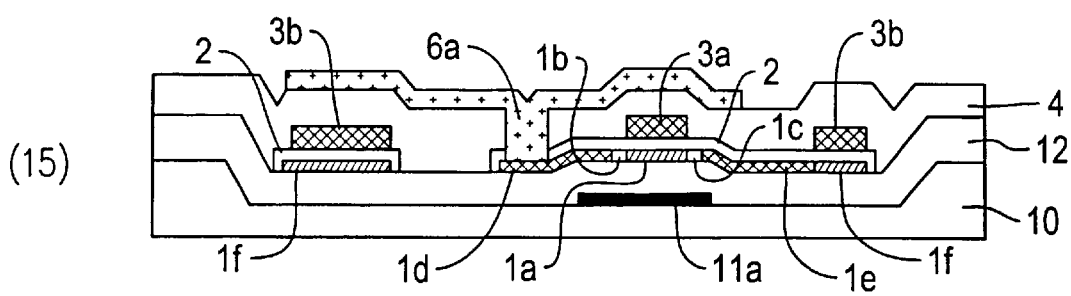
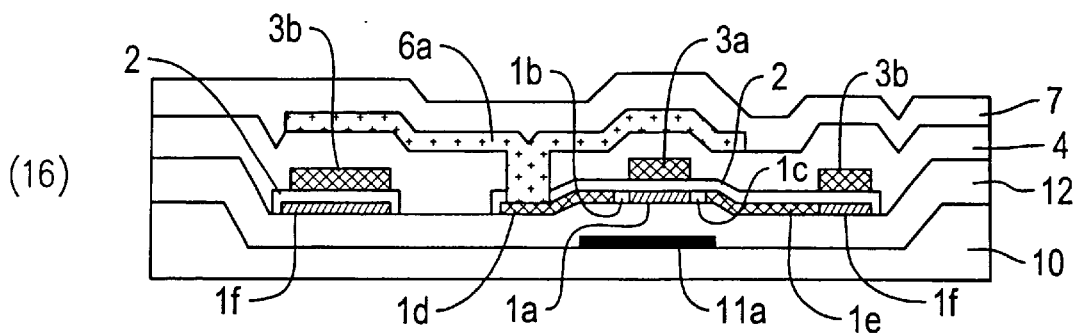
Fig. 10

<PIXEL PLAN VIEW>

CONVERSION OF SECOND INTERLAYER
INSULATING FILM INTO THIN FILM

CONVERSION OF THIRD INTERLAYER
INSULATING FILM INTO THIN FILM

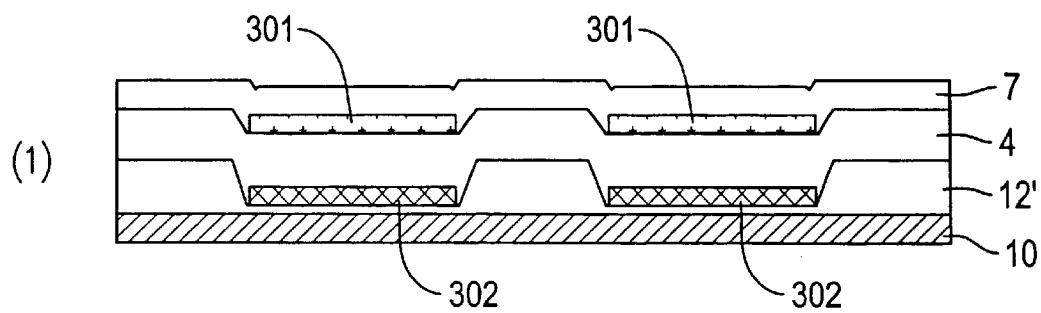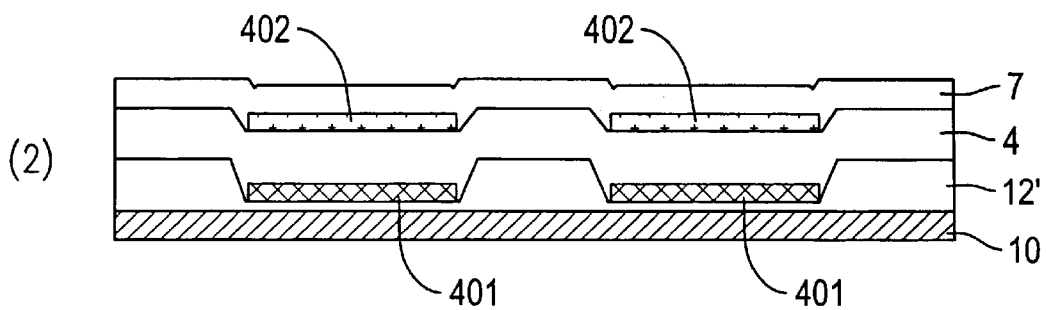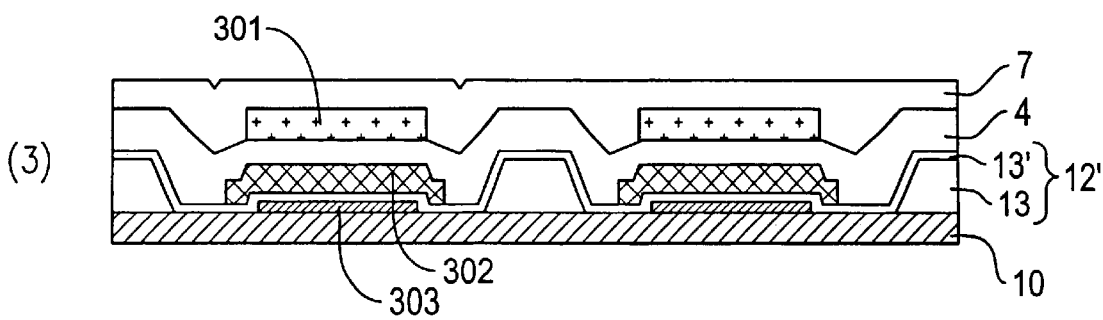
Fig. 63

ELECTRO-OPTICAL APPARATUS HAVING FACES HOLDING ELECTRO-OPTICAL MATERIAL IN BETWEEN FLATTENED BY USING CONCAVE RECESS, MANUFACTURING METHOD THEREOF, AND ELECTRONIC DEVICE USING SAME

This is a Continuation of application Ser. No. 09/216,872 filed Dec. 21, 1998. The entire disclosure of the prior application is hereby incorporated by reference herein in its entirety.

BACKGROUND OF THE INVENTION

1. Field of the Invention

The present invention relates to an active matrix driven or passive matrix driven electro-optical apparatus such as a liquid crystal apparatus based on thin-film transistor driving or thin-film diode driving, a manufacturing method thereof, and an electronic device using the same.

2. Description of Related Art

A liquid crystal apparatus typically includes an electro-optical apparatus, a pair of alignment films that are rubbed in prescribed directions and provided on a pixel electrode and an opposing electrode between a pair of substrates, and an electro-optical material such as liquid crystal held between the alignment films. An electric field is applied to the electro-optical material from both electrodes. As a result, the alignment condition of the electro-optical material changes and a display is provided within an image display area.

Therefore, if a convex or concave portion caused by a difference in the total film thickness between an area comprising wiring lines (such as data lines, scanning lines and capacitor lines), driving circuits for driving pixels and the like such as thin-film transistor driving circuits (TFT) and thin-film diode elements (TFD) is left as it is up to a face (alignment film) in contact with the electro-optical material, then, defective alignment (disclination) may occur in the electro-optical material in response to the extent of convex or concave, which may lead to deterioration of the image for each pixel. More specifically, when an alignment film having an aperture area formed on the convex or concave face is rubbed, variations may occur in the alignment regulating ability on the alignment film surface in response to the extent of convex or concave. This may cause defective alignment of the electro-optical material and change the display contrast. Upon defective alignment of the electro-optical material for a normally white mode in which non-application of voltage onto the electro-optical material results in white display, a white dropout may occur at the position of defective alignment, which leads to a decrease in contrast which in turn leads to a decrease in fineness. In order to uniformly rub the alignment film over the entire substrate, a prescribed constant distance is maintained between the alignment films. To avoid this inconvenience, it is very important to flatten a pixel portion positioned within the image display area.

On the other hand, an electro-optical material may be sealed in a space surrounded by a sealing material between both substrates having wiring lines and driving circuits to form an electro-optical material layer. The sealing material may be an adhesive comprising a photosetting resin or a thermosetting resin for bonding both substrates around them. Particularly in a small-capacity electro-optical apparatus, the gap between the substrates may be controlled using a sealing material mixed with a bead-shaped or fiber-shaped gap material having an outside diameter of several μm. In the sealed area (i.e., area bonded by the sealing material), outgoing wire lines of the scanning and data lines are arranged from the image display area to the peripheral areas. This produces a step depending upon the presence or absence of the connecting lines. Such a step makes it difficult to gap control using the gap filler and stress concentration by the gap filler may cause breakage of lines or cause a short circuit. It is therefore very important to flatter the sealed area.

SUMMARY OF THE INVENTION

In order to flatten the above-described pixel portion for one or a plurality of interlayer insulating films provided to insulate individual thin films composing a thin-film transistor or individual thin films composing various wiring lines, the thickness of a non-aperture area of each pixel may be smaller than the thickness of an aperture area thereof. Or, it may be necessary to flatten the upper surface of the interlayer insulating film closest to the electro-optical material using a CMP(Chemical Mechanial Polishing) operation or to form a SOG (Spin On Glass) film using a spin coating operation.

Also for flattening the sealed area as described above, the thickness of the portion having connecting lines formed thereon may be smaller than the thickness having no connecting line thereon. Or, the upper surface of the interlayer insulating film closest to the sealed area may be flattered by forming an SOG using a CMP operation or spin coating.

At all events, therefore, there are posed problems of more complicated manufacturing steps, a lower yield and a high cost.

In order to prevent flicker or a cross-talk even with a low duty ratio upon supplying image signals to each pixel electrode in an electro-optical apparatus of this type, a storage capacitor may be provided for imparting a prescribed capacity to each pixel electrode. The total film thickness in the non-aperture area may be increased by an amount corresponding to the storage capacitor electrode and the capacitor lines composing the same. This may result in an increase in step in the pixel section. When such a storage capacitor is incorporated in an area under the data lines or along the scanning lines, thickness in this portion may increase causing production of a large step. For example, when incorporating a storage capacitor in the area under the data lines, the thickness may increase compared to that of the pixel section not having them by an amount corresponding to the thickness of the storage capacitor (i.e., total thickness of the first storage capacitor electrode, the insulating film and the second storage capacitor electrode) and the data line thickness. This may result in a step of about 10,000 Å. Thus, flattening applied for offsetting the step in the image display area may be difficult and expensive.

In an electro-optical apparatus having each pixel provided with a thin-film transistor, a light shielding film may be provided under the thin-film transistor (on the TFT array substrate side) with a view to prevent optical leakage caused by a feedback light from the back of the projected light having transmitted through the electro-optical apparatus incoming into a channel area of the thin-film transistor particularly in a use such as a projector. Thus, the total thickness in the non-aperture area having a TFT formed thereon becomes larger by an amount corresponding to the light shielding film. This results in a larger step. In this case, the flatten applied for offsetting the step in the image display area may be difficult and expensive.

The present invention may provide an electro-optical apparatus which can reduce the step caused by the presence of various wiring lines and elements in the image display area by using a relatively simple configuration, a manufacturing method thereof, and an electronic device using the same.

An electro-optical apparatus may be provided to reduce the step caused by the presence of various wiring lines in the sealed area by the use of a relatively simple configuration, a manufacturing method thereof, and an electronic device using the same.

An object of the present invention may be to provide an electro-optical apparatus that permits efficient flattening of the pixel section by the utilization of the configuration in which a light shielding film is provided under the TFT and features of the manufacturing steps, a manufacturing method thereof, and an electronic device using the same.

An object of the invention may be to provide an electro-optical apparatus having a large storage capacitor in which defective alignment of liquid crystal may be reduced as far as possible. A manufacturing method and a electronic device using the same may also be provided.

An object of the present invention may be to provide an electro-optical apparatus which permits reduction of defective wiring under the sealed area and accurate control of the gap between substrates. A manufacturing method and an electronic device using the same may also be provided.

An electro-optical apparatus may include a first substrate having a first face provided with a concave recess and a second face. A second substrate may be arranged opposite to the first face. An electro-optical material may be held between the first face and the second substrate. A plurality of pixel electrodes may be formed on the first face and a plurality of wiring lines may be formed on the first face so as to be at least partially positioned on the concave recess and connected to the pixel electrodes.

In one of the substrates (first substrate), the area opposite to a plurality of wiring lines on the side facing the electro-optical material (first face side) may be at least partially a concave recess. The surface of the uppermost layer (alignment film) located above wiring lines (such as data lines scanning lines and capacitor lines) may be flattened toward the aperture areas of pixels (i.e., the area where pixels electrode are formed) in response to the depth of recess in the area having the concave recess formed therein. For example, when an area where the lamination forming the wiring lines has the largest thickness because of overlapping of various wiring lines is formed into a concave shape to a depth equal to the total layer thickness thereof, this area may be completely flattened. Or, when all the non-aperture areas opposite to the electro-optical material except for the pixel electrodes (with various wiring lines formed thereon) are formed into concave recesses, the aperture area and the non-aperture areas of the pixels are flattened. Similarly when the substrate area opposite to the connecting lines in the sealed area is formed into a concave recess, it is possible to reduce a step caused by the presence of connecting lines in the sealed area, and thus to flatten the sealed area.

The electro-optical apparatus may be formed by forming a concave recess on the substrate in an initial stage of manufacture, and the subsequent steps of including the sputtering step, the photolithographic step and the etching step may be carried out in substantially the same or similar manner as in the conventional art, thus providing very favorable advantages. In addition, it is not necessary to use a larger thickness for a portion of the interlayer insulating film and a smaller thickness for the other portion thereof as described above. There is therefore no risk of occurrence of cracks at thicker portions of the interlayer insulating film or back channel at thinner portions thereof. This leads to a remarkably improved degree of freedom in design, makes it unnecessary to conduct difficult manufacturing steps or additional steps, and does not lead to an increase in cost.

In an electro-optical apparatus including active matrix driving type, passive matrix driving type and segment driving type, a step in the pixel section can be reduced by the use of a relatively simple configuration. It is therefore possible to efficiently reduce defective alignment of the electro-optical material by an inappropriate rubbing processing due to a step, or directly caused by a deviated distance between the substrates due to a step. Further, because a step in the sealed area can be reduced by the use of a relatively simple configuration, it is also possible to efficiently perform gap control between the substrates and prevent deterioration of connecting lines.

The electro-optical apparatus according to one aspect of the present invention includes a first substrate having a first face and a second face and provided with a concave recess formed on the first face, a second substrate arranged opposite to the first face, an electro-optical material held between the first face and the second substrate, a plurality of pixel electrodes formed on the first face, and a plurality of wiring lines formed on the first face to be at least partially positioned on the concave recess, respectively, and connected to the pixel electrodes.

According to the invention, portions opposite to the TFT, the data lines and the scanning lines may be formed into concave recesses when viewed from the second substrate side. As compared with the conventional case in which the interlayer insulating film is formed into a flat shape, and then the TFT and other components are formed thereon, therefore, the difference in total thickness between an area having the TFT and other-components formed thereon and an area not having these components, depending upon the depth of the concave recess, is reduced. This promotes flattening in the pixel section. For example, by setting a depth of the concave recess so as to bring the difference in total thickness substantially to zero, a subsequent flattening step can be omitted. Or, by setting a depth of the concave recess so as to reduce the difference in the total layer thickness, it is possible to alleviate the burden of the subsequent flattening step. More specifically, conventional steps including the coating step of a flattened film by spin coating and the forming step of a flattened insulating film can be omitted or simplified.

The electro-optical apparatus according to one aspect of the present invention includes a first substrate having a first face and a second face, a second substrate arranged opposite to the first face, an electro-optical material held between the first face and the second substrates, a plurality of pixel electrodes formed on the first face, and an interlayer insulating film formed on the first face so as to have a concave recess directed toward the electro-optical material. A plurality of wiring lines may be formed on the first face so as to be at least partially positioned on the concave recess and connected to the pixel electrodes. A plurality of capacitor lines may be formed on the first face so as to be at least partially positioned under the wiring lines on the concave recess for imparting a capacity to each of the pixel electrodes.

Because the incident light does not transmit, the space under wiring lines (such as data lines) unavailable as an aperture area can be effectively utilized as a space for imparting a capacitor to the pixel electrodes.

Further, according to the invention, an area of the interlayer insulating film opposite to the capacitor lines may be formed into a concave recess as compared with other areas. For example, the surface of the pixel electrode located above the data lines may be flattened by this recess. In the conventional art, defective alignment of a liquid crystal may have been caused by inappropriate rub processing due to a step, or directly caused by a deviated distance between substrates due to a step, most easily at the portion of the aperture area along the data lines. However, defective alignment at this portion can be minimized through flattening.

The electro-optical apparatus according to one aspect of the present invention may include a first substrate having a first face and a second face, a second substrate arranged opposite to the first face, an electro-optical material held between the first face and the second substrate and a plurality of pixels electrodes formed on the first face. A plurality of wiring lines may be formed on the first face and connected to the pixel electrodes. A sealing material may be mixed with a gap filler for bonding the first face and the second substrate together. A plurality of connecting lines may be formed in an area where the sealing material is formed on the first face and extends from the wiring lines, respectively. An interlayer insulating film may be formed on the first face so as to have a concave recess between the first face and the connecting lines.

The first and the second substrates may be bonded to each other, and the gap between the substrates may be filled with a gap filler mixed with a sealing material. The apparatus of the invention in therefore embodied in a liquid crystal apparatus of the active matrix driving type such as TFT (thin-film transistor) driving or TFD (thin-film diode) driving, or a liquid crystal apparatus of the passive matrix driving type, provided with liquid crystal having a prescribed thickness, and being matrix-driven by the data lines and the scanning lines. In the interlayer insulating film, the portion opposite to the connecting lines in the sealed area may be formed into a concave recess. Therefore, the height of a projection caused by the thickness of the connecting lines formed on the surface of the uppermost layer (hereinafter referred to as the "sealed area surface") such as an interlayer insulating film in contact with the sealing material in the sealed area on the substrate side having the data lines and the scanning lines formed thereon is reduced in response to the depth of the concave recess. That is, the surface of the sealed area may be flattened. As a result, this stress may be uniformly dispersed over the surface on the flattened sealed area via the gap filler mixed with the sealing material. This may reduce the possibility of breakage of connecting lines or short circuits. By reducing the difference in height on the surface of the sealed area, if not substantially to zero, but only slightly, the possibility of breakage of connecting lines or short circuit is reduced at least slightly under a similar effect.

Further, the surface of the uppermost layer of the alignment film or the like in contact with the liquid crystal in each pixel area on the substrate surface having data lines or scanning lines formed thereon (hereinafter referred to as the "pixel area surface") has almost the same height as that of a portion of the sealed area surface not located on the connecting lines. The difference in height between the pixel area surface and the sealed area surface is therefore reduced by flattening the sealed area surface. As a result, a gap filler may not be needed having a smaller diameter than the gap between substrates by about 1 $\mu$m as in the conventional art.

It is possible to use a gap filler having a diameter of the same order as that of the gap between the substrates. This permits expectation of a remarkable effect when reducing the gap between the substrates to prevent defective alignment of the liquid crystal caused by finer pixels.

The manufacturing method of an electro-optical apparatus of one aspect of the present invention may include: a step of forming a resist pattern corresponding to a concave recess by photolithography on a flat substrate serving as the first substrate, a step of forming the concave recess through etching for a prescribed period of time via the resist pattern and a step of forming a plurality of pixel electrodes and a plurality of wiring lines in a prescribed sequence on the first substrate including the concave recess.

A resist pattern corresponding to the concave recess may be formed by photolithography on the flat substrate serving as the first substrate. Then, etching may be carried out for a prescribed period of time via this resist pattern to form a concave portion. By controlling the etching time, it may be possible to control the depth of the concave recess and the film thickness. When using dry etching, an aperture having substantially the designed exposure size can be provided. Then, a plurality of pixel electrodes and a plurality of wiring lines may be formed in a prescribed sequence on the substrate containing the concave recess. It is therefore possible to manufacture the electro-optical apparatus of the invention relatively easily. Particularly, by forming a concave recess on the substrate in an initial stage of manufacture, the electro-optical apparatus of the invention may be favorably manufactured by only executing the subsequent steps in substantially or in the same manner as in the conventional art.

The manufacturing method of an electro-optical apparatus of one aspect of the present invention may include: a step of forming a light shielding film in a prescribed area on the first substrate, a step of depositing an interlayer insulating film on the first substrate and the light shielding film, a step of forming a resist pattern corresponding to a concave recess on the insulating film by photolithography and a step of forming the concave recess by dry etching for a prescribed period of time via the resist pattern.

A light shielding film may be formed in a prescribed area on a first substrate, and an insulating film may be deposited on the first substrate and the light shielding film. Then, a resist pattern corresponding to a concave recess may be formed by photolithography on the insulating film, and then the concave recess is formed through dry etching for a prescribed period of time via the resist pattern. It is therefore possible to control the depth of the concave recess and the film thickness through control of the dry etching time.

The manufacturing method of an electro-optical apparatus of one aspect of the present invention may include: a step of forming a light shielding film in a prescribed area on the first substrate, a step of depositing a first insulating film on the first substrate and the light shielding film, a step of forming a resist pattern corresponding to a concave recess on the first insulating film by photolithography, a step of removing the first insulating film corresponding to the concave recess through etching via the resist pattern and a step of depositing a second insulating film on the first substrate and the first insulating film.

A light shielding film may be formed in a prescribed area on a first substrate, and a first insulating film may be deposited on the first substrate and the light shielding film. Then, a resist pattern corresponding to a concave recess may be formed by photolithography on the first insulating film, and then, etching may be performed via the resist pattern to remove the first insulating film corresponding to the concave recess. Then, a second insulating film is deposited on the first substrate and the first insulating film. As a result, certain and highly accurately control of the thickness of the first interlayer insulating film at the concave recess portion may be accomplished through control of thickness of the second insulating film.

The manufacturing method of an electro-optical apparatus of one aspect of the present invention may include: a step of forming a light shielding film in a prescribed area on the first substance, a step of forming a first interlayer insulating film on the first substrate and the light shielding film so that concave recesses are formed on the portion opposite to a thin-film transistor and a portion corresponding to the position of connection and a step of forming the thin-film transistor on the first interlayer insulating film. The method may further include a step of aperturing the second and first interlayer insulating films to reach the light shielding film at the position for connection as contact holes for connecting the light shielding film and the wiring lines from the contact potential source, and at the same time, aperturing the second and first insulating films to reach a semiconductor layer at a position opposite to a source or drain area of the semiconductor layer forming the thin-film transistor, as contact holes for connecting the thin-film transistor and the data lines.

A light shielding film may be formed in a prescribed area on a first substrate, and a first interlayer insulating film may be formed on the first substrate and the light shielding film so that a portion corresponding to a TFT and a portion corresponding to a position for connection of the light shielding film and a constant potential source. Then, a TFT may be formed on the first interlayer insulating film, and a second interlayer insulating film may be formed on the TFT and the first interlayer insulating film. The second interlayer insulating film is provided for electric insulation of the TFT, the data lines, and the scanning lines. The second and the first interlayer insulating films may be apertured to reach the light shielding film as contact holes for connecting the light shielding film and the wiring lines from the constant potential source, and at the same time, the second insulating film may be apertured up to a semiconductor layer, as contact holes for connecting the TFT and the data lines. It is thus possible to aperture together these two kinds of contact holes.

The manufacturing method of an electro-optical apparatus of one aspect of the present invention may include: a step of depositing an insulating film forming a single layer on the first substrate, a step of forming a resist pattern corresponding to a concave recess on the deposited insulating film by photolithography and a step of forming the concave recess through etching for a prescribed period of time via the resist pattern.

An insulating film to form the single layer on the first substrate may be deposited over the entire screen display area. Then, a resist pattern corresponding to a concave recess may be formed by photolithography on the deposited insulating film. Then, etching may be conducted for a prescribed period of time via the resist pattern to form a concave recess. The depth of the concave recess and the film thickness may be controlled based on the etching time. When dry etching is performed, an aperture having substantially a designed exposure size can be provided.

The manufacturing method of an electro-optical apparatus of one aspect of the present invention may include: a step of depositing a first insulating film to form a multilayered portion on the first substrate, a step of forming a resist pattern corresponding to a concave recess on the deposited first insulating film by photolithography, a step of removing the first insulating film corresponding to the concave recess through etching via the resist pattern and a step of depositing a second insulating film to form the single-layered portion and a multilayered portion on the first insulating film and the area from which the first insulating film has been removed.

A first insulating film may be deposited over the entire screen display area to form a multilayered portion on a first substrate. Then, a resist pattern corresponding to a concave recess may be formed by photolithography on the deposited first insulating film. Etching may be carried out via the resist pattern to remove the first insulating film corresponding to the concave recess. Then, a second insulating film may be deposited on the first insulating film and the area from which the first insulating film has been removed. As a result, the thickness of the first interlayer insulating film in the concave recess portion may be controlled relatively easily through control of the thickness of the second insulating film. When dry etching is used in this etching step, an aperture having substantially a designed exposure size can be provided.

The manufacturing method of an electro-optical apparatus of one aspect of the present invention may include: a step of forming a light shielding film in a prescribed area of the first substrate, a step of forming a first interlayer insulating film on the first substrate and the light shielding film so that a portion corresponding to the position for connection becomes a concave portion, a step of forming a thin-film transistor on the first interlayer insulating film; a step of forming a second interlayer insulating film on the thin-film transistor and the first interlayer insulating film and a step of aperturing the second and first interlayer insulating films to reach the light shielding film at the position for connection as contact holes for connecting the light shielding film and the wiring lines from the contact potential source and at the same time aperturing the second and first insulating films to reach a semiconductor layer at a position opposite to a source or drain area of the semiconductor layer forming the thin-film transistor as contact holes for connecting the thin-film transistor and the data lines.

A light shielding film may be formed in a prescribed area on the first substrate, and a first interlayer insulating film may be formed on the first substrate and the light shielding film so that a portion corresponding to the position where the light shielding film and a constant potential source are connected together forms a concave recess. Then, a TFT may be formed on the first interlayer insulating film and a second interlayer insulating film may be formed on the TFT and the first interlayer insulating film. The second interlayer insulating film may be provided for electrical insulation of the TFT, the data lines, the scanning lines and the capacitor lines. The second and the first interlayer insulating films may be apertured to reach the light shielding film as contact holes for connection of the light shielding film and the wiring lines from the constant potential source. At the same time, the second interlayer insulating film may be apertured to reach a semiconductor layer as a contact hole for connection of the TFT and the data lines. It is therefore possible to aperture together two kinds of contact holes.

The electronic device using an electro-optical apparatus according to one aspect of the present invention may include: a first substrate having a first face and a second face and provided with a concave recess formed on the first face, a second substrate arranged opposite to the first face, an electro-optical material held between the first face and the second substrate, a plurality of pixel electrodes formed on the first face and a plurality of wiring lines formed on the first face so as to be at least partially positioned on the concave recess and the pixel electrodes.

The electronic device using an electro-optical apparatus according to one aspect of the present invention may include: a first substrate having a first face and a second face, a second substrate arranged opposite to the first face, an electro-optical material held between the first face and the second substrate, a plurality of pixel electrodes formed on the first face, an interlayer insulating film formed on the first face so as to have a concave recess facing the electro-optical material side and a plurality of wiring lines formed on the first face so as to be at least partially positioned on the concave recess and connected to the pixel electrodes.

The electronic device using an electro-optical apparatus according to one aspect of the present invention may include: a first substrate having a first face and a second face, a second substrate arranged opposite to the first face, an electro-optical material held between the first face and the second substrate, a plurality of pixel electrodes formed on the first face and an interlayer insulating film formed on the first face so as to have a concave recess facing the electro-optical material side. A plurality of wiring lines may be formed on the first face so as to be at least partially positioned on the concave recess and connected to the pixel electrodes. A plurality of capacitor lines may be formed on the first face so as to be at least partially positioned under the wiring lines on the concave recess for imparting a capacity to each of the pixel electrodes.

The electronic device using an electro-optical apparatus according to one aspect of the present invention may include: a first substrate having a first face and a second face, a second substrate arranged opposite to the first face, an electro-optical material held between the first face and the second substrate, a plurality of pixel electrodes formed on the first face and a plurality of wiring lines formed on the first face, and connected to the pixel electrodes. A sealing material mixed with a gap filler may also be provided for bonding together the first face and the second face. A plurality of connecting lines may be formed in an area where the sealing material is formed on the first face and extends from the wiring lines, respectively. An interlayer insulating film may be formed on the first face so as to have a concave recess between the first face and the connecting lines.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIGS. 10(14)-10(16) are process diagrams illustrating the manufacturing process of the electro-optical apparatus of the invention;

FIGS. 63(1)–63(3) are sectional views of the electro-optical apparatus at a connecting portion formed under the sealed area on the TFT array substrate side;

DETAILED DESCRIPTION OF THE PREFERRED EMBODIMENTS

Figure 1:
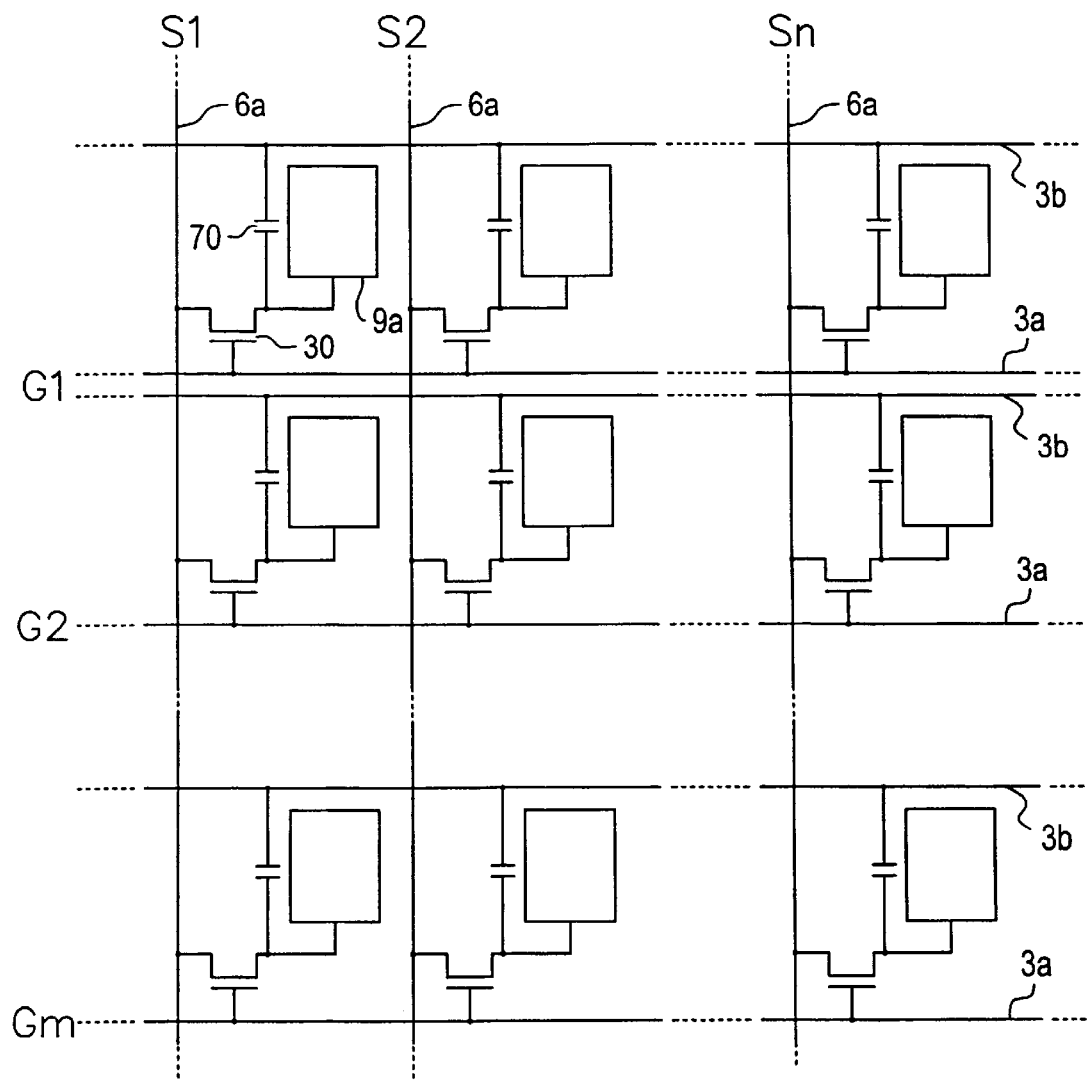
FIG. 1 illustrates various elements and wiring lines provided in a plurality of matrix-shaped pixels forming a screen display area according to the present invention.
Figure 2:
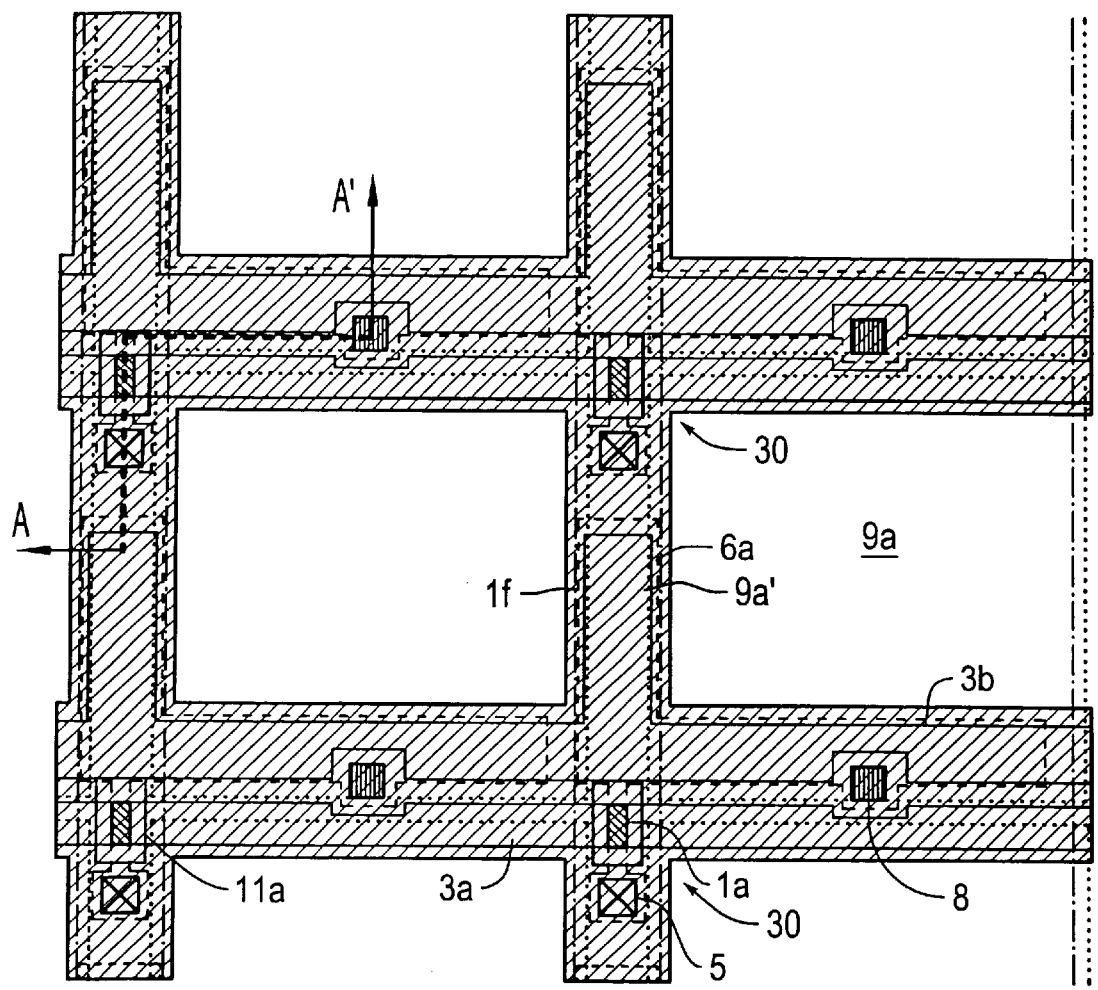
FIG. 2 illustrates a plurality of pixels adjacent to each other of a TFT array substrate having data lines, scanning lines pixel electrodes and light shielding films according to the present invention.
Figure 3:
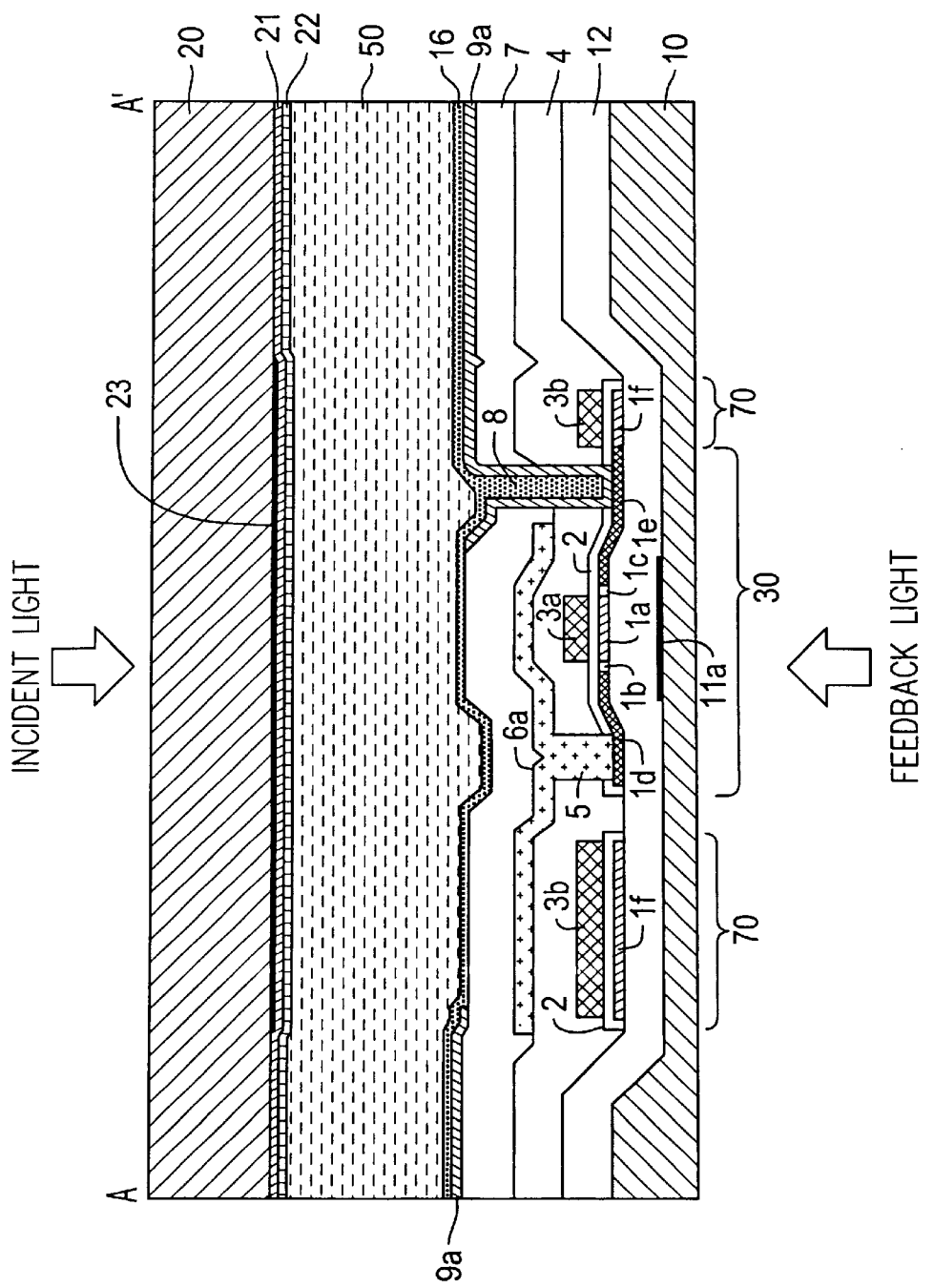
FIG. 3 is a sectional view of FIG. 2 cut along the line A–A'.
Figure 4:
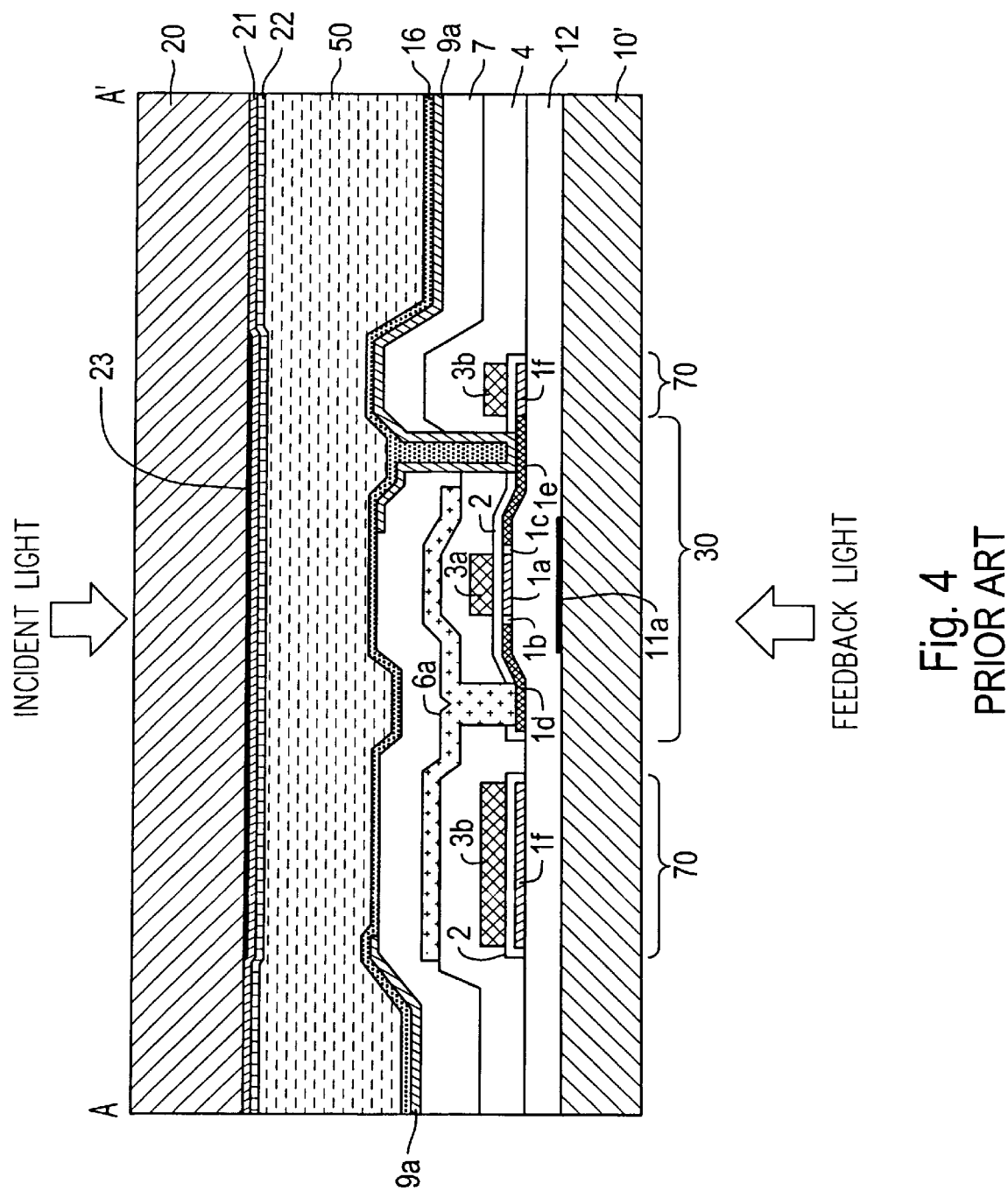
FIG. 4 is a sectional view of a comparative example corresponding to the A–A' sectional view of FIG. 2.

A configuration of the electro-optical apparatus of the present invention in the image display area and operations thereof will now be described with reference to FIGS. 1 to 4. FIG. 1 illustrates an equivalent circuit of various elements and wiring lines provided in a plurality of matrix-shaped pixels forming an image display area. FIG. 2 is a plan view illustrating a plurality of pixels adjacent to each other on a TFT array substrate having data lines, scanning lines, pixel electrodes and light shielding films formed thereon. FIG. 3 is a sectional view of FIG. 2 along the line A–A'. FIG. 4 is a sectional view corresponding to the A–A' sectional view of FIG. 2. In FIGS. 3 and 4, layers and elements are shown in different reduced scales to make the components recognizable.

As shown in FIG. 1, the plurality of pixels are formed into a matrix shape so as to form the image display area of the electro-optical apparatus. This may include a pixel electrode $9a$, a TFT $30$ for controlling the pixel electrode $9a$ and a data line $6a$ for receiving an image signal being electrically connected to a source of the pixel switching TFT $30$. Image signals S1, S2 . . . , Sn written on the data lines $6a$ may be sequentially supplied in this order or may be supplied for each group of the plurality of neighboring data lines $6a$. Scanning lines $3a$ may be electrically connected to the gate of the pixel switching TFT $30$ so that scanning signals G1, G2 . . . Gm are sequentially impressed in this order in pulsation to the scanning lines $3a$. The pixel electrode $9a$ may be electrically connected to a drain of the pixel switching TFT $30$ so as to write the image signals S1, S2, . . . , Sn supplied from the data lines $6a$ at a prescribed timing by closing the pixel switching TFT $30$, which is a switching element, for a certain period of time. The image signals S1, S2, . . . , Sn on a prescribed level written in the electro-optical material using the pixel electrode $9a$ are retained for a certain period of time relative to an opposing electrode formed on an opposing substrate. The electro-optical material modulates a light through variation of alignment or order of molecular arrangement in response to the impressed voltage. This permits a gradation display. In the normally white mode, an incident light may not pass through the electro-optical material section in response to the impressed voltage. In the normally black mode, the incident light may pass through the electro-optical material in response to the impressed voltage and the light having a contrast corresponding to the image signals may be emitted from the electro-optical apparatus. A storage capacitor $70$ may be provided in parallel with the electro-optical material capacitor formed between the pixel electrode $9a$ and the opposing electrode to prevent leakage of the retained image signals. For example, voltage of the pixel electrode $9a$ may be retained by the storage capacitor $70$ for a period longer than the period of impression of source voltage by three digits. This improves the retaining property, thus permitting achievement of an electro-optical apparatus giving a high contrast ratio.

As shown in FIG. 2, a plurality of transparent pixel electrodes $9a$ (contoured by a dotted line $9a'$) may be provided in a matrix shape on a TFT array substrate. A data line $6a$, a scanning line $3a$ and a capacitor line $3b$ may be provided along each of the longitudinal and lateral boundaries of the pixel electrode $9a$. The data line $6a$ may be electrically connected to the source area of a semiconductor layer $1a$ comprising a polysilicon film or the like via a contact hole $5$. The pixel electrode $9a$ may be electrically connected to the drain area of the semiconductor layer $1a$ via a contact hole $8$. A scanning line $3a$ may be arranged to be opposite to the channel area (area marked with right-down oblique lines) of the semiconductor layer $1a$. The scanning line $3a$ may serve as a gate electrode.

The capacitor line $3b$ has a main line portion which linearly extends along the scanning line $3a$, and a projecting portion which projects from the crossing point with the data line $6a$ along the data line $6a$ toward the leading side (i.e., upward in FIG. 2).

A first light shielding film $11a$ may be provided on each of the rectangular islands shown by thick lines in FIG. 2.

More specifically, each of the first island-shaped light shielding films 11a may be provided at a position covering one pixel at least when the channel area of each TFT is viewed from the TFT array substrate side.

The TFT array substrate may be formed into a concave recess in the area marked with right-up oblique lines in FIG. 2. This concave structure will be described later with reference to FIG. 3.

As shown in FIG. 3, the electro-optical apparatus may be provided with a TFT array substrate 10, which is an example the transparent substrate, and an opposing (or common) substrate 20 arranged opposite thereto. The TFT array substrate 10 may be made of a quartz substrate, for example, and the opposing substrate 20 may be made of a glass substrate or a quartz substrate, for example. A pixel electrode 9a may be provided on the TFT array substrate 10, and an alignment film 16 which is subjected to an alignment processing (such as rubbing) may be provided thereabove. The pixel electrode 9a may include a transparent conductive thin film such as an ITO (Indium Tin Oxide film). The alignment film 16 may include an organic thin film such as a polyimide thin film.

An opposing electrode (i.e., common electrode) 21 may be provided over the entire opposing substrate 20 and an alignment film 22 which is subjected to an alignment processing may be provided thereunder. The opposing electrode 21 may include a transparent conductive thin film such as an ITO film. The alignment film 22 comprises, for example, an organic thin film such as a polyimide thin film.

A pixel switching TFT 30 for switch-controlling each pixel electrode 9a may be provided adjacent to each pixel electrode 9a of the TFT array substrate 10 as shown in FIG. 3.

A second light shielding film 23 also known as a black mask or a black matrix may be provided in the area other than the aperture area (i.e., the area where actually an incident light transmits and effectively contributes to display within the image display area) of each pixel. As a result, an incident light from the opposing substrate 20 side never enters the channel area 1a' of the semiconductor layer 1a of the pixel switching TFT 30 or LDD (Lightly Doped Drain) areas 1b and 1c. Further, the second light shielding film 23 improves the contrast and prevents color mixture.

An electro-optical material may be sealed in a space between the TFT array substrate 10 and the opposing substrate 20 such that the pixel electrode 9a and the opposing electrode 21 are arranged opposite to each other to form an electro-optical material layer 50. The electro-optical material layer 50 may take a prescribed alignment condition under the effect of the alignment films 16 and 22 when an electric field is not impressed from the pixel electrode 9a. The electro-optical material layer 50 may be made of a mixed electro-optical material made from one or more nematic liquid crystal. The sealing material may be an adhesive including a photo-setting resin or a thermo-setting resin for bonding the two substrates 10 and 20 at peripheries thereof. The sealing material may be mixed with a spacer such as glass fiber or glass beads to keep a prescribed distance between both substrates.

The TFT array substrate 10 may be formed into a concave recess within the area meshed with right-up oblique lines (FIG. 2) containing the data line 6a, the scanning line 3a, the capacitor line 3b and the pixel switching TFT 30. The TFT array substrate 10 is formed relatively convex (flat) and in the aperture area substantially corresponding to the pixel electrode 9a (i. e., the area not containing oblique lines in FIG. 2).

Since at least a part of the TFT array substrate 10 is formed into a concave recess, the surface of the alignment film 16 positioned above the data line 6a, the scanning line 3a, the capacitor line 3b and the pixel switching TFT 30 may be flattened relative to the surface of the alignment film 16 in the aperture area in response to the depth of the recess in this concave recess area.

In this embodiment in which the data line 6a, the scanning line 3a, the capacitor line 3b and the pixel switching TFT 30 are arranged on top of each other, the area where the lamination composing these lines and the pixel switching TFT 30 becomes the largest in thickness is formed into a concave shape of a depth equal to the total layer thickness and this thickest area is almost completely flattened. The non-aperture areas opposite to the electro-optical material layer 50 except for the pixel electrode 9a may be formed into a concave shape. As a result, the aperture area and the non-aperture areas are made flush with each other.

The height of the alignment film 16 of any arbitrary area may be fitted with the height of the alignment film 16 in the aperture area. For example, the height of the alignment film 16 above the storage capacitor 70 (to the left in FIG. 3) may be fitted, or the height of the alignment film 16 above the scanning line 3a or the capacitor line 3b off the pixel switching TFT 30 may be fitted. Any arbitrary area of the TFT array substrate 10 may be made concave. For example, only the area opposite to the data line 6a may be formed into a concave recess or only the area opposite to the pixel switching TFT 30 may be made concave. By forming a slight recess at an area off the aperture area, a flattening effect is available in response to the area formed into a recess and the depth thereof. Therefore, the area to be formed into a concave shape and the depth of the recess are determined as design matters by taking into account the pixel aperture ratio (i.e., the ratio of the aperture area to the non-aperture area of the pixel), the degree of fineness and the field to be actually achieved.

Since the electro-optical apparatus has the above-described configuration, by forming a concave recess on the TFT array substrate 10 in the initial stage of manufacture, the electro-optical apparatus can be manufactured through various steps including a CVD step, a sputtering step, a photolithographic step, and an etching step for forming the first light shielding, the semiconductor layer, the wiring lines, the interlayer insulating film and the like, in the same or similar manner to conventional methods. In addition, it is not necessary to use a large thickness portions and small thickness portions of the interlayer insulating film. There is therefore less risk of cracks at the thicker portion or back channel at the thinner portions of the interlayer insulating film. This remarkably increases the degree of freedom in design, eliminates the need for difficult manufacturing steps and additional steps, and provides a benefit of not requiring a higher cost.

In the comparative example shown in FIG. 4, a concave recess is not formed on the TFT array substrate 10'. Therefore, the thickness of the electro-optical material layer 50 largely varies between the aperture area and the non-aperture area. This causes a serious disclination of the electro-optical material at a step between these areas. The disclination of the electro-optical material affecting the aperture area causes deterioration of image quality. In order to prevent the disclination from affecting the aperture area, the second light shielding film 23 on the opposing substrate 20 is widened which results in a darker displayed image.

According to this embodiment, it is possible to effectively inhibit occurrence of disclination of the electro-optical material layer 50 used by a step. This makes it possible to reduce an adverse effect to disclination of the electro-optical material layer 50 exerted on a displayed image, thus permitting display of a high-quality image and to enlarge the aperture area of the pixel section.

As shown in FIG. 3, an island-shaped first light shielding film 11a is provided for each pixel between the TFT array substrate 10 and each pixel switching TFT 30 at a position opposing the pixel switching TFT 30. The first light shielding film 11a is preferably made of a single metal, an alloy, metal silicide or Si containing at least one of opaque high-melting-point metals such as Ti, Cr, W, Ta, Mo and Pd. By using such a material, breakage or melting of the first light shielding film 11a is prevented by using a high-temperature treatment during the forming step of the pixel switching TFT 30 that is carried out after the forming step of the first light shielding film 11a on the TFT array substrate 10. A polysilicon film may be used as the first light shielding film 11a. Alternatively, a polysilicon film may be formed as an upper layer on top of the high-melting-point metal and a reflection preventing treatment may be applied. Formation of the first light shielding film 11a prevents the feedback light from the TFT array substrate 10 side from entering the channel area 1a' or source side LDD area 1b and drain side LDD area 1c of the pixel switching TFT 30. As a result, properties of the pixel switching TFT 30 are not deteriorated by the occurrence of photoelectric current.

A first interlayer insulating film 12 may be provided between the first light shielding film 11a and the plurality of pixel switching TFTs 30. The first interlayer insulating film 12 may electrically insulate the semiconductor layer 1a forming the pixel switching TFT 30 from the first light shielding film 11a. The first interlayer insulating film 12 serves also as an undercoat film for the pixel switching TFT 30 by covering the entire surface of the TFT array substrate 10. That is, the first interlayer insulating film 12 may prevent properties of the pixel switching TFT 30 from being deteriorated by roughening during surface polishing or stains remaining after rinsing. Because a driving circuit is not formed directly on the concave portion, it is possible-to prevent the effect of the concave portion on the active layer of the driving circuit, (i. e., a shift of threshold) from resulting in deterioration of the properties such as a decrease in mobility of the active layer or an increase in off-leak. The first interlayer insulating film 12 may be made of a high-insulating glass such as NSG (Non-doped Silicate Glass), PSG (Phosphorus Silicate Glass), BSG (Boron Silicate Glass) or BPSG (Boron Phosphorus Silicate Glass), a silicon oxide film, or a silicon nitride film. By using the first interlayer insulating film 12, the first light shielding film 11a may be prevented from contaminating the pixel switching TFT 30 and the like.

A storage capacitor 70 may include a gate insulating film 2 extended from the position opposite to the scanning line 3a and serving as a dielectric film. A semiconductor film 1a may extend to serve as a first storage capacitor electrode 1f, and a part of the capacitor line 3b opposite thereto may serve as a second storage capacitor electrode. More specifically, a high-concentration drain area of the semiconductor layer 1a may extend under the data line 6a and the scanning line 3a, arranged opposite via the insulating film 2 to the portion of the capacitor line 3b running along the data line 6a and the scanning line 3a, and serves as the first storage capacitor electrode (semiconductor layer) 1f. Particularly, the insulating film 2 serving as the dielectric of the storage capacitor 70 is the gate insulating film 2 itself of the pixel switching TFT 30 forming the polysilicon film by high-temperature oxidation. It is therefore possible to form the film as a thin and pressure-resistant insulating film and the storage capacitor 70 can have a large storage capacitor with a relatively small area.

As a result, the storage capacitor of the pixel electrode 9a can be increased through effective utilization of the spaces other than the aperture area such as the area under the data line 6a and the area along the scanning line 3a where disclination of the electro-optical material occurs (i. e., the area having the capacitor line 3b formed therein). It is therefore possible to achieve a bright electro-optical apparatus giving a high contrast ratio even in a small-capacity high-precision electro-optical apparatus.

In FIG. 3, the pixel switching TFT 30 has an LDD structure, and has the scanning line 3a, a channel area 1a' of the semiconductor layer 1a in which a channel is formed by an electric field from the scanning line 3a, a gate insulating film 2 for insulating the scanning line 3a and the semiconductor layer 1a, the data line 6a, a low-concentration source area (source side LDD area) 1b and a low-concentration drain area (drain side LDD area) 1c of the semiconductor layer 1a, and a high-concentration source area 1d and a high-concentration drain area 1e of the semiconductor layer 1a. One of the plurality of pixel electrodes 9a may be connected to the high-concentration area 1e. The source areas 1b and 1d and the drain areas 1c and 1e may be formed by doping a dopant for n-type or for p-type having a prescribed concentration depending on which of the n-type and the p-type channels is to be formed onto the semiconductor layer 1a. The n-type channel TFT has a favorable feature of a high operating speed and is therefore often used as a pixel switching TFT 30 which is a switching element for pixels. In this embodiment, the data line 6a may be made of a light-shielding thin film such as a metal film having a low resistance such as Al or an alloy film such as metal silicide. A second interlayer insulating film 4 having a contact hole 5 communicating with the high-concentration source area 1d and a contact hole 8 communicating with the high-concentration drain area 1e formed therein is formed on the scanning line 3a, the gate insulating film 2 and the first interlayer insulating film 12. The data line 6a is electrically connected to the high-concentration source area 1d through the contact hole 5 to the high-concentration source area 1d. Further, a third interlayer insulating film 7 having the contact hole 8 communicating with the high-concentration drain area 1e formed therein is formed on the data line 6a and the second interlayer insulating film 4. The pixel electrode 9a is electrically connected to the high-concentration drain area 1e through the contact hole 8. The pixel electrode 9a may be provided on the upper surface of the third interlayer insulating film 7 having such a configuration. The pixel electrode 9a and the high-concentration drain area 1e may be electrically connected through the same Al film as that of the data line 6a or the same polysilicon film as the scanning line 3b.

The pixel switching TFT 30 should preferably have the above-described LDD structure, or may have an offset structure in which impurity ion implantation is not applied to the low-concentration source area 1b or the low-concentration drain area 1c. The pixel switching TFT 30 may also be a self-alignment type TFT in which impurity ion implantation is performed at a high concentration with the gate electrode 3a as a mask, and the high-concentration source and drain areas are formed in a self-alignment manner.

In this embodiment, a single gate structure is adopted in which only one gate electrode 3a of the pixel switching TFT 30 is arranged between the high-concentration source area 1*d* and high concentration drain area 1*e*. Two or more gate electrodes may be arranged between these areas. In this case, the same signal should be impressed on these gate electrodes. By forming the TFT with dual or triple gates as described above, leaking current may be prevented at the connecting portion of the source and the drain areas, thus reducing current during power-off. By arranging at least one of these gate electrodes in the LDD structure or the offset structure, it is possible to further reduce off current and to form a stable switching element.

In general, in the polysilicon films such as the channel area 1*a*' of the semiconductor layer 1*a*, the low-concentration source area 1*b* and the low-concentration drain area 1*c*, a photocurrent is produced by the photoelectric exchange effect of polysilicon upon entrance of a light, which leads to deterioration of transistor properties of the pixel switching TFT 30. In this embodiment, in which the data line 6*a* is made of a light-shielding metal thin film such as Al to cover the gate electrode 3*a*, it is possible to effectively prevent entrance of an incident light into at least the channel area 1*a*' and the LDD areas 1*b* and 1*c* of the semiconductor layer 1*a*. The first light shielding film 11*a* provided under the pixel switching TFT 30 may prevent entering feedback light into at least the channel area 1*a*', the source side LDD areas 1*b* and drain side LDD area 1*c* of the semiconductor layer 1*a*.

The first light shielding film 11*a* may be divided into a plurality of island-shaped portions. Therefore, for example as compared with a lattice-shaped or stripe-shaped light shielding film, the film 11*a* has a far smaller area formed integrally, thus making it possible to largely alleviate stress produced in the light shielding film by the difference in physical properties between the light shielding film and an adjacent film. As a result, it is possible to prevent occurrence of film peeling, a deformation or cracks in the first light shielding film 11*a*. At the same time, it is also possible to prevent deterioration of properties of the pixel switching TFT 30 caused by stress of the first light shielding film 11*a*. The first light shielding film 11*a* may be formed into a stripe shape or a matrix shape under the data line 6*a*, the scanning line 3*a* and capacitor line 3*b*.

In addition, the plurality of islands of the first light shielding film 11*a* may be electrically connected to a constant potential source or a capacitor portion. For example, the first light shielding film 11*a* may be electrically connected to the capacitor lines 3*b* and kept at a constant potential, respectively. By using this configuration, a change in potential of the first light shielding film 11*a* does not affect the pixel switching TFT 30 arranged opposite to the first light shielding film 11*a*. By keeping the capacitor line 3*b* at a constant potential, it can satisfactorily function as the second capacitor electrode of the storage capacitor 70. In this case, applicable constant-potential sources include a constant potential source such as negative and positive power supplies to peripheral circuits (for example, a scanning line driving circuit, a data line driving circuit and the like) for driving the electro-optical apparatus, a grounding power supply and constant-potential sources to the opposing electrode 21.

In this embodiment, the islands of the first light shielding film 11*a* are provided in the smallest number necessary for shielding light from the channel area 1*a*' of the pixel switching TFT 30. The areas where the data lines 6*a*, the scanning lines 3*a* and the individual islands (light shielding films) are on top of the other in the limited non-aperture areas of the pixel section are limited. For example, when an unexpected projection is formed in the first light shielding film 11*a* during the manufacturing process, the first light shielding film 11*a* is short-circuited with the data line 6*a* or the scanning line 3*a*, thus reducing the possibility of the electro-optical apparatus becoming defective.

The capacitor line 3*b* and the scanning line 3*a* comprise polysilicon films of the same material. The dielectric film of the storage capacitor 70 and the gate insulating film 2 of the pixel switching TFT 30 are made of high-temperature oxide films of the same material. The first storage capacitor electrode 1*f*, and the pixel switching TFT 30 include semiconductor layers 1*a* of the same material. As a result, it is possible to simplify the lamination structure formed on the TFT array substrate 10, and further, in the manufacturing method of the electro-optical apparatus described below, to form simultaneously the capacitor line 3*b* and the scanning line 3*a* in a single thin-film forming step, and also simultaneously the dielectric film of the storage capacitor 70 and the gate insulating film 2.

According to this embodiment, in which the image display area is flattened, it is possible to improve the quality of the displayed image by adopting the first light shielding film 11*a* and the capacitor line 3*b*, and to reduce disclination of the electro-optical material by inhibiting a step around the pixel aperture area caused by the presence of the data line 6*a*, the scanning line 3*a*, and the pixel switching TFT 30, as well as the capacitor lines 3*b*, the first light shielding film 11*a* and the interlayer insulating film required along therewith as far as possible, and a bright image display with a high pixel aperture ratio is available.

Figure 5:
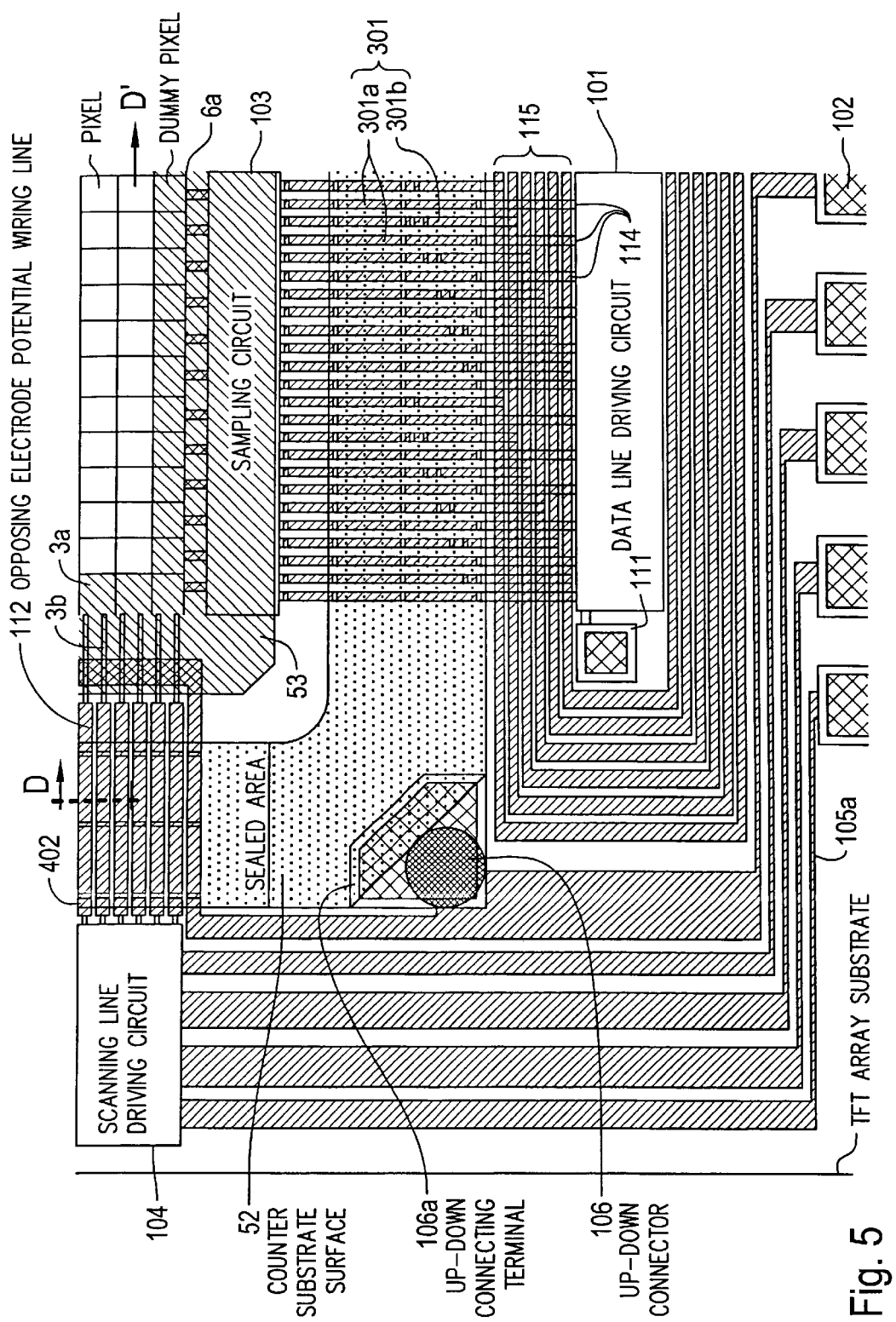
FIG. 5 illustrates connecting lines and a peripheral circuit formed in a sealed area and peripheral areas.
Figure 6:
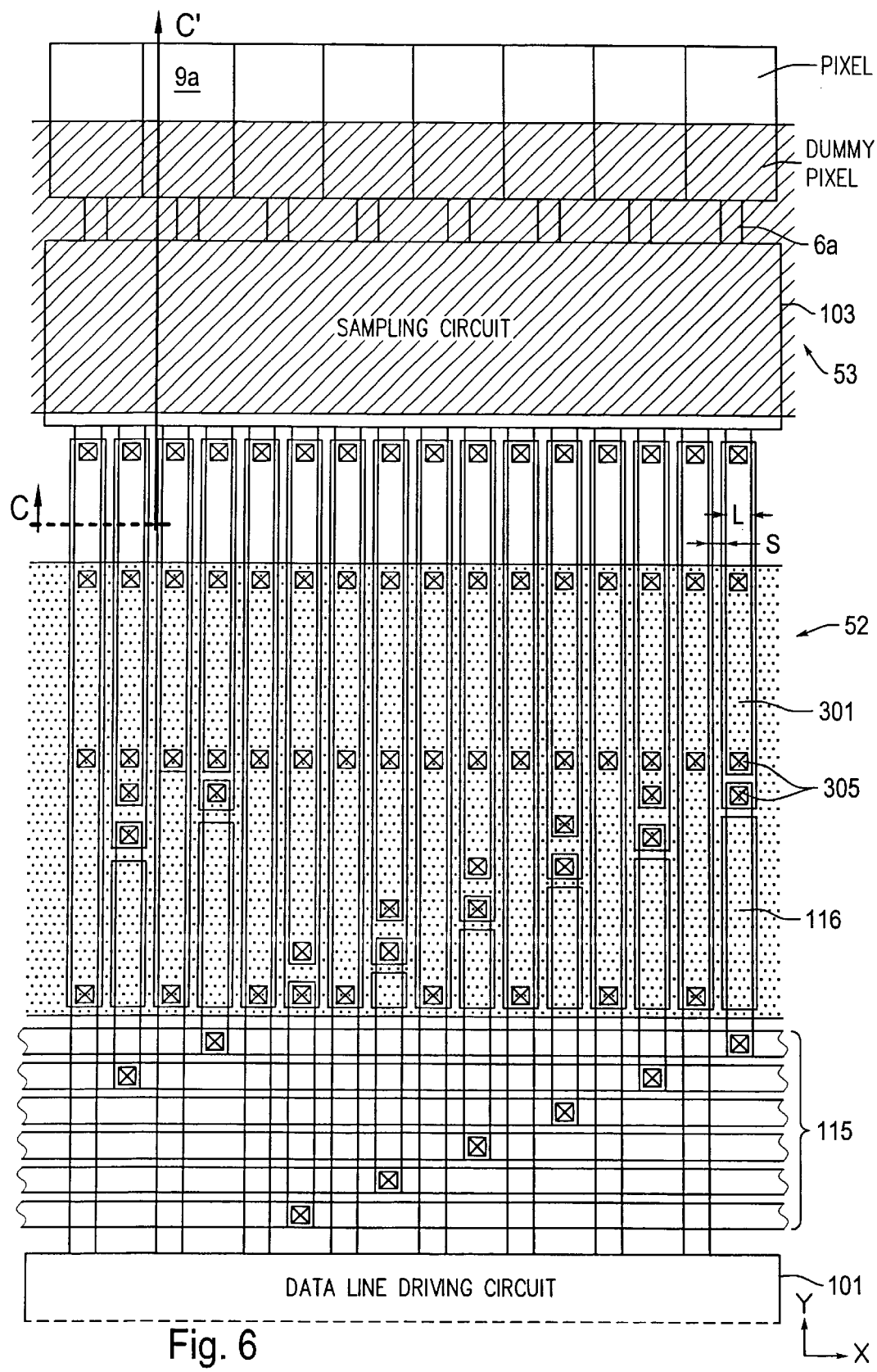
FIG. 6 illustrates connecting line portions of the data lines formed in the sealed area in FIG. 5.
Figure 7:
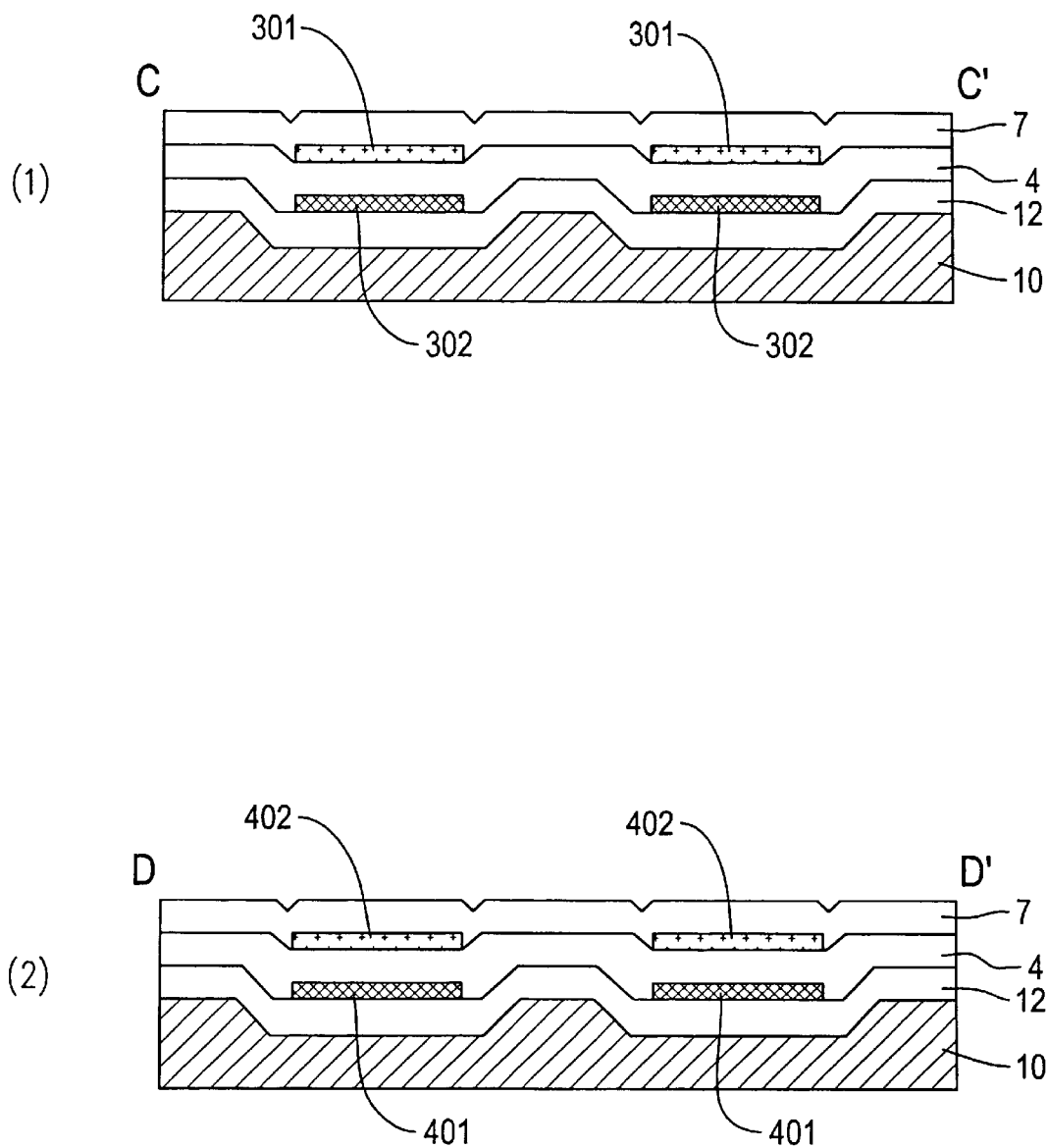
FIGS. 7(1) and 7(2) are a sectional views of an electro-optical apparatus on the TFT array substrate side in the connecting line portion formed under the sealed area.

The configuration of the electro-optical apparatus of the invention in the peripheral and sealed areas will now be described along with operations thereof with reference to FIGS. 5 to 7. FIG. 5 is a plan view illustrating connecting lines and peripheral circuits formed in the sealed area and peripheral areas. FIG. 6 is an enlarged plan view illustrating in an enlarged scale connecting line portion of the data lines formed in the sealed area in FIG. 5. FIG. 7(1) and 7(2) are sectional view of FIGS. 6 and 5 cut along the lines C–C' and D–D', respectively.

In FIG. 5, a scanning line driving circuit signal line 105*a* is wired from a mounting terminal 102 provided on the peripheral of the TFT array substrate 10 to a scanning line driving circuit 104, and a plurality of image signal lines 115 are wired in the X-direction in an area between a data line driving circuit 101 and the sealed area. A relay wiring line 301 comprising a connecting line 301*a* forming a part of a sampling circuit driving signal line 114 from the data line driving circuit 101 and a connecting line 301*b* from the image signal lines 115 are provided under the sealed area on the extension of the data line 6*a*. On the other hand, a connecting line 402 of the scanning line from the scanning line driving circuit 104 is provided under the sealed area on the extension of the scanning line 3*a*. The connecting line 402 includes a oppposing electrode (common electrode) potential wiring line 112 at an end thereof. The oppposing electrode potential wiring line 112 is connected to a oppposing electrode (see FIG. 3) formed on a opposing substrate 20 via an up-down connecting terminal 106*a* and an up-down connecting material 106. An inspection terminal 111 for entering a signal for a prescribed inspection into the data line driving circuit 101 may be provided adjacent to the data line driving circuit 101.

In FIG. 5, a sampling circuit 103 may be provided for impressing an image signal at a prescribed timing onto the data line 6*a* provided on the TFT array substrate 10. The sampling circuit 103 is provided with a plurality of switching elements (for example, TFT), one for each data line 6*a*.

Upon input of a plurality (six, for example) of serial-parallel converted image signals from the plurality of image signal lines 115 via the connecting line 301b, the sampling circuit 103 samples theses image signals using the individual switching elements at a timing of sampling circuit driving signal supplied from the data line driving circuit 101 via the sampling circuit driving signal line 114 and the connecting line 301a, and impresses the sampled signals onto the individual data lines 6a. In addition to the sampling circuit 103, a precharge circuit supplying precharge signals on a prescribed voltage level to the plurality of data lines 6a prior to supplying the image signals, or an inspection circuit for inspecting quality and defects of the electro-optical apparatus driving manufacture or upon shipping may be formed.

As shown in FIG. 6, each of the connecting lines of data lines extends in the Y-direction and has a width L, and adjacent wiring lines are arranged at intervals S. The connecting line 301 comprises an Al film of the same material as the data line 6a. A dummy wiring line 302 comprising a polysilicon film of the same material as the scanning line 3a is provided under each connecting line 301.

In FIGS. 5 and 6, dummy pixels having the same configuration as the pixels forming the screen display area are formed under the third light shielding film 53 provided on the opposing substrate and regulating the periphery of the image display area known as a peripheral frame. While it is not necessary to provide display pixels under the third light shielding film 53 provided for concealing a defective alignment area of the electro-optical material, dummy pixels may be provided by a prescribed with outside the edge of the image display area with a view to stabilizing properties of the pixels near the edge of the image display area.

On the other hand, the connecting lines 402 of the scanning line shown in FIG. 5 extend in the X-direction, and wiring lines adjacent to each other are arranged at certain intervals. The connecting line 402 includes a polysilicon film of the same material as the scanning line 3a. As shown in FIG. 7(2), a dummy wiring line 401 comprising an Al film of the same material as the data line 6a provided on each connecting line 402.

Particularly in this embodiment, as shown in FIGS. 7(1) and 7(2), the portions of the sealed area opposite to the connecting lines 301 and 402 in the TFT array substrate 10 are formed into concave recesses. As a result, the height of projections formed on the connecting lines 301 and 402 on the surface of the third interlayer insulating film 7 in contact with the sealing material 52 in the sealed area on the TFT array substrate 10 side is reduced in response to the depth of these concave recess. As shown in FIGS. 7(1) and 7(2), the surface of the third interlayer insulating film 7 is thus substantially flattened. Consequently, stress acting on the sealed area via the gap material such as glass fibers or glass beads mixed with the sealing material is uniformly dispersed over the surface of the third interlayer insulating film 7. This largely reduces the possibility of breakage or short-circuit of the connecting line caused by the concentration of such stress from the gap material in the sealed area having surface irregularities in response to the presence or absence of the connecting line.

Further, the difference in height is reduced between the surface of the pixel area facing the electro-optical material and the surface of the sealed area facing the sealing material 52. This eliminates the necessity of using a gap filler having a diameter smaller by about 1 $\mu$ than the gap between substrates as in the conventional art, and permits use of a gap material having a diameter of the same order as the gap between substrates. This permits expectation of a remarkable effect when reducing the gap between substrates to prevent defective alignment of the electro-optical material layer 50 used by a finer size of pixels.

In this embodiment, in the sealed area, the dummy wiring line 302 comprising a polysilicon film is formed by lamination via the second interlayer insulating film 4 for the connecting line 301 (see FIG. 7(1)). For the connecting line 402, on the other hand, a dummy wiring line 401 comprising an Al film is formed by lamination via the second interlayer insulating film 4 (see FIG. 7(2)). Therefore, the height of the surface of the third interlayer insulating film 7 in the sealed area on the upper and lower sides of the image display area agrees with the height of the surface of the third interlayer insulating film 7 on the right and left sides of the image display area. This stabilizers control of the gap between substrates by means of the gap material mixed with the entire sealing material 52.

The dummy wiring lines 302 and 401 for adjusting the total film thickness in the sealed area may be electrically connected to the connecting lines 301 and 402, respectively. By adopting this configuration, it is possible to achieve redundancy of the connecting lines. Electric floatation, if any, poses no problem, and these connecting lines can serve as connecting lines for the other capacitor lines 3b or the first light shielding film 11a.

In this embodiment, as shown in FIG. 6, the dummy wiring line 302 is further electrically connected to the connecting line 301 via a contact hole 305 provided in the second interlayer insulating film 4 (see FIGS. 7(1) and (2)). Similarly, the dummy wiring line 401 is electrically connected to the connecting line 402. As a result, each of the connecting lines 301 and 402 has a redundant structure having each two conductive layers (an Al film and a polysilicon film). Therefore, for example, even when the connecting line 301 or 402 is broken by the stress exerted by the gap material under the sealed area, or even when the Al conductive film tears the second interlayer insulating film 4 in a direction at right angles to the TFT array substrate 10 and causes a short-circuit with the polysilicon film, a defective wiring never occurs, thus providing an advantage. Further, for redundancy, the first light shielding film 1a may be provided under the connecting lines 302 and 402.

According to this embodiment, as described above in detail, the sealed area is flattened, thus permitting satisfactory control of the gap between substrates by means of the gap filler mixed with the sealing material while reducing defective wiring of the connecting lines.

In this embodiment, as shown in FIGS. 3 and 7, the concave side wall portion of the TFT array substrate is tapered. Therefore, as described below, polysilicon or resist formed in the subsequent steps does not remain in the concave recess. This ensures flattening. Particularly, because the side wall of the concave portion in the sealed area is tapered, it is possible to certainly and relatively easily form, by the thin-film technique, the wiring portion running across the side wall toward the data line driving circuit 101 and the scanning line driving circuit 104 formed from the connecting line passing under the sealed area onto the surface not having a concave portion. For example, it is not easy to arrange the connecting line across a side wall not tapered or reversely tapered, and this may cause defective wiring.

The manufacturing process of the electro-optical apparatus having the configuration as described above will now be described with reference to FIGS. 8 to 11. FIGS. 8 to 11 are process diagrams illustrating the layers on the TFT array substrate side in each process in association with the A–A' sectional view of FIG. 2 as in FIG. 3.

Figure 8:
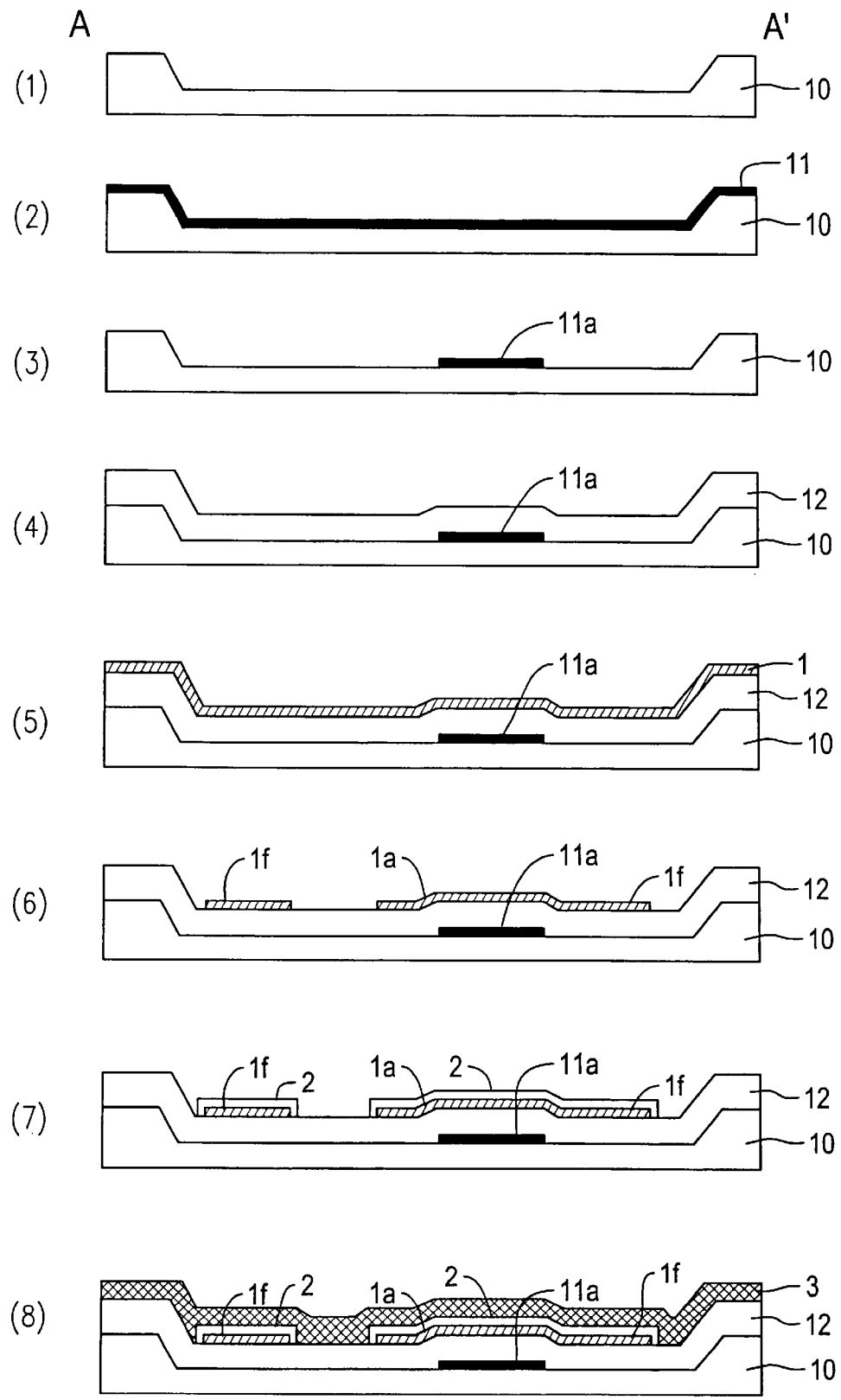
FIGS. 8(1)-8(8) are process diagrams illustrating the manufacturing process of the electro-optical apparatus of the invention.
Figure 9:
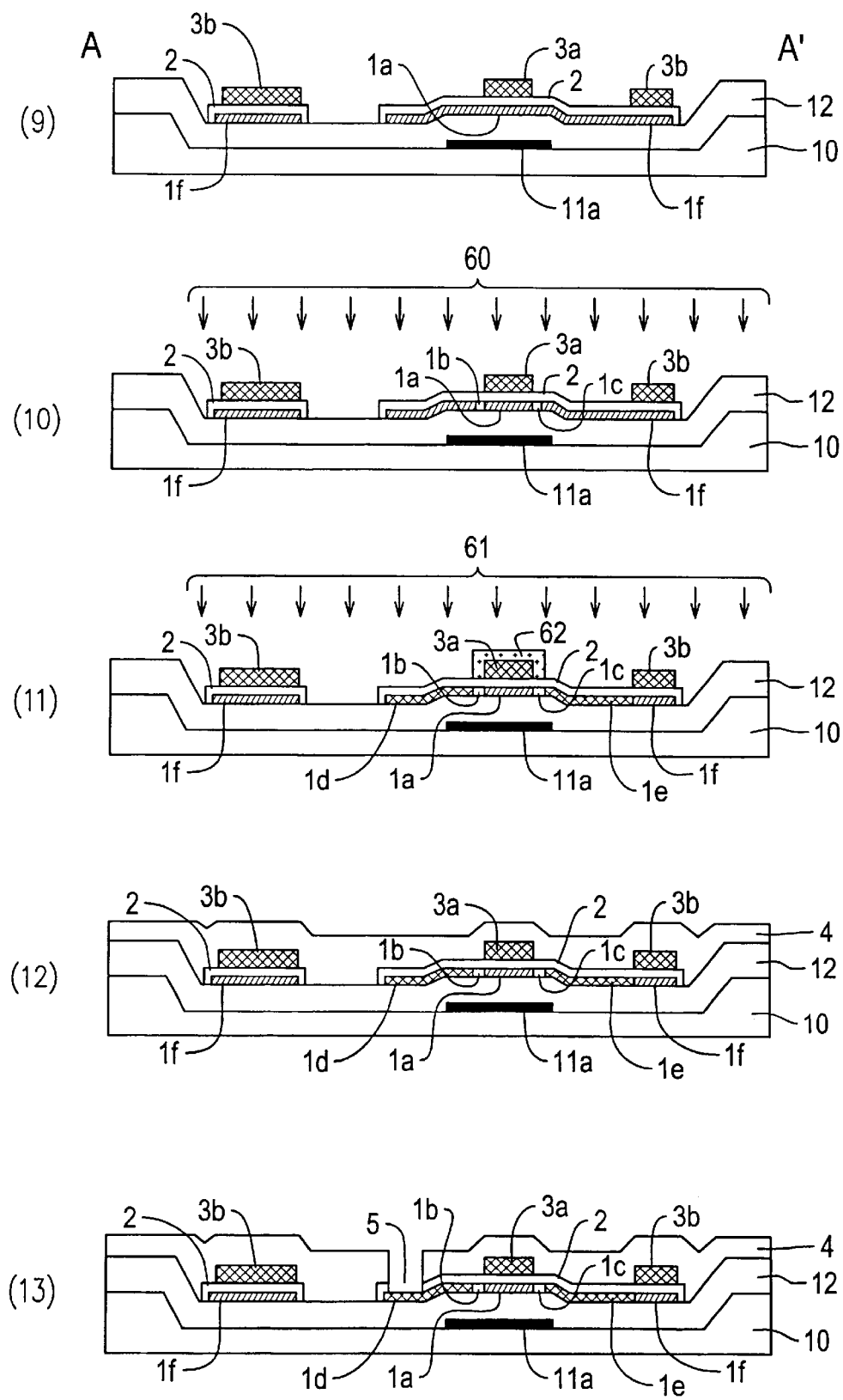
FIGS. 9(9)-9(13) are process diagrams illustrating the manufacturing process of the electro-optical apparatus of the invention.

First, as shown in step (1) in FIG. 8, by etching such as reactive ion etching or a reactive ion beam etching is applied to a quartz substrate serving as the TFT array substrate to form a concave recess not tapered on the upper surface of the substrate in the non-aperture area (see FIGS. 2 and 3) on which various wiring lines and TFTs are to be formed within the image display area. The quartz substrate has a thickness, for example, of about 1 mm, and provision of a recess of a few micros for flattening poses no problem as described later. According to the results of an experiment carried out by the present inventors, for example, when dry etching using $SF_6/CHF_3$ gas, a mixing ratio of 14/112 leads to an etching rate of 5290 Å/min (angstrom/minutes); a mixing ratio of 17/90 results in an etching rate of 5,169 Å/min; and a mixing ratio of 23/67 corresponds to a etching rate of 4,297 Å/min. That is, a desired etching rate is obtained by adjusting the mixing ratio of $SF_6/CHF_3$ gas, thus permitting formation of a concave recess having a desired depth. Particularly, formation of the concave recess by anisotropic etching such as reactive ion etching or reactive ion beam etching makes it possible to form the aperture into the same shape as that of the mask. Then, wet etching of a low etching rate as 780 Å/min is applied to the quartz substrate having a non-tapered concave recess formed by dry etching as described above to achieve a recess having a tapered side wall. By tapering the side wall of the concave portion as described above, a polysilicon film or resist formed in the subsequent steps never remains on or around the side wall of the recess without being etched or peeled, thus preventing a decrease in yield, and hence permitting certain flattening. The method of forming the tapered side wall of the aperture of the first interlayer insulating film 12 may comprise once applying dry etching, and after withdrawing the resist pattern, applying dry etching again.

It is desirable to apply an annealing treatment in an inert gas atmosphere such as $N_2$ (nitrogen) at a high temperature within a range of from about 900 to 1,300° C. as a pretreatment for minimizing strain produced in the TFT array substrate in the subsequent high-temperature process. That is, to fit with the temperature of the high-temperature treatment carried out at the highest temperature in the manufacturing process, the TFT array substrate 10 should preferably be heat-treated at a temperature equal to or higher than the highest temperature in advance.

The TFT array substrate 10 may be formed, in place of a quartz substrate, of a silicon substrate or a hard glass subjected to the above-mentioned etching or annealing treatment. Alignment with the recess formed on the TFT array substrate 10 in the subsequent step such as masking is accomplished, for example, by previously providing an alignment recess at a prescribed position on the TFT array substrate in this step (1), and recognizing it by means of optical interference.

Then, as shown in step (2), a light shielding film 11 having a thickness of from 1,000 to 5,000 Å, or preferably, about 2,000 Å is formed by sputtering process from a metal or alloy film comprising a metal such as Ti, Cr, W, Ta, Mo or PD or an alloy such as metallic silicide over the entire surface of the TFT array substrate 10 having the concave recess formed thereon. When using a polysilicon film as the light shielding film 11, stress never breaks the interlayer insulating film.

Then, a first light shielding film 11a is formed by forming a resist mask corresponding to a pattern of the first light shielding film 11a (see FIG. 2) by photolithography on the light shielding film 11, as shown in step (3).

Then, as shown in step (4), a first interlayer insulating film 12 comprising a silicate glass film, a silicon nitride film or a silicon oxide film of NSG, PSG, BSG or BPSG by the use of TEOS (tetraethylortho-silicate) gas, TEB (tetraethyl borate) gas, or TMOP (tetramethyloxy phosphate) gas by, for example, the room-temperature or vacuum CVD process. This first interlayer insulating film 12 should have a thickness within a range of from 5,000 to 20,000 Å.

Then, an amorphous silicon film is formed by the vacuum CVD process (for example, CVD under a pressure of from 20 to 40 Pa) using monosilane gas or disilane gas at a flow rate of from 400 to 60 cc/min in a relatively low-temperature environment at a temperature of from 450 to 550° C., or preferably, at about 500° C., on the first interlayer insulating film 12. Subsequently, a polysilicon film 1 undergoes solid-phase growth up to a thickness of 500 to 2,000 Å, or preferably, about 1,000 Å by applying an annealing treatment in a nitrogen atmosphere at 600 to 700° C. for a period of from 1 to 10 hours, or preferably, from 4 to 6 hours.

When preparing an n-channel type pixel switching TFT 30 as the pixel switching TFT 30 shown in FIG. 3, a slight amount of a V-family dopant such as 5b (antimony), As (arsenic) or P (phosphorus) may be doped by ion injection or the like into the channel area. When preparing a p-channel type pixel switching TFT 30, a slight amount of a III-family dopant such as B (boron), Ga (gallium), or In (indium) may be doped by ion injection or the like. A polysilicon film 1 may be formed directly by the vacuum CVD process or the like without carrying out an amorphous silicon film. Or, a polysilicon film 1 may be formed by injecting silicon ions into a polysilicon film deposited by the vacuum CVD process or the like once to prepare a noncrystalline film, and recrystallizing the same through an annealing treatment or the like. As a method for solid-phase growth, an annealing treatment using RTA (Rapid Thermal Anneal), or a laser annealing using an excimer may be applied.

Then, as shown in step (6), a semiconductor layer 1a of a prescribed pattern as shown in FIG. 2 is formed through a photolithographic step or an etching step. More specifically, a first storage capacitor electrode 1f extended from the semiconductor layer 1a forming the pixel switching TFT 30 is formed in the area where the capacitor line 3b is formed under the data line 6a, and in the area where the capacitor line 3b is formed along the scanning line 3a.

Then, as shown in step (7), a thermal-oxidized silicon film having a relatively small thickness of about 300 Å is formed through thermal oxidation of the semiconductor layer 1a forming the pixel switching TFT 30, together with the first storage capacitor electrode 1f, at a temperature of from 900 to 1,300° C., or preferably at about 1,000° C. Further, a capacitor forming insulating film 2, together with a gate insulating film 2 of the pixel switching TFT 30 having a multilayer structure, is formed by depositing a high-temperature silicon oxide film (HTO film) or a silicon nitride film by the vacuum CVD process into a relatively small thickness of about 500 Å (see FIG. 3). This results in a thickness of the first storage capacitor electrode 1f within a range of from 300 to 1,500 Å or preferably, from 350 to 500 Å, and a thickness of the gate insulating film 2 within a range of from 200 to 1,500 Å, or preferably, from 300 to 1,000 Å. By thus reducing the high-temperature thermal oxidation time, it is possible to prevent a camber caused by heat when using a large-sized substrate of about 8 inches. However, the gate insulating film 2 having a single-layer structure may be formed by only thermally oxidizing the polysilicon film 1.

While there is no particular limitation in step (7), a low resistance may be achieved by doping P ions in a dose of about $3 \times 10^{12}/cm^2$ onto the semiconductor portion serving as the first storage capacitor electrode 1f.

Then, as shown in step (8), the polysilicon film 3 is made conductive by depositing the polysilicon film 3 by the vacuum CVD process or the like, and then, thermally diffusing phosphorus (P). Or, a doped silicon film prepared by introducing phosphorus ions simultaneously with formation of the polysilicon film 3 may be employed.

Then, as shown in step (9), scanning lines 3a of a prescribed pattern as shown in FIG. 2 and capacitor lines 3b are formed through a photolithographic step or an etching step using a resist mask. These capacitor lines 3b and scanning lines 3a have a thickness, for example, of about 3,500 Å.

Then, as shown in step (10), when the pixel switching TFT 30 shown in FIG. 3 is an n-channel type TFT having an LDD structure, to form first a low concentration source area 1b and a low-concentration drain area 1c on the semiconductor layer 1a, a V-family dopant 60 such as P is doped in a low concentration (for example, P ions in a dose within a range of from 1 to $3 \times 10^{13}/cm^2$) with the scanning line 3a as a diffusion mask. As a result, the semiconductor layer 1a under the scanning line 3a becomes a channel area 1a'. This doping of impurity reduces resistance of the capacitor lines 3b and the scanning lines 3a.

Then, as shown in step (11), a resist layer 62 is formed with a mask having a width larger than the scanning line 3a on the scanning line 3a to form a high-concentration source area 1d and a high-concentration drain area 1e constituting the pixel switching TFT 30, and then a V-family dopant 61 such as P is doped at a high concentration (for example, P ions in a dose within a range of from 1 to $3 \times 10^{15}/cm^2$). When the pixel switching TFT 30 is of the p-channel type, doping is carried out with the use of a III-family dopant such as B to form a low-concentration source area 1b, a low-concentration drain area 1c, a high-concentration source area 1d and a high-concentration drain area 1e on the semiconductor layer 1a. However, for example, a TFT of the offset structure may be adopted without conducting low-concentration doping, or a self-alignment type TFT may be used by the application of the ion injection technique using P ions or B ions with the scanning line 3a as a mask.

This doping of impurity further reduces resistance of the capacitor lines 3b and the scanning lines 3a.

In parallel with these steps, circuits such as a data line driving circuit 101 and a scanning driving circuit 104 having the complementary structure composed of an n-channel type TFTs and p-channel TFTs are formed on the periphery of the TFT array substrate 10. If in this embodiment, the semiconductor layer for the pixel switching TFT 30 is made of polysilicon, the data line driving circuit 101 and the scanning line driving circuit 104 can be formed through substantially the same steps at the time of forming the pixel switching TFT 30, thus providing advantages in manufacture.

Then, as shown in step (12), a second interlayer insulating film 4 comprising a silicate glass film, a silicon nitride film or a silicon oxide film made of NSG, PSG, BSG or BPSG is formed by the use of atmospheric-pressure or vacuum CVD process or TEOS gas, for example, so as to cover the scanning lines 3a and the capacitor lines 3b in the pixel switching TFT 30. The second interlayer insulating film 4 should preferably have a thickness within a range of from 5,000 to 15,000 Å.

Then, in the stage of step (13), annealing treatment is carried out at about 1,000° C. for about 20 minutes for activating the high-concentration source area 1d and the high-concentration drain area 1e, and then, a contact hole 5 for the data line 6a is formed by dry etching (such as reactive ion etching or reactive ion beam etching, or wet etching). A contact hole for connecting the scanning line 3a and the capacitor line 3b to wiring lines (not shown) is provided in the second interlayer insulating film 4 through the same step as that of the contact hole 5.

Then, as shown in step (14) in FIG. 10, a metal film 6 made of a light-shielding low-resistance metal (such as Al or metal silicide) is deposited on the second interlayer insulating film 4 by sputtering or the like to a thickness of from 1,000 to 5,000 Å, or preferably, about 3,000 Å, and further, as shown in step (15), data lines 6a are formed through a photolithographic step and an etching step.

Then, as shown in step (16), a third interlayer insulating film 7 comprising a silicate glass film, a silicate nitride film or a silicon oxide film made of NSG, PSG, BSG or BPSG may be formed by the use of the atmospheric-pressure or vacuum CVD process or TEOS gas or the like so as to cover the data lines 6a. The third interlayer insulating film 7 should preferably have a thickness of from 5,000 to 15,000 Å.

Figure 11:
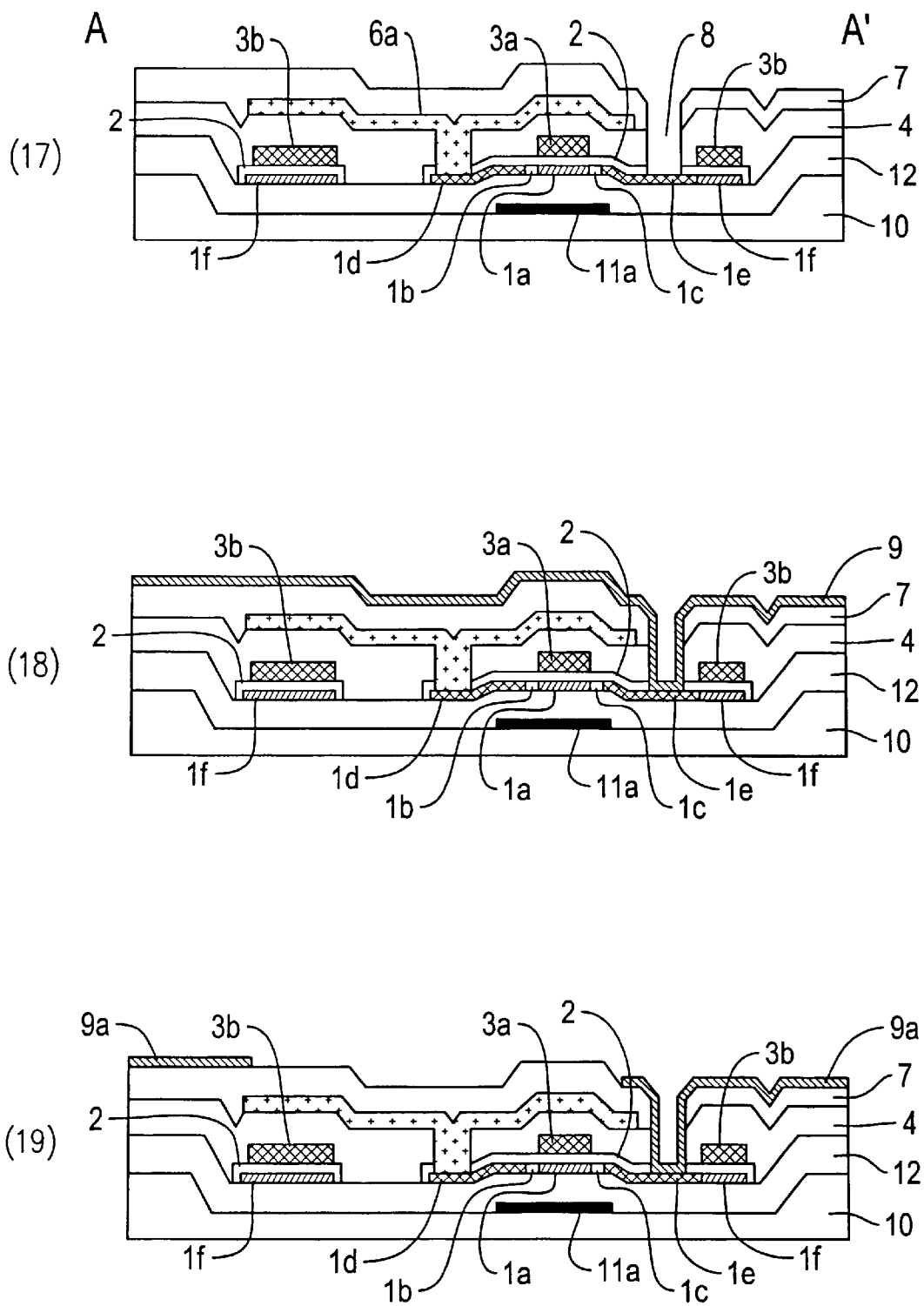
FIGS. 11(17)-11(19) are are process diagrams illustrating the manufacturing process of the electro-optical apparatus of the invention.

Then, in the stage of step (17) shown in FIG. 11, a contact hole 8 for electrically connecting the pixel electrode 9a and the high-concentration drain area 1e in the pixel switching TFT 30 is formed through dry etching (such as reactive ion etching or reactive ion beam etching).

Then, as shown in step (18), a transparent conductive thin film such as an ITO film is deposited by sputtering or the like to a thickness of from 500 to 2,000 Å on the third interlayer insulating film 7, and further as shown in step (19), and further as shown in step (19), pixel electrode 9a is formed through a photolithographic step, an etching step or the like. When the electro-optical apparatus is used for a reflection type electro-optical apparatus, the pixel electrode 9a may be made of a non-transparent material having a high reflectivity such as Al.

Then, a coating liquid for a polyimide-based alignment film is coated onto the pixel electrode 9a, and then, an alignment film 16 (see FIG. 3) is formed by applying a rubbing treatment in a prescribed direction so as to have a prescribed pretilting angle.

The manufacturing steps have been described above centering around the pixel section with reference to FIGS. 8 to 11. The lamination structure in the sealed area shown in FIG. 7 is also formed through the same steps as above. More particularly, the process mainly comprises the steps of forming a concave recess in the sealed area through the same etching step as in the above-mentioned step (1), forming connecting lines 402 (see FIG. 7(2)) and dummy wiring lines 302 (see FIG. 7(1)) through the same steps as in steps (8) and (9), forming connecting lines 301 (see FIG. 7(1)) and dummy wiring lines 401 (see FIG. 7(2)) through the same steps as in steps (14) and (15) and forming first to third interlayer insulating films 12, 4 and 7 through the other steps. In the sealed area, therefore, the upper surface of the third interlayer insulating film 7 is flattened in response to the concave recess formed on the TFT array substrate 10. According to the manufacturing method of this embodiment, as described above, a flattened surface is achieved in the sealed area, and particularly, the concave recess formed in the sealed area has a tapered side wall. The wiring line portion scanning from the connecting lines 301 and 402 passing under the sealed area toward the data line driving circuit 101 and the scanning line driving circuit 104 formed on the substrate surface not having a concave portion across the side wall (see FIGS. 5 and 6) can therefore be certainly and relatively easily formed.

For the opposing substrate 20 shown in FIG. 3, on the other hand, a glass substrate is first prepared, and then, a second light shielding film 23 and a third light shielding film 53 serving as a peripheral frame (see FIG. 5, 6, 12 and 13) are formed through sputtering of metallic chromium, for example, a photolithographic step and an etching step. The second light shielding film and the third light shielding film may be made of a metal material such as Cr, Ni or Al, or a resin black prepared by dispersing Si, carbon or Ti in a photoresist.

Then, an opposing electrode 21 is formed by depositing a transparent conductive thin film such as an ITO by sputtering or the like into a thickness of from 500 to 2,000 521 on the entire surface of the opposing substrate 20. Further, an alignment film 22 (see FIG. 3) is formed by coating a coating liquid for a polyimide alignment film over the entire surface of the opposing electrode 21, and then applying a rubbing treatment in a prescribed direction so as to have a prescribed pretilting angle.

Finally, the TFT array substrate 10 and the opposing substrate 20 on which the above-mentioned layers have been formed are bonded together with a sealing material 52 so that the alignment films 16 and 22 face each other. An electro-optical material layer 50 is formed by attracting an electro-optical material prepared by mixing a plurality of kinds of nematic electro-optical materials into the space between the two substrates by vacuum suction, for example.

In the aforementioned manufacturing process, the upper surface of the third interlayer insulating film 7 may be more completely flattened by applying a CMP treatment or forming an SOG film by spin coating, for example. This flattening makes it possible to reduce disclination (defective alignment) of the electro-optical material caused by surface irregularities of the third interlayer insulating film 7 in response to the extent of flattening. Because a step on the upper surface of the third interlayer insulating film 7 is reduced in response to the concave recess formed on the TFT array substrate, complete global flattening can be carried out with the slightest burden on the process.

Figure 12:
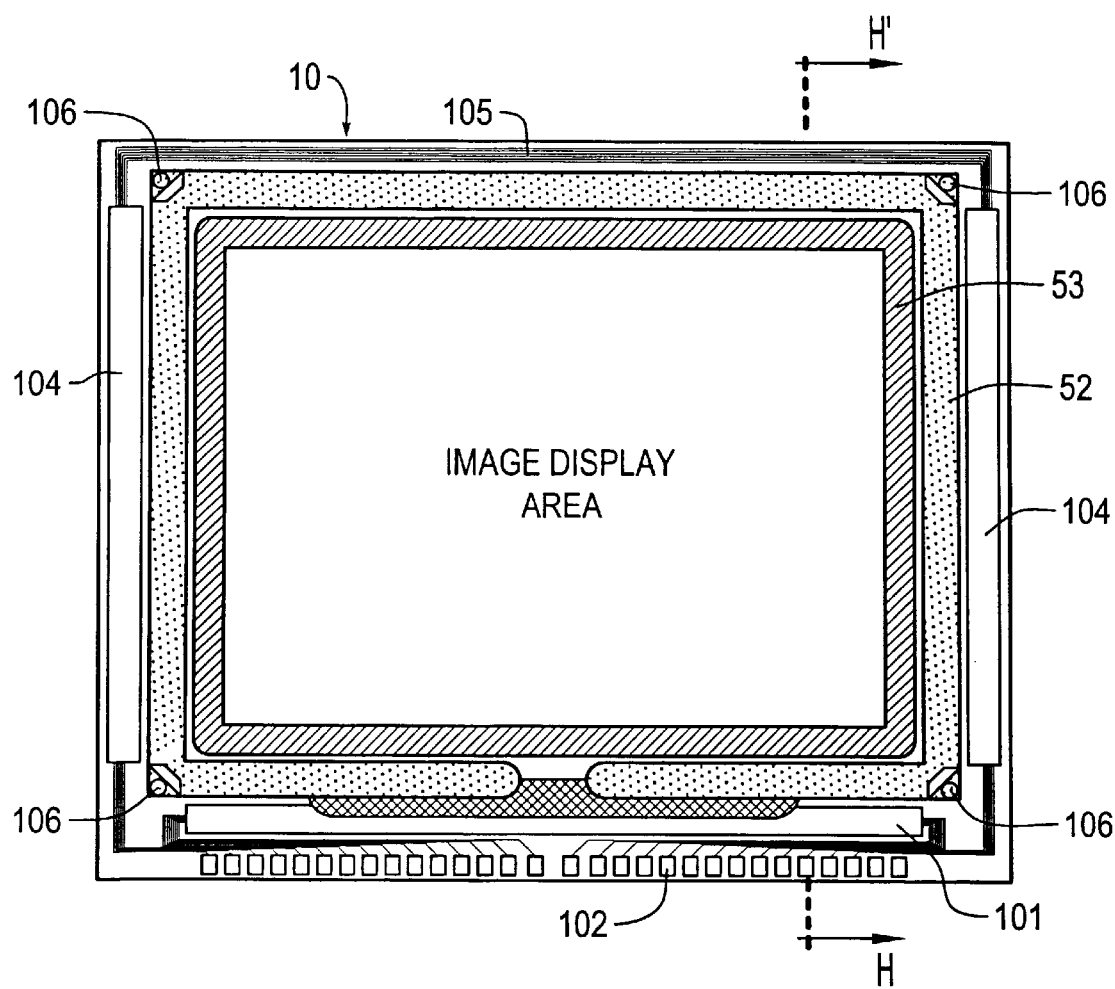
FIG. 12 is a plan view a TFT array substrate and components formed thereon as viewed from the opposite substrate side.
Figure 13:
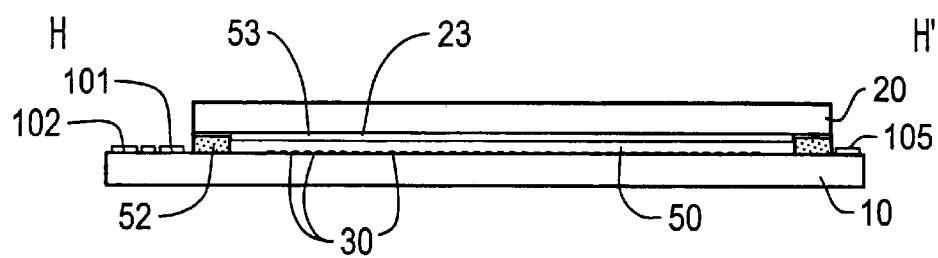
FIG. 13 is a sectional view of FIG. 12 cut along the line H–H'.

The whole configuration of the embodiments of the electro-optical apparatus 100 as mentioned above will now be described with reference to FIGS. 12 and 13. FIG. 12 is a plan view of the TFT array substrate 10 together with components thereof formed thereon, as viewed from the opposing substrate 20 side and FIG. 13 is a sectional view of FIG. 12 cut along the line H–H'.

In FIG. 12, a sealing material 52 is provided on the TFT array substrate 10 along the edge thereof, and in parallel and inside of this, a third light shielding film 53 serving as a peripheral frame made of the same or a different material as that of the second light shielding film 23 is provided. A data line driving circuit 101 and a mounting terminal 102 are provided along a side of the TFT array substrate 10 outside the sealing material 52, and a scanning line driving circuit 104 are provided along two sides adjacent to that side. When the delay of the scanning signal supplied to the scanning lines is not a problem, it suffices to provide a scanning line driving circuit 104 only on one side. The data line driving circuits 101 may be provided on both sides of the image display area. For example, image signals may be supplied to odd-No. rows of data lines 6a from the data line driving circuits arranged along one side of the image display area, and even-No. rows of data lines from the data line driving circuits arranged along the other side of the image display area. This comb-shaped driving of the data lines 6a makes it possible to expand the area occupied by the data line driving circuits, thus permitting configuration of more complicated circuits. Further, a plurality of wiring lines 105 for connecting the scanning line driving circuits 104 may be provided on both sides of the image display area and provided on the scanning side of the TFT array substrate. An up-down connecting member 106 for electric connection between the TFT array substrate 10 and the opposing substrate 20 may be provided at least at corners of the opposing substrate 20. As shown in FIG. 13, the opposing substrate 20 having substantially the same profile as that of the sealing material 52 shown in FIG. 12 is secured to the TFT array substrate 10 by the sealing material.

In the embodiments described above with reference to FIGS. 1 to 13, the data line driving circuit 101 and the scanning line driving circuit 104 may be electrically and mechanically connected to a driving LS1 mounted on a TAB via an anisotropic conductive films provided on the periphery of the TFT array substrate 10, in place of providing the driving circuits 101 and 104 on the TFT array substrate 10. A polarization film, retardation film, a polarization plate and the like arranged in a prescribed direction on each of the incident side of an irradiated light on the opposing substrate 20 and on each of the output side of an output light on the TFT array substrate 10, respectively, depending upon the operation modes such as TN (twisted nematic) mode, VA(Vertically Aligned) mode, PDLC(Polymer Dispersed Liquid Crystal) mode and normally white mode/normally black mode.

Another embodiment of the present invention will now be described.

Figure 14:
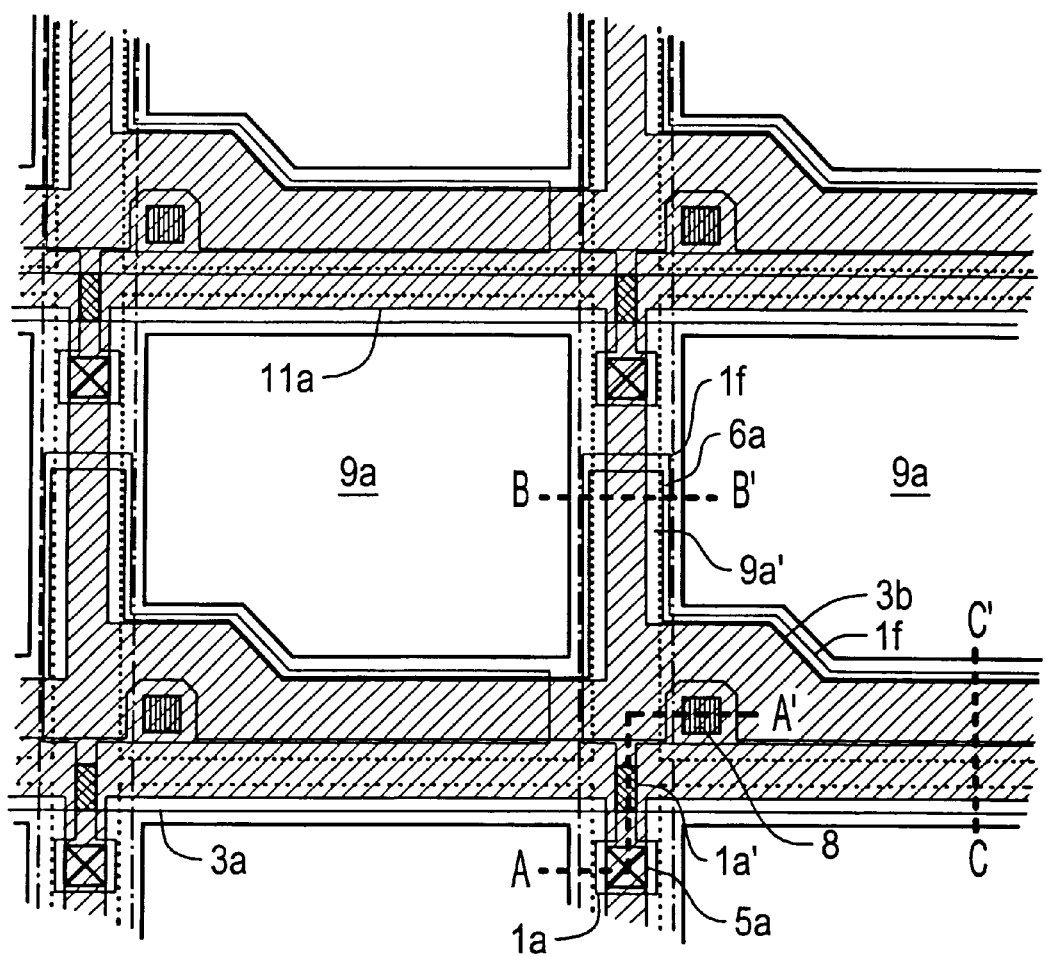
FIG. 14 illustrates a group of neighboring pixels on a TFT array substrate having data lines, scanning lines, pixel electrodes and light shielding films formed thereon.
Figure 15:
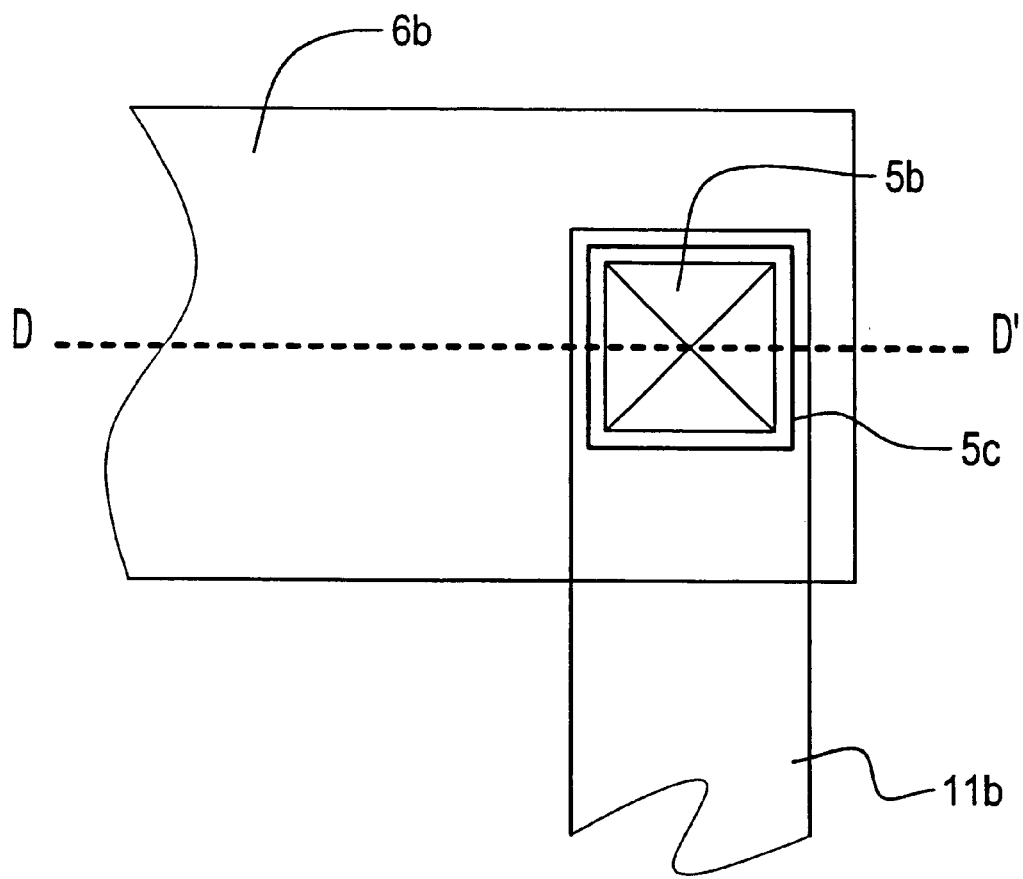
FIG. 15 is a plan view of a TFT array substrate illustrating a connecting portion of the light shielding film and the constant potential lines.
Figure 16:
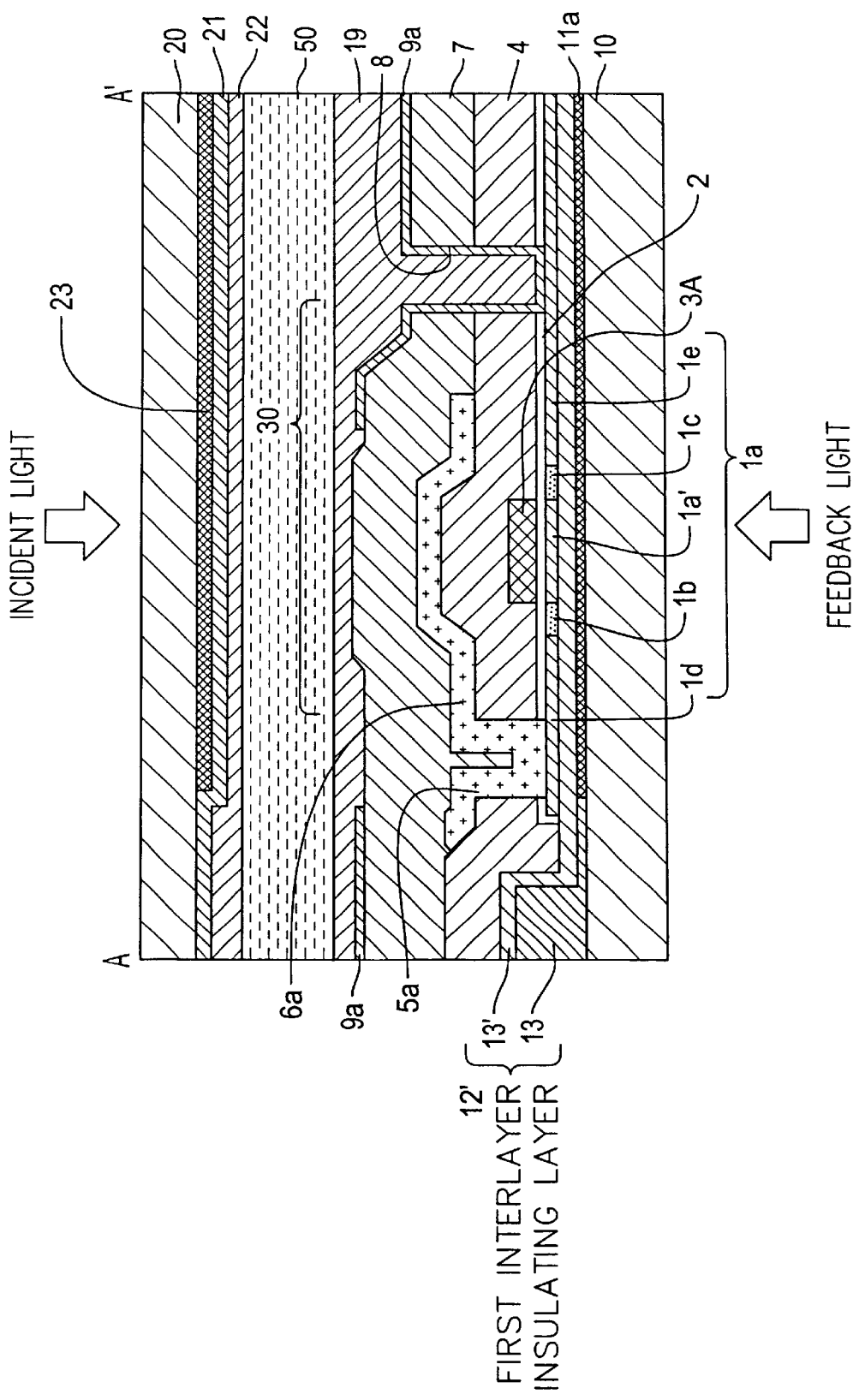
FIG. 16 is a sectional view of an embodiment along the A–A' sectional view of FIG. 14 and together with an opposing substrate.
Figure 17:
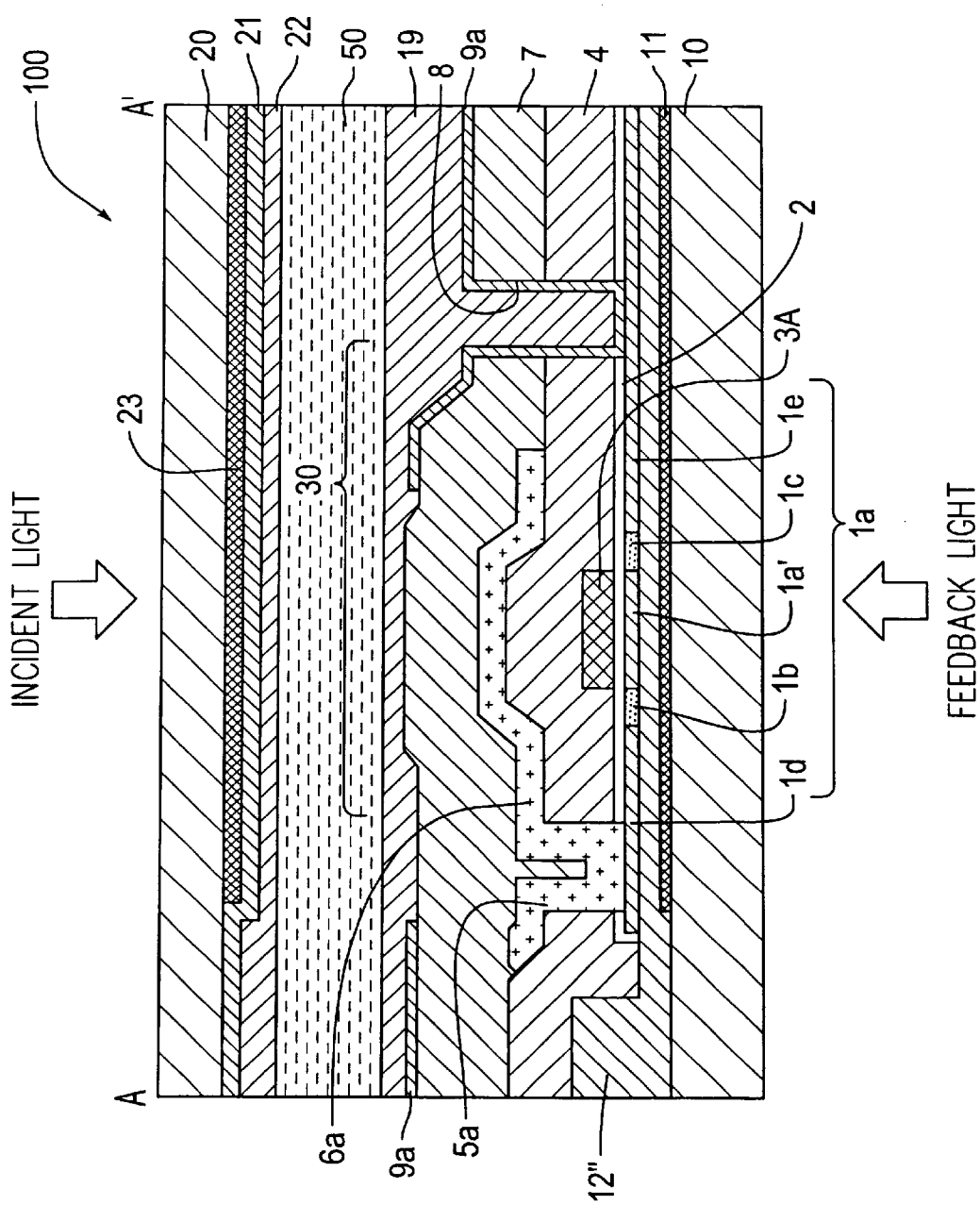
FIG. 17 is a sectional view of an embodiment of the electro-optical apparatus along the A–A' sectional view of FIG. 14 and with an opposing substrate.
Figure 18:
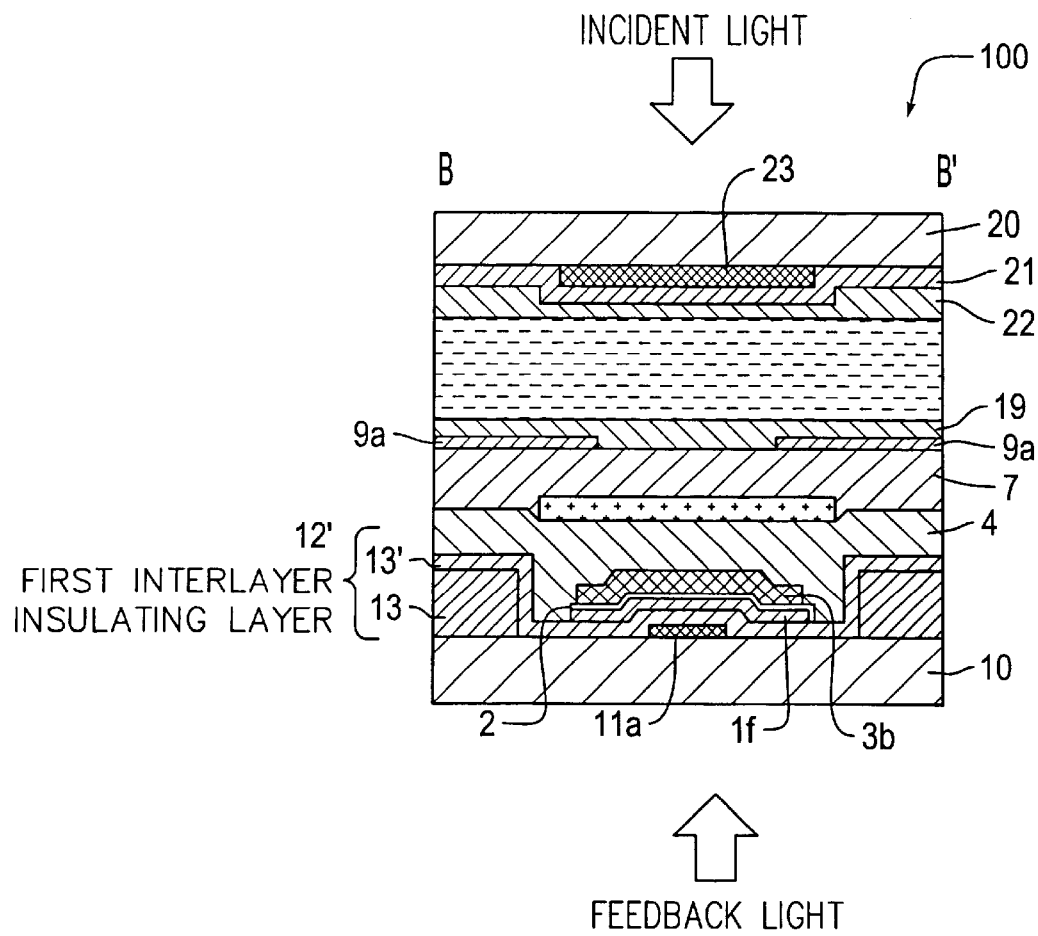
FIG. 18 is a sectional view of the electro-optical apparatus along the B–B' section of FIG. 18 and with an opposing substrate.
Figure 19:
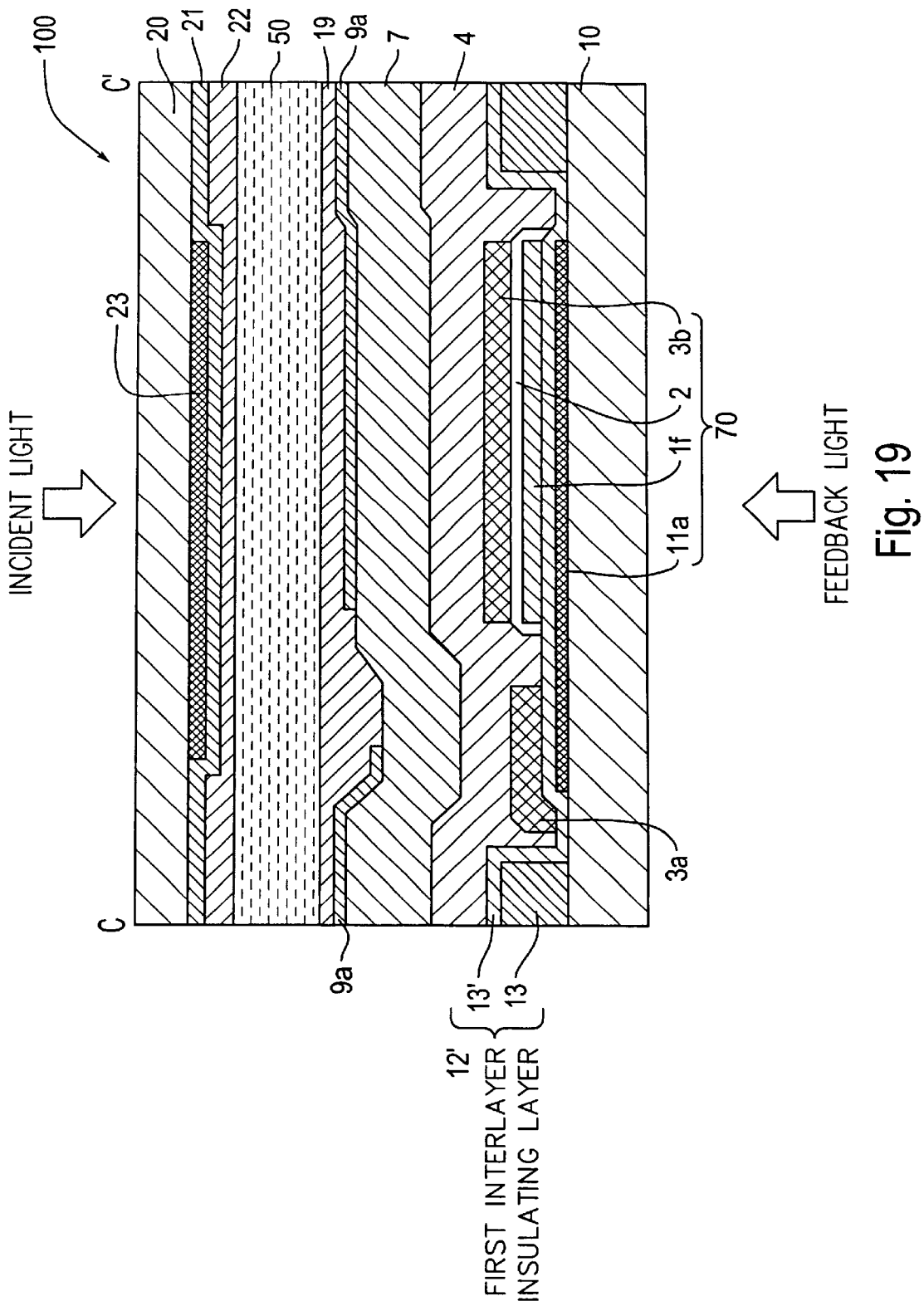
FIG. 19 is a sectional view of the electro-optical apparatus along the C–C' section of FIG. 18 and with an opposing substrate.
Figure 20:
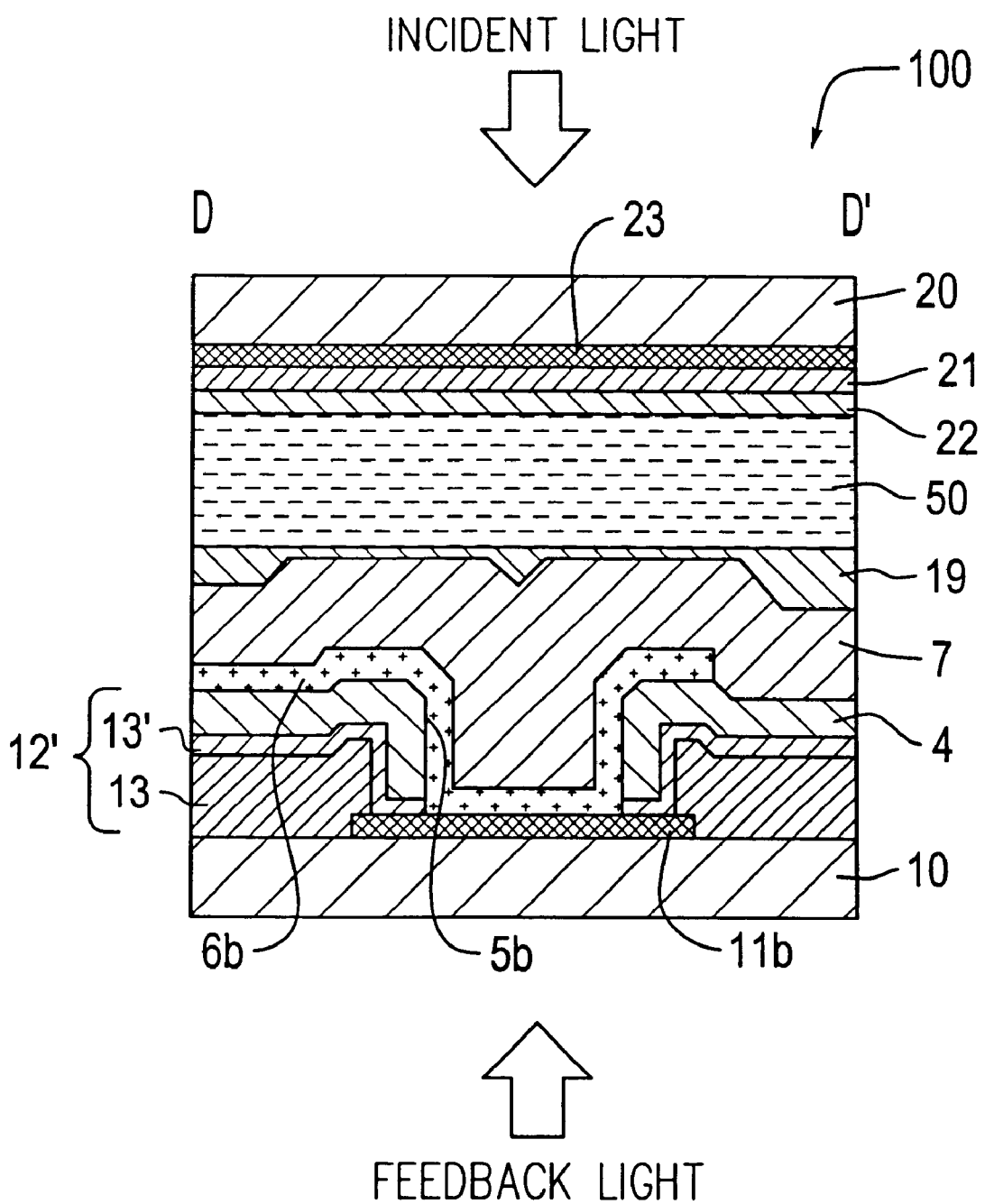
FIG. 20 is a sectional view of the electro-optical apparatus along the D–D' section of FIG. 18 and with an opposing substrate.

The configuration of the electro-optical apparatus will be described with reference to FIGS. 14 to 20. FIG. 14 is a plan view illustrating a group of neighboring pixels on a TFT array substrate having data lines, scanning line, pixel electrodes and light shielding films formed thereon. FIG. 15 is a plan view illustrating a connecting portion of the light shielding film and the constant potential lines. FIG. 16 is a sectional view of an embodiment of the electro-optical apparatus illustrating a cross-section of FIG. 1 cut along the line A–A' together with a an opposing substrate. FIG. 17 is a sectional view of an embodiment of the electro-optical apparatus shown in FIG. 16. FIG. 18 is a sectional view of the electro-optical apparatus illustrating a cross-section of FIG. 1 cut along the line B–B' together with the opposing substrate. FIG. 19 is a sectional view of the electro-optical apparatus illustrating a cross-section of FIG. 1 cut along the line C–C', together with the opposing substrate. FIG. 20 is a sectional view of the electro-optical apparatus illustrating a cross-section of FIG. 2 cut along the line D–D', together with the opposing substrate. In FIGS. 16 to 20, the reduction scale differs for each layer and each member to make them recognizable in size on the drawings. Like components have the same reference numerals.

In FIG. 14, a plurality of transparent pixel electrodes 9a (outlined by a dotted line 9a') are provided in a matrix shape on the TFT array substrate of the electro-optical apparatus, and data line 6a, scanning lines 3a and capacitor lines 3b are provided along longitudinal and lateral boundaries of the pixel electrodes 9a. The data lines 6a are electrically connected to the source area described below in a semiconductor layer 1a via a contact hole 5, and the pixel electrodes 9a are electrically connected to a drain area described below in a semiconductor layer 1a via a contact hole 8. Scanning lines 3a are arranged so as to be opposite to a channel area 1a' (area marked with right-down oblique lines in FIG. 14) described below in the semiconductor layer 1a. A first light shielding film 11a for the pixel section is provided in an area marked with right-up oblique lines in FIG. 14. That is, the first light shielding film 11a is provided to overlap the TFTs including the channel area 1a' of the semiconductor layer la, the data lines 6a, the scanning lines 3a and the capacitor lines 3b as viewed from the TFT array substrate side.

Particularly in a mesh-like (matrix-shaped) area surrounded by a thick line containing the data lines 6a, the scanning lines 3a and the capacitor lines 3b in FIG. 14, a first interlayer insulating film is formed into a concave recess. In the other area substantially corresponding to the pixel electrodes 9a, the first interlayer insulating film is formed relatively convex (into a flat surface).

In FIG. 15, constant potential lines 6b comprising a conductive film made of Al, which is the same material as the data lines 6a, are provided on the TFT array substrate of the electro-optical apparatus, and are connected to the light shielding film (light shielding wiring) in the non-pixel section via the contact hole 5b. In FIG. 15, particularly in an area surrounded by a thick line containing the contact hole 5b, the first interlayer insulating film described below is formed into a concave recess, and in the other area, the first interlayer insulating film is formed relatively convex (into a flat surface).

As shown in FIGS. 16 to 19, the electro-optical apparatus is provided with a TFT array substrate 10 which is an example the transparent substrate, and an opposing substrate 20 which is an example of the other substrate arranged opposite thereto. The TFT substrate 10 is made, for example, of a quartz substrate, and the opposing substrate 20 is made, for example, of a glass substrate or a quartz substrate. A pixel electrode 9a is provided on the TFT array substrate 10, and an alignment film 19 subjected to prescribed alignment processing such as rubbing is provided thereabove. The pixel electrode 9a includes, for example, a transparent conductive thin film such as an ITO film. The alignment film 19 includes, for example, an organic thin film such as a polyimide thin film.

An opposing electrode 21 is provided, on the other hand, over the entire surface of the opposing substrate 20, and an alignment film 22 subjected to an alignment processing such as rubbing is provided thereunder. The opposing electrode 21 comprises, for example, a transparent conductive thin film such as an ITO film. The alignment film 22 comprises, for example, an organic thin film such as a polyimide thin film.

A TFT 30 for switching-controlling each pixel electrode 9a provided at a position adjacent to each pixel electrode 9a of the TFT array substrate 10 as shown in FIG. 16.

A second light shielding film 23 is provided in the area other than the aperture area of each pixel as shown in FIGS. 16 to 20. As a result, an incident light from the opposing substrate 20 side never enters the channel area 1a' of the semiconductor layer 1a of the pixel switching TFT 30 or LDD (Lightly Doped Drain) areas 1b and 1c. Further, the second light shielding film 23 have functions of improving contrast and preventing color mixture.

Electro-optical material is sealed in a space surrounded by a sealing material 5, as shown in FIGS. 12 and 13, between the TFT array substrate 10 and the opposing substrate 20 arranged so that the pixel electrode 9a and the opposing electrode 21 are arranged opposite to each other in this configuration, thereby forming a electro-optical material 50.

The electro-optical material 50 takes a prescribed alignment condition under the effect of the alignment films 19 and 22 when an electric field is not impressed from the pixel electrode 9a. The electro-optical material 50 is, for example, made of a mixed liquid crystal made from one or more nematic liquid crystals. The sealing material 52 is an adhesive comprising a photo-setting resin or a thermo-setting resin for bonding the two substrates 10 and 20 at peripheries thereof, and is mixed with a spacer such as glass fiber or glass beads to keep a prescribed distance between both substrates.

As shown in FIG. 16, first light shielding films 11a are provided between the TFT array substrate 10 and the individual pixel switching TFTs 30 at positions opposite to the Pixel switching TFTs 30. The first light shielding film 11a is made of a single metal, an alloy or a metal silicide preferably containing at least one of non-transparent high-melting-point metals such as Ti, Cr, W, Ta, Mo and Pd. When the first light shielding film 11a has the above-mentioned composition, the first light shielding film 11a can be prevented from being broken or melted under the effect of a high-temperature treatment in the pixel switching TFT 30 forming step carried out after the first light shielding film 11a forming step on the TFT array substrate 10. Because of the presence of the first light shielding film 11a, it is possible to prevent the feedback light from the TFT array substrate 10 side from entering the channel area 1a' or the source side LDD area 1b and drain side LDD area 1c, and properties of the TFT do not deteriorate by the occurrence of photocurrent.

Further, a first interlayer insulating film 12' comprising a first insulating film 13 and a second insulating film 13' may be provided between the first light shielding film 11a and the plurality of pixel switching TFTs 30. The first interlayer insulating film 12' is provided for electrically insulating the semiconductor layer 1a forming the pixel switching TFTs 30 from the first light shielding film 11a. The first interlayer insulating film 12' also serves as an undercoat film for the pixel switching TFT 30 by covering the entire surface of the TFT array substrate 10. That is, the first interlayer insulating film 12 prevents the properties of the pixel switching TFT 30 deteriorating by roughening during surface polishing or stains remaining after rinsing.

Particularly as shown in FIGS. 16 to 20, the first interlayer insulating film 12' on the first light shielding film 11a in an area where the first light shielding film 11a is formed on the TFT array substrate, and on the TFT array substrate 10 in an area where the first light shielding film 11a is not formed. The portions opposite to the pixel switching TFT 30, the data line 6a, the scanning line 3a and the capacity line 3b are formed into concave recesses as viewed from the opposing substrate 20 side. In this embodiment, in particular, the first interlayer insulating film 12' comprises a single-layer portion and a double-layer portion. The single-layer portion of the second insulating film 13' is thinner to form a concave portion. The double-layer portion of The first and the second insulating films 13, 13' are thicker to form portions not forming a concave recesses. When adopting the above-mentioned configuration of the first interlayer insulting film 12', it is possible to relatively easily, certainly and highly accurately control the thickness of the first interlayer insulating film 12' as the thickness of the second insulating film 13'. It is therefore possible to achieve a very small thickness of the first interlayer insulating film 12' (i. e., thickness of the second insulating film 13') at the concave portion.

The first interlayer insulating film 12' having the configuration as described above makes it possible to electrically insulate the pixel switching TFT 30 and the like from the first light shielding film 11a, and at the same time, to prevent contamination of the pixel switching TFT 30 and the like by the first light shielding film 11a. Particularly, the portions of the first interlayer insulating film 12 opposite to the pixel switching TFT 30, the data line 6a, the scanning line 3a and the capacitor line 3b are formed into concave recesses. As compared with the conventional case where the first interlayer insulating film is formed flat and a TFT and others are formed thereon, therefore, the difference in the total thickness between the area having these TFT and others and the area not having them is reduced in response to the depth of the concave portions, thus promoting flattening of the pixel section.

For example, by using a depth of the concave recess so as to substantially achieve a difference in the total thickness of 0, the subsequent flattening step can be omitted. Or, by using a depth of the concave recess so as to reduce the difference in the total thickness even slightly, the burden of the subsequent flattening step can be alleviated. More preferably, the first interlayer insulating film 12' should be formed into a concave recess having a depth corresponding to the total thickness of the first light shielding film 11a, the semiconductor layer 1a, the capacitor line 3b and the data line 3a. The first interlayer insulating film 12' having the configuration as described above makes it possible to substantially fit the upper surface of the data line 6a with the upper surface of the adjacent second interlayer insulating film 4, thus accelerating flattening of the pixel section before forming the pixel electrode 9a. Provided however that the first interlayer insulating film 12' may be formed into a concave recess having a depth corresponding to the total thickness of the first light shielding film 11a, the semiconductor layer 1a and the capacitor line 3b. By forming the first interlayer insulating film 12' as above it is possible to achieve substantially a flat upper surface of the second interlayer insulating film 4, thus promoting flattening of the pixel section before forming the pixel electrode 9a.

Since the prescribed area for the first interlayer insulating film 12' required by the provision of the first light shielding film 11a is formed into a concave recess, as described above, it is possible, in this embodiment to omit or simplify spin coating of a flattening film, a CMP treatment and flattened insulating film forming steps required in the conventional art.

As shown in FIG. 17, the first interlayer insulating film 12" may be formed of a single layer, in place of the first interlayer insulating film 12' formed of a double-layer as shown in FIG. 16. By using a single layer, it is not necessary to increase the number of layers as compared with conventional cases. The first interlayer insulating film 12" is available by controlling the thickness of the concave portion and the other portion by means of the etching time as described below.

Referring again to FIG. 16, the first interlayer insulating film 12' comprises a high-insulating glass such as NSG, PSG, BSG or BPSG Silicate Glass), a silicon oxide film or a silicon nitride film.

In this embodiment, as shown in FIGS. 14 and 18, a high-concentration drain area 1e of the semiconductor layer 1a is provided along the data lines 6a, and the first light shielding film 11a is provided under the data lines 6a. A capacitor is therefore formed between a first storage capacitor electrode (polysilicon film) 1f extended along the data lines 6a and a first light shielding film 11a via the second insulating film 13. As a result, it is possible to increase the storage capacity of the pixel electrode 9a through effective utilization of the space other than the aperture area under the data lines 6a. A capacitor can be formed between the second storage capacitor electrode 3b formed by a part of the capacitor lines 3b and the first storage capacitor electrode 1f with an insulating film formed through the same steps as the gate insulating film 2 as a dielectric. Consequently, a capacitor may be formed above and below the first storage capacitor electrode 1f permitting effective addition of storage capacity in a limited area. It is thus possible to refine the size of the pixels. Or, a brighter electro-optical apparatus can be provided because of the possibility to achieve a high aperture ratio.

In this embodiment, as shown in FIGS. 14 and 19, the portion of the first interlayer insulating film 12' opposite to the capacitor lines (i.e., second storage capacitor electrodes) is also formed into a concave recess. Even when the capacitor lines 3b are wired above the first interlayer insulating film 12', therefore, it is possible to flatten the area in which the capacitor lines 3b have been wired. The first interlayer insulating film 12' has a very small thickness (for example, from 1,000 to 2,000 Å) at the portion opposite to the capacitor lines 3b, and the first light shielding film 11a is provided under the capacitor lines 3b. It is therefore possible to increase the storage capacitors 70 between the first light shielding film 11a oppositely arranged via the second insulating film 13' and the first storage capacitor electrode 1f extended from the high-concentration drain area 1e of the semiconductor layer 1a without increasing the surface area of the capacitor lines 3b. That is, the storage capacitor 70 of the pixel electrodes 9a as a whole can be increased. This possibility to increase the storage capacity so as not to narrow the aperture area of each pixel within a limited area within the image display area is very useful. The storage capacitor may be formed between the same and the first portion of the scanning lines 3a without providing the capacitor lines 3b. By connecting constant potential lines supplying a constant potential to the capacitor lines 3b to a constant potential source such as a negative power supply or a positive power supply of a peripheral driving circuit (i.e., a data line driving circuit or a scanning line driving circuit), it is possible to omit a mounting terminal for input of an external signal and signal wiring lines connected to the mounting terminal. This is very favorable when downsizing the electro-optical apparatus.

In this embodiment, as shown in FIGS. 15 and 20, the light shielding wiring 11b formed by the same film as the light shielding wiring film and extended from the first light shielding film 11a in the pixel section connected thereto is electrically connected to the constant potential lines 6b. The first light shielding film 11a is therefore kept at a constant potential. As a result, a change in potential of the first light shielding film 11a never exerts an adverse effect on the pixel switching TFT 30 arranged opposite to the first light shielding film 11a. In this case, the constant potential of the constant potential lines 6b may be equal either to the grounding potential or to the potential of the opposing (or common) electrode 21. The constant potential lines 6b may be connected to a constant potential source such as a negative power supply or a positive power supply of the peripheral circuit for driving the electro-optical apparatus 100. Electrical connection of the light shielding film 11b and the above-mentioned capacitor lines 3b poses no problem. In this case, the possibility of common use of the constant potential lines permits reduction of the signal wiring lines and effective utilization of space, thus providing very useful advantages for a downsized electro-optical apparatus.

Further, as shown in FIGS. 16 and 20, the first interlayer insulating film 12' is formed to have a concave recess at a position where the light shielding layer 11b is connected to the constant potential line 6b. As a result, the step of providing a contact hole 5b by etching after forming the first interlayer insulating film 12' becomes easier to carry out in response to the depth of the concave recess, thus permitting piercing the contact holes 5a and 5b at a time. It is therefore possible to omit the step of piercing the contact hole 5b, enabling to achieve reduction of cost and processes and improvement of yield.

In this embodiment, the structure of the pixel switching TFT 30 is similar to the structure of FIG. 3, which has an LDD (Lightly Doped Drain) structure. Therefore, an explanation of FIG. 16 is omitted.

As shown in FIG. 19, a storage capacitor 70 is provided for each pixel electrode 9a. More specifically, the storage capacitor 70 may include a first storage capacitor electrode 1f formed through the same step as the semiconductor layer 1a and consisting of a polysilicon film extended from the high-concentration drain area 1e of the semiconductor layer 1a, an insulating film 2' formed via the gate insulating film 2, a capacitor line 3b (i.e., second storage capacitor electrode) formed through the same step as the scanning line 3a, second and third interlayer insulating films 4 and 7, a portion of the pixel electrode 9a opposite to the capacitor line 3b via the second and third interlayer insulating films 4 and 7. Because of the storage capacitor 70 provided as described above, the duty ratio is small, permitting highly accurate display free from flicker. The capacitor line 3a (i.e., second storage capacitor electrode) is provided in parallel with the scanning line 3a on the surface of the TFT array substrate 10 as shown in FIG. 14. Further, in this embodiment, it is possible to form the first interlayer insulating film 12' under the first storage capacitor electrode 1f into a thin film. It is therefore possible to increase the storage capacitors and achieve a electro-optical apparatus giving a high image quality.

In this embodiment, the first interlayer insulating film of the forming areas of all of the semiconductor layer 1a, the data line 6a, the scanning line 3a and the capacitor line 3b are formed into thin films. However, when there is conceivable a risk of the level of signal delay of image or scanning signals becoming unallowable or the transistor properties of the pixel switching TFT 30 being affected, it surfaces to form the first interlayer insulating film into a thin film at least at a portion of the semiconductor layer 1a, the data line 6a, the scanning line 3a and the capacitor line 3b.

The electro-optical apparatus 100 having the configuration as described above has the same configuration as those shown in FIGS. 12 and 13.

Figure 21:
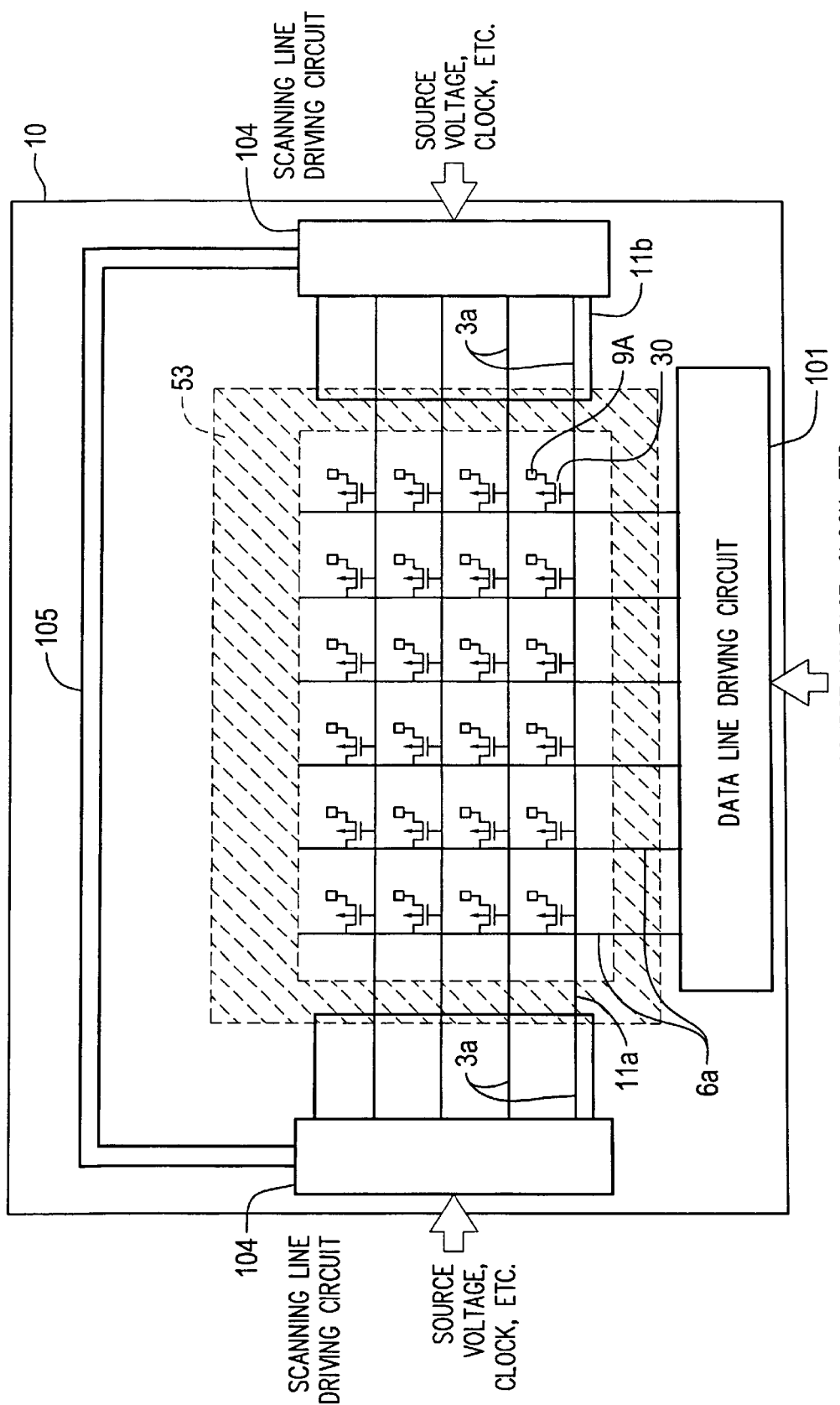
FIG. 21 is a plan view on a TFT array substrate illustrating a two-dimensional layout of the light shielding film forming a light shielding wiring.

FIG. 21 illustrates a two-dimensional layout of the light shielding wiring 11b forming the light shielding wiring section on the TFT array substrate 10.

As shown in FIG. 21, the first light shielding film 11a are provided in the screen display area within a peripheral frame so as to overlap the scanning lines 3a, the capacitor lines 3b (not shown) and the data line 6a. The first light shielding film 11a is wired so as to run under the third light shielding film 53 on the opposing substrate 20 outside the image display area, and connected to the constant potential line as shown in FIG. 15. With such a wiring, it is possible to effectively utilize dead spaces under the third light shielding film 53 and provide a large area for solidifying the sealing material. The third light shielding film 53 provided on the opposing substrate 20 is made with the same layer and of the same material as the first light shielding film 11a on the TFT array substrate 10, and electrically connected to the first light shielding film 11a. Because incorporation of the third light shielding film 53 eliminates the necessity of the second light shielding film on the opposing substrate 20, accuracy upon bonding of the TFT array substrate 10 and the opposing substrate can be disregarded, thus enabling to achieve a bright electro-optical apparatus free from variation of transmissivity. The first light shielding film 11a may be arranged along and only under the scanning lines 3a, or along and only under the data lines 6a. One of the above-mentioned manners of the first light shielding film 11a should be selected, taking account of the thickness of the step portion and yield.

In FIGS. 12, 13 and 21, a precharge circuit which supplies precharge signals on a prescribed voltage level to the plurality of data lines 6a prior to supplying image signals, a sampling circuit which samples image signals and supplies the same to the plurality of data lines 6a, and an inspection circuit for inspecting quality and defects of the electro-optical apparatus during transportation or upon shipping thereof may be formed further on the TFT array substrate 10. The data line driving circuit 101 and the scanning line driving circuit 104 may be electrically and mechanically connected to a driving LSI mounted on a TAB (Tape Automated Bonding) substitute via an anisotropic conductive film provided on the periphery of the TFT array substitute 10, in place of providing these driving circuits 101 and 104 on the TFT array substitute 10.

Particularly in this embodiment, an excellent light shielding property is available for the pixel switching TFT 30, thus reducing an adverse effect exerted by the feedback light. The transistor properties of the pixel switching TFT 30 is therefore improved. Further because the first interlayer insulating film 12' is formed into concave recesses at positions opposite to the pixel switching TFT 30 and various wiring lines, defective alignment of the liquid crystal is reduced and the electro-optical apparatus 100 can display a high-quality image with high contrast.

In the electro-optical apparatus 100, another flattening film may be coated on the third interlayer insulating film 7 by spin coating with a view to further inhibiting defective alignment of liquid crystal molecules on the TFT array substrate 10 side by applying a CMM treatment. Or, the third interlayer insulating film 7 may include a flattening layer. In this embodiment, as shown in FIGS. 16 to 20, the portion having the pixel switching TFT 30 and the various wiring lines flush with the other portion by the presence of the concave recess on the first interlayer insulating film 12'. Therefore, such a flattening treatment is not necessary in general. However, even when further flattening is carried out for the uppermost portion as described above, the present embodiment is very useful because it achieves a very thin flattening film, and it suffices to add a simple flattening step.

The switching element of the electro-optical apparatus 100 have been described above as a positive-stagger type or coplanar type polysilicon TFT. This embodiment is valid also for any of TFT of the other types such as the reverse-stagger type and amorphous silicon TFTs.

The manufacturing process of the electro-optical apparatus 100 having the configuration as described above will now be described with reference to FIGS. 22 to 37. FIGS. 22 to 25 are illustrate the individual layers on the TFT array substrate 10 corresponding to the A–A' cross-section shown in FIG. 16 in the individual steps. FIGS. 26 to 29 illustrate the individual layers on the TFT array substrate 10 corresponding to the B–B' cross-section shown in FIG. 18 in the individual steps. FIGS. 30 to 33 illustrate the individual layers on the TFT array substrate side corresponding to the C–C' cross-section shown in FIG. 19 in the individual steps. FIGS. 34 to 37 illustrate the individual layers on the TFT array substrate 10 corresponding to the D–D' cross-section shown in FIG. 20 in the individual steps. Steps (1) to (20) described in these drawings should be carried out in a lump as the same steps at different portions on the TFT array substrate 10.

The manufacturing process of the portion including the pixel switching TFT 30 corresponding to the A–A' cross-section shown in FIG. 14 will first be described with reference to FIGS. 22 to 25.

Figure 22:
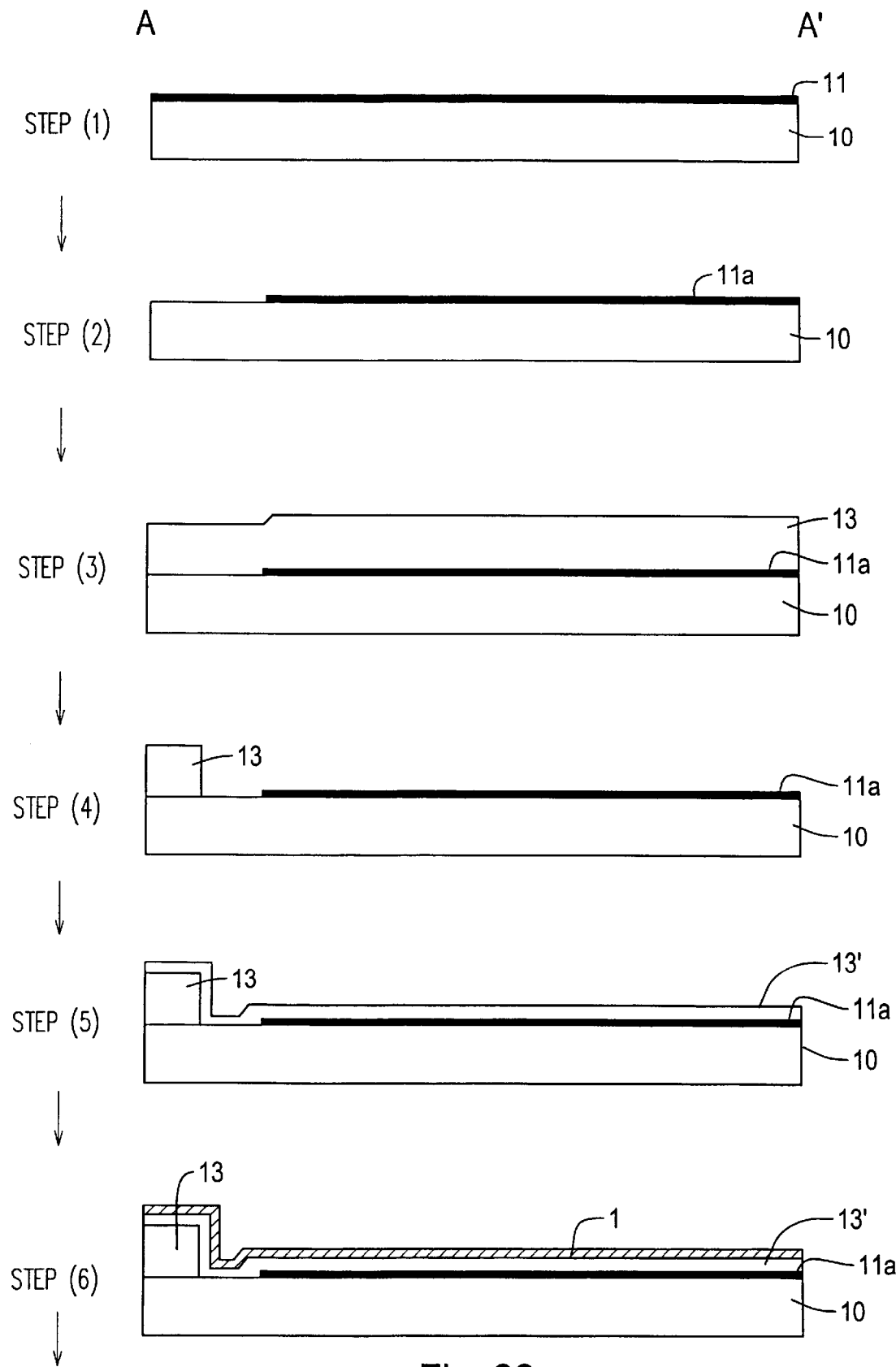
FIGS. 22(1)-22(6) are process diagrams sequentially illustrating the portion shown in FIG. 16 of the manufacturing process of an embodiment of the electro-optical apparatus.

As shown in step (1) of FIG. 22, a TFT array substrate 10 (such as a quartz substrate or a hard glass substrate or a silicon substrate) is prepared. The substrate 10 is preferably preliminarily treated through annealing in an inert gas atmosphere such as N2 (nitrogen) at a high temperature of from 900 to 1,300° C. to minimize strain produced in the TFT array substrate 10 during the subsequent high-temperature process. That is, to cope with the temperature of the high-temperature treatment to be carried out at the highest temperature in the manufacturing process, the TFT array substrate 10 should previously be heat-treated at a temperature equal to, or higher than the highest temperature.

A film of a metal such as Ti, Cr, W, Ta, Mo or Pd or an alloy such as a metal silicide may be formed on the entire surface of the TFT array substrate 10 by sputtering into a light shielding film 11 having a thickness of from 1,000 to 3,000 Å, or preferably about 2,000 Å.

Then, a first light shielding film 11a may be formed using a resist mask corresponding to a pattern of the first light shielding film 11a by photolithography on the first light shielding film 11, as shown in step (2).

Then, as shown in step (3), a first interlayer insulating film 12 (the lower layer of the double-layer first interlayer insulating film 12') is provided comprising a silicate glass film of NSG, PSG, BSG or BPSG, a silicon nitride film or a silicon oxide film by the use of TEOS gas, TEB gas, or TMOP gas is formed by, for example, the room-temperature or vacuum CVD process. This first interlayer insulating film 12 should have a thickness within a range of from 8,000 to 12,000 Å.

Then, as shown in step (4), etching is applied to an area where the pixel switching TFT 30, the data line 6a, the scanning lines 3a and the capacitor lines 3b are to be formed thereabove to remove the first insulating film 13 in this area. When a treatment is carried out by dry etching such as reactive ion etching or reactive ion beam etching, the first insulating film 13 can be removed anisotropically with substantially the same size as the resist mask formed by photolithography. This permits easy control as designed in size. When using at least wet etching, on the other hand, isotropy provides a wider aperture area of the first interlayer insulating film 12'. However because the side wall of the aperture can be tapered, the polysilicon film or the resist for forming scanning lines 3a in a subsequent step never remains on the periphery of the aperture side wall without being etched or peeled off thus preventing the yield from decreasing. Tapering the aperture side wall of the first interlayer insulating film 12' may be accomplished by carrying out etching by dry etching, and then withdrawing the resist pattern, and conducting dry etching once again.

Then, as shown in step (5), a second insulating film 13' (i.e., the upper layer of the double-layer first interlayer insulating film 12') comprising a silicate glass film, a silicon nitride film or silicon oxide film is formed in the same manner as the first insulating film 13, is formed on the first light shielding film 11a and the first insulating film 13. The second insulating film 13' has a thickness of, for example, from 1,000 to 2,000 Å. The second insulating film 13' may be annealed at about 900° C. to prevent contamination and may be flattened.

Particularly in this embodiment, the first insulating film 13 and the second insulating film 13' forming the first interlayer insulating film have such a thickness, that the pixel area becomes substantially flat before formation of the pixel electrode 9a in a subsequent step.

Then, as shown in step (6), an amorphous silicon film is formed by the vacuum CVD processes (for example, CVD under a pressure of from 20 to 40 Pa) using monosilane gas or disilane gas at a flow rate of from 400 to 60 cc/min in a relatively low-temperature environment at a temperature of from 450 to 500° C., or preferably, at about 500° C., on the second interlayer insulating film 13. Subsequently, a polysilicon film 1 undergoes solid-phase growth up to a thickness of thickness of 500 to 2,000 Å, or preferably, about 1,000 Å by annealing in a nitrogen atmosphere at 600 to 700° C. for a period of from 1 to 10 hours, or preferably, from 4 to 6 hours. When preparing an n-channel type TFT 30 as the pixel switching TFT 30, a slight amount of a V-family dopant such as 5b, As or P may be doped by ion injection or the like. When preparing a p-channel type TFT 30, a slight amount of a III-family dopant such as B, Ga, or In may be doped by ion injection or the like. A polysilicon film 1 may be formed directly by the vacuum CVD process or the like without using an amorphous silicon film. Or, a polysilicon film 1 may be formed by injecting silicon ions into a polysilicon film deposited by the vacuum CVD process or the like once to prepare a noncrystalline, and the recrystallizing the same through an annealing treatment or the like.

Figure 23:
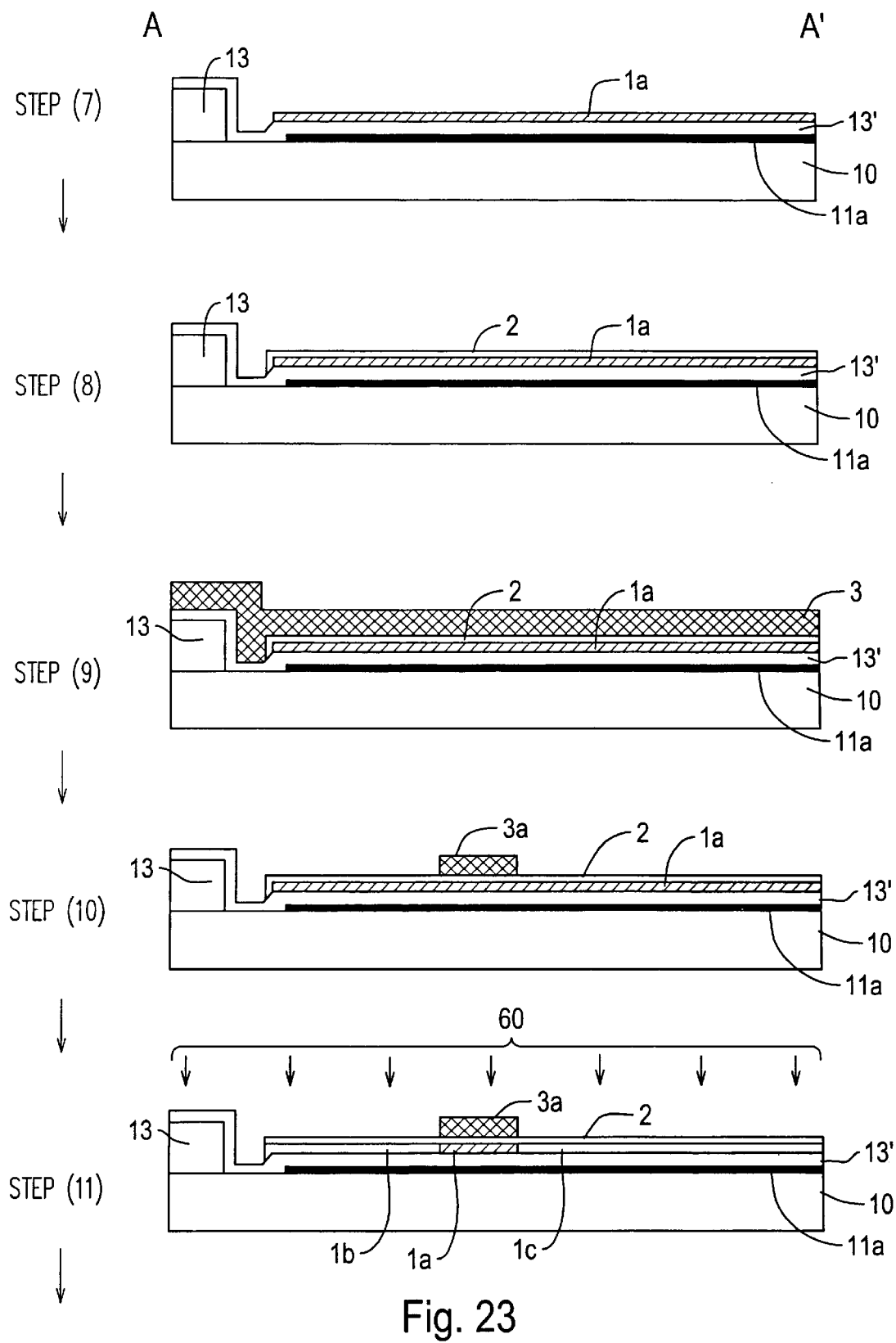
FIGS. 23(7)-23(11) are process diagrams sequentially illustrating the portion shown in FIG. 16 of the manufacturing process of an embodiment of the electro-optical apparatus.

Then, as shown in step (7) in FIG. 23, a semiconductor film 1a of a prescribed pattern as shown in FIG. 14 is formed through a photolithographic step or an etching step.

Then, as shown in step (8), a thermal-oxidized film having a relatively small thickness of about 300 Å is formed through thermal oxidation of the semiconductor layer 1a at a temperature of from 900 to 1,300° C., or preferably at about 1,000° C. Further, a gate insulating film 2 having a multilayer structure may be formed by depositing a high-temperature silicon oxide film (HTO film) or a silicon nitride film by the vacuum CVD process into a relatively small thickness of about 500 Å. This results in a thickness of the semiconductor layer 1a within a range of from 300 to 1,500 Å, or preferably, from 350 to 500 Å, and a thickness of the gate insulating film 2 within a range of from 200 to 1,500 Å, or preferably from 300 to 1,000 Å. By thus reducing the high-temperature thermal oxidation time, it is possible to prevent a camber caused by heat when using a large-sized substrate of about 8 inches. However, the gate insulating film 2 having a single-layer structure may be formed by only thermally oxidizing the polysilicon film 1.

Then, as shown in step (9), the polysilicon film 3 may be made conductive by depositing the polysilicon film 3 by the vacuum CVD process or the like, and then, thermally diffusing P. Or, a doped silicon film prepared by introducing phosphorus ions simultaneously with formation of the polysilicon film 3 may be employed. Then, as shown in step (10), scanning lines 3a of a prescribed pattern as shown in FIG. 14 may be formed through a photolithographic step or an etching step using a mask. The scanning lines 3b (gate electrodes) may have a thickness of about 3,500 Å.

The scanning line 3a may be formed from a film of a high-melting-point metal such as W or Mo (molybdenum) or a metal silicide, not a polysilicon film, or may be formed into a multilayer structure by combining a metal film or a metal silicide film and the polysilicon film. In this case, if the scanning lines 3a are arranged as a light shielding film corresponding to all or part of the area covering the second light shielding film 23, it is possible to omit all or part of the second light shielding film 23 under the effect of light shielding property of the metal film or the metal silicide film. This provides a particular advantage in that it is possible to prevent a decrease in the pixel aperture ratio caused by a shift in bonding of the opposing substrate 20 and the TFT array substrate 10.

Then, as shown in step (11), when the pixel switching TFT 30 is an n-channel type TFT having an LDD structure, to form first a low concentration source area 1b and a low-concentration drain area 1c on the p-type semiconductor film 1a, a V-family dopant 60 such as P is doped in a low concentration (for example, P ions in a dose within a range of from 1 to $3 \times 10^{13}/cm^2$) with the scanning line 3a as a diffusion mask. As a result, the semiconductor layer 1a under the scanning line 3a becomes a channel area 1a'.

Figure 24:
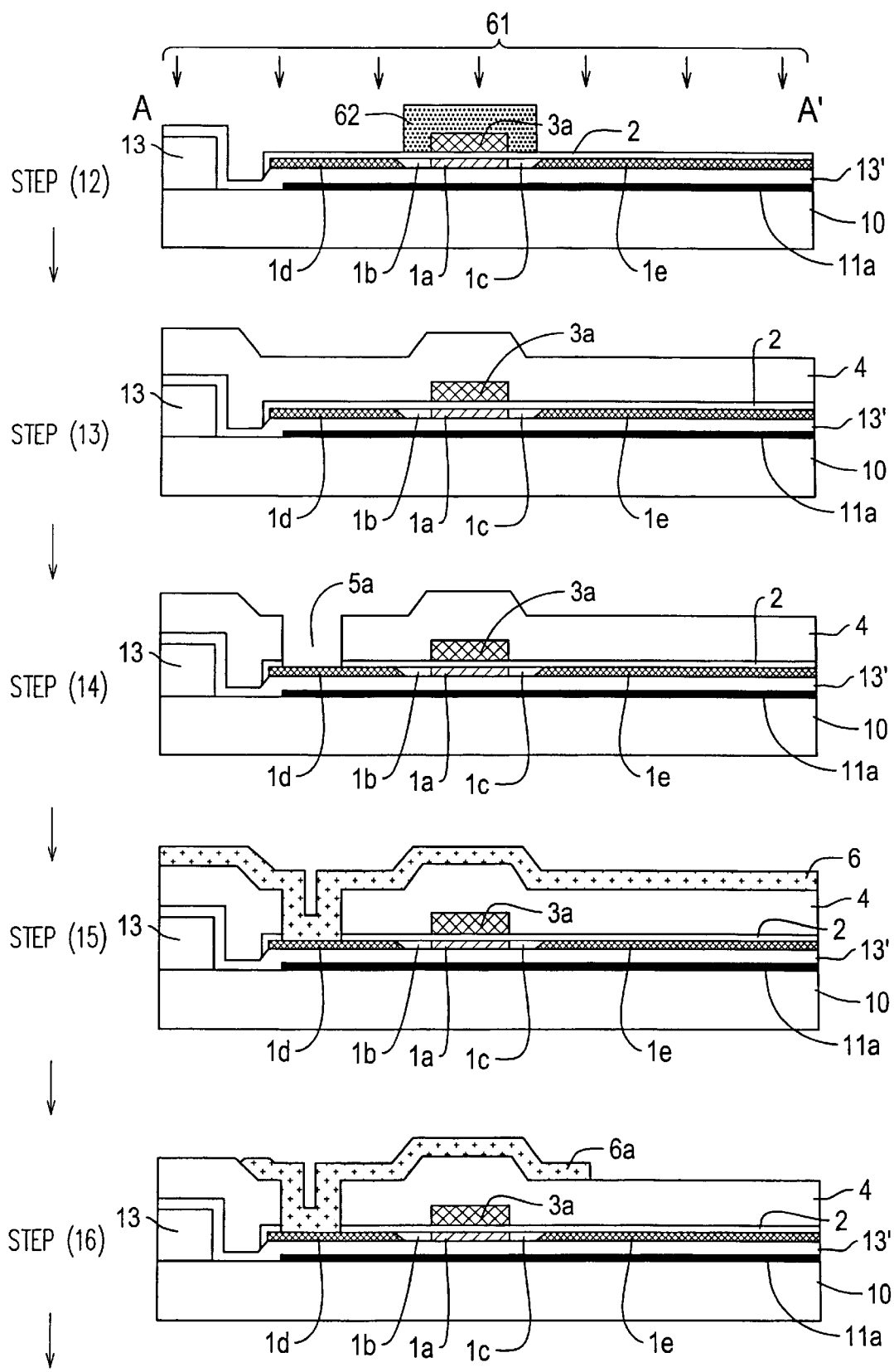
FIGS. 24(12)-24(16) are process diagrams sequentially illustrating the portion shown in FIG. 16 of the manufacturing process of an embodiment of the electro-optical apparatus.

Then, as shown in step (12) of FIG. 24, a resist layer 62 is formed with a mask having a width larger than the scanning line 3a on the scanning line 3a to form a high-concentration source area 1d and a high-concentration drain area 1e, and then a V-family dopant 61 such as P is doped at a high concentration (for example, P ions in a dose within a range of from 1 to $3 \times 10^{15}/cm^2$). When the pixel switching TFT 30 is of the p-channel type, doping is carried out with the use of a III-family dopant such as B to form a low-concentration source area 1b, a low-concentration drain area 1c, a high-concentration source area 1d and a high-concentration drain area 1e on the n-type semiconductor layer 1a. Adoption of the LDD structure permits reduction of a channel effect. However, a TFT of the offset structure may be adopted without conducting low-concentration doping, or a self-alignment type TFT may be used by the application of the ion injection technique using P ions or B ions with the scanning line 3a as a mask.

In parallel with these steps, circuits such as a data line driving circuit 101 and a scanning driving circuit 104 or the like having the complementary structure composed of an n-channel type TFTs and p-channel TFTs are formed on the periphery of the TFT array substrate 10. Because the pixel switching TFT 30 is made of polysilicon, the data line driving circuit 101 and the scanning line driving circuit 104 can be formed through substantially the same steps at the time of forming the pixel switching TFT 30, thus providing advantages in manufacture.

Then, as shown in step (13), a second interlayer insulating film 4 comprising a silicate glass film made of NSG, PSG, BSG or BPSG, a silicon nitride film or a silicon oxide film is formed by the use of atmospheric-pressure or vacuum CVD process or TEOS gas, for example, so as to cover the scanning lines 3a (gate electrodes). The second interlayer insulating film 4 is preferably within a range of from 5,000 to 15,000 Å thick.

Then, as shown in step (14), annealing may be carried out at about 1,000° C. for about 20 minutes for activating the high-concentration source area 1d and the high-concentration drain area 1e, and then, a contact hole 5a for the data line 6a may be formed by dry etching such as reactive ion etching or reactive ion beam etching.

In this case, providing an aperture of the contact hole 5a by anisotropic etching such as reactive ion etching or reactive ion beam etching provides an advantage in that the aperture can have substantially the same shape as the mask shape. Aperturing by a combination of dry etching and wet etching, which allows to make a tapered contact hole 5a, permits an advantage of preventing breakage upon connecting wiring lines.

A contact hole for connecting the scanning line 3a to wiring lines (not shown) is provided in the second interlayer insulating film 4 through the same step as that of the contact hole 5a.

Then, as shown in step (15), a metal film 6 made of a light-shielding low-resistance metal such as Al or metal silicide is deposited on the second interlayer insulating film 4 by sputtering or the like to a thickness of from 1,000 to 5,000 Å, or preferably, about 3,000 Å, and further, as shown in step (16), data lines 6a are formed through a photolithographic step and an etching step.

Figure 25:
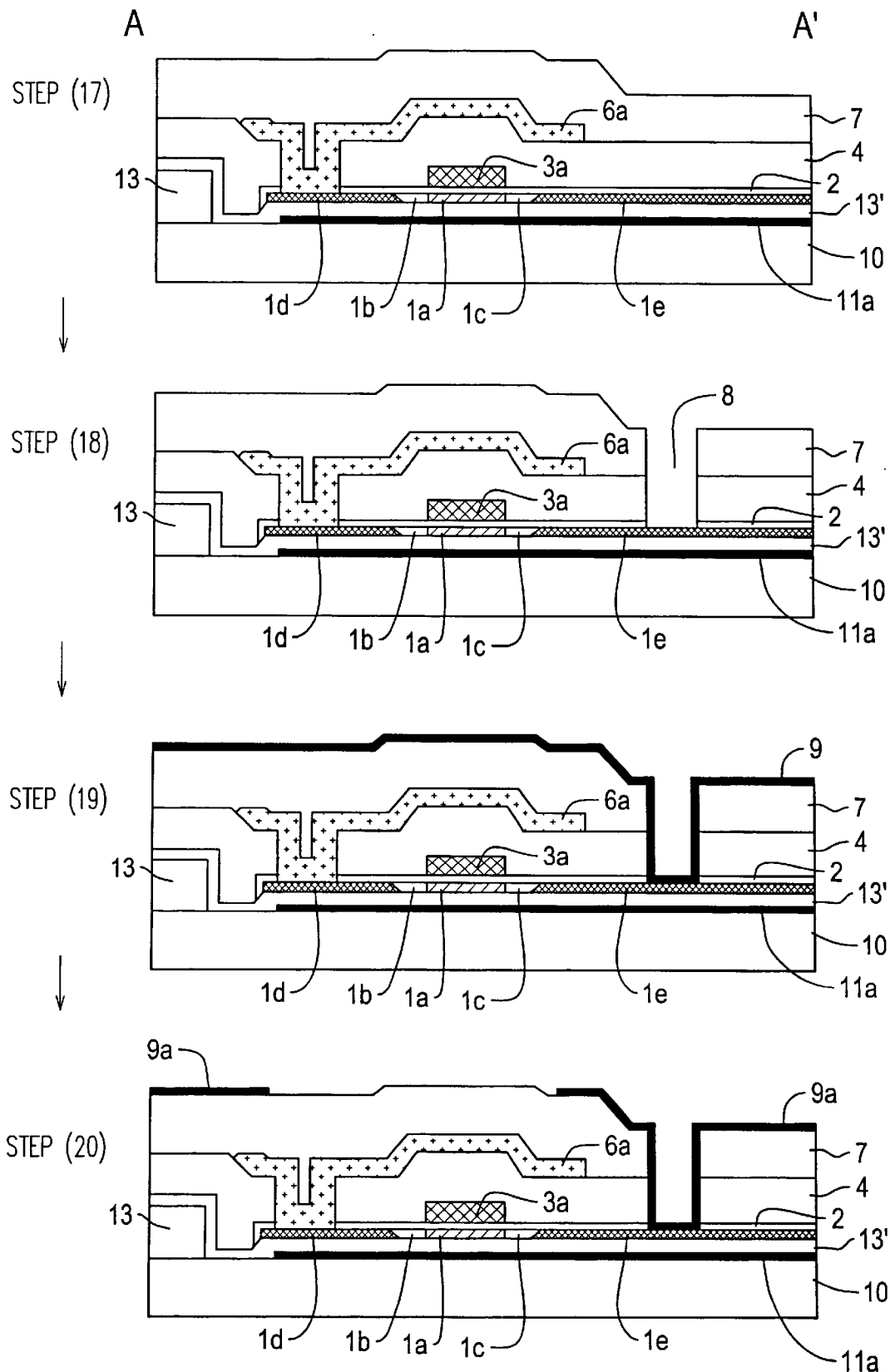
FIGS. 25(17)-25(20) are process diagrams sequentially illustrating the portion shown in FIG. 16 of the manufacturing process of an embodiment of the electro-optical apparatus.

Then, as shown in step (17) in FIG. 25, a third interlayer insulating film 7 comprising a silicate glass film made of NSG, PSG, BSG or BPSG, a silicate nitride film or a silicon oxide film is formed by the use of the atmospheric-pressure or vacuum CVD process or TEOS gas or the like so as to cover the data lines 6a. The third interlayer insulating film 7 should preferably have a thickness of from 5,000 to 15,000 Å.

In this embodiment, particularly in steps (4) and (5) shown in FIG. 22, concave recess are formed on the first interlayer insulating film at portions of the pixel switching TFT 30 and the various wiring lines. Therefore, the surface of the pixel area becomes substantially flat upon completion of this step (17). For further flattening, a more flat film may be formed by spin-coating an organic film or an SOG film, or applying a CMP treatment, in place of, or onto, the silicate glass film composing the third interlayer insulating film 7.

Then, as shown in step (18), a contact hole 8 for electrically connecting the pixel electrode 9a and the high-concentration drain area 1e is formed through dry etching such as reactive ion etching or reactive ion beam etching. In this case, providing an aperture of the contact hole 8 by anisotropic etching such as reactive ion etching or reactive ion beam etching provides an advantage in that the aperture can have substantially the same shape as the mask shape. Aperturing by a combination of dry etching and wet etching, which allow to make a tapered contact hole 8, permits an advantage of preventing breakage upon connecting wiring lines.

Then, as shown in step (19), a transparent conductive thin film 9 such as an ITO film is deposited by sputtering or the like into a thickness of from 500 to 2,000 Å on the third interlayer insulating film 7, and further as shown in step (20), pixel electrode 9a is formed through a photolithographic step, an etching step or the like. When the electrooptical apparatus 100 is used for a reflection type liquid crystal apparatus, the pixel electrode 9a may be made of a non-transparent material having a high reflectivity such as Al.

Figure 26:
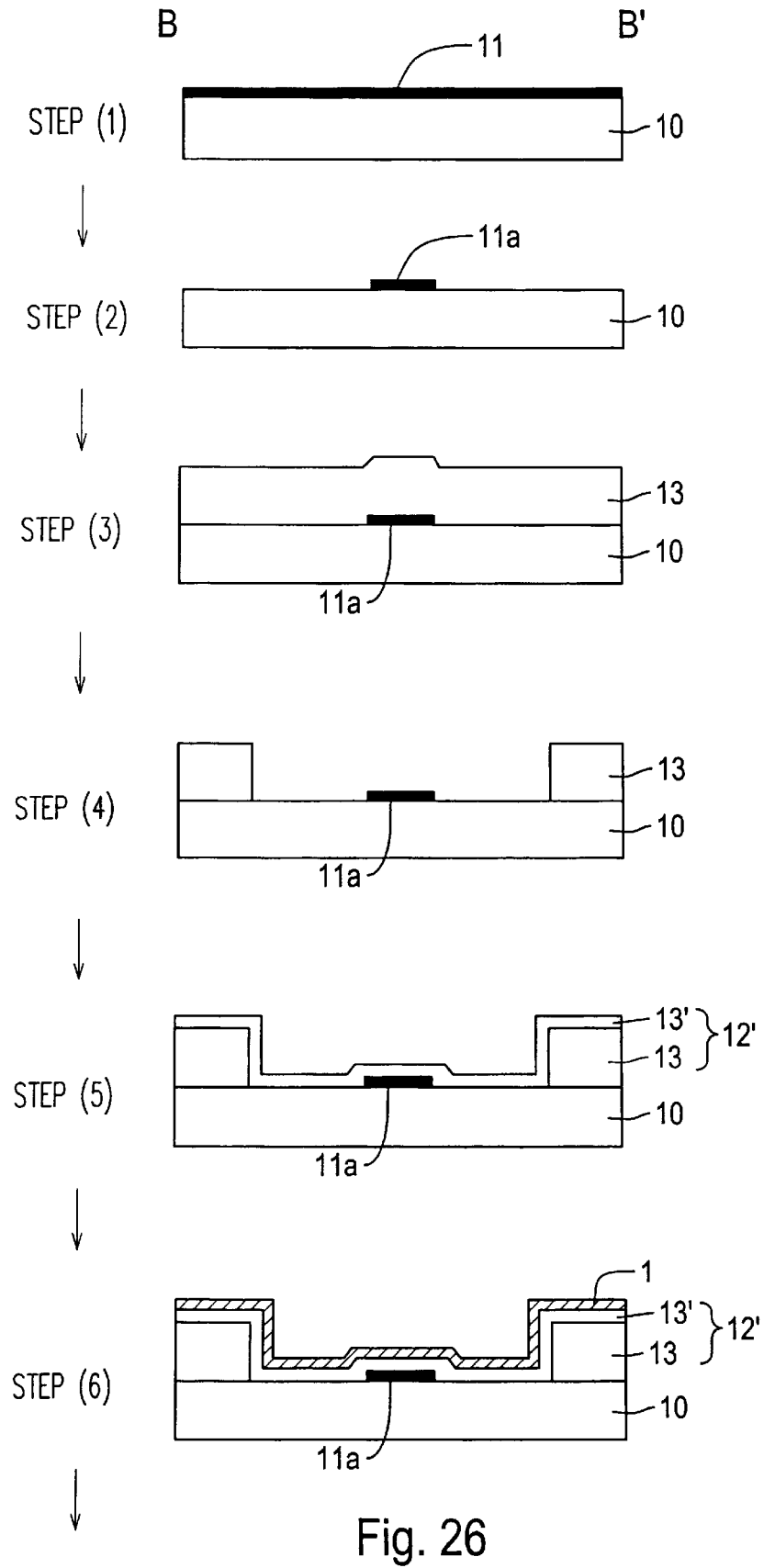
FIGS. 26(1)-26(6) are process diagrams sequentially illustrating the portion shown in FIG. 18 of the manufacturing process of an embodiment of the electro-optical apparatus.
Figure 29:
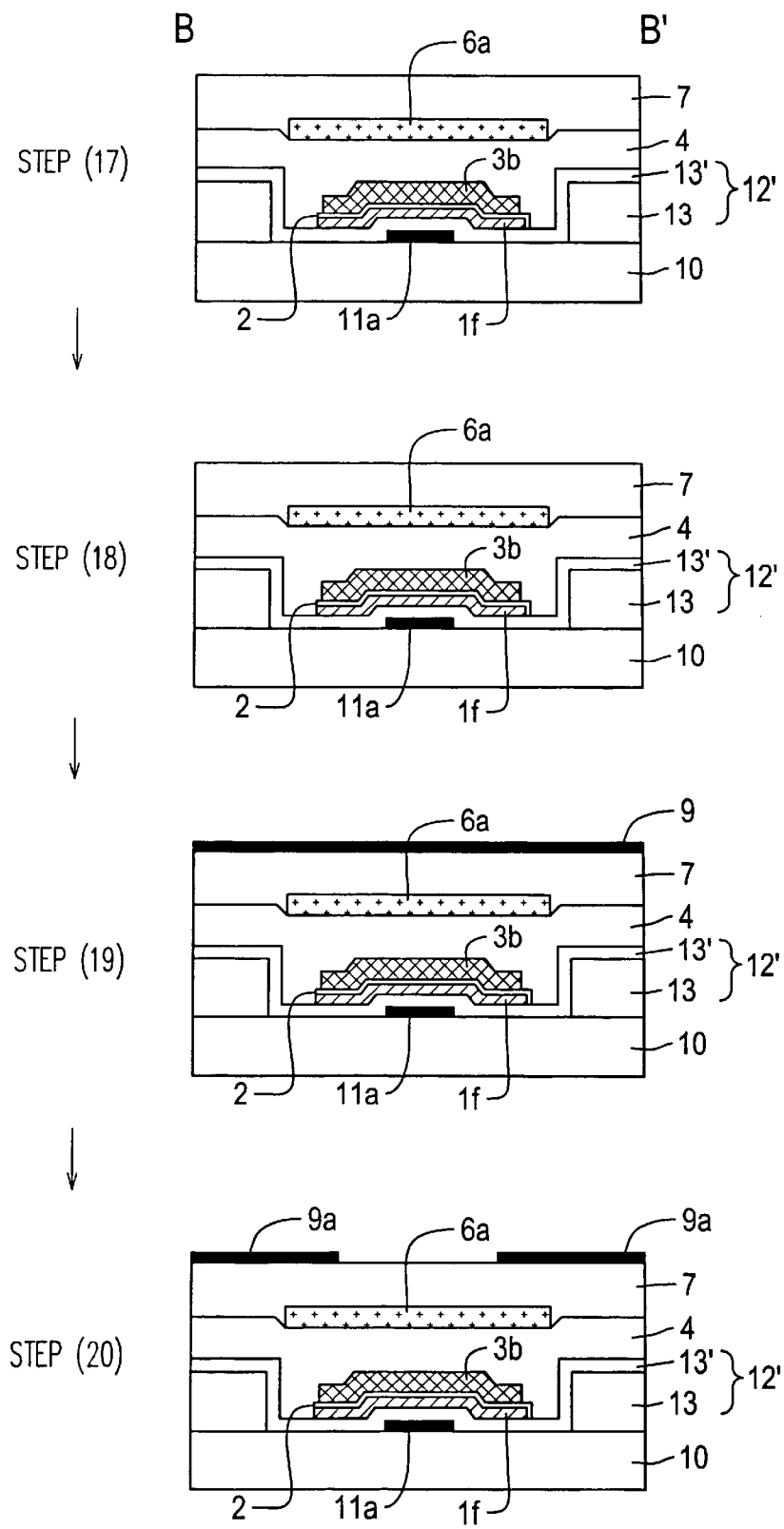
FIGS. 29(17)–29(20) are process diagrams sequentially illustrating the portion shown in FIG. 18 of the manufacturing process of an embodiment of the electro-optical apparatus.

Step (1) shown in FIG. 26 to step (20) shown in FIG. 29 are carried out under the same manufacturing process as steps (1)-(20) shown in FIGS. 22–25.

More specifically, as shown in step (1) of FIG. 26, a light shielding film 11 is formed on the entire surface of the TFT array substrate 10, and then, as shown in step (2), a first light shielding film 11a is formed in a photolithographic step or an etching step.

Then, as shown in step (3), a first insulating film 13 (i.e., the lower layer of the double layered first interlayer insulating film 12') is formed on the first light shielding film 11*a*. In step (4) etching is applied to an area where the data lines 6*a* are to be formed thereabove to remove the first insulating film 13 in this area. When a treatment is carried out by dry etching such as reactive ion etching or reactive ion beam etching, the first insulating film 12' can be removed anisotropically with substantially the same size as the resist mask formed by photolithography, thus providing an advantage of permitting easy control as designed in size. When wet etching, on the other hand, isotropy provides a wider aperture area of the first interlayer insulating film 12'. However because the side wall of the aperture can be tapered, the polysilicon film or the resist for forming capacitor lines 3*b* in a subsequent step never remains on the periphery of the aperture side wall without being etched or peeled off, thus preventing the yield from decreasing. Tapering the aperture side wall of the first interlayer insulating film 12' may be accomplished by carrying out by dry etching, then withdrawing the resist pattern and then dry etching once again.

Then, as shown in step (5), a second insulating film 13' (i.e., the upper layer of the double-layered first interlayer insulating film 12') is formed on the first light shielding film 11*a* and the first insulating film 13.

Then, as shown in step (6), an amorphous silicon film is formed on the second insulating film 13', and then a polysilicon film 1 is caused to solid-phase grow.

Then, as shown in step (7) shown in FIG. 23, a semiconductor layer 1*a* of a prescribed pattern as shown in FIG. 14 is formed through a photolithographic step or an etching step.

Then, as shown in step (8), a gate insulating film 2 is formed through thermal oxidation or the like of the first storage capacitor electrode 1*f* extended from the semiconductor film 1*a*. While there is no particular limitation, resistance of the first storage capacitor electrode 1*e'* may be reduced by doping, for example, P ions in an amount of about $3 \times 10^{12}/cm^2$. The first storage capacitor electrode 1*f* is formed by extending the semiconductor layer 1*a* comprising a polysilicon film 1. Further, as shown in step (9), a polysilicon film 3 is deposited thereon, and then, as shown in step (10), a capacitor line 3*b* of a prescribed pattern as shown in FIG. 14 is formed from the same layer as the scanning line 3*a* through a photolithographic step and an etching step. The capacitor line 3*b* has therefore a thickness of about 3,500 Å as the scanning line 3*a*.

Figure 27:
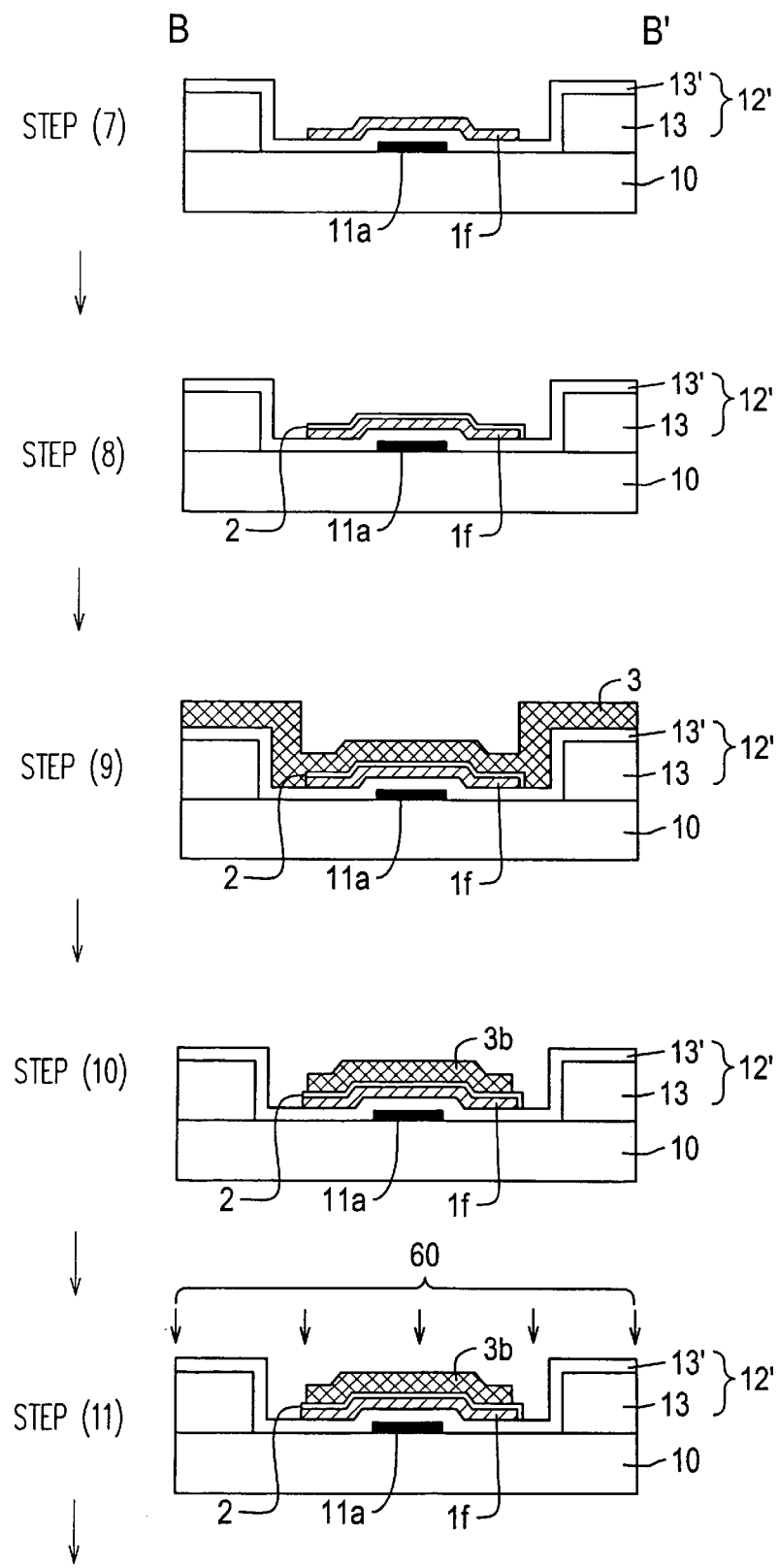
FIGS. 27(7)–27(11) are process diagrams sequentially illustrating the portion shown in FIG. 18 of the manufacturing process of an embodiment of the electro-optical apparatus.
Figure 28:
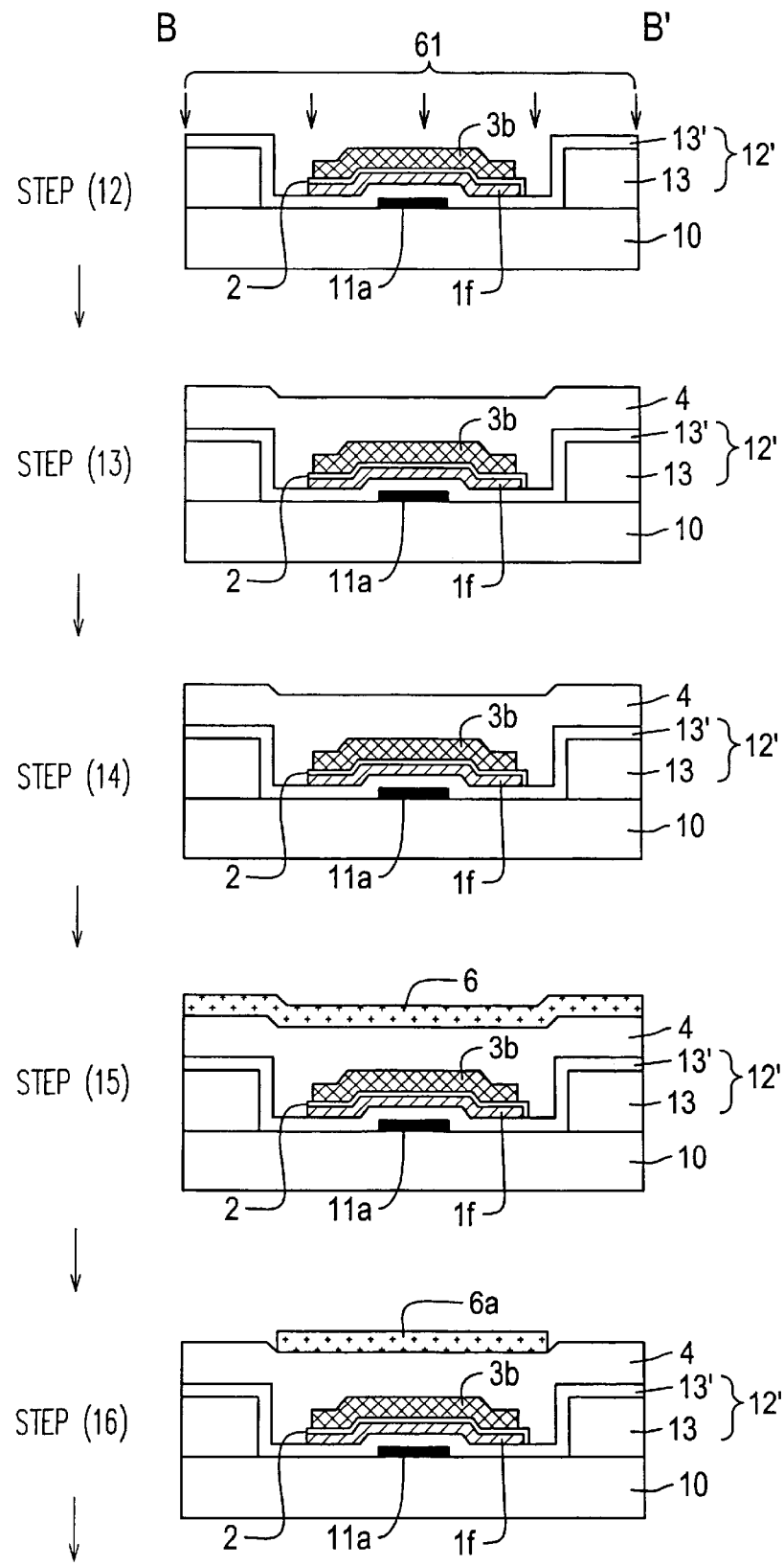
FIGS. 28(12)–28(16) are process diagrams sequentially illustrating the portion shown in FIG. 18 of the manufacturing process of an embodiment of the electro-optical apparatus.

Then, as shown in step (11) shown in FIG. 27 and step (12) shown in FIG. 28, the resistance of the capacitor line 3*b* is further reduced by doping impurity ions 60 and 61.

Then, as shown in step (13), a second interlayer insulating film 4 is formed so as to cover the capacitor line 3*b*, and as shown in step (14), a contact hole for connecting the capacitor line 3*b* to a wiring line not shown is provided in the second interlayer insulating film 4.

Then, as shown in step (15), a metal film 6 made of Al or the like is deposited by sputtering on the second interlayer insulating film 4, and then as shown in step (16), a data line 6*a* (source electrode) is formed through a photolithographic step and an etching step.

Then, as shown in step (17) of FIG. 29, a third interlayer insulating film 7 is formed so as to cover the data line 6*a*.

In this embodiment, in which a concave recess is formed on the first interlayer insulating film 12' at the data line 6*a* portion particularly in steps (4) and (5) of FIG. 26, the surface of the pixel area becomes substantially flat upon completion of this step (17).

Then, in step (18) of FIG. 29 after the contact hole 8 is formed, as shown in the step (19), a transparent conductive thin film such as an ITO film is deposited on the third interlayer insulating film 7, and further as shown in step (20), a pixel electrode 9*a* is formed through a photolithographic step and an etching step.

The manufacturing process of the portion including the scanning lines and capacitor lines corresponding the C–C' cross-section of FIG. 14 will now be described with reference to FIGS. 30 to 33.

Figure 30:
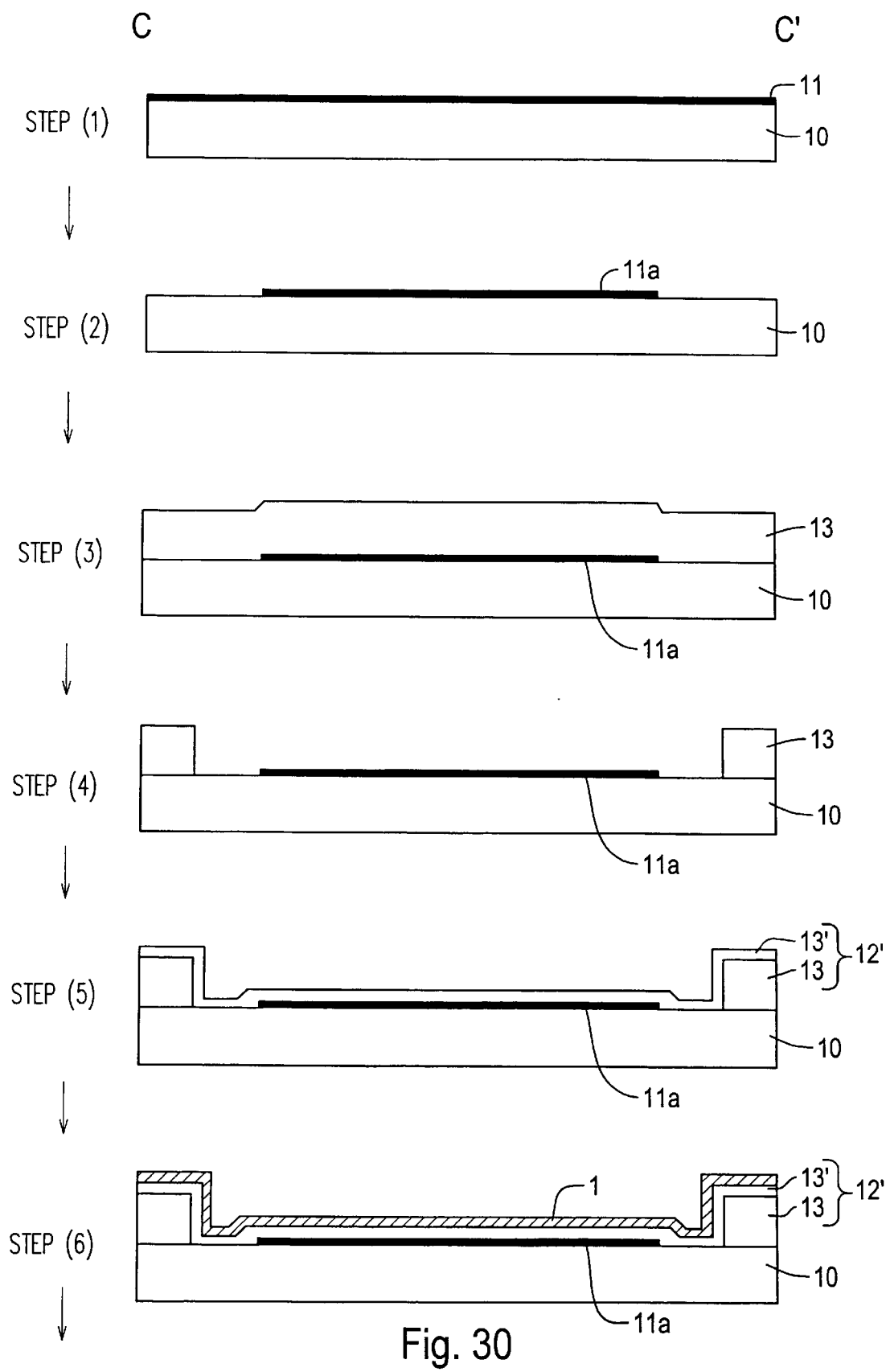
FIGS. 30(1)–30(6) are process diagrams sequentially illustrating the portion shown in FIG. 19 of the manufacturing process of an embodiment of the electro-optical apparatus.
Figure 33:
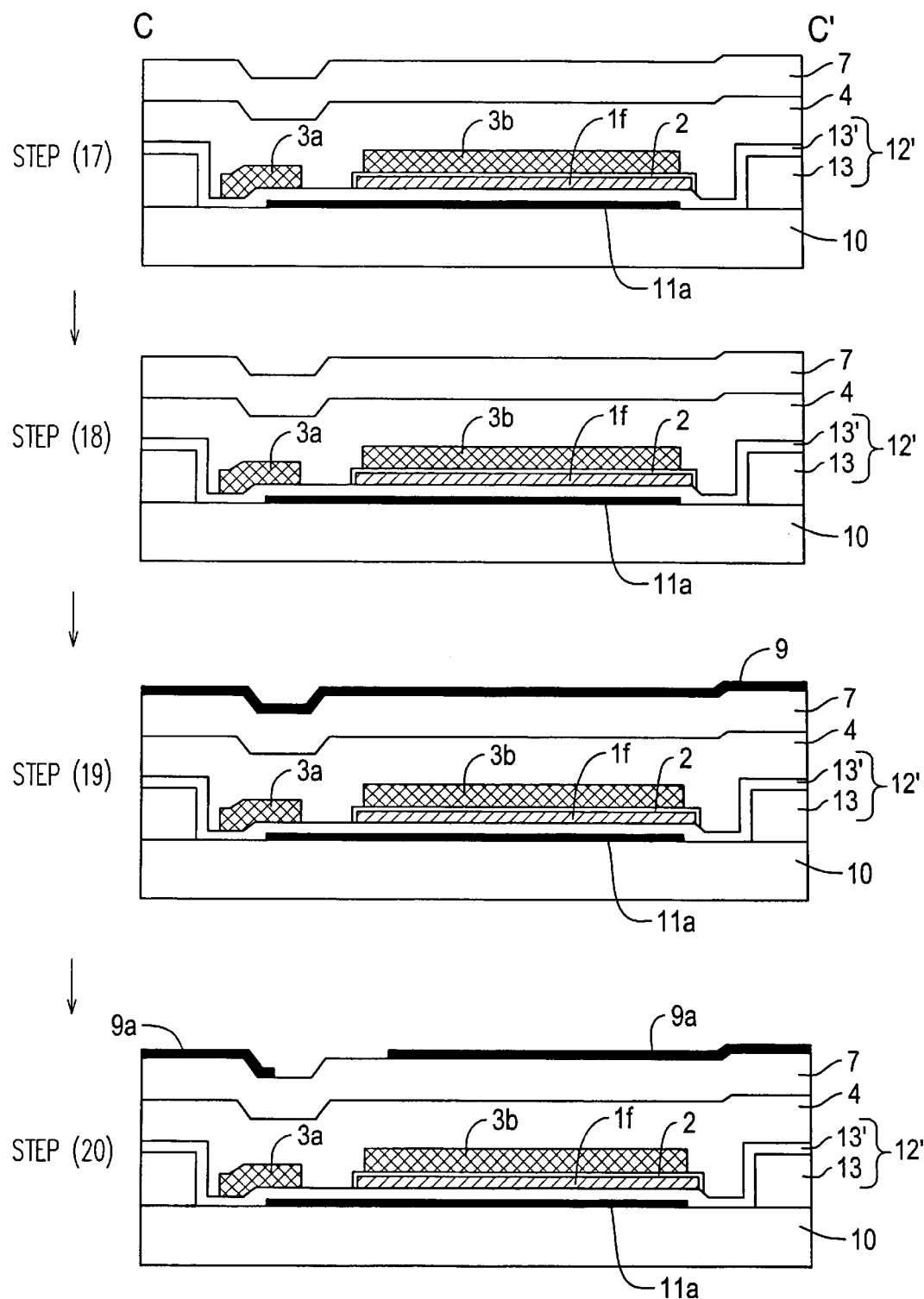
FIGS. 33(17)–33(20) are process diagrams sequentially illustrating the portion shown in FIG. 19 of the manufacturing process of an embodiment of the electro-optical apparatus.

Step (1) shown in FIG. 30 to step (20) shown in FIG. 33 are carried out as the same manufacturing process as step (1) shown in FIG. 22 to step (20) shown in FIG. 25.

More specifically, as shown in step (1) of FIG. 30, a light shielding film 11 is formed on the entire surface of the TFT array substrate 10, and then, as shown in step (2), a light shielding film 11*a* is formed in a photolithographic step or an etching step.

Then, as shown in step (3), a first insulating film 13 (i.e., the lower layer of the double-layered first interlayer insulating film 12') is formed on the first light shielding film 11*a*, and then, as shown in step (4), etching is applied to an area where the scanning lines 3*a* and capacitor lines 3*b* are to be formed thereabove to remove the first insulating film 13 in this area. When a treatment is carried out by dry etching such as reactive ion etching or reactive ion beam etching, the first insulating film 13 can be removed anisotropically with substantially the same size as the resist mask formed by photolithography, thus permitting easy control as designed in size. When using at least wet etching, on the other hand, isotropy provides a wider aperture area of the first interlayer insulating film 12'. However because the side wall of the aperture can be tapered, the polysilicon film or the resist for forming capacitor lines 3*b* in a subsequent step never remains on the periphery of the aperture side wall without being etched or peeled off, thus preventing the yield from decreasing. Tapering the aperture side wall of the first interlayer insulating film 12' may be accomplished by dry etching, then withdrawing the resist pattern, and then conducting dry etching once again.

Then, as shown in step (5), a second insulating film 13 (i.e., the upper layer of the double-layered first interlayer insulating film 12') is formed on the first light shielding film 11*a* and the first insulating film 13.

Then, as shown in step (6), an amorphous silicon film is formed on the second insulating film 13', and then a polysilicon film 1 is caused to solid-phase grow.

Figure 31:
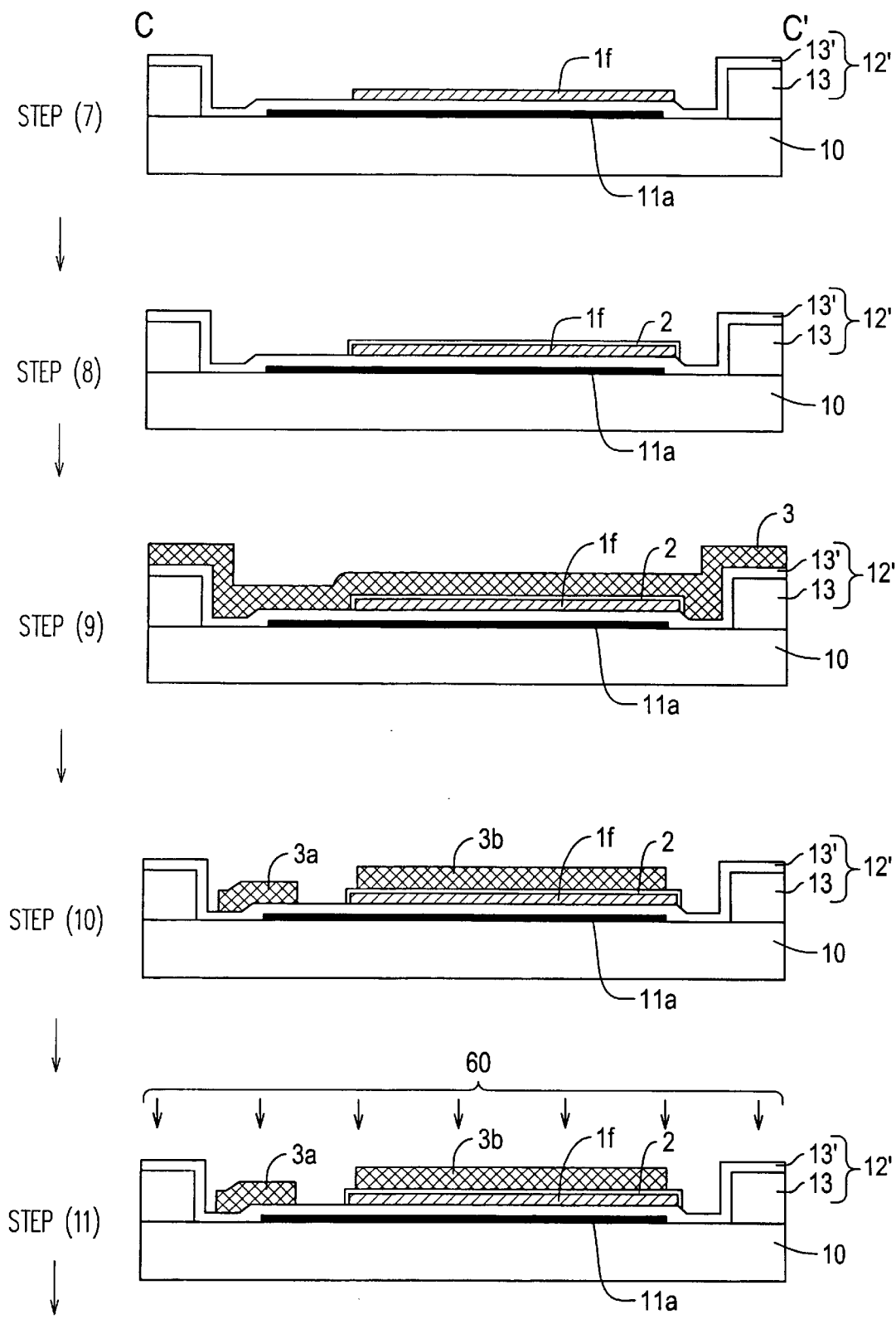
FIGS. 31(7)–31(11) are process diagrams sequentially illustrating the portion shown in FIG. 19 of the manufacturing process of an embodiment of the electro-optical apparatus.

Then, as shown in step (7) of FIG. 31, a first capacitor electrode 1*f* is formed by the extension of a semiconductor layer 1*a* comprising a polysilicon film 1 of a prescribed pattern as shown in FIG. 14 through a photolithographic step and an etching step.

Then, as shown in step (8), a gate insulating film 2 through thermal oxidation of the first storage capacitor electrode 1*f*, and further, as shown in step (9), after depositing a polysilicon film 3, scanning lines 3*a* and capacitor lines 3*b* of a prescribed pattern as shown in FIG. 14 are formed through a photolithographic step and an etching step, as shown in step (10).

Figure 32:
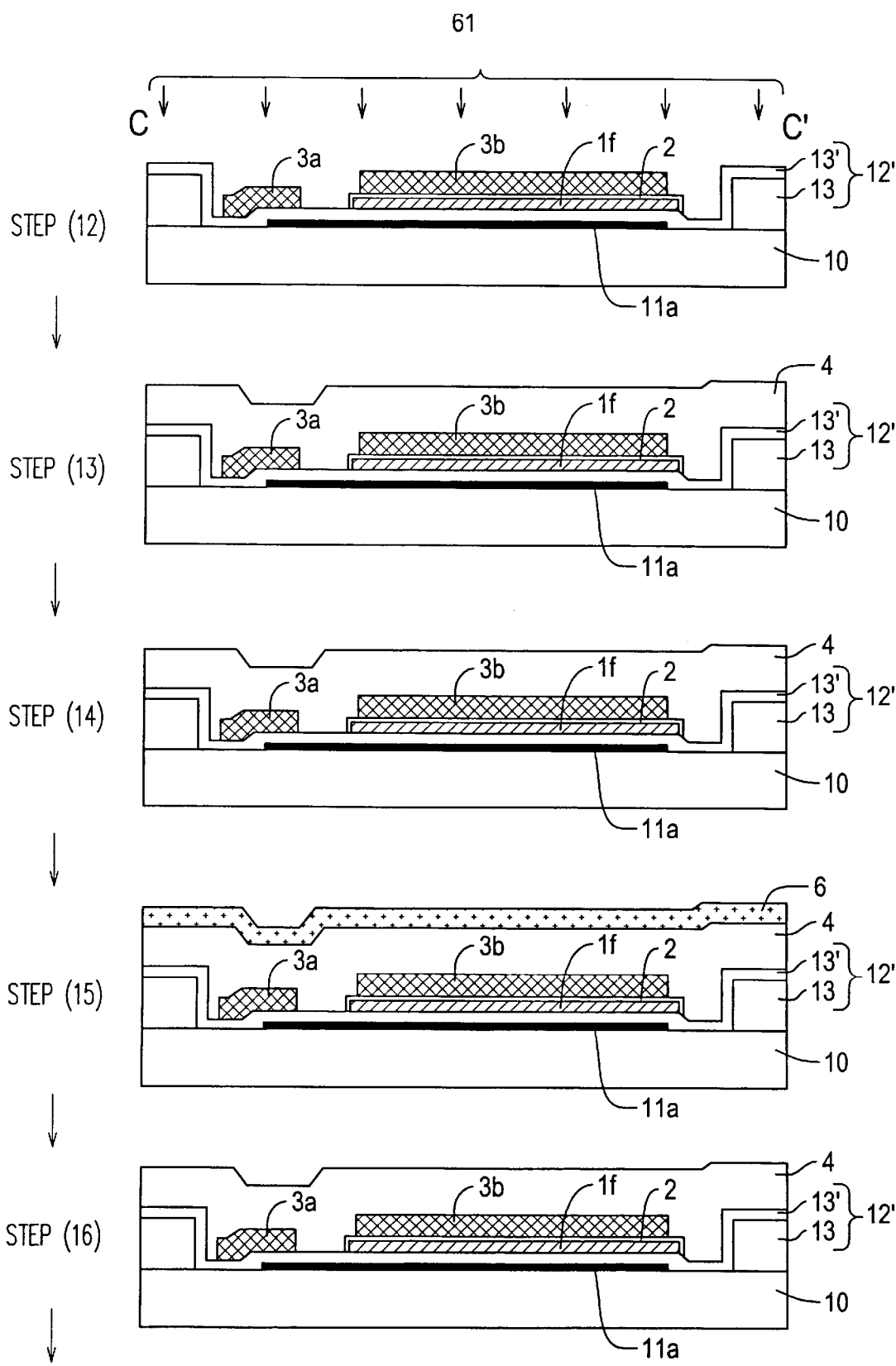
FIGS. 32(12)–32(16) are process diagrams sequentially illustrating the portion shown in FIG. 19 of the manufacturing process of an embodiment of the electro-optical apparatus.

Then, as shown in step (11) of FIG. 31 and in step (12) of FIG. 32, the resistance of the scanning line 3*a* and the capacitor line 3*b* is further reduced by doping impurity ions 60 and 61.

Then, as shown in step (13), a second interlayer insulating film 4 is formed so as to cover the scanning line 3*a* and the capacitor line 3*b*, and as shown in step (14), a contact hole for connecting the scanning line 3*a* and the capacitor line 3*b* to wiring lines not shown can be provided in the second interlayer insulating film 4.

Then, as shown in step (15), a metal film 6 made of Al or the like is deposited by sputtering on the second interlayer insulating film 4, and then, as shown in step (16), a data line 6a (i.e., source electrode) not present on the cross-section is formed through a photolithographic step and an etching step.

Then, as shown in step (17) of FIG. 33, a third interlayer insulating film 7 is formed so as to cover the second interlayer insulating film 4.

In this embodiment, the first interlayer insulating film 12' is formed to provide concave recesses at the scanning line 3a and the capacitor line 3b portions particularly through steps (4) and (5) of FIG. 30. The surface of the pixel area becomes substantially flat upon completion of this step (17).

In step (18) of FIG. 33, after piercing of a contact hole 8, a transparent conductive thin film 9 such as an ITO film is deposited on the third interlayer insulating film 7, as shown in step (19), and as shown in step (20), a pixel electrode 9a is formed through a photolithographic step and an etching step.

The manufacturing process of the portion including the connecting portion of the light shielding wiring 11b and the constant potential line 6b corresponding to the D–D' cross-section of FIG. 15 will now be described with reference to FIGS. 34 to 37.

Figure 34:
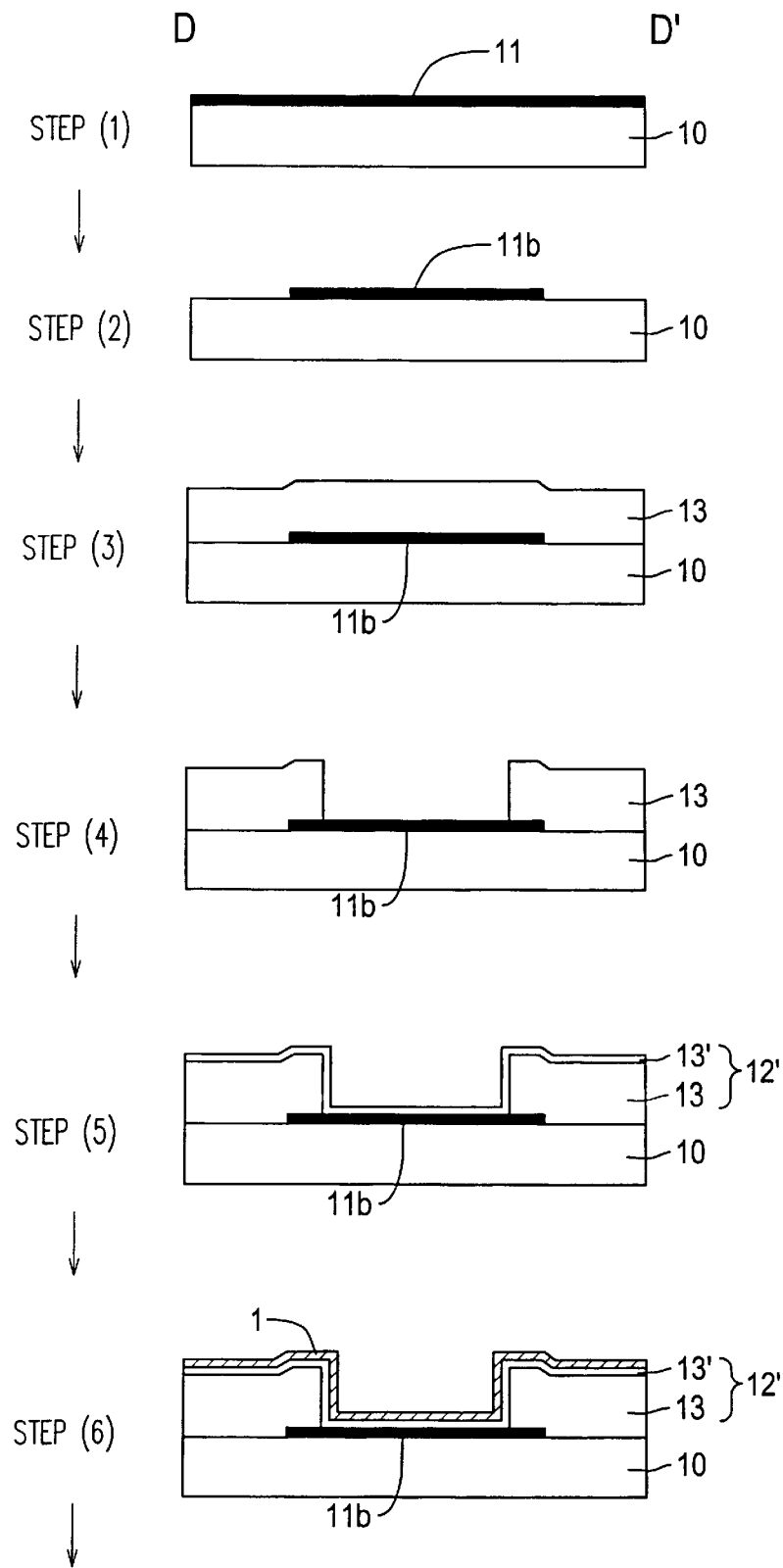
FIGS. 34(1)–34(6) are process diagrams sequentially illustrating the portion shown in FIG. 20 of the manufacturing process of an embodiment of the electro-optical apparatus.

Step (1) of FIG. 34 to step (20) of FIG. 33 are carried out using the same manufacturing process as the process of step (1) of FIG. 22 to step (20) of FIG. 25.

More specifically, as shown in step (1) of FIG. 34, a light shielding film 11 is formed on the entire surface of the TFT array substrate 10, and then, as shown in step (2), a light shielding wiring 11b is formed through a photolithographic step and an etching step.

Then, as shown in step (3), a first insulating film 13 (i.e., lower layer of the double-layered first interlayer insulating film 12') is formed on the light shielding wiring 11b, and then, as shown in step (4), etching is applied to an area where the connecting portion is to be formed thereabove to remove the first insulating film 13 in this area. Then, as shown in step (5), a second insulating film 13' (i.e., upper layer of the double-layered first interlayer insulating film 12') is formed on the light shielding wiring 11b and the first insulating film 13.

Then, as shown in step (6), an amorphous silicon film is formed on the second insulating film 13', and then the polysilicon film 1 undergoes solid-phase growth.

Figure 35:
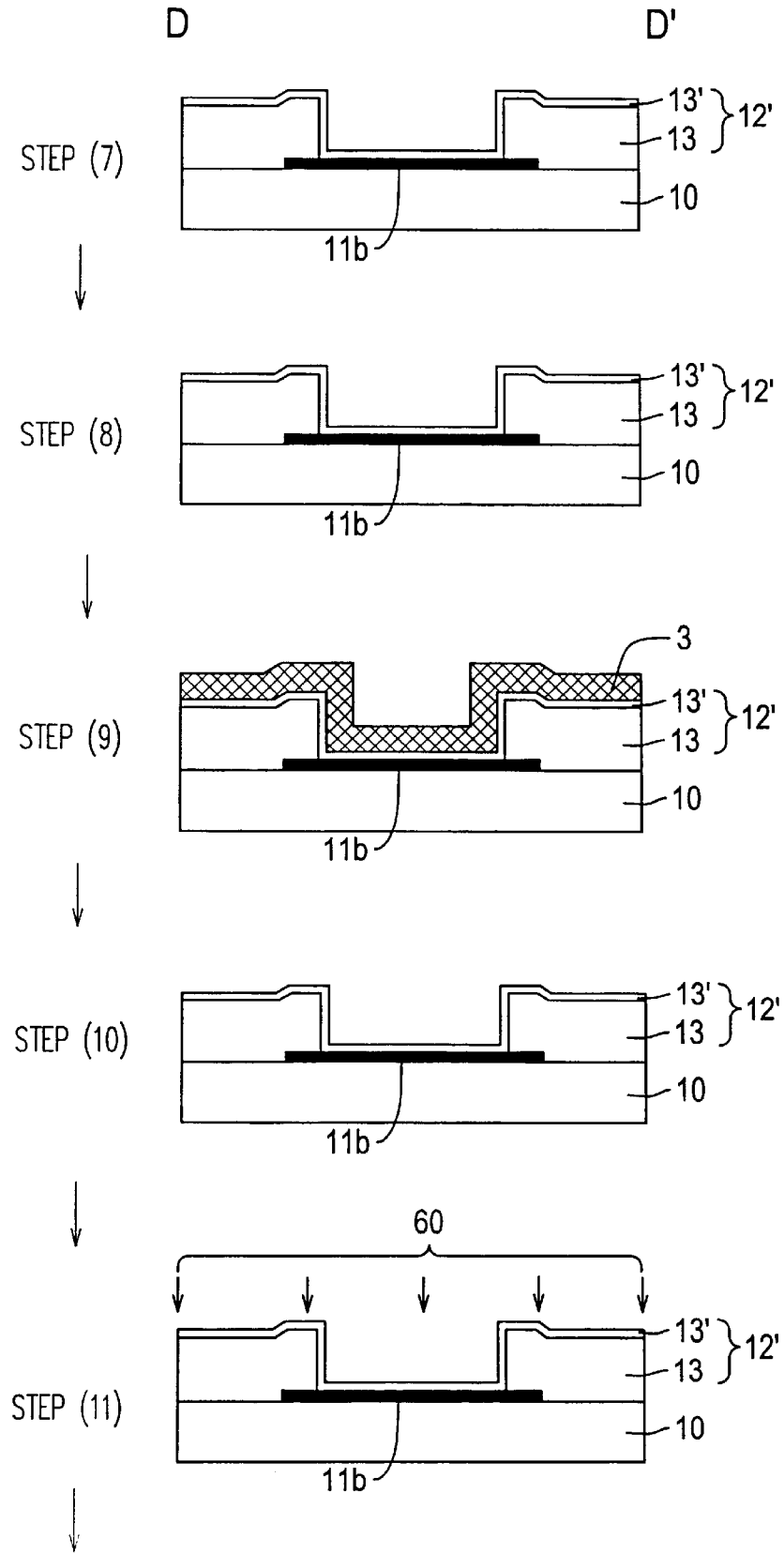
FIGS. 35(7)–35(11) are process diagrams sequentially illustrating the portion shown in FIG. 20 of the manufacturing process of an embodiment of the electro-optical apparatus.

Then, in steps (7) and (8) of FIG. 35, after formation of the semiconductor layer 1a and the gate insulating film 2 in the pixel section, a polysilicon film 3 is deposited as shown in step (9), and then, as shown in step (10), the polysilicon film 3 is completely removed from the connecting portion.

Figure 36:
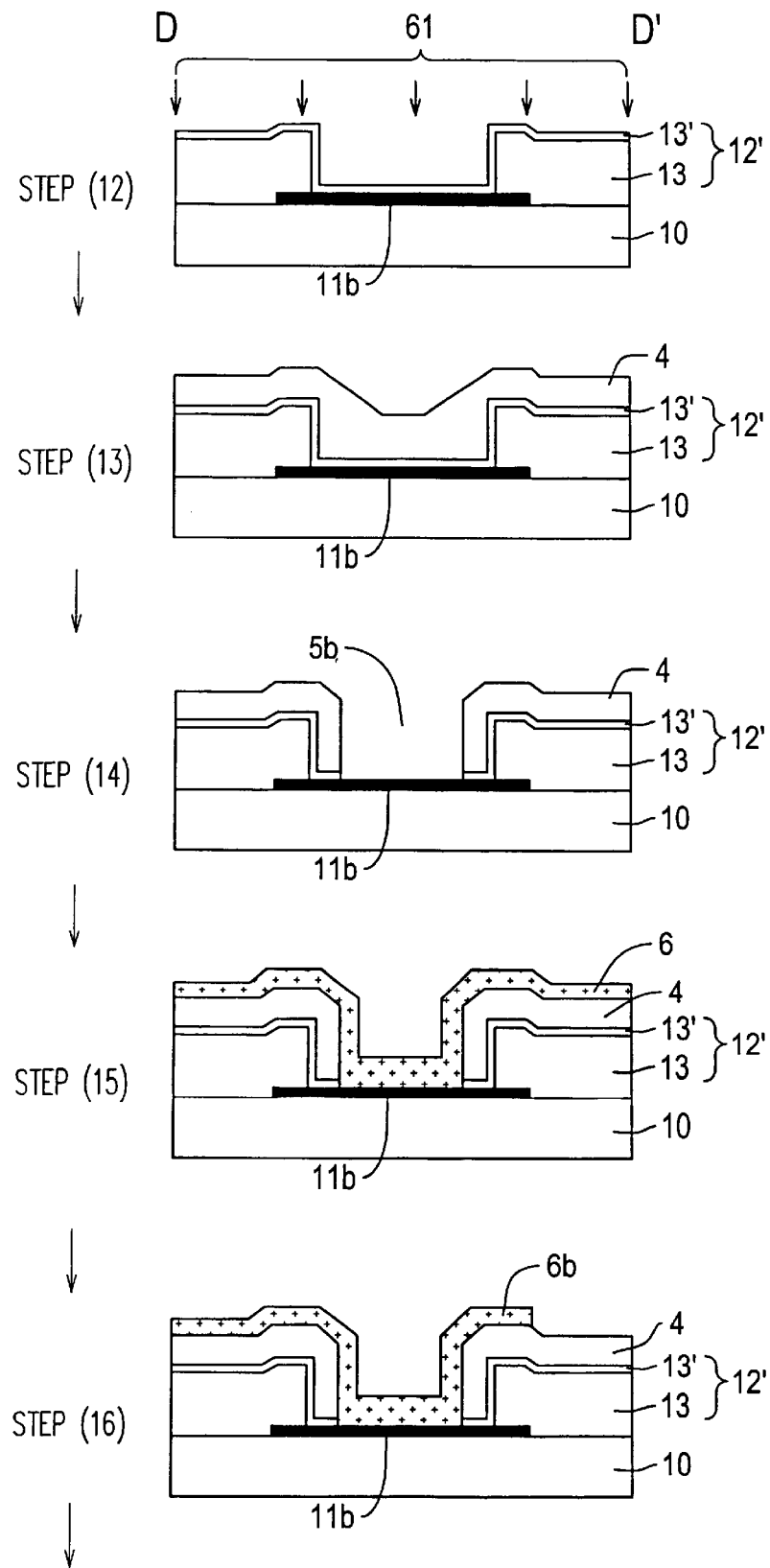
FIGS. 36(12)–36(16) are process diagrams sequentially illustrating the portion shown in FIG. 20 of the manufacturing process of an embodiment of the electro-optical apparatus.

Then, as shown in step (11) of FIG. 35 and step (12) of FIG. 36, doping of the impurity ions 60 and 61 for the semiconductor layer 1a is completed.

Then, as shown in step (13), a second interlayer insulating film 4 is formed to cover the second insulating film 13', and then, as shown in step (14), a contact hole 5b for connecting the light shielding wiring 11b and the constant potential line 6b is provided in the second interlayer insulating film 4. In this case, only the second insulating film 13' of the first interlayer insulating film 12' is formed under the second interlayer insulating film 4. It is therefore possible to pierce the hole in the same etching step as the step for forming the contact hole 5a (step (14) in FIG. 24) by providing the second interlayer insulating film 4 on the high-concentration source area 1d of the semiconductor layer 1a.

Then, as shown in step (15), a metal film 6 made of Al or the like is deposited by sputtering on the second interlayer insulating film 4. Subsequently, as shown in step (16), a constant potential line 6b is formed from the same layer (Al or the like) as the data line 6a through a photolithographic step and an etching step.

Figure 37:
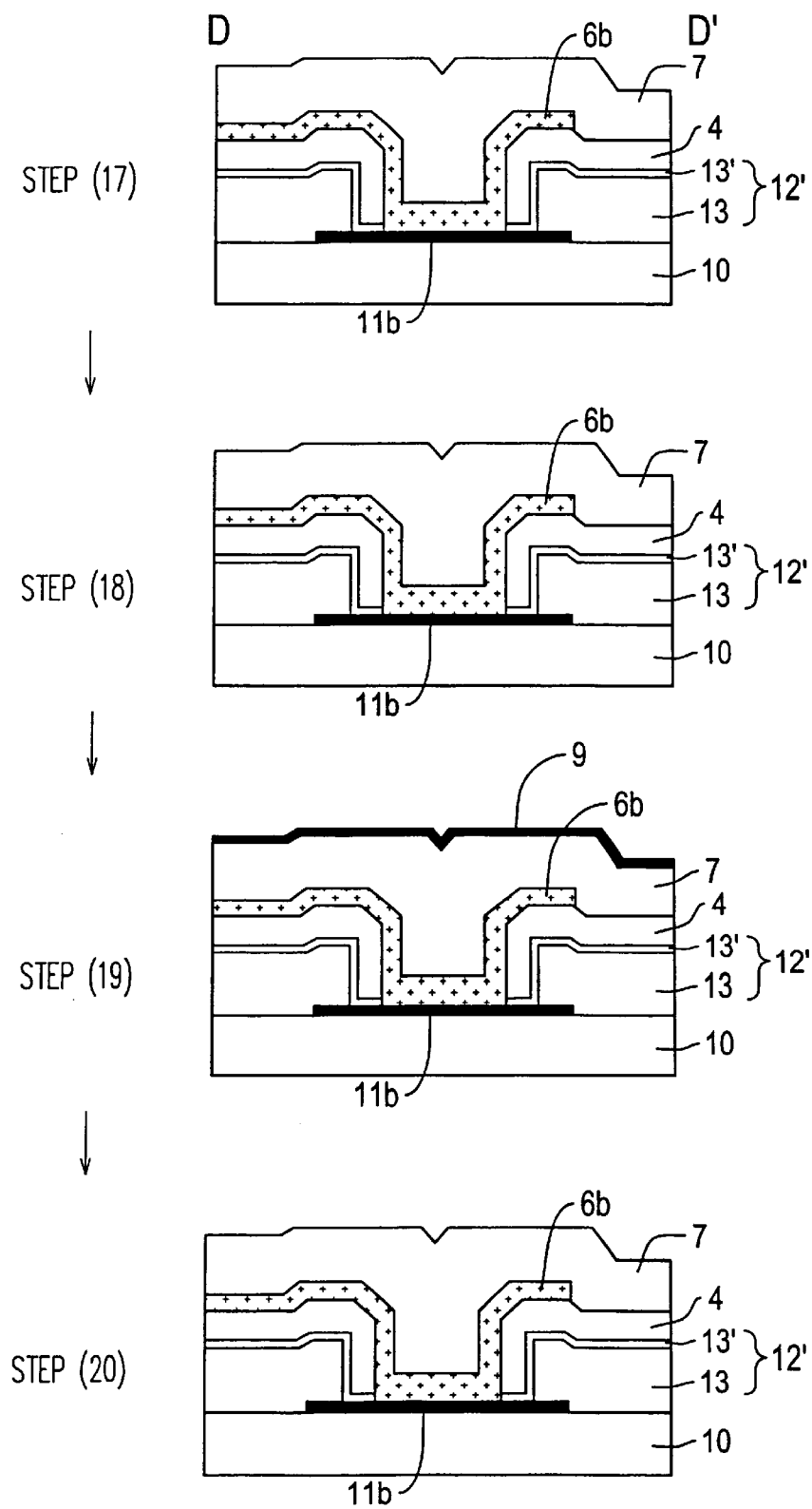
FIGS. 37(17)–37(20) are process diagrams sequentially illustrating the portion shown in FIG. 20 of the manufacturing process of an embodiment of the electro-optical apparatus.

Then, as shown in step (17) of FIG. 37, a third interlayer insulating film 7 is formed so as to cover the constant potential line 6b and the second interlayer insulating film 4.

Then, in step (18) of FIG. 37, after waiting for piercing of a contact hole 8, a transparent conductive thin film 9 such as an ITO film is deposited on the third interlayer insulating film 7 as shown in step (19), and further as shown in step (20), this portion is completely removed through a photolithographic step and an etching step.

According to the manufacturing method of a electro-optical apparatus in this embodiment, as described above, a contact hole 5b for connecting the light shielding wiring 11b and the constant potential line 6b pierces through the second interlayer insulating film 4 and the second insulating film 13' (i.e., the upper layer of the first interlayer insulating film 12') to the light shielding film 11b. At the same time, a contact hole 5a for connecting the pixel switching TFT 30 and the data line 6a pierces through the second interlayer insulating film 4 to the semiconductor layer 1a. It is therefore possible to pierce these two contact holes 5a and 5b at a time, which provides advantages in manufacturing. For example, it is possible to pierce the contact holes 5a and 5b at a single time so as to have prescribed depths, respectively, by the application of wet etching with a selection ratio set to an appropriate value. The step of piercing the contact holes is made easier particularly in response to the depth of the concave recess of the first interlayer insulating film 12. Thereby, since the contact hole piercing step (a photolithographic step or an etching step) for connecting the light shielding wiring 11b and the constant potential line 6b can be omitted, an increase in manufacturing cost can be avoided.

According to the manufacturing process of this embodiment, as described above, the thickness of the first interlayer insulating film 12' at the concave portion can be relatively easily, certainly and accurately controlled through control of the thickness of the second insulating film 13'. It is therefore possible to a very slight thickness of the first interlayer insulating film 12' at this concave portion.

When the first interlayer insulating film 12" comprises a single layer, as shown in FIG. 25, it suffices to carry out steps (1) to (20) by making slight modifications in step (3), (4) and (5) shown in FIGS. 22, 26, 30 and 34, respectively. More specifically, the process comprises the steps of depositing a first interlayer insulating film 12" having a slightly large thickness of from 10,000 to 15,000 Å in step (3); and applying etching, in step (4), to an area where the pixel switching TFT 30, the data line 6a, the scanning line 3a and the capacitor line 3b are to be formed thereabove and leaving a thickness of from 1,000 to 2,000 Å of the first interlayer insulating film 12" in this area, thus omitting step (5). In this case also, the thickness of the portion not etched of the first interlayer insulating film 12" and the etched portion thickness are set so that the pixel area becomes substantially flat prior to forming the pixel electrode 9a later. When the first interlayer insulating film 12" comprises a single layer, it is not necessary to increase the number of layers as compared with a conventional case, and controlling the thickness of the concave portion and the non-concave portion through control of the etching time permits flattening.

Still another embodiment of the present invention will now be described.

Figure 38:
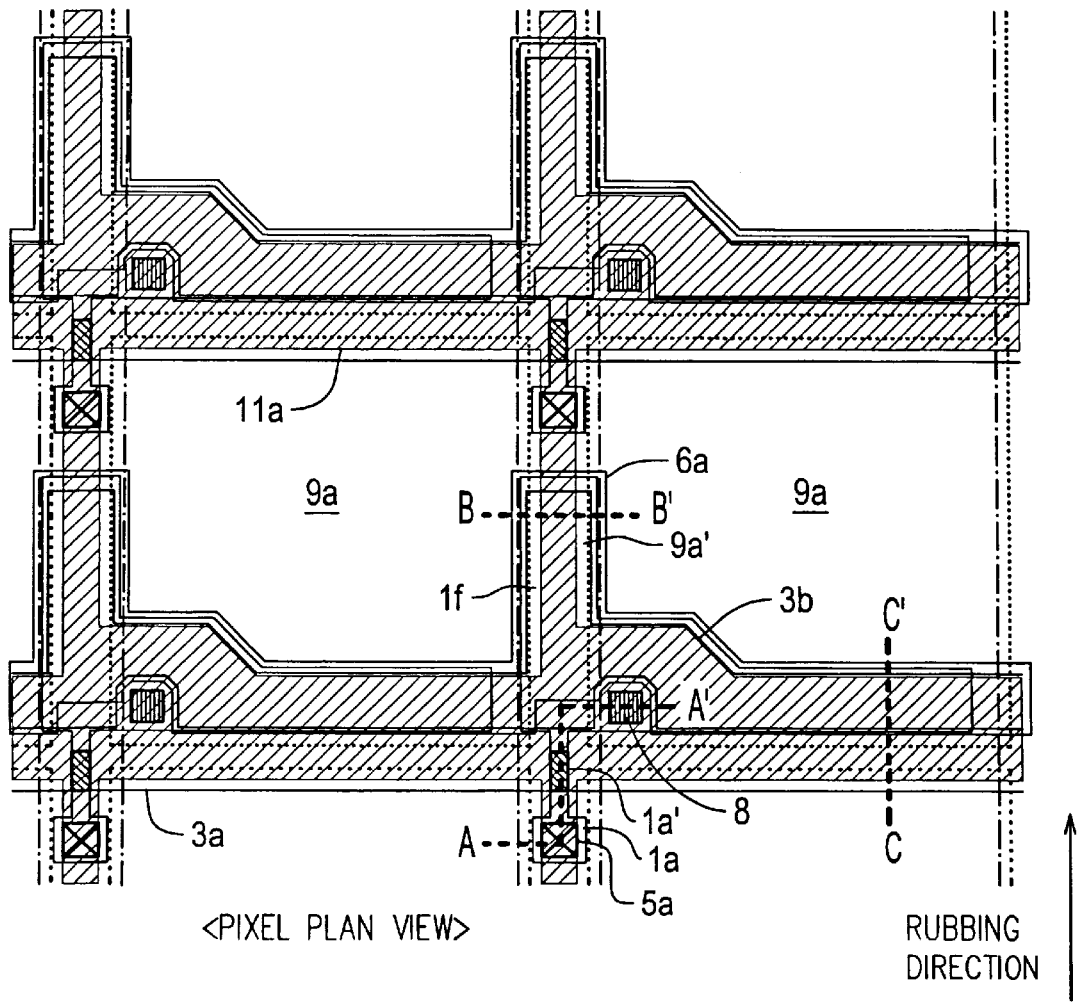
FIG. 38 is a plan view of a TFT array substrate having data lines, scanning lines, pixel electrodes and light shielding films formed thereon and provided in a electro-optical apparatus according to an embodiment of the invention.
Figure 39:
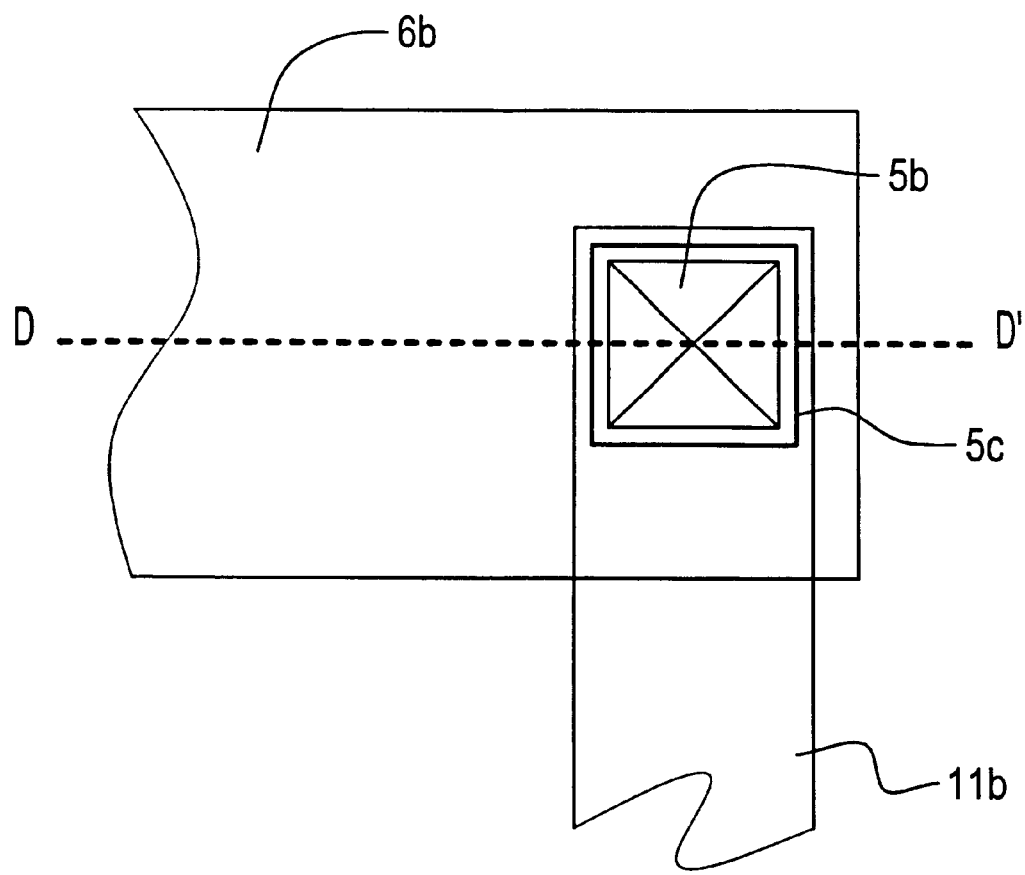
FIG. 39 is a plan view of a TFT array substrate illustrating a connecting portion with the light shielding and the constant potential source in still an embodiment of the invention.
Figure 40:
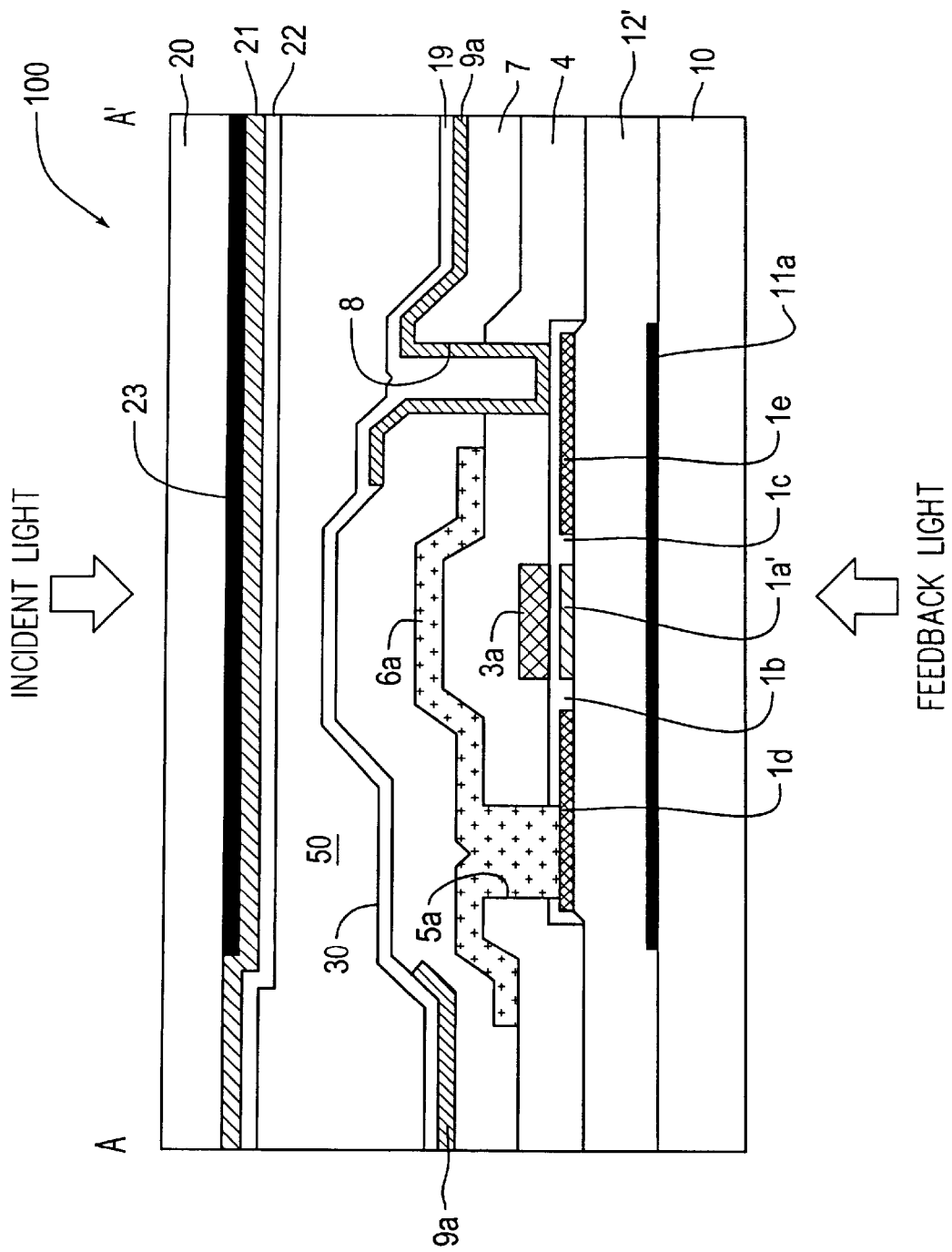
FIG. 40 is a sectional view of the electro-optical apparatus illustrating the A–A' section of FIG. 38 together with a and with an opposing substrate.
Figure 41:
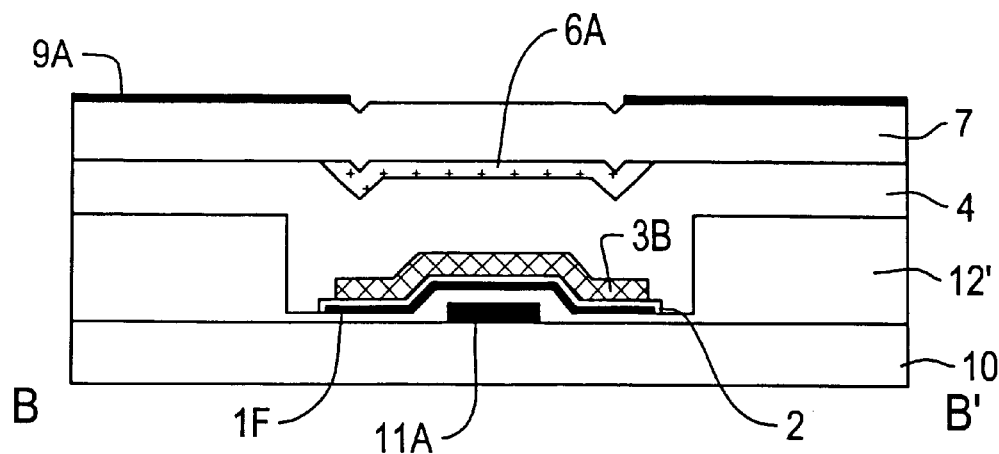
FIG. 41 is a sectional view of FIG. 38 along the line B–B' of FIG. 38.
Figure 42:
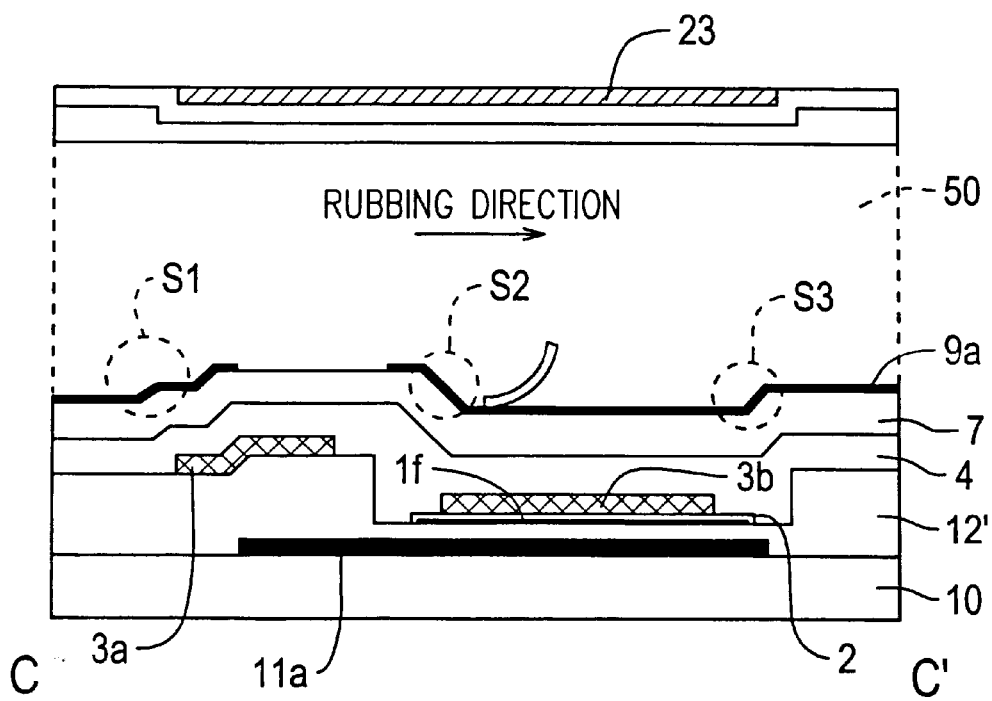
FIG. 42 is a sectional view of FIG. 38 along the line C–C' of FIG. 38.
Figure 43:
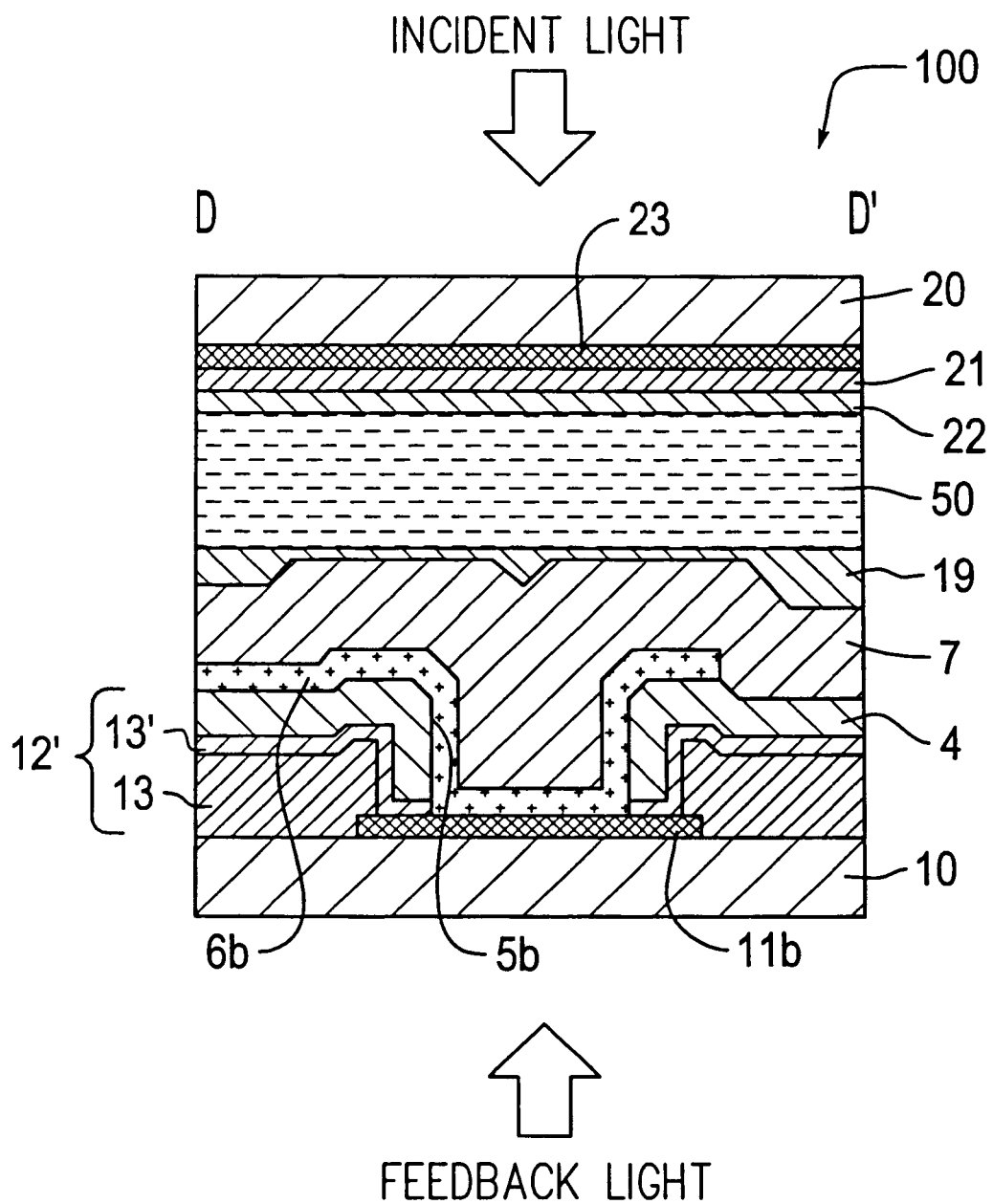
FIG. 43 is a sectional view of the electro-optical apparatus illustrating the D–D' section of FIG. 38 together with and with an opposing substrate.

First, the configuration and operations of the embodiment of the electro-optical apparatus in this embodiment will be described with reference to FIGS. 38 to 45. FIG. 38 is a plan view of a pixel section within an aperture area of a TFT array substrate having data lines, scanning lines, pixel electrodes and light shielding films formed thereon. FIG. 39 is a plan view of a connecting portion of the light shielding wiring and the constant potential line. FIG. 40 is a sectional view of the electro-optical apparatus shown in FIG. 38 cut along the line A–A' illustrating a opposing substrate 20 and the like; FIG. 41 is a sectional view of FIG. 38 cut along the line B–B'. FIG. 42 is a sectional view of FIG. 38 cut along the line C–C'. and FIG. 43 is a sectional view of FIG. 39 cut along the line D–D'. In FIGS. 40 to 43, the individual layers and components are shown in different scales to make them recognizable. As in previous embodiments, like reference numerals refer to like elements.

In FIG. 38, a plurality of transparent pixel electrodes 9a (outlined by a dotted line 9a') are provided in a matrix shape on the TFT array substrate of the electro-optical apparatus. Data line 6a, scanning lines 3a (i.e., gate electrodes) and capacitor lines 3b are provided along longitudinal and lateral boundaries of the pixel electrodes 9a. The data lines 6a are electrically connected to the source area in a semiconductor layer 1a comprising a polysilicon film through a contact hole 5. The pixel electrodes 9a are electrically connected to a drain area in a semiconductor layer 1a through a contact hole 8. Scanning lines 3a are arranged so as to be opposite to a channel area 1a' (i.e., the area marked with right-down oblique lines in FIG. 14) described later in the semiconductor layer 1a. A first light shielding film 11a for the pixel section is provided in an area marked with right-up oblique lines in FIG. 14. That is, the TFTs 30, the data lines 6a, the scanning lines 3a and the capacitor lines 3b including the channel area 1a' of the semiconductor layer 1a provided at positions so as to be one on top of the other as viewed from the TFT array substrate side.

Particularly in a mesh-like (matrix-shaped) area surrounded by a thick line containing the capacitor lines 6b formed under the data lines 6a in FIG. 38, a first interlayer insulating film is formed into a concave recess. In the other area substantially corresponding to the pixel electrodes 9a and the scanning lines 3a, the first interlayer insulating film is formed relatively convex (i.e., into a flat surface). FIG. 38 shows the direction of rubbing of the TFT array substrate 10.

Defective alignment of liquid crystal has conventionally been caused by inappropriate application of a rubbing treatment due to a step where the alignment film forming surface is highest because of the data lines, or directly caused by an inaccurate distance between substrates resulting from such a step after at the portion of the aperture area along the data lines. According to this embodiment, however, defective alignment in this portion can be reduced through flattening.

In FIG. 39, constant potential lines 6b comprising a conductive layer, made of Al, which may be the same material as the data lines 6a, are provided on the TFT array substrate of the liquid crystal apparatus, and are connected through the contact hole 5b to the light shielding wiring 11b in the non-pixel section. In FIG. 39, particularly in an area 5c surrounded by a thick line containing the contact hole 5b, the first interlayer insulating film is formed into a concave recess, and in the other area, the first interlayer insulating film is formed relatively convex (into a flat surface).

As shown in FIGS. 40 to 43, the electro-optical apparatus is provided with a TFT array substrate 10 which may be a transparent substrate and a opposing substrate 20 which is arranged opposite thereto. The TFT array substrate 10 may be made of a quartz substrate, and the opposing substrate 20 may be made of a glass substrate or a quartz substrate. A pixel electrode 9a is provided on the TFT array substrate 10, and an alignment film 19 subjected to an alignment process such as rubbing may be provided thereabove. The pixel electrode 9a may include a transparent conductive thin film such as an ITO film. The alignment film 19 may include an organic thin film such as a polyimide thin film.

An opposing electrode (also called common electrode) 21 is provided, on the other hand, over the entire surface of the opposing substrate 20, and an alignment film 22 subjected to an alignment process such as rubbing is provided thereunder. The opposing electrode 21 may include a transparent conductive thin film such as an ITO film. The alignment film 22 may include an organic thin film such as a polyimide thin film.

A pixel switching TFT 30 for switch-controlling each pixel electrode 9a is provided at a position adjacent to each pixel electrode 9a of the TFT array substrate 10 as shown in FIG. 40.

A second light shielding film 23 may be provided in the area other than the aperture area of each pixel on the opposing substrate 20 as shown in FIG. 40. As a result, incident light from the opposing substrate 20 side does not enter the channel area 1a' of the semiconductor layer 1a of the pixel switching TFT 30. The second light shielding film 23 may improve the contrast and preventing color mixture.

Electro-optical material may be sealed in a space surrounded by a sealing material 52, as shown in FIGS. 12 and 13, between the TFT array substrate 10 and the opposing substrate 20 arranged so that the pixel electrode 9a and the opposing electrode 21 are arranged opposite to each other in this configuration to form an electro-optical material 50. The electro-optical material 50 takes a prescribed alignment condition under the effect of the alignment films 19 and 22 when an electric field is not impressed from the pixel electrode 9a. The electro-optical material 50 is made of a mixed liquid crystal such as one or more nematic liquid crystals. The sealing material 52 may be an adhesive comprising a photo-setting resin or a thermo-setting resin for bonding the two substrates 10 and 20 at peripheries thereof, and is mixed with a spacer such as glass fiber or glass beads to keep a prescribed distance between both substrates.

As shown in FIG. 40, first light shielding films 11a are provided between the TFT array substrate 10 and the individual pixel switching TFTs 30 at positions opposite to the pixel switching TFTs 30. The first light shielding film 11a may be made of a single metal, an alloy or a metal silicide preferably containing at least one of non-transparent high-melting-point metals such as Ti, Cr, W, Ta, Mo and Pd. When the first light shielding film 11a has this composition, the first light shielding film 11a can be prevented from being broken or melted under the effect of a high-temperature treatment in the pixel switching TFT 30 forming step carried out after the first light shielding film 11a forming step on the TFT array substrate 10. Because of the presence of the first light shielding film 1a, the feedback light from the TFT array substrate 10 side can be prevented from entering the channel area 1a' of the pixel switching TFT 30 or the source side LDD area 1b and drain side LDD area 1c. Properties of the pixel switching TFT are not deteriorated by the occurrence of photocurrent.

Further, a first interlayer insulating film 12' comprising a single or multiple layers may be provided between the first light shielding film 11a and the plurality of pixel switching TFTs 30. The first interlayer insulating film 12' is provided for electrically insulating the semiconductor layer 1a from the first light shielding film 11a. The first interlayer insulating film 12' also serves as an undercoat film for the pixel switching TFT 30 by covering the entire surface of the TFT array substrate 10. That is, the first interlayer insulating film 12' prevents properties of the pixel switching TFT 30 from deteriorating by roughening during surface polishing or stains remaining after rinsing.

Particularly as shown in FIGS. 41 and 42, the first interlayer insulating film 12' has the area where the capacitor lines 3b are formed on the TFT array substrate 10 formed into a concave shape as compared with the other area. The first interlayer insulating film 12' may comprise a single-layered portion and a multi-layered portion, or a single-layer alone as described below.

The first interlayer insulating film 12' may include a high insulating glass such as NSG, PSG, BSG or BPSG, a silicon oxide film, or a silicon nitride film.

According to the first interlayer insulating film 12' having the configuration as described above, the pixel switching TFT 30 may be electrically insulated from the first light shielding film 11a. This prevents the pixel switching TFT 30 from being contaminated by the light shielding film 11a. Particularly, in the first interlayer insulating film 12', the portion where capacitor lines 3b are formed under the data line 6a is formed into a concave recess (see FIG. 41), and the area where the capacitor lines 3b are formed along the scanning lines is also formed into a concave recess (see FIG. 42). As compared with a conventional case of forming a flat first interlayer insulating film and forming the capacitor lines thereon, therefore, the total film thickness of the areas with and without the capacitor lines 3b formed thereon is reduced in response to the depth of the concave portions. This promotes flattening of the pixel section.

In FIG. 41, by setting a depth of the concave portions so as to be equal to the total thickness of the light shielding film on the first interlayer insulating film 12', the first storage capacitor electrode 1f extended from the high-concentration drain area 1e of the semiconductor layer 1a, the capacitor forming insulating film formed by the same film as gate insulating film 2, the capacitor lines 3b and the data lines 6a, the upper surface of the third interlayer insulating film 7 becomes flat, thus permitting omission of the subsequent flattening treatment step. Or, when even a slight recess is formed, the burden of the subsequent flattening treatment can be alleviated. Similarly, in FIG. 42, by setting a depth of the concave portions to be equal to the total thickness of the first light shielding film 11a on the first interlayer insulating film 12', the first storage capacitor electrode 1f extended from the high-concentration drain area 1e of the semiconductor layer 1a, the insulating film 2, the capacitor lines 3b and the data lines 6a, the upper surface of the third interlayer insulating film 7 becomes substantially flat (i.e., lower than the pixel section by a height equal to that of the data lines). In FIGS. 41 and 42, the first interlayer insulating film 12' may be formed into a concave shape with a depth corresponding to the total thickness of the first light shielding film 11a, the first storage capacitor electrode 1f, the insulating film 2 and the capacitor lines 3b. By forming the first interlayer insulating film 12' as described above, the upper surface of the third interlayer insulating film 7 becomes flat in FIG. 42, and becomes substantially flat in FIG. 41 (i.e., higher than the pixel section by a height equal to that of the data lines).

Particularly as shown in FIG. 42, the rubbing direction for the alignment film on the pixel electrodes 9a formed on the TFT array substrate 10 is along the data line 6a running from the scanning line 3a side toward the capacitor line 3b side relative to a pair of scanning lines 3a and capacitor lines 3b arranged adjacent to each other. When applying a rubbing treatment, rubbing is relatively satisfactory accomplished for a step becoming higher in the rubbing direction, but it is difficult to carry out satisfactory rubbing for a step becoming lower in the rubbing direction according to research conducted by the present inventor. When rubbing treatment is carried out in a direction from the scanning line 3a no flattened toward the flattened capacitor line 3b as in this embodiment, therefore, a step S1 at an edge of the scanning line 3a on the side of a pixel located in the upstream in the rubbing direction is a step having the surface becoming higher in the rubbing direction. This ensures high alignment regulating power and hence a satisfactory rubbing treatment. A step S2 located at the other edge of the scanning line 3a adjacent to the capacitor line 3b, has only a weak alignment regulating power because the surface of the step becomes lower in height in the rubbing direction. This results in an insufficient rubbing treatment. However, there is a flattened surface (i.e., a small step S3) located above the capacitor line 3b between the step S2 and the pixel located in downstream in the rubbing direction. The pair of scanning lines 3a and the capacitor line 3b are covered by a band of the second light shielding film 23. The step S2 is largely distant from the aperture area. As a result, even when the rubbing at the step S2 is not satisfactory, defective alignment of the liquid crystal does not affect the image. When rubbing is applied in a reverse direction, defective alignment of liquid crystal caused by the step S1 becoming lower in height in the rubbing direction exerts an adverse effect on the image, or it is necessary to narrow the aperture area by further covering this portion with the second light shielding film 23. In such a case, it suffices to provide the capacitor line 3b on the opposite side of the scanning line 3a.

Because the rubbing treatment is applied as described above, the scanning line reversal driving method (1H reversal driving method) is favorably applicable with a view to preventing deterioration of the liquid crystal caused by DC driving and preventing flicker of the displayed image particularly when rubbing is carried out along the data line. The scanning line reversal driving method consists of causing reversal of the polarity of voltage to be impressed onto both ends of the liquid crystal scanning line. Generally, defective alignment (disclination) tends to be caused by a step in the pixel section near the scanning line, which is a step in the data line direction.

Figure 44:
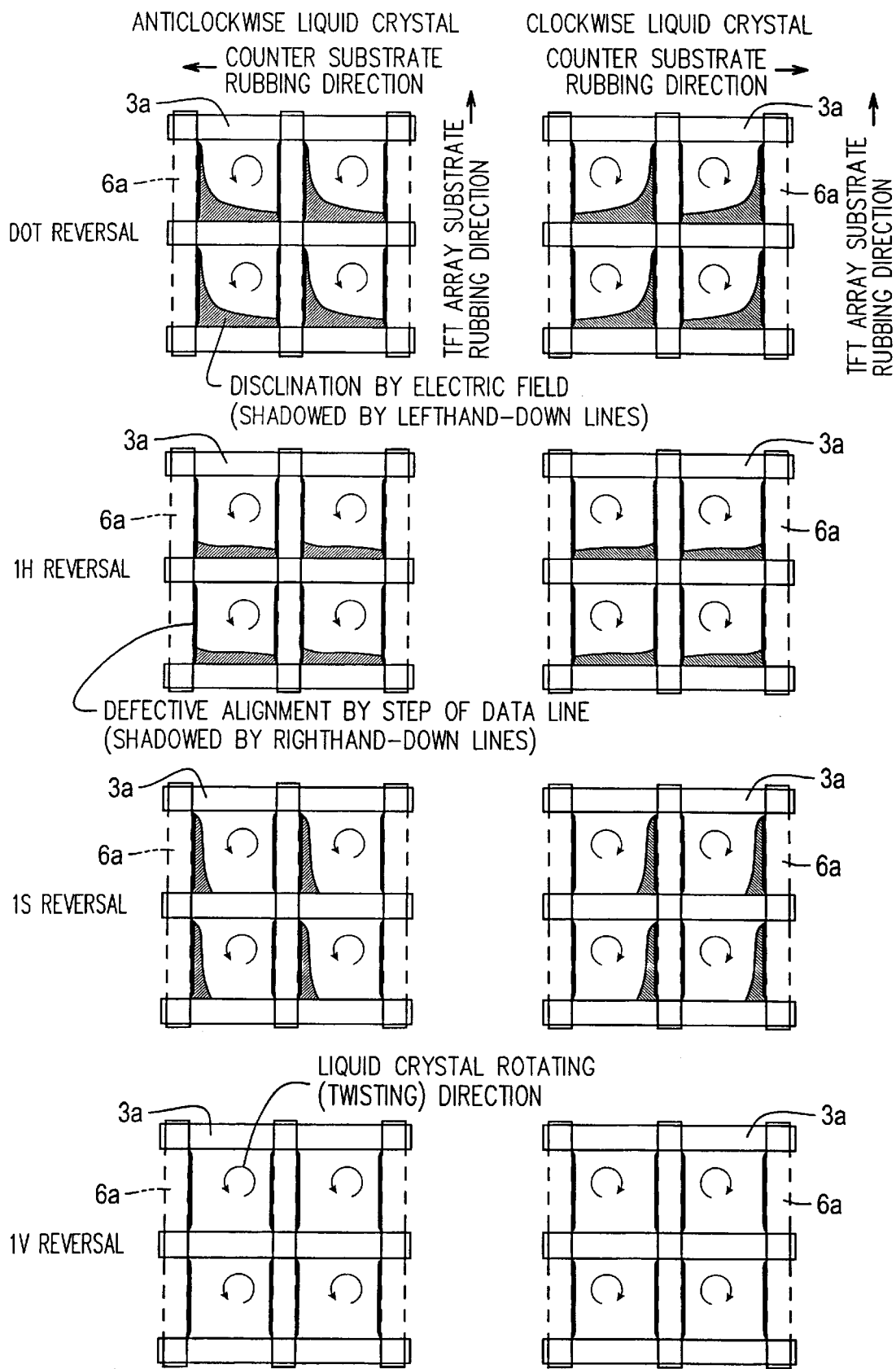
FIG. 44 is a descriptive view schematically illustrating various driving manners caused by lateral electric field in a TN electro-optical.

A disclination under the effect of a lateral electric field in a TN liquid crystal, an example of defective alignment of liquid crystal, will now be described for each of various driving methods with reference to FIG. 44. FIG. 44 illustrates conditions of disclination in four pixel aperture areas surrounded by three scanning lines and three data lines, for the DOT (pixel) reversal driving method, the 1H (row) reversal driving method, the 1S (column) reversal driving method, and the 1V (frame) reversal driving method. Particularly, the left column shows disclination for an anti-clockwise TN liquid crystal as a display on a electro-optical apparatus as viewed from the opposing substrate side, and the right column shows the same for a clockwise TN liquid crystal. In FIG. 44, the area where disclination is caused by a lateral electric field is represented by a portion shadowed by left-down oblique lines, and in addition, the area where defective alignment is caused by a step of the data line is represented by a portion shadowed by right-down oblique lines. In this example, the rubbing direction relative to the alignment film on the TFT array substrate runs from bottom toward top in the drawing.

As shown in FIG. 44, defective alignment of the TN liquid crystal caused by the step of the data line 6a occurs in narrow areas along both sides of the data line 6a, irrespective of clockwise or counter-clockwise. In the case of the DOT reversal driving method, disclinations are caused by a lateral electric field above the individual scanning lines 3a and to the right of the data lines 6a in the counter-clockwise liquid crystal. In the clockwise liquid crystal, disclinations are caused by lateral electric field above the individual scanning lines 3a and to the left of the individual data lines 6a. In the case of the 1S reversal driving method (reversing polarity of voltage impressed onto the both ends of the liquid crystal for each data line 6a), a slight disclination is caused by lateral electric field to the right of the individual data lines 6a in the counter-clockwise liquid crystal, and a slight disclination is caused by lateral electric field to the right of the individual data lines in the clockwise liquid crystal. In the case of the 1V reversal driving method (reversing polarity of voltage impressed onto the both ends of the liquid crystal), almost no disclination is caused by lateral electric field above or below the scanning lines 3a.

In the case of the 1H reversal driving method in contrast, disclination is caused by lateral electric field above the individual scanning lines, irrespective of clockwise or counter-clockwise. As shown in FIG. 44, therefore, by adopting a configuration in which rubbing is applied to the alignment film on the TFT array substrate 10 in a direction from bottom to top, with the capacitor lines 3b arranged in an area above the scanning lines 3a subjected to occurrence of disclination caused by lateral electric field, and the step of the scanning lines 3a is located between these capacitor lines 3b and the scanning lines 3a, disclination caused by lateral electric field would mainly occur between the capacitor lines 3b and the scanning lines 3a. This reduces the adverse effect thereof on the pixel aperture area. FIG. 44 further suggests that alignment defects of liquid crystal appearing along the data lines 6a can be reduced in any of the reversal driving methods by flattening the data line portion.

In this embodiment, therefore, the step in the direction of the data lines 6a is arranged not on the edges of pair of scanning line 3a and capacitor line 3b but rather between the pair of scanning line 3a and capacitor line 3b. When adopting the scanning line reversal driving method (1H reversal driving method), therefore, defective alignment of TN liquid crystal would occur near the center of the pixel boundary area covered with the second light shielding film 23, (i. e., in an area distant from all the pixel aperture areas). As a result, adoption of the scanning line 3a reversal driving method permits reduction of the effect of defective alignment of liquid crystal on the displayed image along the scanning lines 3a resulting from reversal of voltage polarity, and achievement of a high contrast and a high refinement.

According to this embodiment in which the first interlayer insulating film 12' required by the provision of the first light shielding film 11a is formed into a concave shape at a prescribed area, it is possible to omit or simplify the conventional step of forming an insulating film flattened by spin coating a flattened film.

In this embodiment, as shown in FIGS. 38 and 41, the high-concentration drain area 1e of the semiconductor layer 1a is extended along the data lines 6a to form the first storage capacitor electrode 1f. Therefore, a storage capacitor is formed via a insulating film 2 between this first storage capacitor electrode 1f and the second storage capacitor electrode which is part of the capacitor line 3b. In addition, a first light shielding film 11a is provided also under the first storage capacitor electrode 1f extended under the data line 6a. A capacitor is therefore formed via the first interlayer insulating film 12' also between the first storage electrode 1f and the first light shielding film 11a.

As shown in FIG. 38 and 42, on the other hand, the high-concentration drain area 1e of the semiconductor layer 1a extends in parallel with the scanning lines 3e to form the first storage capacitor electrode 1f. Therefore, a storage capacitor is formed via the capacitor forming insulating film 2 between this first storage capacitor electrode 1f and the second storage capacitor electrode which is part of the capacitor line 3b. In addition, a first light shielding film 11a also provided also under the first storage capacitor electrode (i.e., the semiconductor layer) 1f. A capacitor is therefore formed through first interlayer insulating film 12' between the first storage capacitor electrode (i.e., the semiconductor layer) 1f and the first light shielding film 11a.

As a result, it is possible to increase the storage capacitor of the pixel electrode 9a by effective utilization of the space off the aperture area including the area under the data lines 6a and the area in parallel with the data lines.

In this embodiment, as shown in FIGS. 38, 41 and 42, the first interlayer insulating film 12' is formed into a concave shape in the area incorporating these capacitors for flattening. Further, the concave area of the first interlayer insulating film 12' serving as a capacitor forming insulating film has a very small thickness (for example, 1,000 to 5,000 Å). It is therefore possible to increase the capacitor between the first light shielding film 11a and the first storage capacity electrode 1f arranged opposite to each other via the first interlayer insulating film 12' without increasing the surface area of the capacitor lines 3b. This is very useful because it is possible to increase the storage capacity without narrowing the pixel aperture area and without impairing flatness of the pixel section.

As shown in FIGS. 39 and 43, because the light shielding wiring 11b is the same film as the first light shielding film and extends from the first light shielding film 11a in the pixel section connected thereto and is electrically connected to the constant potential line 6b, the first light shielding film 11a is kept at a constant potential. A change in potential of the first light shielding film 11a never exerts an adverse effect of the pixel switching TFT 30 arranged opposite to the first light shielding film 11a. In this case, the constant potential of the constant potential line 6b may be equal to the grounding potential, or equal to the potential of the opposing electrode 21. The constant potential line 6b may be connected to a constant potential source such as a negative power supply or a positive power supply of a peripheral circuit for driving the electro-optical apparatus 100.

In this embodiment, the first interlayer insulating film 12' is not formed into a concave shape in the area opposite to the pixel switching TFT 30 or the area opposite to the scanning line 3a. As a result, even when the first interlayer insulating film 12' has a very small thickness in the concave area, the potential of the light shielding film 11a never exerts an adverse effect on the channel area 1a' of the pixel switching TFT 30 or the scanning line 3a is never affected even when the thickness is made very small for the purpose of increasing the storage capacity in the concave area of the first interlayer insulating film 12'.

Further as shown in FIGS. 39 and 43, the first interlayer insulating film 12' is formed into a concave shape at a position where the light shielding wiring 11b and the constant potential line 6b are connected. The step of providing a contact hole 5b by etching after forming the first interlayer insulating film 12' becomes easier in response to the depth of this concave portion, thus permitting piercing the contact holes 5a and 5b at a time. It is thus possible to omit the photolithographic step or the etching step only for piercing the contact hole 5b, without increasing the number of processes and without causing a decrease in yield.

Referring again to FIG. 40, the pixel switching TFT 30 has an LDD structure, and has the scanning line 3a, a channel area 1a' of the semiconductor layer 1a in which a channel is formed by an electric field from the scanning line 3a, a gate insulating film 2 for insulating the scanning line 6a, a low-concentration source area (source side LDD area) 1d and a low-concentration drain area (drain side LDD area) 1c of the semiconductor layer 1a, a data line 6a (source electrode), a low-concentration drain area (drain side LDD area) of the semiconductor layer 1a, and a high-concentration source area 1e and a high-concentration drain area 1e. One of the pixel electrodes 9a is connected to the high-concentration area 1e. The source areas 1b and 1d and the drain areas 1c and 1e are formed, as described later, by doping a dopant for n-type or for p-type having a prescribed concentration, depending upon which of the n-type and the p-type channels is to be formed, onto the semiconductor layer 1a. The n-type channel TFT has a favorable feature of a high operating speed, and is therefore often used as a pixel switching TFT 30. In this embodiment, particularly the data lines 6a (source electrode) is made of a light-shielding thin film such as a metal film (such as AL) or an alloy film (such as metal silicide). A second interlayer insulating film 4 having a contact hole 5a communicating with the high-concentration source area 1d and a contact hole 8 communicating with the high-concentration drain area 1e formed therein is formed on the scanning line 3a, the gate insulating film 2 and the first interlayer insulating film 12'. The data line 5a is electrically connected to the high-concentration source area 1d through the contact hole 5a to the high-concentration source area 1d. Further, a third interlayer insulating film 7 having the contact hole 8 communicating with the high-concentration drain area 1e formed therein is formed on the data line 6a (source electrode) and the second interlayer insulating film 4. The pixel electrode 9a is electrically connected to the high-concentration drain area 1e through the contact hole 8 to the high-concentration drain area 1e. The aforementioned pixel electrode 9a is provided on the upper surface of the third interlayer insulating film 7 having such a configuration.

The pixel switching TFT 30 should preferably have the above mentioned LDD structure. The structure of the TFT 30 is similar to the above embodiment. Therefore, the explanation of the TFT 30 is omitted.

In FIG. 43, the first interlayer insulating film 12' consists of two insulating film 12 and 13. This configuration will be described in detail as to the manufacturing process.

Figure 45:
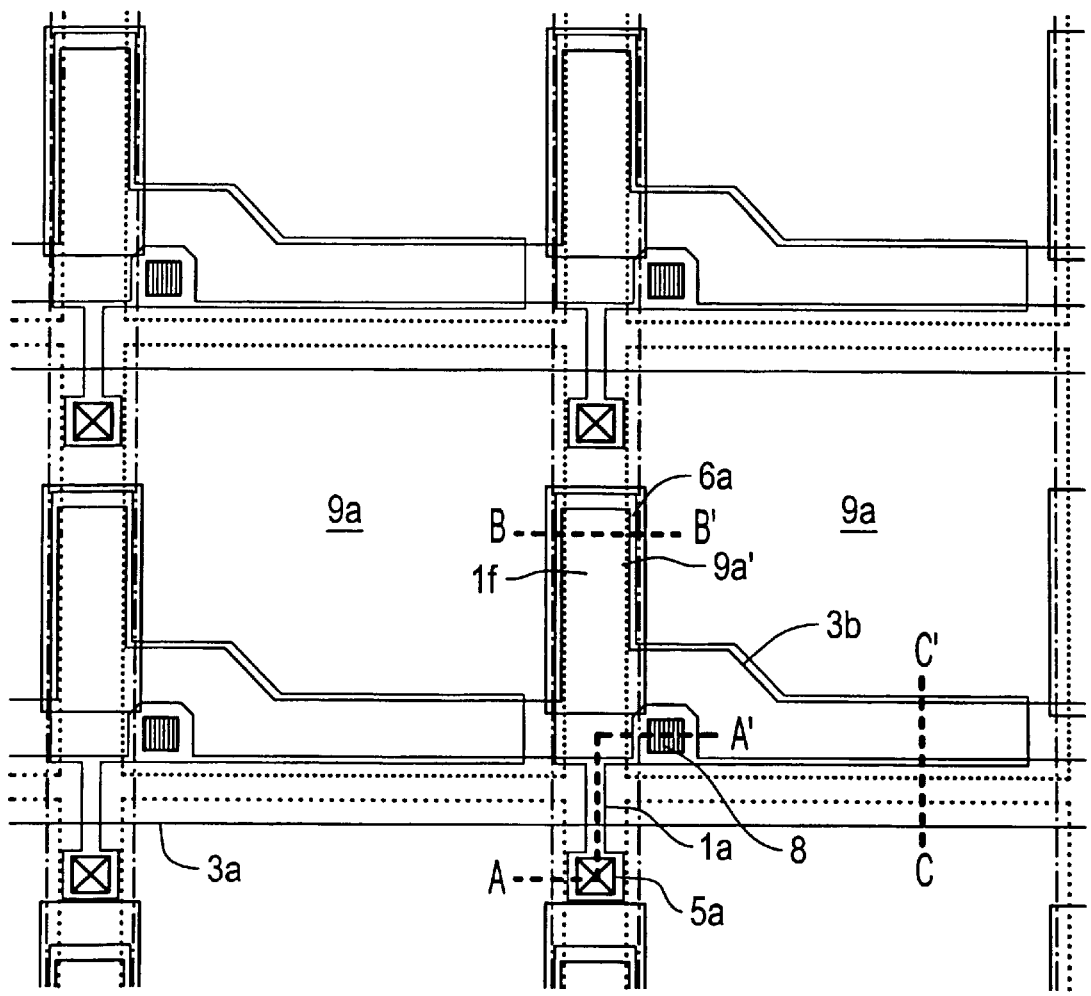
FIG. 45 is a plan view of a TFT array substrate having data lines, scanning lines, pixel electrodes and the like provided in a electro-optical in an embodiment of the invention.
Figure 46:
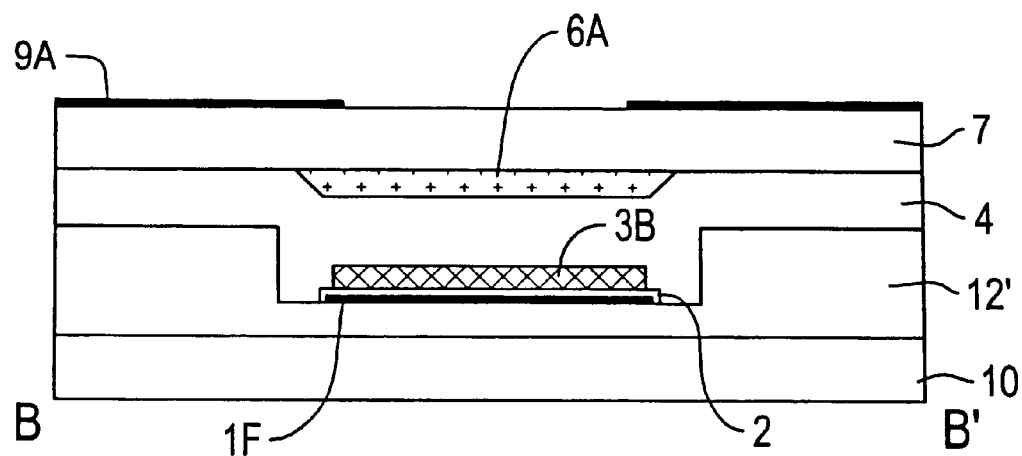
FIG. 46 is a sectional view of FIG. 45 along the line B–B' of FIG. 45.

A further embodiment of the present invention will now be described with reference to FIGS. 45 and 46. This embodiment differs from the above embodiments in that a first light shielding film 11a is not provided on the TFT array substrate 10 side, and further, the first interlayer insulating film 12' is formed into a concave shape only in the area where a capacitor line 3b is formed under a data line 6a. A first light shielding film 11a may be provided as shown in FIG. 38. FIG. 45 is a plan view of a TFT array substrate having data lines, scanning lines and pixel electrodes formed thereon. FIG. 46 is a sectional view of FIG. 45 cut along the line B–B'. In FIG. 46, various layers and various components are drawn in different scales. The same components as those in the foregoing embodiments are assigned the same reference numerals, and the description thereof is omitted.

In FIG. 45, in the area surrounded by a thick line in which the capacitor line 3b is formed under the data line 6a, the first interlayer insulating film 12' is formed into a concave shape as shown in FIG. 46. In other areas substantially corresponding to the capacity line 3b, the pixel electrode 9a and the scanning line 3a, the first interlayer insulating film 12' is formed into a relatively convex (flat) shape.

The first interlayer insulating film 12' formed into the concave shape flattens only the area where a largest step is produced on the upper surface of the third interlayer insulating film 7 when no flattening treatment is applied as in this embodiment, i. e., only the area where defective alignment of the liquid crystal is the most important problem is flattened by means of the concave recess of the first interlayer insulating film 12'. There is therefore available a very high flattening efficiency as determined from cost and labor required for the flattening treatment.

The first interlayer insulating film 12' shown in FIG. 46 may be formed of a single-layered and double-layered portions, or of a single layer.

In this embodiment, as shown in FIG. 46, the high-concentration drain area 1e of the semiconductor layer 1a extends along the data line 6a to form a first storage capacitor electrode 1f. A capacitor is therefore formed via the first interlayer insulating film 12' between the first storage capacitor electrode 1f and the capacity line (second storage capacitor electrode) 3b. Flattening is accomplished in the area incorporating this capacitor.

Figure 47:
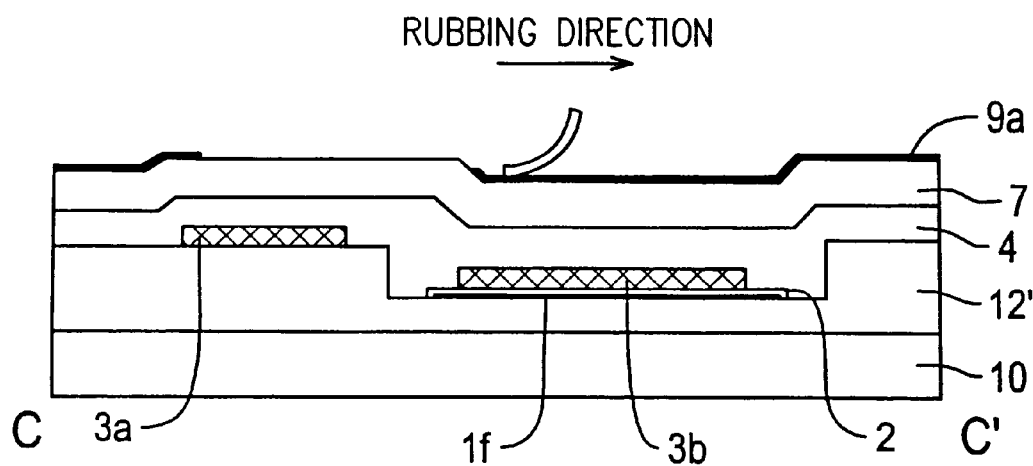
FIG. 47 is a partial sectional view of a electro-optical apparatus of an embodiment of the invention at a position corresponding to the C–C' section in FIG. 45.

Another embodiment of the present invention will now be described with reference to FIG. 47. This embodiment differs from the above embodiments in that a first light shielding film 11a is not provided on the TFT array substrate 10 side. FIG. 47 is a sectional view of a electro-optical apparatus at a position corresponding to the C–C' cross-section of FIG. 38.

As shown in FIG. 47, and as compared with FIG. 42 showing the above embodiment, the electro-optical apparatus of this embodiment does not have a first light shielding film 11a. Other components are the same as in previous embodiments, and a description thereof is therefore omitted.

The first interlayer insulating film 12' shown in FIG. 47 may be composed of single-layered and double-layered portions or of only a single layer.

Flattening is accomplished by a concave recess of the first interlayer insulating film 12' both in an area where a capacitor line 3b is formed under a data line 6a producing the largest step on the upper surface of a third interlayer insulating film 7 and in an area where a capacitor line 3b is formed along a scanning line 3a, when no flattening treatment is applied as in this embodiment.

Figure 48:
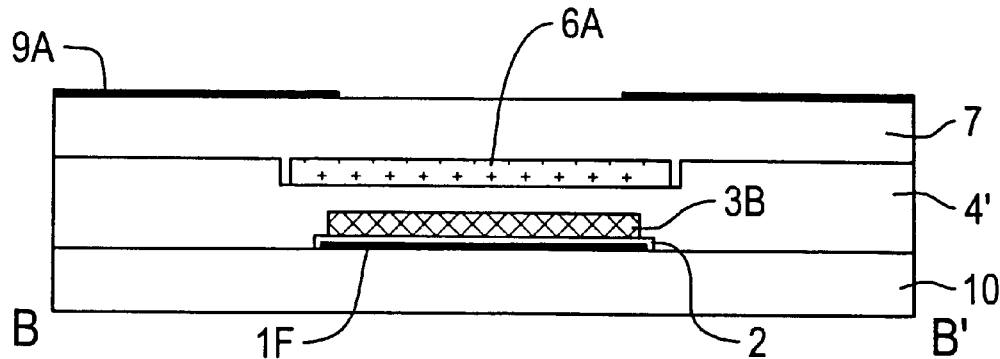
FIG. 48 is a partial sectional view of a electro-optical apparatus of an embodiment of the invention at a position corresponding to the B–B' section in FIG. 45.

Another embodiment of the invention will now be described with reference to FIG. 48. This embodiment differs from the previous embodiment in that the TFT array substrate 10 also serves as the first interlayer insulating film 12' as an undercoat film of the semiconductor layer 1a, thus omitting the first interlayer insulating film 12'. A first light shielding film 11a is also not provided. FIG. 48 is a sectional view of a electro-optical apparatus at a position corresponding to the B–B' cross-section of FIG. 38. In FIG. 48, various layers and components are drawn in different scales. The same components as those in the preceding embodiments are assigned the same reference numerals, and the description thereof is omitted.

As shown in FIG. 48, and as compared with the previous embodiment, a first light shielding film 11a and a first interlayer insulating film 12' are not provided. A first storage capacitor electrode (i.e., semiconductor layer) 1f may be formed directly on the TFT array substrate 10. In an area where a capacitor line 3b may be formed under data line 6a, a second interlayer insulating film 4 is formed into a concave shape so as to flatten the upper surface of a third interlayer insulating film 7. For the area where the capacitor line 3b is formed along a scanning line 3a, the second interlayer insulating film 4' may be formed into a concave shape for flattening, or the surface may be left unflattened as in the previous embodiment.

As in the first interlayer insulating film 12' in the preceding embodiment, the second interlayer insulating film 4' shown in FIG. 48 may be composed of a single-layered portion and a double-layered portion, or of a single layer.

It is thus possible to achieve flattening using the second interlayer insulating film 4.

As shown in FIG. 38, a first light shielding film 11a or a first interlayer insulating film 12' may be provided.

Figure 49:
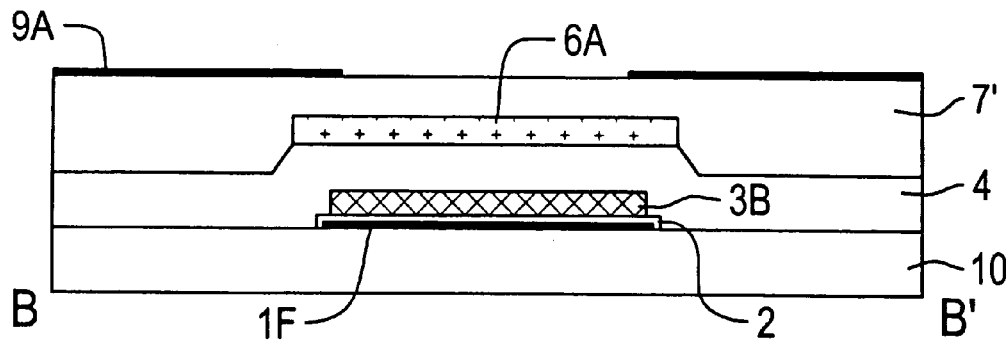
FIG. 49 is a partial sectional view of a electro-optical apparatus of an embodiment of the invention at a position corresponding to the B–B' section in FIG. 45.

Another embodiment of the present invention will now be described with reference to FIG. 49. This embodiment differs from the previous embodiments in that a TFT array substrate 10 serves also as a first interlayer insulating film 12' as an undercoat film of a semiconductor layer 1a thus omitting the first interlayer insulating film 12' and a first light shielding film 11a is not provided. FIG. 49 is a sectional view of a electro-optical apparatus at a position corresponding to line B–B' of FIG. 38. In FIG. 49, various layers and components are drawn in different scales. The same components as those in the preceding embodiments are assigned the same reference numerals, and the description thereof is omitted.

As shown in FIG. 49, and as compared with the previous embodiment, a first light shielding film 11a, a first interlayer insulating film 12' and are not provided. A first storage capacitor electrode (semiconductor layer) 1f may be directly formed on the TFT array substrate 10. In an area where a capacitor line 3b is formed under a data line 6a, a third interlayer insulating film 7' is formed into a concave shape so as to flatten the upper surface of the third interlayer insulating film 7'. For the area where the capacitor line 3b is formed along a scanning line 3a, the third interlayer insulating film 7' may be formed into a concave shape for flattening, or the surface may be left unflattened as in the previous embodiment.

As in the first interlayer insulating film 12' in the above embodiments, the third interlayer insulating film 7' shown in FIG. 49 may be composed of a single-layered portion and a double-layered portion, or of a single layer.

It is thus possible to achieve flattening using the third interlayer insulating film 7'.

As shown in FIG. 38, a first light shielding film 11a or a first interlayer insulating film 12' may be provided.

The entire configuration of the embodiments of the electro-optical apparatus described above is as shown in FIGS. 12 and 13.

A two-dimensional layout on the TFT array substrate 100 of the light shielding wiring 11b extends from the first light shielding film 11a in the previous embodiment as shown in FIG. 21.

In this embodiment, in which flattening of the pixel section is achieved by forming the interlayer insulating film into a concave shape, defective alignment of the liquid crystal may be reduced particularly in proximity to the area having the capacitor line formed therein. It is possible to display a high-quality image with high contrast using the electro-optical apparatus 100.

The manufacturing method of the electro-optical apparatus having the above-described configuration will now be described with reference to FIGS. 50 to 57. FIGS. 50 to 53 illustrate the individual layers of the TFT array substrate in each step with reference to the B–B' cross-section of FIG. 41 including the features of the previous embodiment. FIGS. 54 to 57 illustrate the individual layers of the TFT array substrate 10 in each step with reference to the D–D' cross-section of FIG. 43. Steps (1) to (20) are to be carried out in a lump as the same step at different portion on the TFT array substrate 10.

The manufacturing process of the portion including the data line 6a, the capacitor line 3b formed thereunder and the first storage capacitor electrode (i.e., the semiconductor layer) 1f, corresponding to the B–B' cross section of FIG. 41 will be described with reference to FIGS. 50 to 54. The manufacturing steps of the components shown in the A–A' cross-section of FIG. 40 and the manufacturing steps of the components shown in the C–C' cross-section of FIG. 42 are to be carried out together with the steps shown in FIGS. 50 to 54. These steps are therefore described as required for each step.

Figure 50:
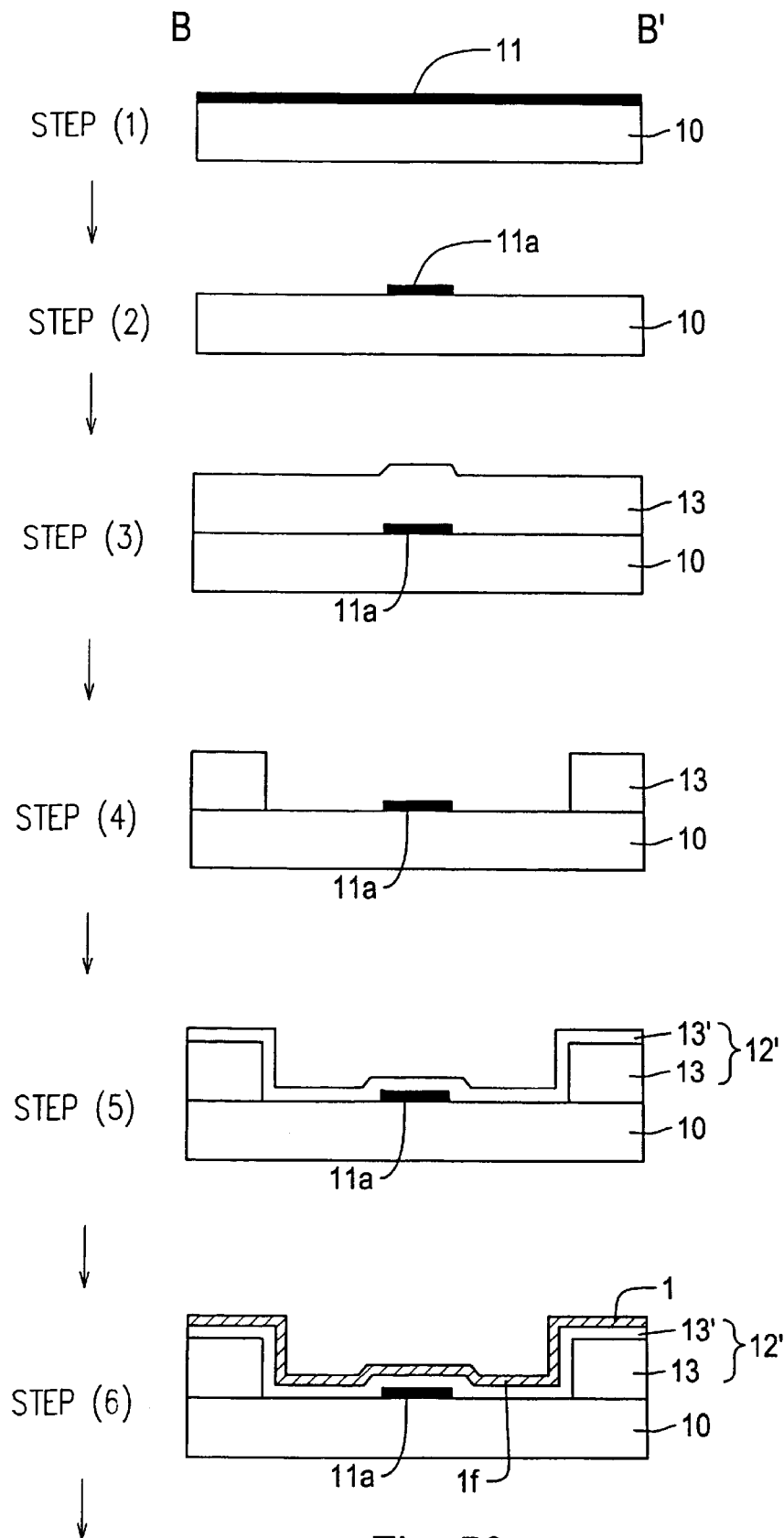
FIGS. 50(1)–50(6) are process diagrams sequentially illustrating a manufacturing process of an embodiment of the electro-optical for the portion shown in FIG. 41.

As shown in step (1) of FIG. 50, a TFT array substrate 10 comprising a quartz substrate or a hard glass substrate or the silicon substrate is prepared. The substrate should preferably be annealed in an inert gas atmosphere such as $N_2$ (nitrogen) and at a high temperature of from 900 to 1,300° C. as a pretreatment to minimize strain produced in the TFT array substrate 10 in subsequent high-temperature process. That is, the TFT array substrate is previously heat-treated at a temperature equal to or superior to the highest temperature in the subsequent high-temperature treatment.

A metal/alloy film made of a metal such as Ti, Cr, W, Ta, Mo or Pd or a metal silicide is formed by sputtering process into the light shielding film 11 having a thickness of from 1,000 to 5,000 Å, or preferably, about 2,000 Å over the entire surface of the thus treated TFT array substrate.

Then, a first light shielding film 11a is formed by forming a resist mask corresponding to a pattern (see FIG. 38) of the first light shielding film 11a by photolithography on the thus formed light shielding film 11 as shown in step (2).

As shown in step (3), a first interlayer insulating film 13 (i.e., the lower layer of the double-layer first interlayer insulating film 12') comprising a silicate glass film of NSG, PSG, BSG or BPSG, a silicon nitride film or a silicon oxide film by the use of TEOS (tetraethylortho-silicate) gas, TEB (tetraethyl borate) gas, or TMOP (tetramethyloxy phosphate) gas is formed by the room-temperature or vacuum CVD process, for example. This first interlayer insulating film 13 (i.e., lower layer of the double-layered first interlayer insulating film 12') should have a thickness within a range of from 5,000 to 20,000 Å, so as to determine the thickness of the first insulating film 13 from the thickness of the film to be incorporated in subsequent steps.

As shown in step (4), etching is applied to an area where the pixel switching TFT 30, the data line 6a, the scanning lines 3a and the capacitor lines 3b are to be formed thereabove (see FIGS. 38, 41 and 42) so as to remove the first insulating film 13 in this area. When a treatment is carried out by dry etching such as reactive ion etching or reactive ion beam etching, the first insulating film 13 can be removed anisotropically with substantially the same size as the resist mask formed by photolithography thus permitting easy control as designed in size. When using at least wet etching, on the other hand, isotropy provides a wider aperture area of the first interlayer insulating film 13. However because the side wall of the aperture can be tapered, the polysilicon films or the resist for forming scanning lines 3*a* in a subsequent step does not remain on the periphery of the aperture side wall without being etched or peeled off, thus preventing the yield from decreasing. Tapering the aperture side wall of the first interlayer insulating film 13 may be accomplished by dry etching, then withdrawing the resist pattern, and conducting dry etching again. Dry etching and wet etching may be combined.

Then, as shown in step (5), a second insulating film 13' (i.e., the upper layer of the double-layered first interlayer insulating film 12') comprising a silicate glass film, a silicon nitride film or silicon oxide film is formed in the same manner as the first insulating film 13, on the first light shielding film 11*a* and the first insulating film 13. The second insulating film 13' has a thickness of, for example, from 1,000 to 1,000 Å. The second insulating film 13 may be annealed at about 900° C. to prevent contamination and may be flattened.

The first insulating film 13 and the second insulating film 13' forming the first interlayer insulating film 12' have such a thickness that the pixel area becomes substantially flat before formation of the pixel electrode 9*a* in a subsequent step, in an area where the capacitor line 3*b* is formed under the data line 6*a* as shown in FIG. 41.

Then, as shown in step (6), an amorphous silicon film is formed by the vacuum CVD process (for example, CVD under a pressure of from 20 to 40 Pa) using monosilane gas or disilane gas at a flow rate of from 400 to 60 cc/min in a relatively low-temperature environment at a temperature of from 450 to 500° C., or preferably, at about 500° C., on the second interlayer insulating film 13'. Subsequently, a polysilicon film 1 is caused to undergo solid-phase growth up to a thickness of from 500 to 2,000 Å, or preferably, about 1,000 Å by applying an annealing treatment in a nitrogen atmosphere at 600 to 700° C. for a period of from 1 to 10 hours, or preferably, from 4 to 6 hours.

When preparing an n-channel type pixel switching TFT 30 as the pixel switching TFT 30 as shown in FIG. 40, a slight amount of a V-family dopant such as 5*b*, As or P is doped by ion injection or the like in the channel forming area. When preparing a p-channel type pixel switching TFT 30, a slight amount of a III-family dopant such as B, Ga, or In can be doped by ion injection or the like. A polysilicon film 1 may be formed directly by the vacuum CVD process or the like without carrying out the stage of an amorphous silicon film. A polysilicon film 1 may be formed by injecting silicon ions into a polysilicon film deposited by the vacuum CVD process or the like once to prepare a noncrystalline, and the recrystallizing the same through an annealing treatment or the like.

Figure 51:
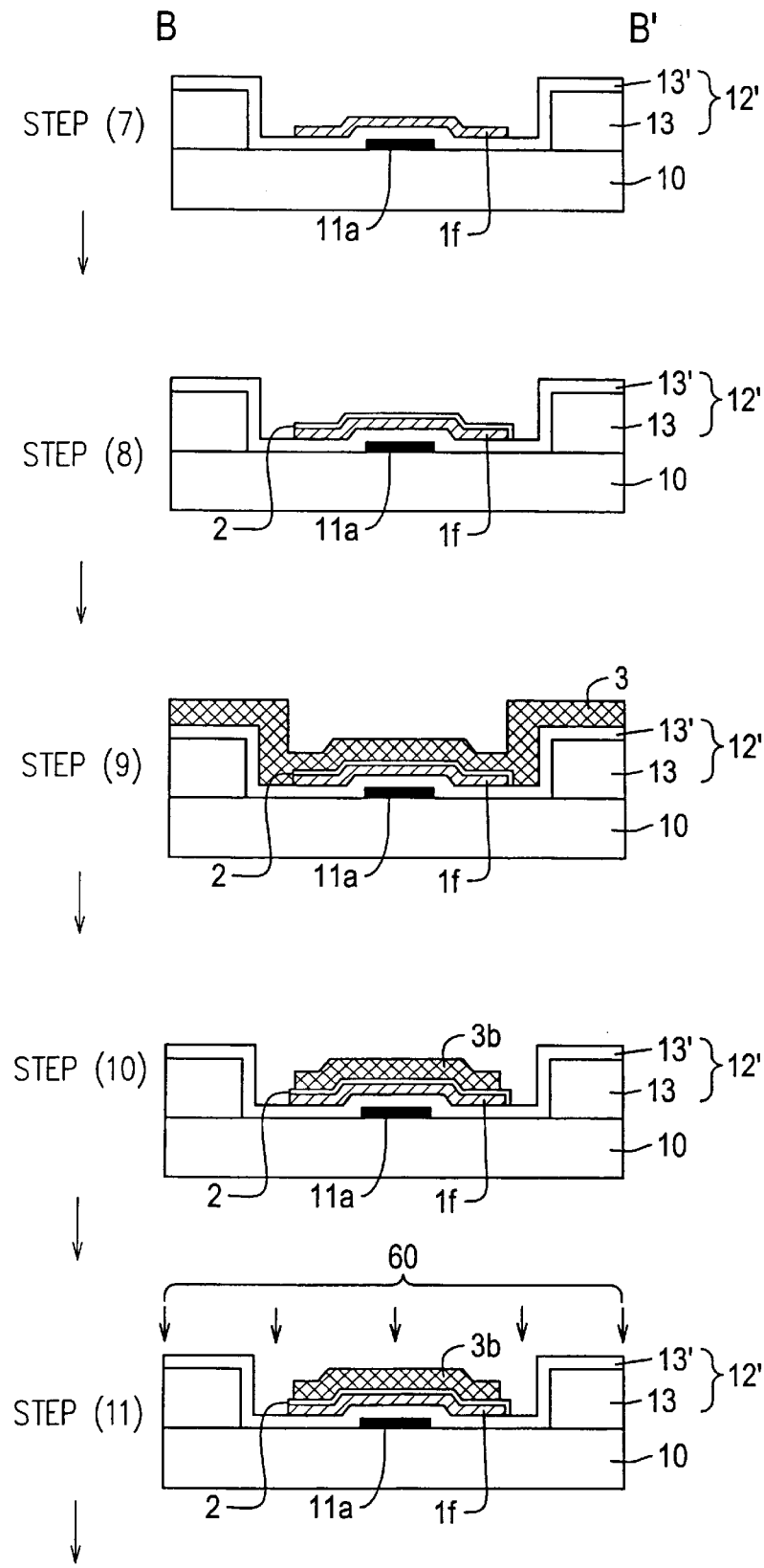
FIGS. 51(7)–51(11) are process diagrams sequentially illustrating a manufacturing process of an embodiment of the electro-optical for the portion shown in FIG. 41.

Then, as shown in step (7) of FIG. 51, a semiconductor layer 1*a* of a prescribed pattern as shown in FIG. 38 is formed through a photolithographic step or an etching step. More specifically, a first storage capacitor electrode 1*f* extends from the semiconductor layer 1*a* (see FIG. 40) forming the pixel switching TFT formed in the area where the capacitor line 3*b* is formed under the data line 6*a*, and in the area where the capacitor line 3*b* is formed along the scanning line 3*a* (see FIGS. 41 and 42).

Then, as shown in step (8), a thermal-oxidized silicon film having a relatively small thickness of about 300 Å is formed through thermal oxidation of the semiconductor layer 1*a* forming the pixel switching TFT 30, together with the first storage capacitor electrode 1*f*, at a temperature of from 900 to 1,300° C., or preferably at about 1,000° C. Further, a capacitor forming gate insulating film 2, together with a gate insulating film 2 (see FIG. 40) of the pixel switching TFT 30 having a multilayer structure, is formed by depositing a high-temperature silicon oxide film (HTO film) or a silicon nitride film by the vacuum CVD process into a relatively small thickness of about 500 Å (see FIGS. 41 and 42). This results in a thickness of the first storage capacitor electrode 1*f* extended from semiconductor layer 1*a* within a range of from 300 to 1,500 Å, or preferably, from 350 to 500 Å, and a thickness of the capacitor forming insulating film serving as the gate insulating film 2 within a range of from 200 to 1,500 Å, or preferably, from 300 to 1,000 Å. By reducing the high-temperature thermal oxidation time, it is possible to prevent a camber caused by heat when using a large-sized wafer of about 8 inches. However, the insulating film 2 having a single-layer structure may be formed by thermally oxidizing the polysilicon film 1.

While there is no particular limitation in step (8), a low resistance may be achieved by doping P ions in a dose of about $3 \times 10^{12}/cm^2$ onto the semiconductor portion serving as the first storage capacitor electrode 1*f*.

Then, as shown in step (9), the polysilicon film 3 is made conductive by depositing the polysilicon film 3 by the vacuum CVD process or the like, and then, thermally diffusing phosphorus (P). A doped silicon film prepared by introducing phosphorus ions simultaneously with formation of the polysilicon film 3 may be employed.

Then, as shown in step (10), a scanning line 3*a* of a prescribed pattern as shown in FIG. 38 is formed together with a capacitor line 3*b* through a photolithographic step or an etching step using a mask. The capacitor line 3*b* (scanning line 3*a*) has a thickness of about 3,500 Å, for example.

The capacitor line 3*b* or the scanning line 3*a* may be formed from a film of a high-melting-point metal such as W or Mo or a metal silicide, not a polysilicon film, or may be formed into a multilayer structure by combining a metal film or a metal silicide film and the polysilicon film. In this case, if the capacitor line 3*b* or the scanning line 3*a* is arranged as a light shielding film corresponding to all or part of the area covered by the second light shielding film 23, it is possible to omit all or part of the light shielding film 23 under the effect of light shielding property of the metal film or the metal silicide film. This prevents a decrease in the pixel aperture ratio caused by a shift in bonding of the opposing substrate 20 and the TFT array substrate 10.

Then, as shown in step (11), when the pixel switching TFT 30 shown in FIG. 40 is an n-channel type TFT having an LDD structure, to form a low concentration source area 1*b* and a low-concentration drain area 1*c* on the semiconductor layer 1*a*, a V-family dopant 60 such as P is doped in a low concentration (for example, P ions in a dose within a range of from 1 to $3 \times 10^{13}/cm^2$) with the scanning line 3*a* as a diffusion mask. As a result, the semiconductor layer 1*a* under the scanning line 3*a* becomes a channel area 1*a*'. This impurity doping reduces resistance of the capacitor line 3*b* and the scanning line 3*a* (see FIGS. 41 and 42).

Figure 52:
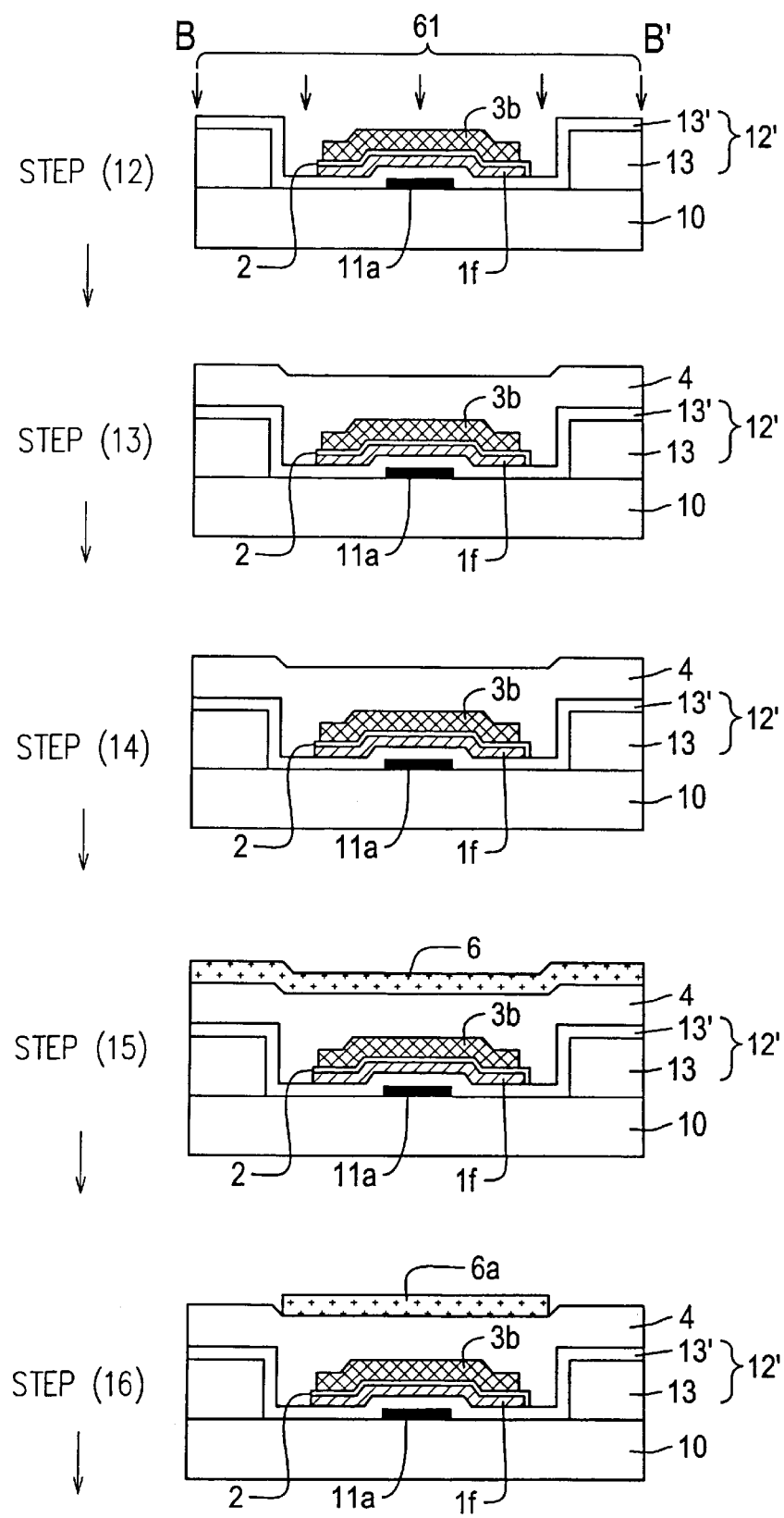
FIGS. 52(12)–52(16) are process diagrams sequentially illustrating a manufacturing process of an embodiment of the electro-optical for the portion shown in FIG. 41.

Then, as shown in step (12) of FIG. 52, a resist layer 62 is formed with a mask having a width larger than the scanning line 3*a* on the scanning line 3*a* to form a high-concentration source area 1*b* and a high-concentration drain area 1*e* forming the pixel switching TFT 30, and then a V-family dopant 61 such as P is doped at a high concentration (for example, P ions in a dose within a range of from 1 to $3\times10^{15}/cm^2$). When the pixel switching TFT 30 is of the p-channel type, doping is carried out with the use of a III-family dopant such as B to form a low-concentration source area 1b, a low-concentration drain area 1c, a high-concentration source area 1, and a high-concentration drain area 1e on the n-type semiconductor layer 1a. Adoption of the LDD structure permits reduction of a channel effect. However, for example, a TFT of the offset structure may be adopted without conducting low-concentration doping, or a self-alignment type TFT may be used by the application of the ion injection technique using P ions or B ions with the scanning line 3a as a mask.

This impurity doping further reduces resistance of the capacitor line 3b and the scanning line 3a (see FIGS. 41 and 42).

In parallel with these steps, a data line driving circuit 101 and a scanning line driving circuit 104 or the like having the complementary structure composed of an n-channel type TFTs and a p-channel TFTs are formed on the periphery of the TFT array substrate 10. Because the semiconductor layer 1a of the pixel switching TFT 30 is made of polysilicon in this embodiment, the data line driving circuit 101 and the scanning line driving circuit 104 or the like can be formed through substantially the same steps at the time of forming the pixel switching TFT 30. This provides advantages in manufacture.

Then, as shown in step (13), a second interlayer insulating film 4 comprising a silicate glass film made of NSG, PSG, BSG or BPSG, a silicon nitride film or a silicon oxide film may be formed by the use of atmospheric-pressure or vacuum CVD process or TEOS gas, for example, so as to cover the scanning lines 3a, together with the capacitor lines 3b (see FIGS. 41 and 42). The second interlayer insulating film 4 should preferably have a thickness within a range of from 5,000 to 15,000 Å.

Then, as shown in step (14) of FIG. 40, annealing may be carried out at about 1,000° C. for about 20 minutes for activating the high-concentration source area 1d and the high-concentration drain area 1e, and then, a contact hole 5a for the data line 6a (source electrode) may be formed by dry etching such as reactive ion etching or reactive ion beam etching.

In this case, providing an aperture of the contact hole 5a by anisotropic etching such as reactive ion etching or reactive ion beam etching provides an advantage in that the aperture can have substantially the same shape as the mask shape. Aperturing by a combination of dry etching and wet etching, which allows to make a tapered contact hole 5a, prevents breakage upon connecting wiring lines. A contact hole for connecting the scanning line 3a and the capacitor line 3b (see FIG. 42) to wiring lines is provided in the second interlayer insulating film 4 using the same step as that of the contact hole 5a.

Then, as shown in step (15), a metal film 6 made of a light-shielding low-resistance metal such as Al or metal silicide is deposited on the second interlayer insulating film 4 by sputtering or the like to a thickness of from 1,000 to 5,000 Å, or preferably, about 3,000 Å, and further, as shown in step (16), data lines 6a are formed through a photolithographic step or an etching step.

Figure 53:
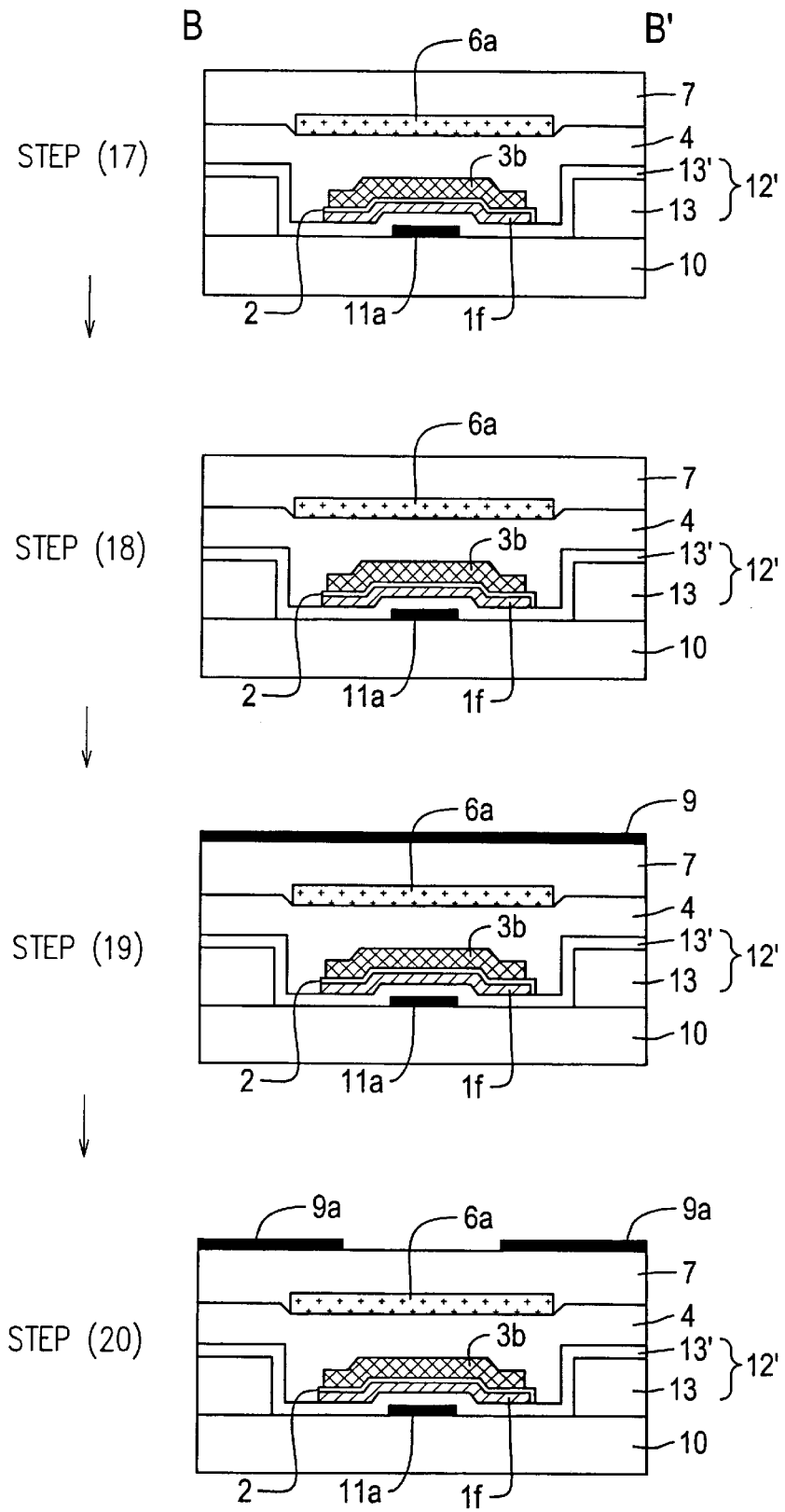
FIGS. 53(17)–53(20) are process diagrams sequentially illustrating a manufacturing process of an embodiment of the electro-optical for the portion shown in FIG. 41.

Then, as shown in step (17) in FIG. 53, a third interlayer insulating film 7 comprising a silicate glass film made of NSG, PSG, BSG or BPSG, a silicon nitride film or a silicon oxide film is formed by the use of the atmospheric-pressure or vacuum CVD process or TEOS gas or the like so as to cover the data lines 6a. The third interlayer insulating film 7 should preferably have a thickness of from 5,000 to 15,000 Å.

In this embodiment, particularly in steps (4) and (5) shown in FIG. 50, concave recesses are formed on the first interlayer insulating film at portions where the capacitor line 3b is to be formed. Therefore, the surface of the pixel area located above the capacitor line 3b becomes substantially flat upon completion of this step (17). In the electro-optical apparatus 100, in order to further inhibit defective alignment of the liquid crystal molecules, a flattening film may be spin-coated on the third interlayer insulating film 7, or a CMP treatment may be applied. The third interlayer insulating film 7 may comprise a flattening film. In this embodiment, as shown in FIGS. 4 to 6, the concave recess of the first interlayer insulating film 12' makes the portion having the capacitor and other lines flush with the other portion. A flattening treatment is generally not therefore necessary. Even when further flattening is applied for the uppermost layer portion as described above for displaying a high-quality image, however, the flattening film can be made very thin requiring only a slight flattening treatment. The present embodiment is therefore very useful.

Then, as shown in step (18) of FIG. 40, a contact hole 8 for electrically connecting the pixel electrode 9a and the high-concentration drain area 1e is formed through dry etching such as reactive ion etching or reactive ion beam etching in the pixel switching TFT 30. In this case, providing an aperture of the contact hole 8 by anisotropic etching such as reactive ion etching or reactive ion beam etching provides an advantage in that the aperture can have substantially the same shape as the mask shape. Aperturing by a combination of dry etching and wet etching, which allow to make a tapered contact hole 8, prevents breakage upon connecting wiring lines.

Then, as shown in step (19), a transparent conductive thin film 9 such as an ITO film is deposited by sputtering or the like to a thickness of from 500 to 2,000 Å on the third interlayer insulating film 7, and further as shown in step (20), a pixel electrode 9a is formed through a photolithographic step, an etching step or the like. When the electro-optical apparatus 100 is used for a reflection type electro-optical apparatus, the pixel electrode 9a may be made of a non-transparent material having a high reflectivity such as Al.

Then, a opposing electrode 21 may be formed by depositing a transparent conductive thin film such as an ITO by sputtering or the like to a thickness of from 500 to 2,000 Å on the entire surface of the opposing substrate 20. Further, an alignment film 22 is formed by coating a coating liquid for a polyimide alignment film over the entire surface of the opposing electrode 21, and then applying a rubbing treatment in a prescribed direction so as to have a prescribed pretilting angle.

In this embodiment, as described above, a rubbing treatment is applied in a direction from the side of the adjacent scanning lines 3a along the data lines 6a toward the capacitor line 3b side. As a result, the step S2 (see FIG. 42) difficult to subject to a rubbing treatment for its nature is positioned near the center of the boundary area covered by the second light shielding film 23. Defective alignment at the step S2 does not therefore exert an adverse effect on the pixel aperture area almost at all.

The manufacturing process of the portion including the connecting portion of the light shielding film and the constant potential line 6b corresponding the D–D' cross-section of FIG. 43 will now be described with reference to FIGS. 54 to 57.

Figure 54:
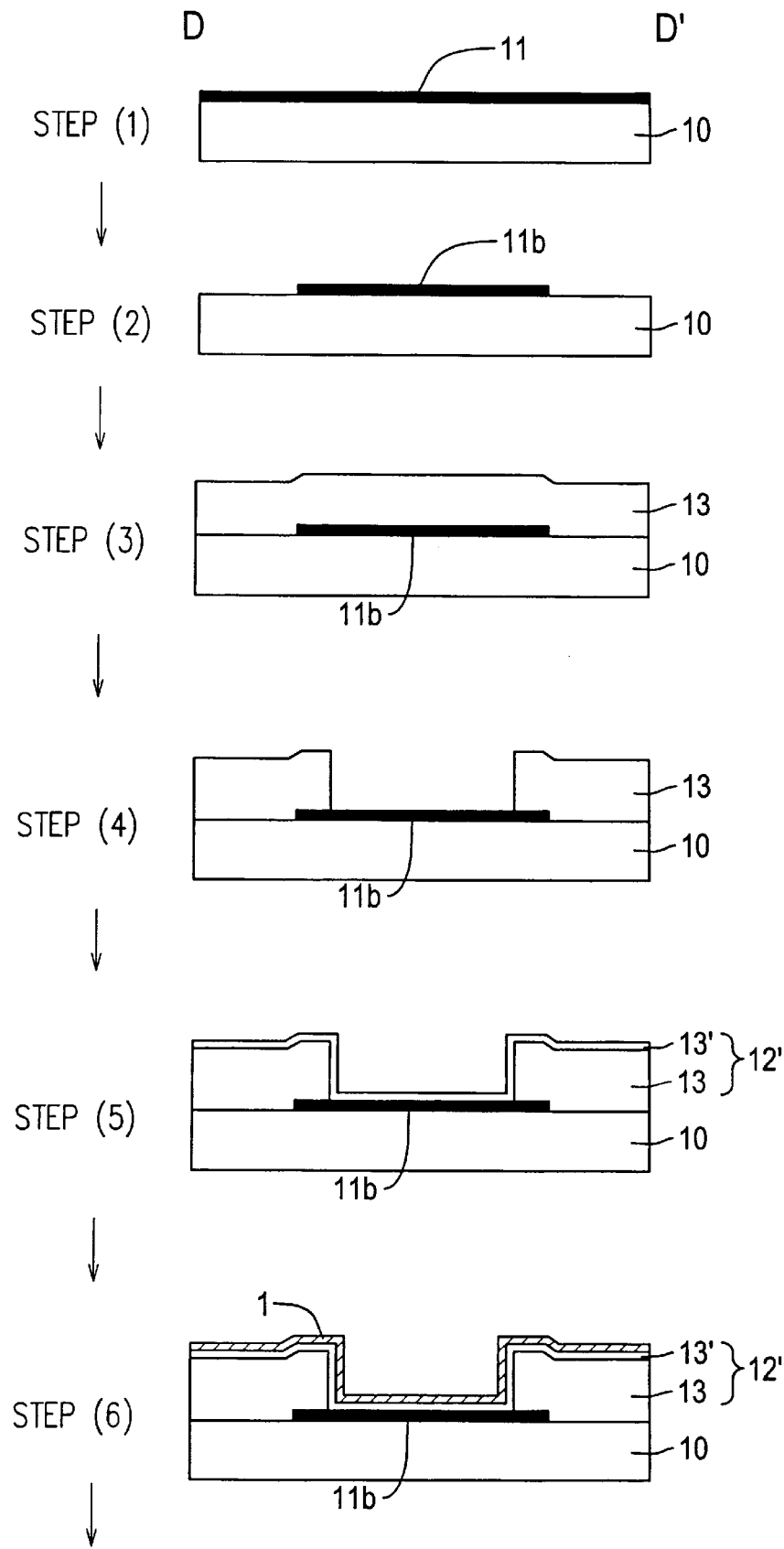
FIGS. 54(1)–54(6) are process diagrams sequentially illustrating a manufacturing process of an embodiment of the electro-optical for the portion shown in FIG. 43.
Figure 57:
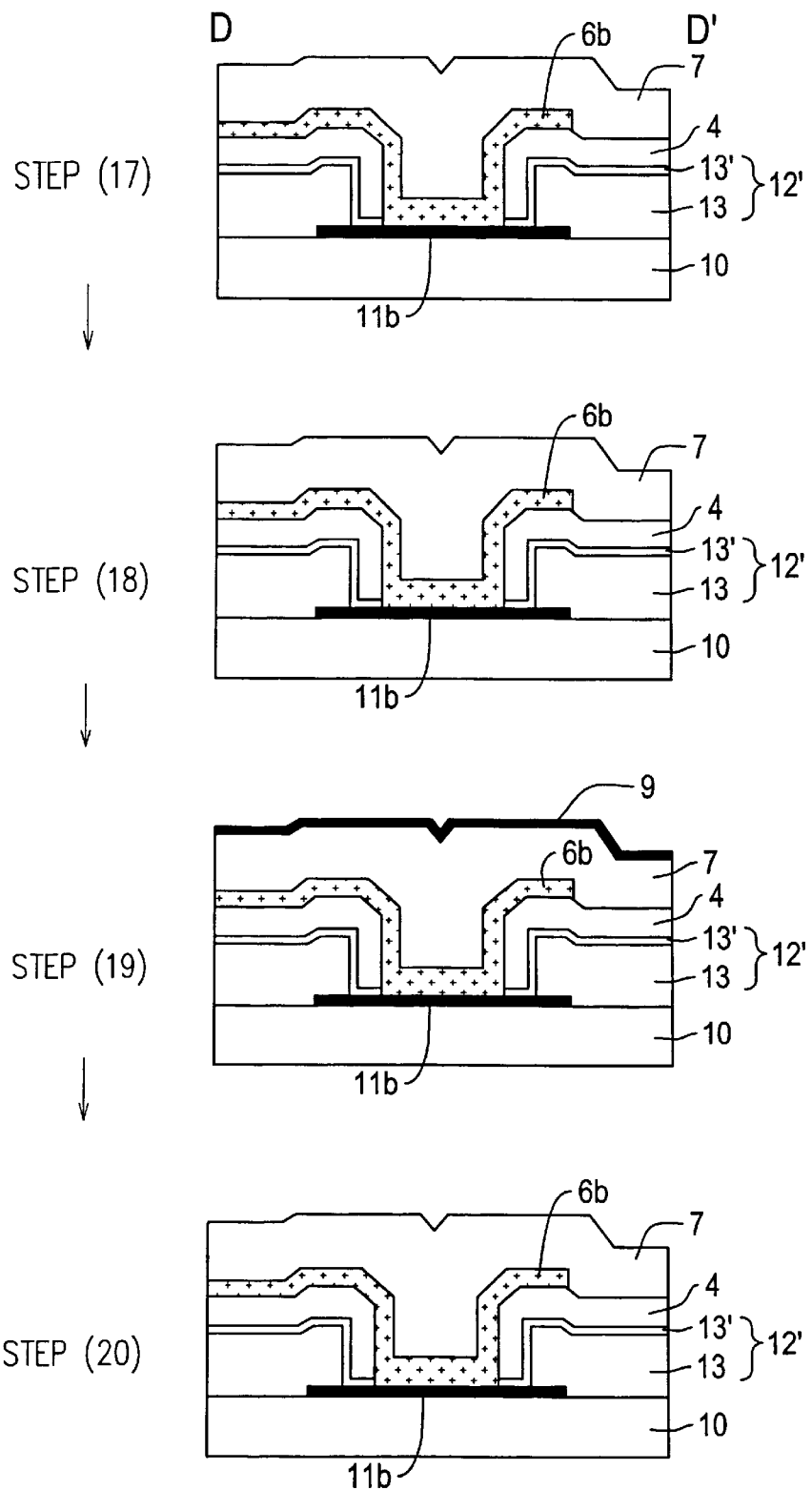
FIGS. 57(17)–57(20) are process diagrams sequentially illustrating a manufacturing process of an embodiment of the liquid crystal for the portion shown in FIG. 43.

Step (1) shown in FIG. 54 to step (20) shown in FIG. 57 are carried out using the same manufacturing process as steps (1) shown in FIG. 50 to step (20) shown in FIG. 53.

More specifically, as shown in step (1) of FIG. 54, a light shielding film 11 is formed on the entire surface of the TFT array substrate 10, and then, as shown in step (2), a light shielding wiring 11b is formed during a photolithographic step or an etching step.

Then, as shown in step (3), a first insulating film 13 (i.e., the lower layer of the double layered first interlayer insulating film 12') is formed on the first light shielding wiring 11b, and then, as shown in step (4), etching is applied to an area where the connecting portion to be formed thereabove to remove the first insulating film 12 in this area. When a treatment is carried out by dry etching such as reactive ion etching or reactive ion beam etching, the first insulating film 13 can be removed anisotropically with substantially the same size as the resist mask formed by photolithography. This provides an advantage of permitting easy control as designed in size. When using wet etching, on the other hand, isotropy provides a wider aperture area of the first insulating film 13. However because the side wall of the aperture can be tapered, the polysilicon film or the resist for forming scanning lines 3a in a subsequent step does not remain on the periphery of the aperture side wall without being etched or peeled off, thus preventing the yield from decreasing. Tapering the aperture side wall of the first insulating film 13 may be accomplished by dry etching, then withdrawing the resist pattern, and then conducting dry etching once again.

Then, as shown in step (5), a second insulating film 13 (i.e., the upper layer of the double-layered first interlayer insulating film 12') is formed on the first light shielding wiring 11b and the first insulating film 13.

Then, as shown in step (6), and amorphous silicon film is formed on the second insulating film 13', and then a polysilicon film 1 is caused to solid-phase grow.

Figure 55:
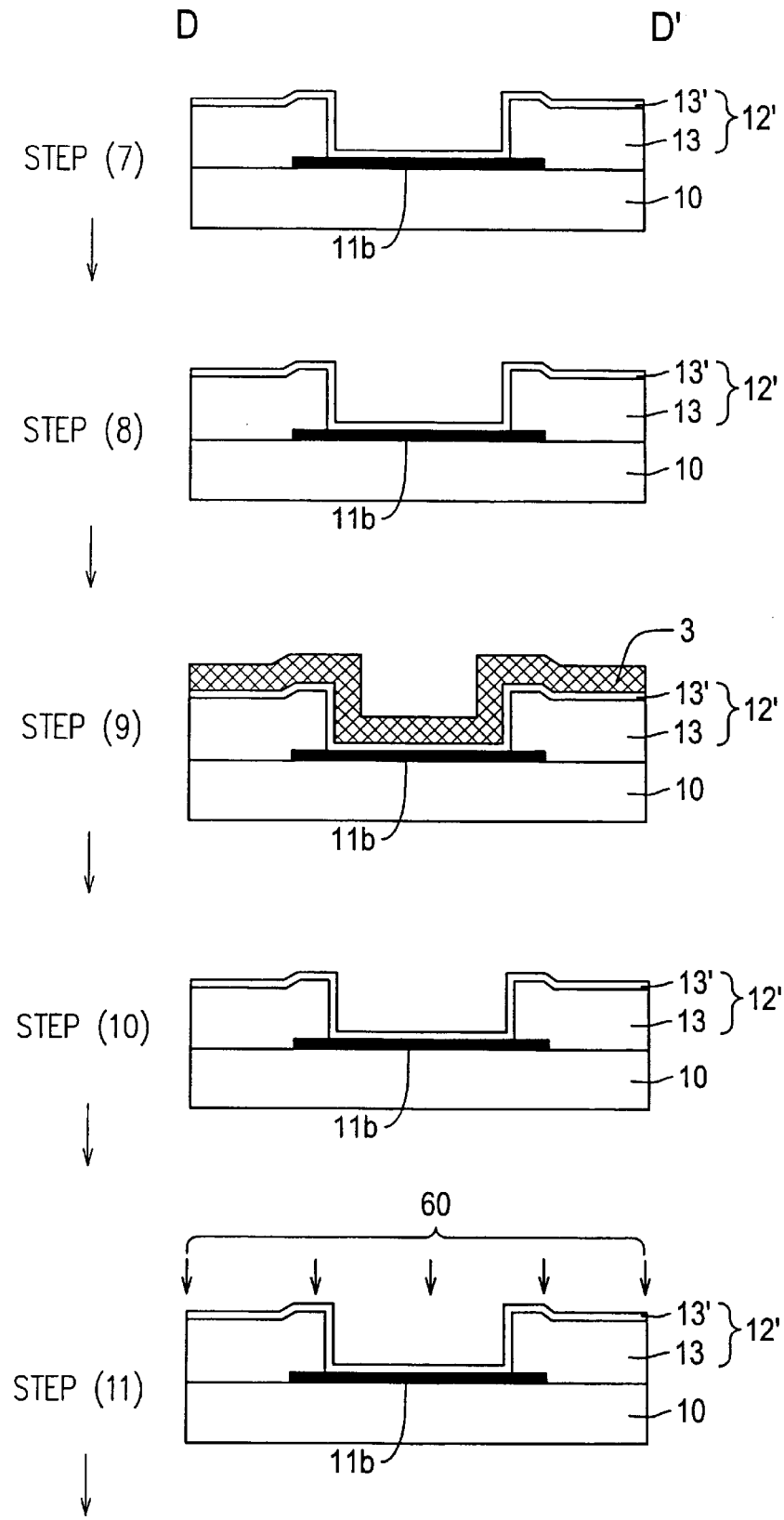
FIGS. 55(7)–55(11) are process diagrams sequentially illustrating a manufacturing process of an embodiment of the electro-optical for the portion shown in FIG. 43.

Then, in steps (7) and (8) of FIG. 55, after formation of the semiconductor layer 1a and the gate insulating film 2 in the pixel section, a polysilicon film 3 is deposited as shown in step (9), and then, as shown in step (10), the polysilicon film 3 is completely removed from the connecting portion.

Figure 56:
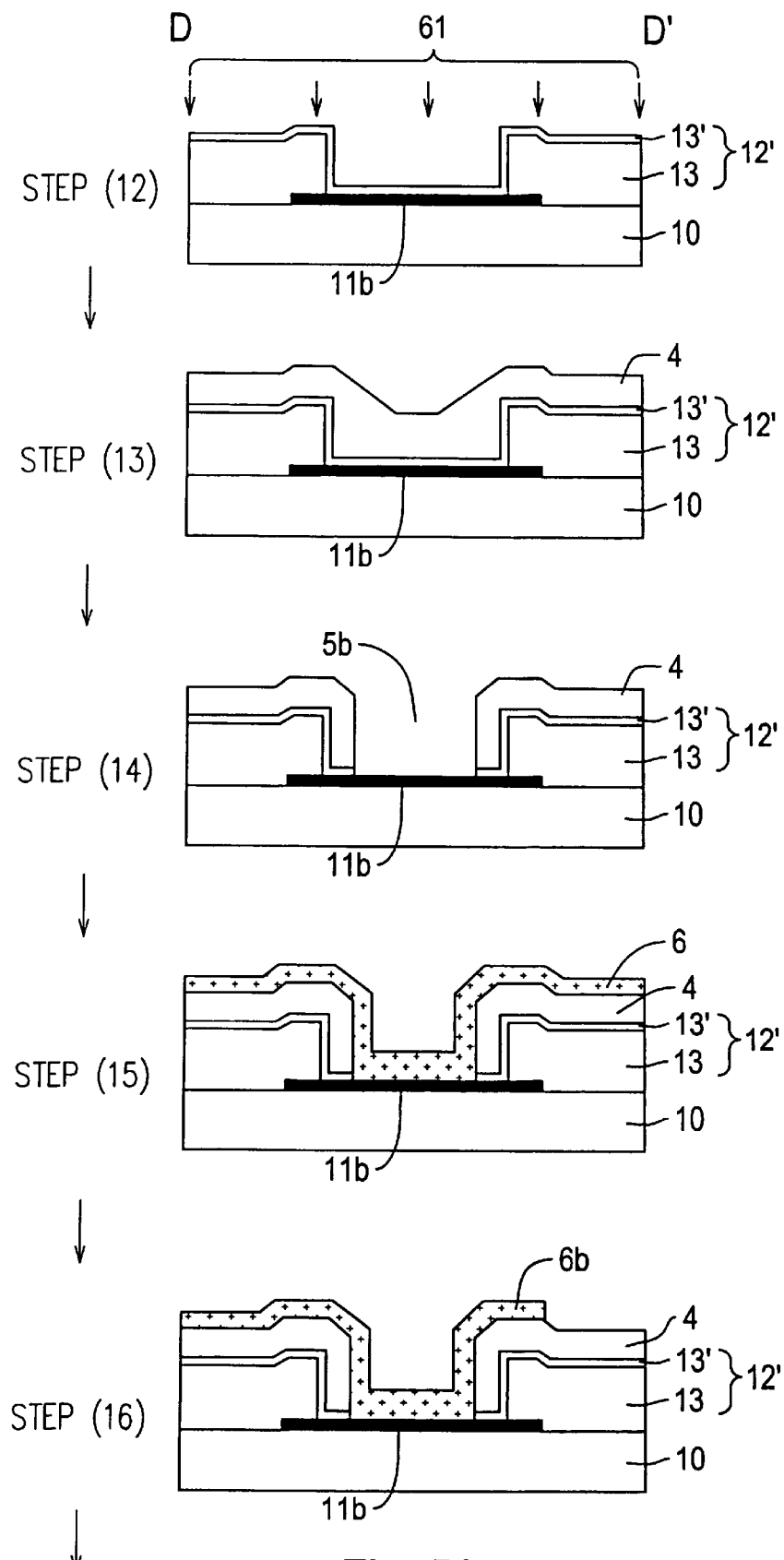
FIGS. 56(12)–56(16) are process diagrams sequentially illustrating a manufacturing process of an embodiment of the electro-optical for the portion shown in FIG. 43.

As shown in step (11) of FIG. 55 and step (12) of FIG. 56, doping of the impurity ions 60 and 61 for the semiconductor layer 1a is completed.

Then, as shown in step (13), a second interlayer insulating film 4 is formed so as to cover the second insulating film 13', and then, as shown in step (14), a contact hole 5b for connecting the light shielding wiring 11b and the constant potential line 6b is provided in the second interlayer insulating film 4. In this case, only the second insulating film 13 of the first interlayer insulating film 12' is formed under the second interlayer insulating film 4. It is therefore possible to pierce the hole in the same etching step as the step for forming the contact hole 5a (step (14) in FIG. 52) by providing the second interlayer insulating film 4 on the high-concentration source area 1d of the semiconductor layer 1a.

Then, as shown in step (15), a metal film 6 made of Al or the like is deposited by sputtering on the second interlayer insulating film 4, and then, as shown in step (16), a constant potential line 6b is formed from the same layer (Al or the like) as the data line through a photolithographic step and an etching step.

Then, as shown in step (17) of FIG. 57, a third interlayer insulating film 7 is formed so as to cover the constant potential line 6b and the second interlayer insulating film 4.

Then, in step (18) of FIG. 40, after waiting for piercing of a contact hole 8, a transparent conductive thin film 9 such as an ITO film is deposited on the third interlayer insulating film 7 as shown in step (19), and further as shown in step (20), this portion is completely removed through a photolithographic step and an etching step.

According to the manufacturing method of a electro-optical apparatus in this embodiment, a contact hole 5b for connecting the light shielding wiring 11b and the constant potential line 6b is pierced through the second interlayer insulating film 4 and the second insulating film 13' (i.e., upper layer of the first interlayer insulating film 12') up to the light shielding film 11b. At the same time, a contact hole 5a for connecting the pixel switching TFT 30 and the data line 6a is pierced through the second interlayer insulating film 4 up to the semiconductor layer 1a. It is therefore possible to pierce these two contact holes 5a and 5b at a same time, thus providing an advantage in the manufacture. For example, it is possible to pierce these contact holes 5a and 5b at a time so as to have prescribed depths, respectively, by the application of wet etching with a selection ratio set to an appropriate value. The step of piercing these contact hole is made easier particularly in response to the depth of the concave recess of the first interlayer insulating film. Because the contact hole piercing step (i.e., a photolithographic step or an etching step) for connecting the light shielding wiring 11b and the constant potential line 6b can be omitted, an increase in manufacturing cost caused by the increase of steps and a decrease in yield can be avoided.

According to the manufacturing process of this embodiment, the thickness of the first interlayer insulating film 12' at the concave portion can be relatively easily, certainly and accurately controlled through control of the thickness of the second insulating film 13'. It is therefore possible to a very slight thickness of the first interlayer insulating film 12' at this concave portion.

When the first interlayer insulating film 12" comprises a single layer, it suffices to carry out steps (1) to (20) by making slight modifications in step (3), (4) and (5) shown in FIGS. 50 and 54, respectively. More specifically, the process comprises the steps of depositing a first interlayer insulating film 12' having a slightly large thickness of from 10,000 to 15,000 Å in step (3); and applying etching in step (4) to an area where the capacitor line 3b is to be formed thereabove and leaving a thickness of from 1,000 to 2,000 Å of the first interlayer insulating film 12' in this area, thus omitting step (5). In this case also, the thickness of the portion not etched of the first interlayer insulating film 12' and the etched portion thickness are set so that the pixel area becomes substantially flat prior to forming the pixel electrode 9a later. When the first interlayer insulating film 12' comprises a signal layer, it is not necessary to increase the number of layers as compared with a conventional case, and controlling the thickness of the concave portion and the portion not made concave through control of the etching time permits flattening.

Figure 58:
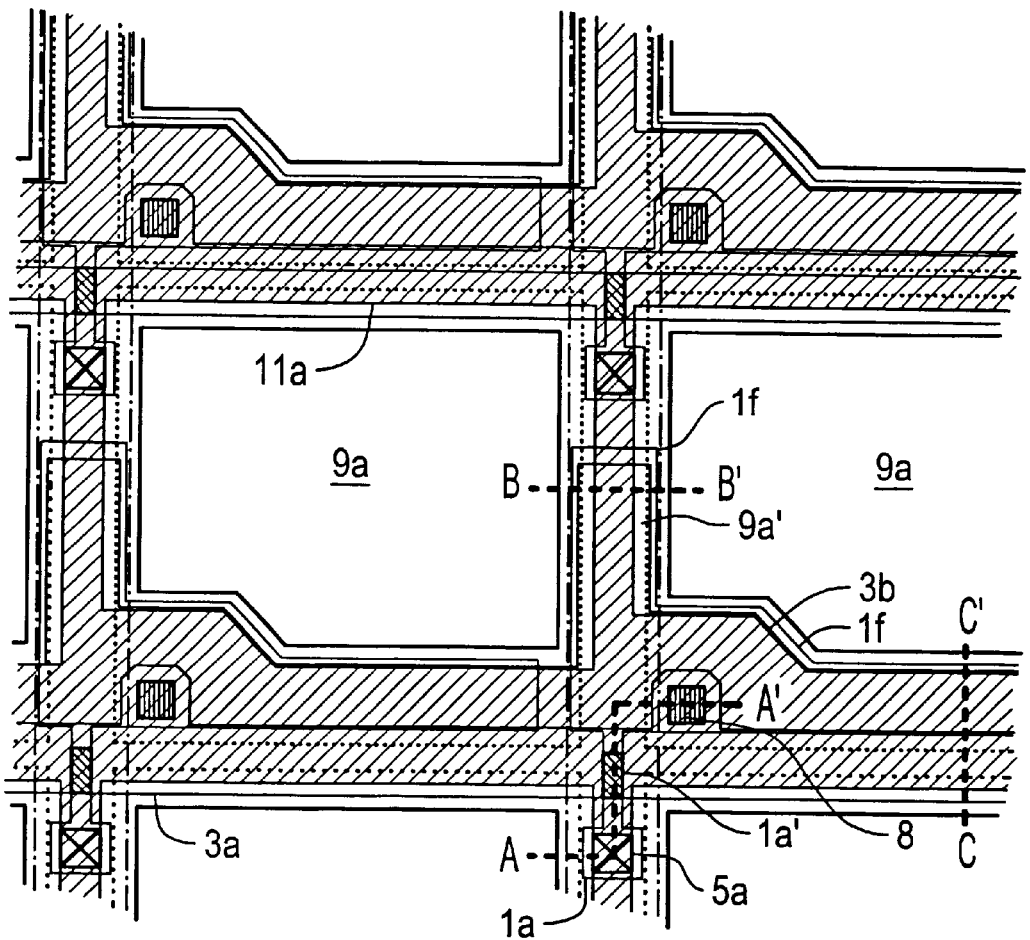
FIG. 58 is a plan view of a group of adjacent pixels on a TFT substrate having data lines, scanning lines, pixel electrodes, light shielding films and the like provided in a electro-optical apparatus in an embodiment of the invention.
Figure 59:
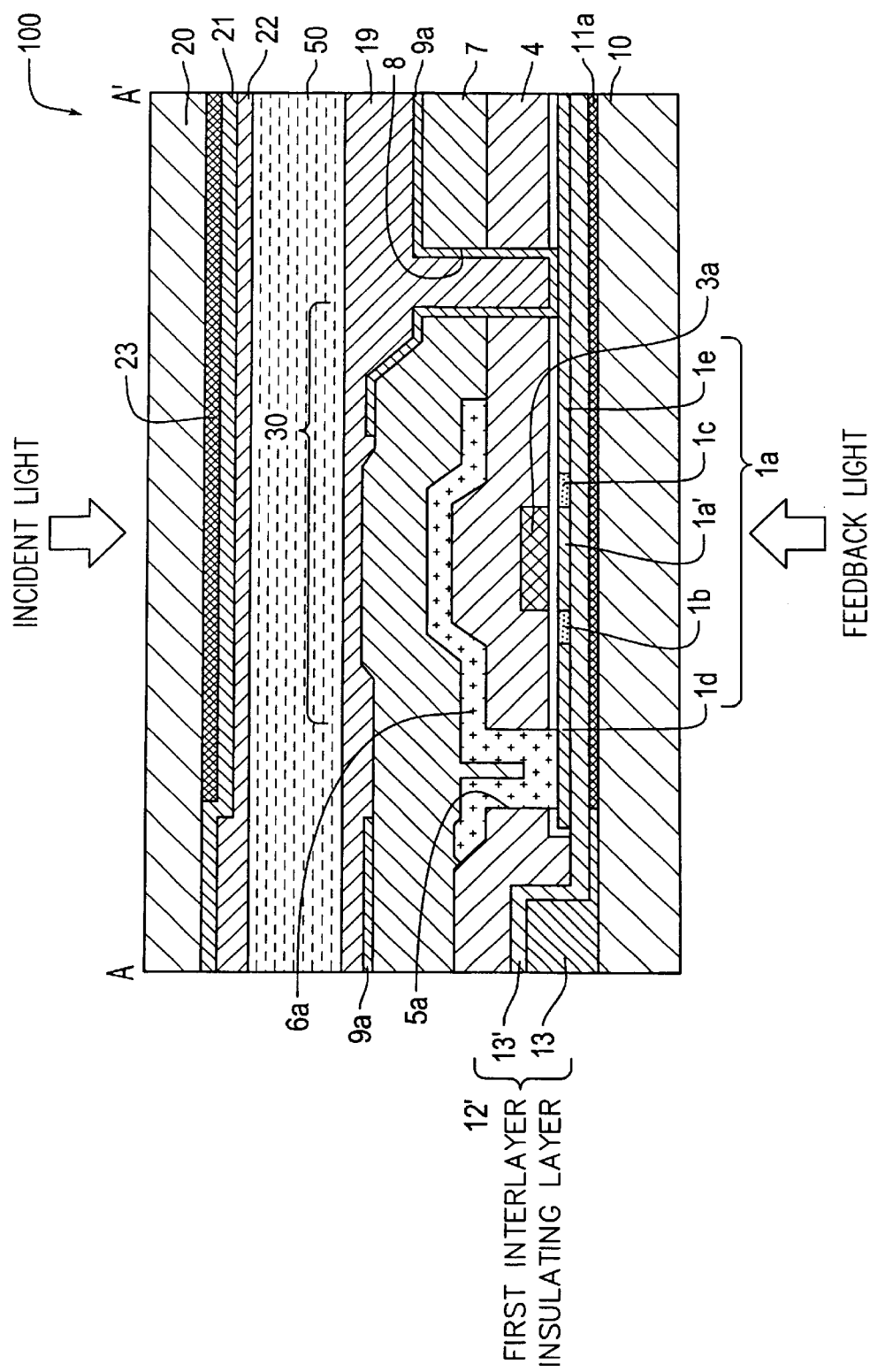
FIG. 59 is a sectional view of an embodiment of the electro-optical apparatus illustrating the A–A' section of FIG. 58 and with an opposing substrate.
Figure 60:
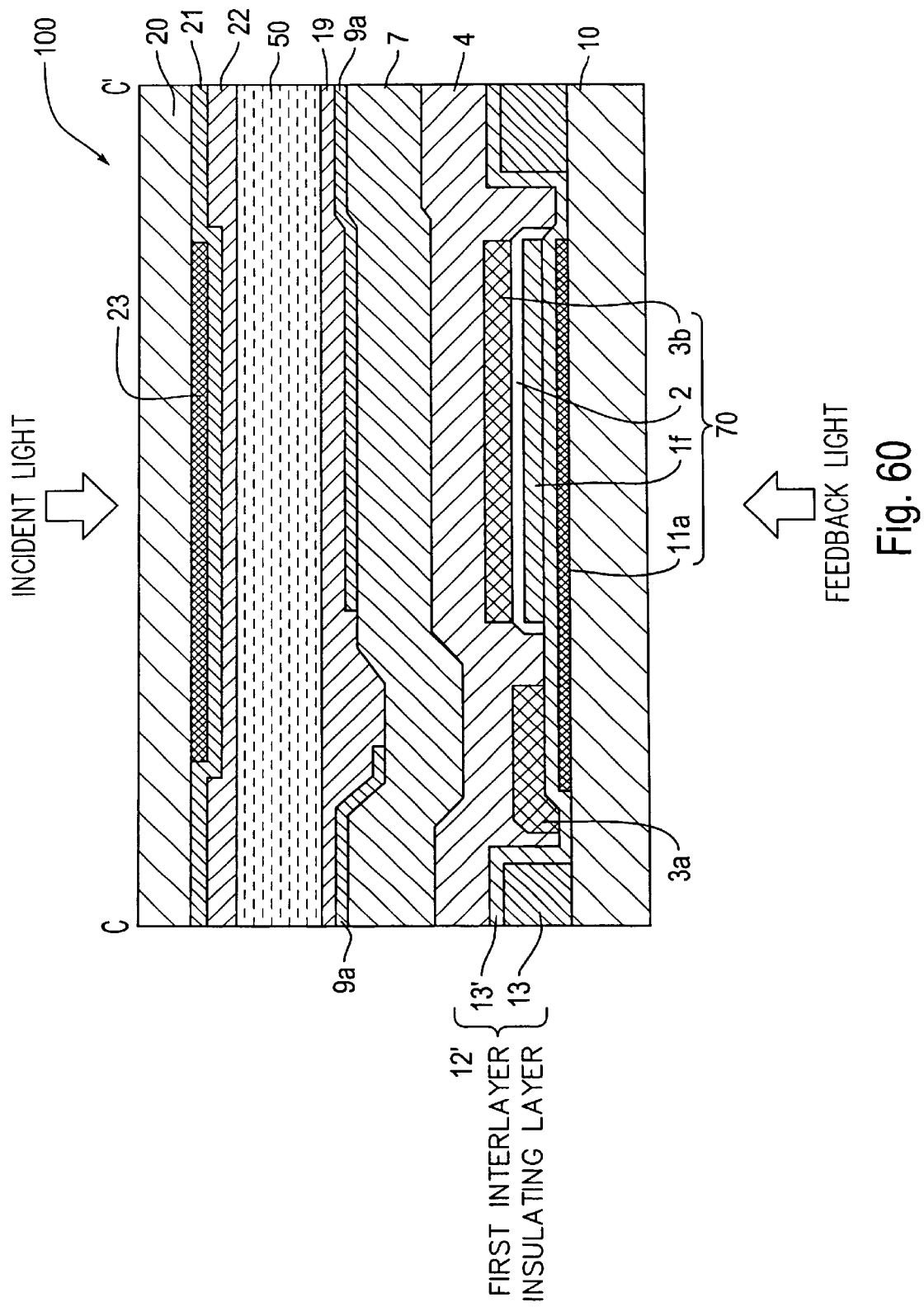
FIG. 60 is a sectional view of an embodiment of the electro-optical apparatus illustrating the C–C' section of FIG. 58 and with an opposing substrate.

Another embodiment of the present invention will now be described. The configuration of the embodiment of the electro-optical apparatus in the pixel area in this embodiment will be described with reference to FIGS. 58 to 60. FIG. 58 is a plan view of an adjacent pixel group of a TFT array substrate having data lines, scanning lines, pixel electrodes and light shielding films formed thereon. FIG. 59 is a sectional view of the electro-optical apparatus shown in FIG. 58 cut along the line A–A' illustrating an opposing substrate and the like and FIG. 60 is a sectional view of FIG. 58 cut along the line C–C'. In FIGS. 59 and 60, the individual layers and components are drawn in different scales. The components corresponding to those of the preceding embodiment are assigned the same reference numerals.

In FIG. 58, a plurality of transparent pixel electrodes 9*a* (outlined by a dotted line 9*a*') are provided in a matrix shape on the TFT array substrate of the electro-optical apparatus, and data lines 6*a*, scanning lines 3*a* and capacitor lines 3*b* are provided along longitudinal and lateral boundaries of the pixel electrodes 9*a*. The data lines 6*a* are electrically connected to the source area in a semiconductor layer 1*a* comprising a polysilicon film via a contact hole 5, and the pixel electrodes 9*a* are electrically connected to a drain area in a semiconductor layer 1*a* through a contact hole 8. Scanning lines 3*a* are arranged so as to be opposite to a channel area 1*a*' (i.e., area marked with right-down oblique lines in FIG. 14) in the semiconductor layer 1*a*. A first light shielding film 11*a* for the pixel section is provided in an area marked with right-up oblique lines in FIG. 14. That is, the TFTs, the data lines 6*a*, the scanning lines 3*a* and the capacitor lines 3*b* including the channel area 1*a*' of the semiconductor layer 1*a* provided at positions so as to be one on top of the other as viewed from the TFT array substrate side.

Particularly in a mesh-like (matrix-shaped) area surrounded by a thick line containing the capacitor lines 6*b* formed under the data lines 6*a* in FIG. 58, a first interlayer insulating film is formed into a concave recess. In the other area substantially corresponding to the pixel electrodes 9*a*, the first interlayer insulating film is formed relatively convex (into a flat surface). The first interlayer insulating film is formed into a concave shape so as to cover part or all area coming at least under the areas of the data line 6*a*, the scanning line 3*a* and the capacitor line 3*b*.

As shown in FIGS. 59 and 60, the electro-optical apparatus 100 is provided with a TFT array substrate 10 which is an example of a transparent substrate, and opposing substrate 20. The TFT array substrate 10 is made, for example, of a quartz substrate, and the opposing substrate 20 is made, for example, of a glass substrate or a quartz substrate. A pixel electrode 9*a* is provided on the TFT array substrate 10, and an alignment film 19 subjected to prescribed alignment processing such as rubbing is provided thereabove. The pixel electrode 9*a* comprises, for example, a transparent conductive thin film such as an ITO film. The alignment film 19 comprises, for example, an organic thin film such as a polyimide thin film.

A opposing electrode 21 is provided, on the other hand, over the entire surface of the opposing substrate 20, and an alignment film 22 subjected to an alignment processing such as rubbing is provided thereunder. The opposing electrode 21 comprises, for example, a transparent conductive thin film such as an ITO film. The alignment film 22 comprises, for example, an organic thin film such as a polyimide thin film.

A TFT 30 for switching-controlling each pixel electrode 9*a* is provided at a position adjacent to each pixel electrode 9*a* of the TFT array substrate 10 as shown in FIG. 59.

A second light shielding film 23 is provided in the area other than the aperture area of each pixel on the opposing substrate 20 as shown in FIGS. 58 and 59. As a result, an incident light from the opposing substrate 20 side never enters the channel area 1*a*' of the semiconductor layer 1*a* of the pixel switching TFT 30 of source side LDD area 1*b* and drain side LDD area 1*c*. Further, the second light shielding film 23 improves contrast and prevents color mixture. The second light shielding film 23 may be provided, not on the opposing substrate 20 side, but rather on the TFT array substrate 10.

As shown in FIG. 59, first light shielding films 11*a* are provided between the TFT array substrate 10 and the individual pixel switching TFTs 30 at positions opposite to the TFTs 30. The first light shielding film 11*a* is made of a single metal, an alloy or a metal silicide preferably containing at least one of non-transparent high-melting-point metals such as Ti, Cr, W, Ta, Mo and Pd. When the first light shielding film 11*a* has the above composition, the first light shielding film 11*a* can be prevented from being broken or melted under the effect of a high-temperature treatment in the pixel switching TFT 30 forming step carried out after the light shielding film 11*a* forming step on the TFT array substrate 10. Because of the presence of the first light shielding film 11*a*, the feedback light from the TFT array substrate 10 side may be prevented from entering the channel area 1*a*' or the source side LDD area 1*b* and drain side LDD area 1*c*, and properties of the TFT do not deteriorate by the occurrence of photocurrent.

Further, a first interlayer insulating film 12' comprising a first insulating film 13 and a second insulating film 13' is provided between the first light shielding film 11*a* and the plurality of TFTs 30. The first interlayer insulating film 12' is provided for electrically insulating the semiconductor layer 1*a* composing the TFTs 30 from the first light shielding film 11*a*. The first interlayer insulating film 12' serves also as an undercoat film for the pixel switching TFT 30 by covering the entire surface of the TFT array substrate 10. That is, the first interlayer insulating film 12 prevents the properties of the pixel switching TFT 30 from being deteriorated by roughening during surface polishing or stains remaining after rinsing.

Particularly as shown in FIGS. 58 and 59, the first interlayer insulating film 12' on the first light shielding film 11*a* in an area where the first light shielding film 11*a* is formed on the TFT array substrate, and on the TFT array substrate 10 in an area where the first light shielding film 11*a* is not formed. The portions opposite to the pixel switching TFT 30, the data line 6*a*, the scanning line 3*a* and the capacity line 3*b* are formed into. concave recesses as viewed from the opposing substrate 20 side.

In this embodiment, the first interlayer insulating film 12' comprises a single-layer portion and a double-layer portion. The single-layer portion of the second insulating film 13 is thinner to form a concave portion. The first and the second insulating films 13, 13' and the double-layer portion are thicker to form portions not forming a concave recesses. When adopting the above configuration of the first interlayer insulating film 12', it is possible to relatively easily and highly accurately control the thickness of the first interlayer insulating film 12' as the thickness of the second insulating film 13'. It is therefore possible to achieve a very small thickness of the first interlayer insulating film 12' (i. e., the thickness of the second insulating film 13) at the concave portion.

The first interlayer insulating film 12' having the configuration as described above makes it possible to electrically insulate the pixel switching TFT 30 and the like from the first light shielding film 11*a*, and at the same time, to prevent contamination of the pixel switching TFT 30 and the like by the first light shielding film 11a. Particularly, the portion of the first interlayer insulating film 12' opposite to the pixel switching TFT 30, the data line 6a, the scanning line 3a and the capacity 3b are formed into concave recess. As compared with the conventional case where the first interlayer insulating film is formed flat and a TFT and others are formed thereon, therefore, the difference in the total thickness between the area having these TFT and others and the area not having them is reduced in response to the depth of the concave portion, thus promoting flattening of the pixel section.

For example, by using a depth of the concave recess so as to substantially achieve a difference in the total thickness of 0, the subsequent flattening step can be omitted. Or, by using a depth of the concave recess so as to reduce the difference in the total thickness even slightly, the burden of the subsequent flattening step can be alleviated. More preferably, the first interlayer insulating film 12' should be formed into a concave recess having a depth corresponding to the total thickness of the first light shielding film 11a, the semiconductor film 1a, the capacitor line 3b and the data line 3a. The first interlayer insulating film 12' having the configuration as described above makes it possible to substantially fit the upper surface of the data line 6a with the upper surface of the adjacent second interlayer insulating film 4, thus accelerating flattening of the pixel section before forming the pixel electrode 9a. Provided however that the first interlayer insulating film 12' may be formed into a concave recess having a depth corresponding to the total thickness of the first light shielding film 11a, the semiconductor layer 1a and the capacitor line 3b. By composing the first interlayer insulating film 12' as described above, it is possible to achieve substantially a flat upper surface of the second interlayer insulating film 4, thus promoting flattening of the pixel section before forming the pixel electrode 9a.

The first interlayer insulating film 12' may be formed into concave recesses only at areas opposite to one or two of the first light shielding film 11a, the semiconductor layer 1a and the capacitor line 3b, and any of various flattening methods may be adopted for the pixel section.

The first interlayer insulating film 12' may comprise, not two layers, but a single layer. By adopting the single-layer configuration, the necessity to increase the number of layers as compared with conventional art is eliminated. A first interlayer insulating film comprising a single layer as described above is available by controlling the total thickness of the concave and non-concave portions through control of the etching time.

Referring again to FIG. 59, the first interlayer insulating film 12' comprises a high-insulating glass such as NSG, PSG, BSG, or BPSG, a silicon oxide film, or a silicon nitride film.

In this embodiment, as shown in FIG. 58, the high-concentration drain area 1e of the semiconductor layer 1a extends along the data line 6a, and the first light shielding film 11a is provided also under the data line 6a. A capacitor is therefore formed through the second insulating film 13 between the first storage capacitor electrode 1f extending along the data line 6a and the first light shielding film 11a. As a result, the storage capacity of the pixel electrode 9a may be increased through effective utilization of a space under the data line 6a off the aperture area.

In this embodiment, as shown in FIGS. 58 and 60, the first interlayer insulating film 12' is formed into a concave shape also at the portion opposite to the second storage capacitor electrode formed by a part of the capacitor line 3b. Even when the capacitor line 3b is wired above the first interlayer insulating film 12', therefore, it is possible to achieve flattening in the area where the capacitor line 3b is arranged. At the portion opposite to the capacitor line 3b, the first interlayer insulating film 12' has a very small thickness (for example, 1,000 to 2,000 Å), and the first light shielding film 11a is provided under the capacity line 3b. It is therefore possible to increase the capacitor between the first light shielding film 11a arranged opposite through the second insulating film 13 and the first storage capacitor electrode 1f extending from the high-concentration drain area 1e of the semiconductor layer 1a without increasing the surface area of the capacitor line 3b. That is, it is possible to increase the storage capacity of the pixel electrode 9a as a whole. This embodiment is very favorable because of the possibility to increase the storage capacity so as not to narrow the aperture area of each pixel in a limited area within the screen display area.

In this embodiment, the first light shielding film 11a should be preferably electrically connected to the constant potential line, and is therefore kept at a constant potential. A change in potential of the first light shielding film 11a therefore never exerts an adverse effect on the pixel switching TFT 30 arranged opposite to the first light shielding film 11a. In this case, the constant potential line potential may be equal to the grounding potential, or equal to the potential of the opposing electrode 21. The constant potential line may be connected to a constant potential source such as a negative power supply or a positive power supply of a peripheral driving circuit (i.e., the data line driving circuit 101 or the scanning line driving circuit 104 in FIG. 12) for driving the electro-optical apparatus.

Referring again to FIG. 59, the pixel switching TFT 30 has an LDD structure. The structure of the pixel switching TFT 30 is similar to the above embodiment, and the structure is explained with reference to FIG. 3. The explanation is therefore omitted.

As shown in FIG. 60, a storage capacitor 70 is provided for each pixel electrode 9a. More specifically, the storage capacitor 70 comprises a first storage capacitor electrode 1f comprising a polysilicon film extended from the high-concentration chain area 1e of the semiconductor layer 1a, an insulating film 2' made through the same step as the gate insulating film 2, a capacitor line 3b formed through the same step as the scanning line 3a, a second and a third interlayer insulating films 4 and 7, and a part of pixel electrode 9a opposite to the capacitor line 3b through the second and the third interlayer insulating films 4 and 7. The presence of the storage capacitor 70 permits highly accurate display even with a low duty ratio. The capacitor line 3b (second storage capacitor electrode) is provided, as shown in FIG. 58, in parallel with the scanning line 3a on the surface of the TFT array substrate 10. Further, the first interlayer insulating film 12' under the first storage capacitor electrode 1f can be made into a thin film. It is therefore possible to increase the storage capacity and thus to achieve a electro-optical apparatus giving a high image quality.

As shown in FIG. 60, it is possible to use the first light shielding film 11a as a wiring line for the storage capacitor 70 (third storage capacitor electrode). In this case, by adopting a structure in which the first storage capacitor electrode 1f is held from above and below between the capacitor line 3b (i.e., second storage capacitor electrode) and the first light shielding film 11a (i.e., third storage capacitor electrode) through the respective insulating films, it is possible to increase the capacity efficiently in a limited area.

Figure 61:
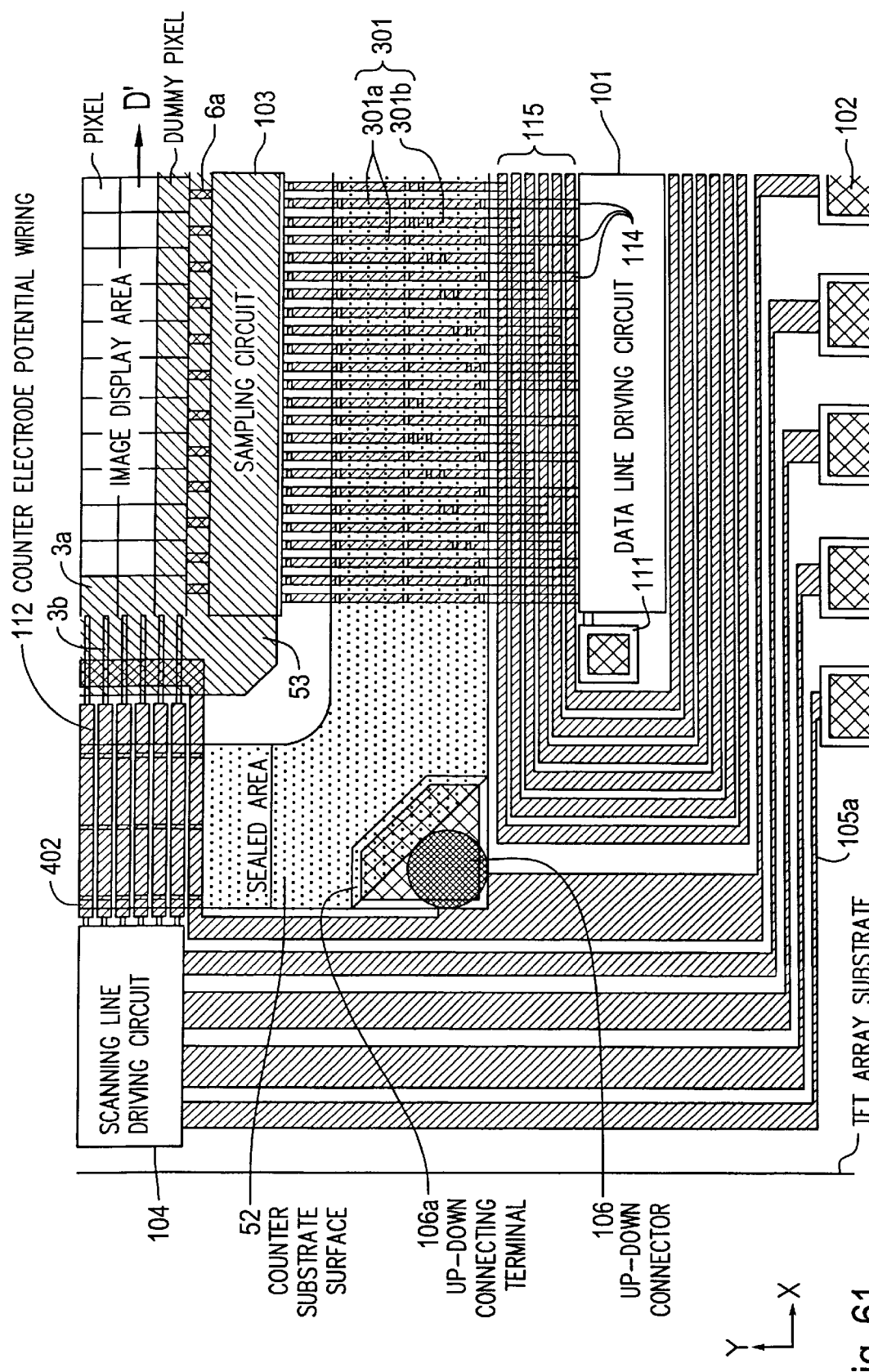
FIG. 61 is an enlarged plan view illustrating a connecting portion of the data lines and scanning lines formed in the sealed area.
Figure 62:
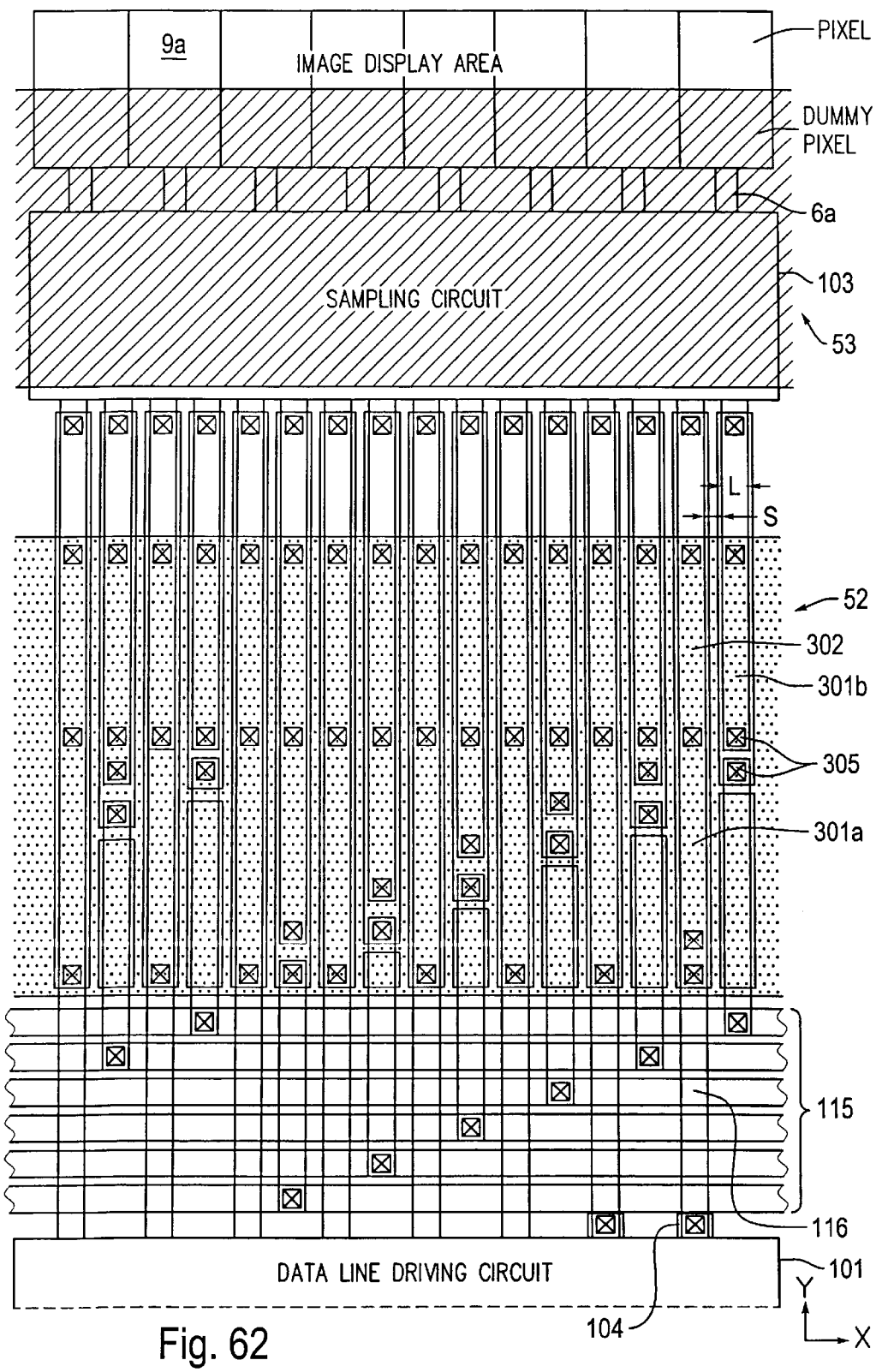
FIG. 62 is an enlarged plan view illustrating a connecting portion of the data lines formed in the sealed area.
Figure 64:
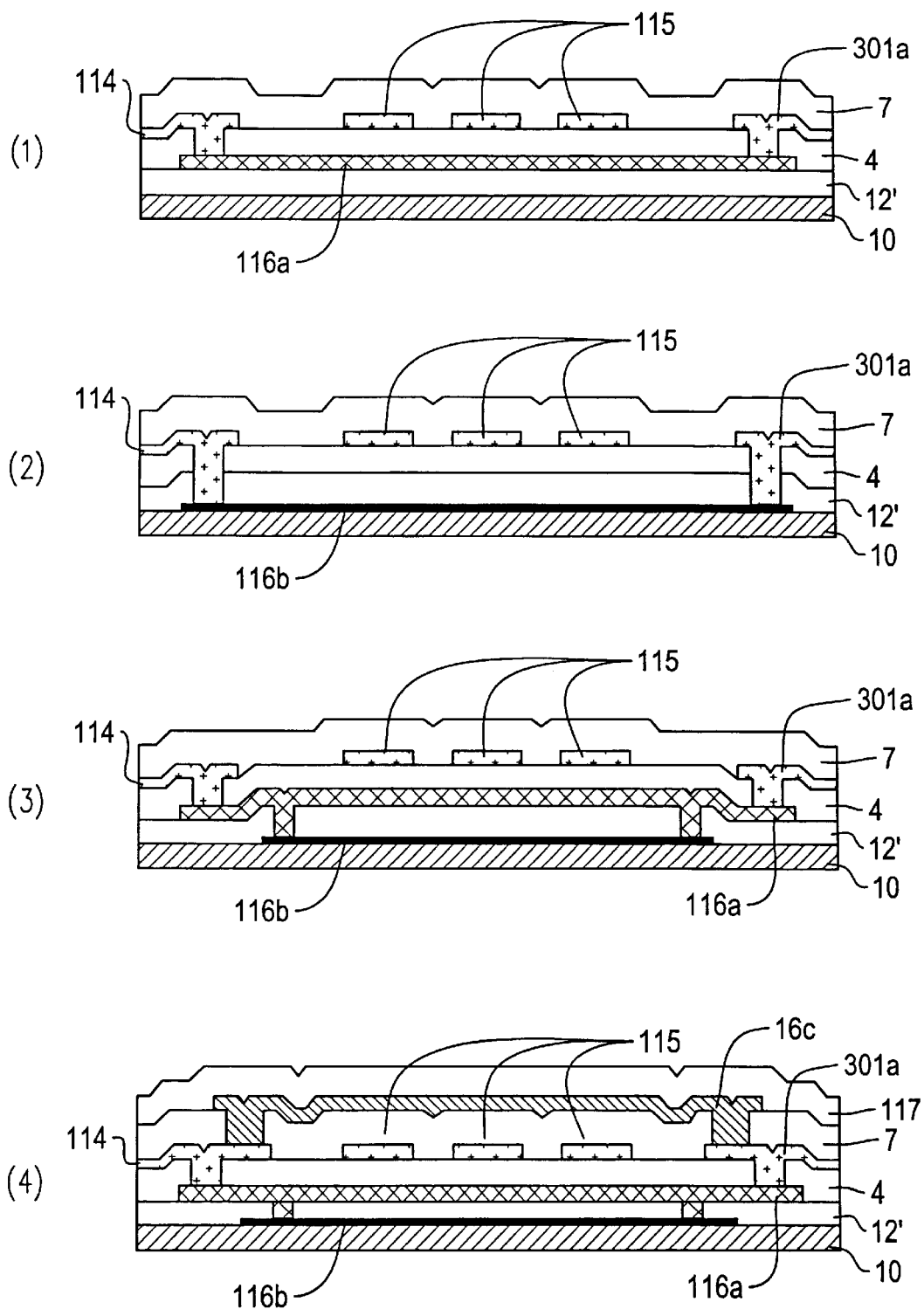
FIGS. 64(1)–64(4) are sectional views of the electro-optical apparatus on the TFT array substrate side at a relay wiring portion from the sampling circuit drive signal lines to the connecting lines across the image signal line.

The configuration of the electro-optical apparatus at the sealed area will be described with reference to FIGS. 61 to 64. FIG. 61 is a plan view of a TFT array substrate in a sealed area having a connecting line provided therein. FIG. 62 is an enlarged plan view illustrating the connecting section shown in FIG. 61 in an enlarged scale. FIG. 63 is a sectional view of the connecting section. FIG. 64 is a sectional view of various relay wiring sections for data lines formed across the image signal lines.

In FIG. 61, a scanning line driving signal line 105a is arranged from a mounting terminal 102 provided on the periphery of the TFT array substrate 10 to a scanning line driving circuit 104. A plurality of image signal lines 115 are wired in the X-direction in an area between the data line driving circuit 101 and the sealed area. A relay wiring line 301 comprising a connecting line 301a forming a part of a sampling circuit driving signal line 114 from the data line driving circuit 101 and a connecting line 301b from the image signal lines 115 are provided under the sealed area on the extension of the data line 6a. Under the sealed area on the extension of the scanning line 3a, on the other hand, an connecting line 402 of the scanning line from the scanning line driving circuit 104 is provided. The connecting line 402 includes an opposing electrode (also referred to as a common electrode) potential wiring line 112 at an end thereof. This opposing electrode potential wiring line 112 is connected to an opposing electrode 21 (see FIGS. 59 and 60) formed on an opposing substrate 20 through an up/down connecting terminal 106a and an up/down connecting member 106. An inspection terminal 111 for entering a signal for a prescribed inspection into the data line driving circuit 101 is provided adjacent to the data line driving circuit 101.

In FIG. 61, a sampling circuit 103 for impressing an image signal onto the data line 6a at a prescribed timing is provided on the TFT array substrate. The sampling circuit 103 has a plurality of switching elements (TFT, for example) each provided for each data line 6a. Upon input of a plurality of image signals (six signals, for example) converted in parallel from the plurality of image signal lines 115 via the connecting lines 301b, the sampling circuit 103 samples the entered image signals using the switching elements at a timing of sampling circuit driving signal supplied from the data line driving circuit 101 via a sampling circuit driving signal line 114 and connecting line 301a, and impresses them onto the individual data lines 6a. In addition to the sampling circuit 103, a precharge circuit may be formed on the TFT array substrate 10 for supplying, prior to image signals, precharge signals on a prescribed voltage level to a plurality of data lines, or an inspection circuit for inspecting quality and defects of the electro-optical apparatus during transportation or upon shipment.

As shown in FIG. 62, the connecting lines 301 from the sampling circuit 103 run in the Y-direction, have a width L, and are arranged at intervals S. The connecting line 301 comprises the same Al film as the data line 6a, and as shown in FIG. 63(1), a dummy wiring line 302 comprising the same polysilicon film as that of the scanning line 3a is provided under each connecting line 301.

In FIGS. 61 and 62, dummy pixels each having the same configuration as those forming the screen display area are formed under a third light shielding film 53 as a peripheral frame. While it is not necessary to compose display pixels under the third light shielding film 53 provided for concealing a defective alignment area of the liquid crystal, the dummy pixels are provided over a prescribed width outside the screen display area with a view to stabilizing properties of the pixels located near edges of the screen display area.

On the other hand, each of the connecting lines 402 of the scanning line 3a shown in FIG. 61 extends in the X-direction, and the wiring lines are arranged at intervals. Each connecting line 402 is made of the same polysilicon film as that for the scanning line 3a. As shown in FIG. 63(2), a dummy wiring line 401 made of the same Al film as the data line 6a is provided on each connecting line 402.

As shown in FIGS. 63(1) and 63(2), particularly in this embodiment, the first interlayer insulating film 12' is formed into a concave shape at portions opposite to the connecting lines 301 and 402 in the sealed area. Therefore, the height of a projection formed on the connecting lines 301 and 402 on the surface of the third interlayer insulating film 7 in contact with a sealing material 52 in the sealed area on the TFT array substrate side is reduced in response to the depth of the concave portion. As shown in these drawings, the surface of the third interlayer insulating film 7 becomes substantially flat. As a result, in the sealed area, stress applied via a gap material such as glass fiber or glass beads mixed with the sealing material 52 is uniformly dispersed over the surface of the third interlayer insulating film 7. Therefore, the conventional risk of breakage or short circuit of the connecting line caused by the gap filler is largely reduced.

Figure 65:
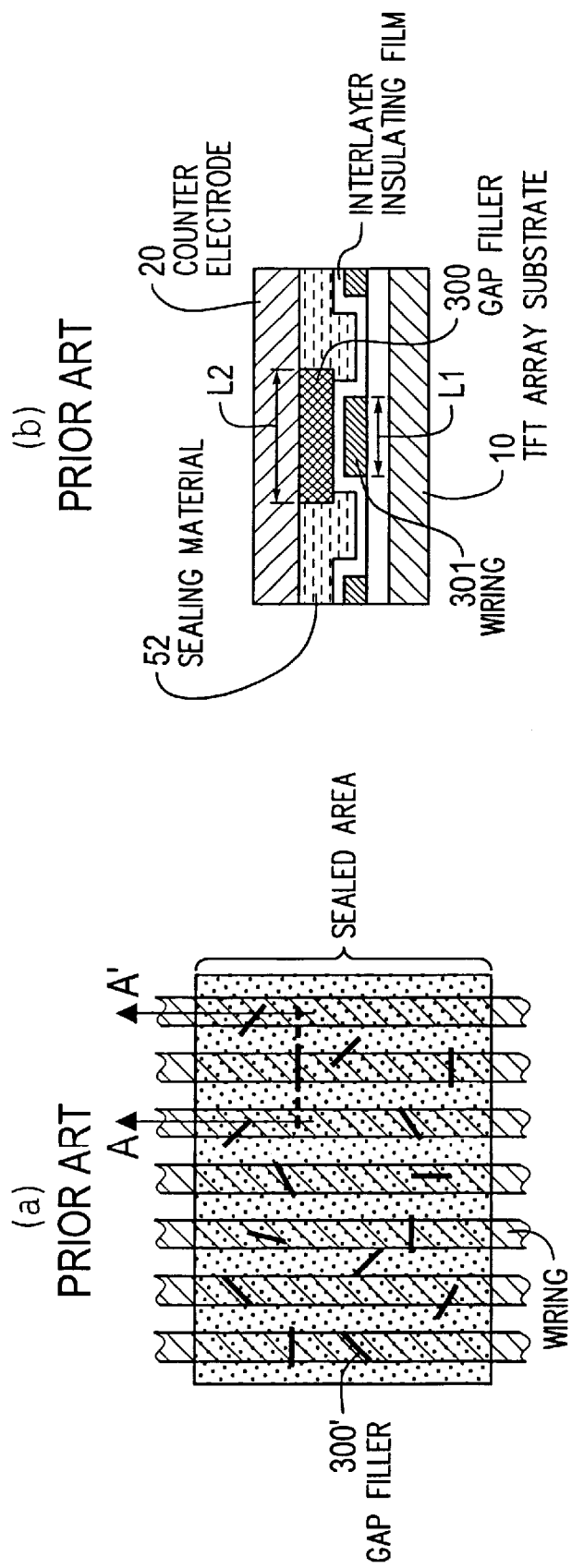
FIG. 65 illustrates a plan view and a sectional view of a sealed area of a electrooptical apparatus showing conventional control of the gap between substrates based on a gap filler.
Figure 66:
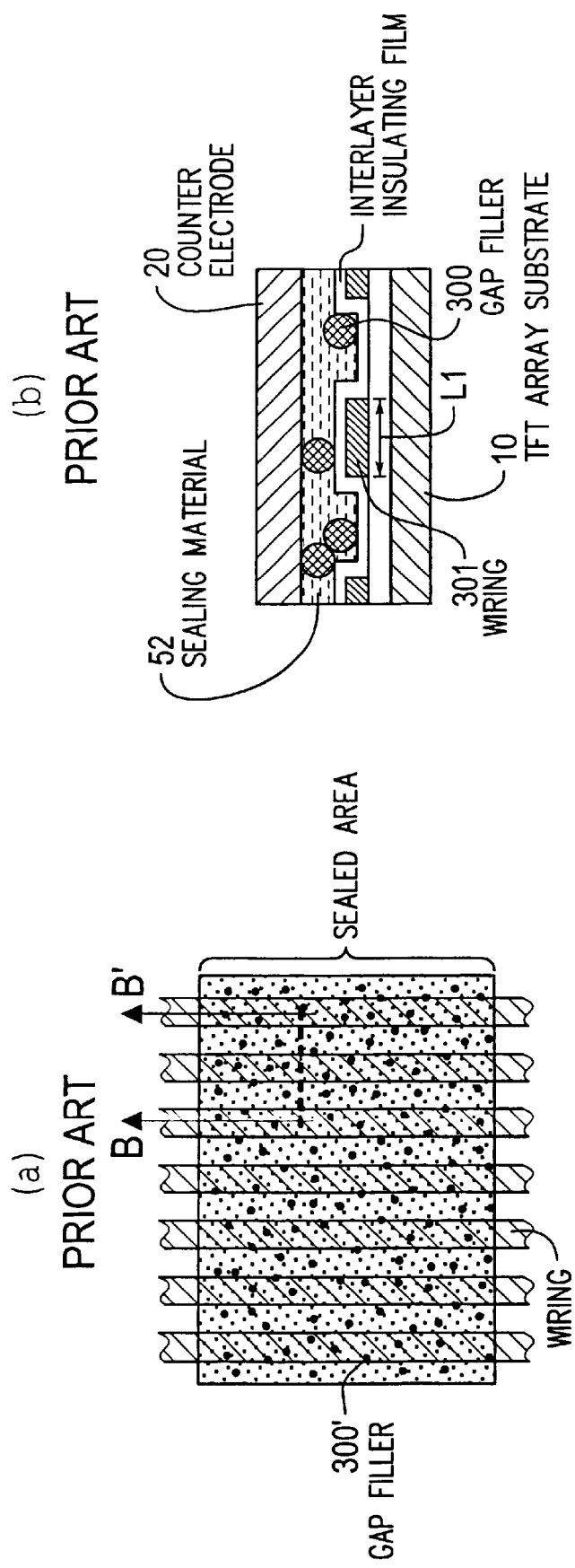
FIG. 66 illustrates a plan view and a sectional view of a sealed area of a electrooptical apparatus showing conventional control of the gap between substrates based on a gap filler.

More specifically, it is the conventional practice to conduct gap control by mixing the gap material comprising circular pole-shaped (rod-shaped) glass fibers with the sealing material 52 charged into the gap between the TFT array substrate 10 and the opposing substrate 20 as shown in the plan view in FIGS. 65(a) and the A–A' sectional view in FIG. 65(b). In this case, the gap filler having a width L2 (where L2>L1) would be placed, via the interlayer insulating film, on the connecting lines 302 having a width L1 as described above. Then, in some manner of cutting the gap material, as shown in FIG. 65(b), the gap material may run across a single connecting line 301, or there may occur a state similar to the above. This causes stress concentration in a linear area along the side lines of the gap material, thus easily resulting in breakage of the connecting line. As shown in the plan view of FIGS. 66(a) and B–B' sectional view of FIG. 66(b), gap control is performed by mixing a gap material' comprising spherical glass beads (silica balls) with the sealing material 52. In this case, the spherical gap material' would be placed, via the interlayer insulating film, on the connecting line 301 having a width L1 as described above. Then, as shown in FIG. 66(b), stress concentration occurs in spots at contact points of the gap material and the connecting line 301 is relatively easily broken, or when other connecting lines exist via the interlayer insulating film under the connecting lines, in particular, there is a high probability that, if not broken, the wiring lines locally break through the interlayer insulating film. The connecting line portion forming a projection in the sealed area along with refinement of the wiring lines cannot withstand the stress concentration caused by the fiber-shaped or bead-shaped gap filer placed thereon, and leads to a higher risk of wiring defects caused by breakage or short circuit. The present invention aims to solve these problems.

The pixel area facing the electro-optical material 50 and the surface of the sealed area facing the sealing material 52 is reduced. This eliminates the necessity to use a gap filler having a size smaller than the gap between substrates by about 1 μm as in the conventional art, thus permitting use of the gap material having a size of the same order as the gap between substrates. This permits expectation of a considerable effect when narrowing the gap between substrates with a view to preventing defective alignment of the electro-optical material 50 resulting from refinement of pixels.

More specifically, when the gap between two adjacent pixel electrodes becomes smaller, the increase in lateral electric field (i.e., electric field along the substrate surface) causes defective alignment of the liquid crystal (disclination). In order to prevent this, it suffices to narrow the gap between substrates to relatively intensify longitudinal electric field (i.e., electric field in a direction at right angles to the substrate surface). However, in order to reduce the step between the sealed area and the pixel area from about 4 μm to about 3 μm, for example, it is necessary to reduce the diameter of the gap filler from about 3 μm to about 2 μm. However, it is very difficult to prepare a gap filler having such a small diameter accurately. In addition, a smaller gap leads to a lower adhesion of a photosetting resin contained in the sealing material. As a result, if the gap between substrates is reduced as described above, there are problems such as a difficult gap control, an increased cost of the gap filler and a poorer bonding strength. Further, when the gap between substrates in the pixel area is reduced from about 4 μm to about 1 μm, it becomes necessary to reduce the gap filler diameter from about 3 μm to about 0 μm. This poses a problem of the technique for mixing the gap filler with the sealing material becoming invalid. The present invention solves these problems as described above.

In the present embodiment, in particular, dummy wiring lines 302 comprising polysilicon films are formed in lamination via the second interlayer insulating film 4 for the connecting line 301 in the sealed area (see FIG. 63(1)). On the other hand, for the connecting line 402, dummy wiring lines 4 comprising Al films are formed in lamination through the second interlayer insulating film 4. Therefore, the height of the surface of the third interlayer insulating film 7 in the sealed areas at the top and the bottom of the screen display area agrees with the height of the third interlayer insulating film 7 on the right and left sides of the screen display area. This stabilizes the control of the gap between substrates using gap material mixed with the entire sealing material 52.

The dummy wiring lines 302 and 401 for adjusting the total thickness in the sealed area may be electrically connected. Adoption of this configuration permits redundancy of the wiring lines. Electric floating poses no problem, and the wiring lines may be used as connecting lines for the other capacitor line 3b or the first light shielding film 11a.

In this embodiment, as shown in FIG. 62, the dummy wiring line 302 is further electrically connected to the connecting line 301 through a contact hole 305 provided in the second interlayer insulating film 4 (see FIG. 63(1) and 63(2)). Similarly, the dummy wiring line 401 is electrically connected to the connecting line 402. As a result, each of the connecting lines 301 and 402 has a redundant structure comprising two conductive layers (an Al film and a polysilicon film). Therefore, even when the connecting line 301 or 402 is broken by stress caused by the gap material under the sealed area, for example, or when a short circuit is caused with the other conductive film by the Al film breaking through the second insulating film 4 in a direction at right angles to the TFT array substrate 10, a wiring defect is never caused, thus providing an advantage.

Further, as shown in FIG. 63(3), a dummy wiring line 303 formed by a light shielding film of high-melting-point metal which is the same material as that for the first light shielding film 11a may be formed in lamination under the dummy wiring line 302 in addition to the configuration shown in FIG. 63(1). In this case, a redundant structure comprising the dummy wiring line 303 to the dummy wiring line 302 and the connecting line 301 through a contact hole is provided in the first interlayer insulating film 12', thus further reducing the risk of defective alignment by these three conducive films. At the same time, the dummy wiring line 303 may be used for adjusting the difference in height between the surface of the sealed area and the surface of the pixel area. The dummy wiring line 303 may therefore be electrically floated as a film only for film thickness adjustment, or as a wiring line for the capacitor line 3b or the first light shielding film 11a other than the data line 6a, not as a redundant wiring line of the connecting line 301.

In this embodiment, as shown in FIG. 63(1) and 63(2), the first interlayer insulating film 12' having a concave recess may comprise a single layer as in the case of forming a concave recess in the pixel area. As shown in FIG. 63(3), the first interlayer insulating film 12' may comprise a single layered portion of only the first insulating film 13 and a multilayered portion of the first and the second insulating films 13 and 13'.

In this embodiment, as shown in FIG. 62, the connecting line 301 of the data line and the dummy wiring line 302 laminated thereon have a stripe-shaped flat pattern in the sealed area, and a gap for light transmission corresponding to the wiring interval S is provided between adjacent wiring lines. In the manufacturing process of the electro-optical apparatus 100, therefore, when using a sealing material 52 comprising a photosetting resin, it is possible to sufficiently irradiate the light onto the sealing material 52 via the light transmitting gap in this lamination structure by irradiating the light via the TFT array substrate 10. It is therefore possible to cause satisfactory photosetting of the sealing material 52 comprising the photosetting resin by the effect of the light coming from the sides of the both substrates. When photosetting can be accomplished as described above, in particular, it is not necessary to give an excessive heat to the electro-optical as compared with the case of thermosetting, thus permitting prevention of thermal deterioration of the electro-optical apparatus 100 and inhibition of defects in equipment caused by thermal strain. Because only a short light irradiating time is required, damage does not occur in the alignment film. The tilting angle of the liquid crystal can be maintained at a high level, thus preventing image quality deterioration caused by defective alignment (i.e., disclination) of the liquid crystal.

In FIG. 61, the image signal line 115 comprises an Al film formed on the second interlayer insulating film 4. The sampling circuit driving signal line 114 running from the data line driving circuit 101 crossing the image signal line 115 to the connecting line 301a cannot therefore be composed of an Al film. It is therefore necessary to provide a three-dimensional relay wiring, as shown in FIG. 64, passing through the lower layer or the upper layer of the image signal line 115. The relay wiring must have the lowest possible time constant. The following method is therefore conceivable.

In FIG. 64(1), the relay wiring line 116a comprises the same polysilicon film so that the scanning line 3a runs under the second interlayer insulating film 4 so as to cross the image signal line 115. It electrically connects the sampling circuit driving signal line 114 on the data line driving circuit 101 side and the connecting line 301a on the sealed area side through a contact hole provided in the second interlayer insulating film 4 on both sides of the image signal line 115 in FIG. 64(1).

In FIG. 64(2), the relay wiring line 116b comprises a high-melting-point metal film such as W (tungsten), the same material as that for the first light shielding film 11a, and runs under the first interlayer insulating film 12' crossing the image signal line 115. It electrically connects the sampling circuit driving signal line 114 on the data line driving circuit 101 side and the connecting line 301 on the sealed area side through contact holes provided in the first interlayer insulating film 12' and the second interlayer insulating film 4 on both sides of the image signal line 115 in FIG. 64(2). This configuration permits forming the relay wiring line from a low-resistance high-melting-point metal or the like, thus making it possible to reduce wiring resistance, not resulting in a delay of sampling circuit driving signals.

In FIG. 64(3), the relay wiring line is composed of a relay wiring line 116a comprising the same polysilicon film as that of the scanning line 3a and a relay wiring line 116b comprising a high-melting-point, the same material as that for the first light shielding film 11a, which run under the second interlayer insulating film 4 and the first interlayer insulating film 12', respectively, so as to cross the image signal line 115. They electrically connect the sampling circuit driving signal line 114 on the data line driving circuit 101 side and the connecting line 301 on the sealed area side through contact holes provided in the first interlayer insulating film 12' and the second interlayer insulating film 4, respectively, on both sides of the image signal line 115 in FIG. 64(3). In this configuration, the relay wiring lines 116a and 116b are formed in the upper and the lower layers of the image signal line 115 through the first interlayer insulating film 12' and the second interlayer insulating film 4, thus permitting achievement of a redundant structure. Because the relay wiring line 116b comprises a low-resistance high-melting-point metal, it is possible to reduce wiring resistance without resulting in signal delay of sampling circuit driving signals. The relay wiring lines 116a and 116b are directly electrically connected in this embodiment. However, the relay wiring line 116b may be directly electrically connected to the sampling circuit signal line 114 or the connecting line 301 on the sealed area side.

Figure 67:
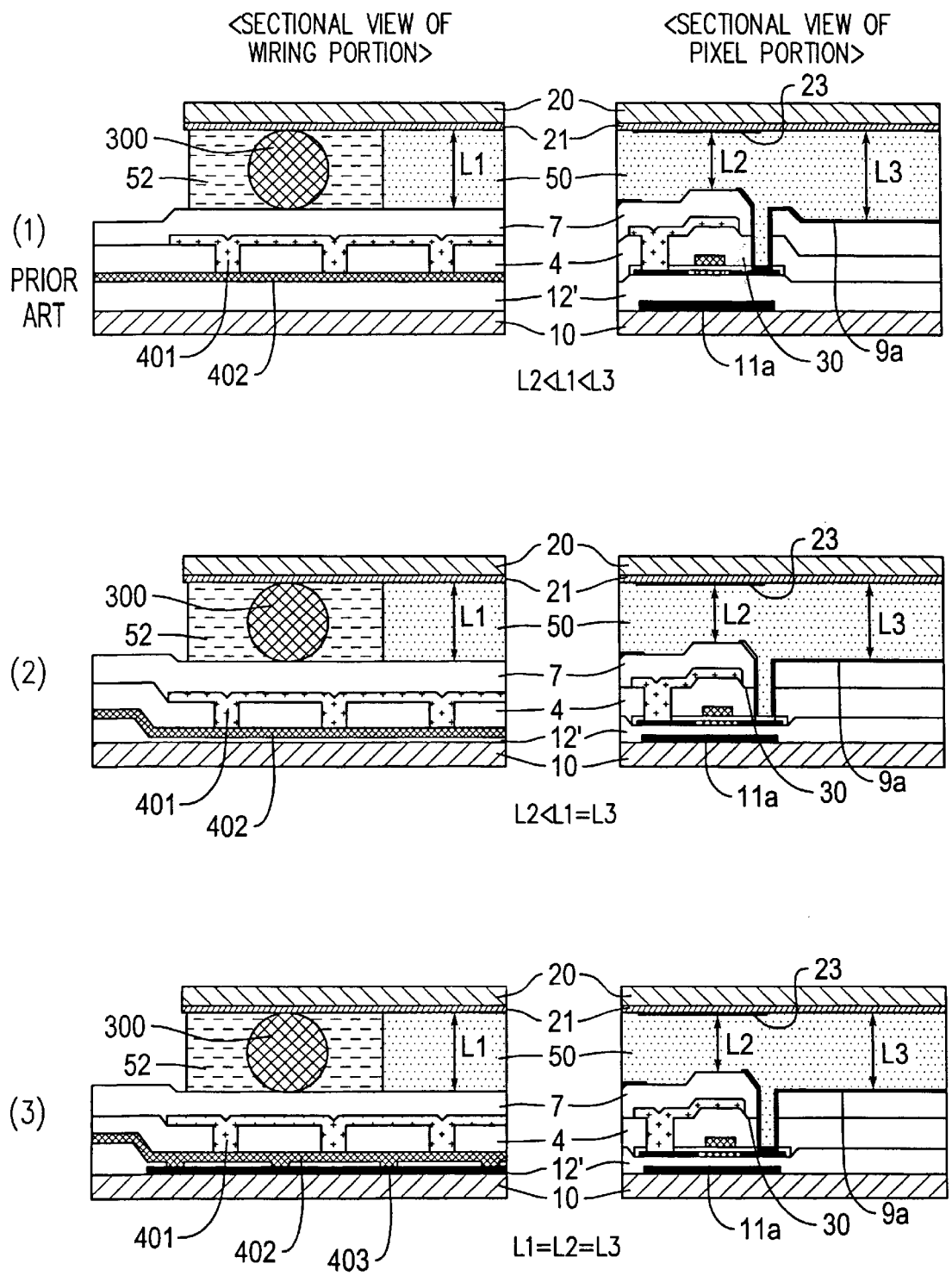
FIGS. 67(1)–67(3) are sectional views of a electro-optical apparatus at a sealed area and a pixel area, comparing various layer structures as to the gap between substrates in the sealed area and the pixel area.

In FIG. 64(4), the relay wiring line has a configuration, in addition to that shown in FIG. 64(3), in which a connecting line 116c comprising the same conductive light shielding film as the light shielding film comprising a high-melting-point metal for regulating at least a part of the pixel aperture area which runs further on the third interlayer insulating film 7 so as to cross the image signal line 115, and a fourth interlayer insulating film 117 is formed thereon. It electrically connects the sampling circuit driving signal line 114 on the data line driving circuit 101 side and the connecting line 301a on the sealed area side through contact holes provided in the third interlayer insulating film 7 on both sides of the image signal line 115 in FIG. 64(4). In this configuration, the relay wiring line is composed of three layers 116a, 116b and 116c in the upper and the lower layers of the image signal line 115 via the first interlayer insulating film 12', the second interlayer insulating film 4 and the third interlayer insulating film 7. This permits achievement of a further redundant structure. The relay wiring lines 116b and 116c comprise a low-resistance high-melting-point metal. It is therefore possible to further reduce wiring resistance without leading to a signal delay of the sampling circuit driving signal. The gap (i. e., thickness of the sealing material 52), between substrates in the sealed area shown in FIGS. 61 to 64, and the gap (i. e., the thickness of the electro-optical material 50) between substrates in the pixel area shown in FIGS. 58 to 60 will now be described with reference to FIG. 67 while comparing various forms. In FIG. 67, the sealed area passed through by the connecting line 401 of the scanning line is compared with the pixel area. As shown in FIGS. 63(1) and 63(2), this is also the case with the sealed area passing through by the connecting line 301.

As shown in FIG. 67(1), it has been conventional to provide connecting lines having a redundant structure mainly from the Al film composing the data line and the polysilicon films composing the scanning line and the capacitor line under the scaled area without alight first shielding film 11a, and not to incorporate the connecting lines 401, 402 in the concave portion of the interlayer insulating film 12'. In this case, the surface of the sealed area is taller than the surface of the pixel area by the height of the Al film and the polysilicon film, and lower by the height of the ITO film composing the pixel electrode. Therefore, the gap L1 between substrates in the sealed area is smaller than the gap L3 between substrates in the pixel area (for example, by about 6,000 to 8,000 Å). In this case, on the other hand, the surface of the sealed area is lower than the TFT forming area by the first light shielding film 11a, the semiconductor layer 1a and the gate insulating film. The gap L1 between substrates in the sealed area is larger than the gap L2 between substrates in the TFT forming area (L2<L1<L3).

Then, as shown in FIG. 67(2), connecting lines having a redundant structure from the Al film and the polysilicon film under the sealed area are provided without having a first light shielding film 11a, and the connecting lines 401, 402 are buried in the concave recess of the first interlayer insulating film. In this case, the surface of the sealed area is lower by the depth of the concave recess as compared with the case shown FIG. 67(1). As a result, the gap L1 between substrates in the sealed area becomes equal to the gap L3 between substrates in the pixel area. The gap L1 between substrates in the sealed area is larger than the gap L2 between substrates in the TFT forming area (L2<L1=L3).

As shown in FIG. 67(3), connecting lines 401, 402, 403 having a redundant structure from the Al film and the polysilicon film are provided under the sealed area, providing a first light shielding film 11a, and the connecting lines are incorporated in the concave recess of the interlayer insulating film. In this case, the surface of the sealed area becomes higher by the first light shielding film 11a as compared with the example shown in FIG. 67(2). However, because the depth of the concave recess is correspondingly larger, the gap L1 between substrates in the sealed are becomes equal to the gap L3 between substrates in the pixel area. The gap L1 between substrates in the sealed area becomes substantially equal to the gap L2 between substrates in the TFT forming area (L1=L2=L3).

In this embodiment, as shown in FIGS. 67(2) and 67(3), the gaps between substrates can be made substantially equal between the pixel area and the sealed area by burying the connecting lines 301 and 401 into the concave recess formed on the interlayer insulating film 12'. It is therefore unnecessary to use a gap filler having a diameter smaller than the gap between substrates in the pixel area by about 1 μm as in the conventional art shown in FIG. 67(1). Hence, it is possible to use a gap material having a diameter of the same order as the gap between substrates. This permits expectation of a considerable effect when reducing the gap between substrates with a view to preventing defection alignment of a liquid crystal caused by refinement of pixels as described above. More specifically, when reducing the gap between substrates from 4 μm to 3 μm or 2 μm, a very fine gap filler having a diameter of 2 μm or 1 μm is required if the surface of the sealed area is not flattened which makes it very difficult to practically achieve high accurate gap control. When the surface of the sealed area is flattened as in this embodiment, it suffices to provide a gap filler having a diameter of 3 μm or 2 μm equal to the gap between substrates. It is thus possible to conduct high-accuracy gap control using a gap filler having a relatively large diameter. A reduced gap leads to a serious decrease in adhesion of the photosetting resin contained in the sealing material, and to a decrease in reliability. In this embodiment, a gap of the same order can be ensured even under the sealed area, thus causing no trouble in bonding strength between substrates of the electro-optical apparatus.

Figure 68:
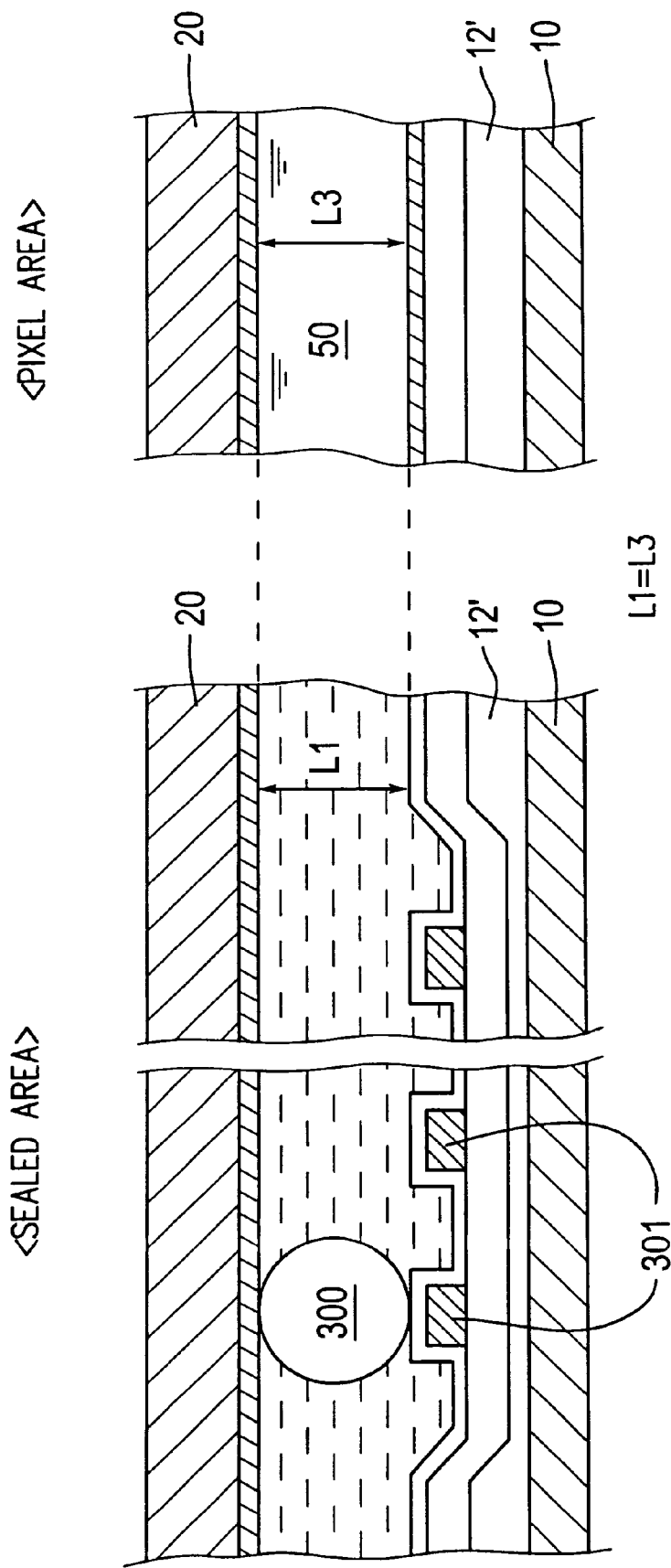
FIG. 68 is a sectional view of a electro-optical apparatus at a sealed area and a pixel area, comparing gaps between substrates between the sealed area and the pixel area in an embodiment of the invention.

From the aforementioned point of view, as shown in FIG. 68, the entire sealed area may be formed into a concave recess including the portion not opposite to the connecting line 301 in addition to the position opposite to the connecting line 301 in the first interlayer insulating film 12'. In such a configuration, the difference in height between the sealed area surface (i.e., surfaces of the projecting portions located on the plurality of connecting lines 301 within the sealed area which is concave as a whole) becomes smaller than the pixel area. By using a gap material having a diameter (L1) of the same order as the gap (L3) between substrates, it is possible to perform high-accuracy gap control.

Figure 69:
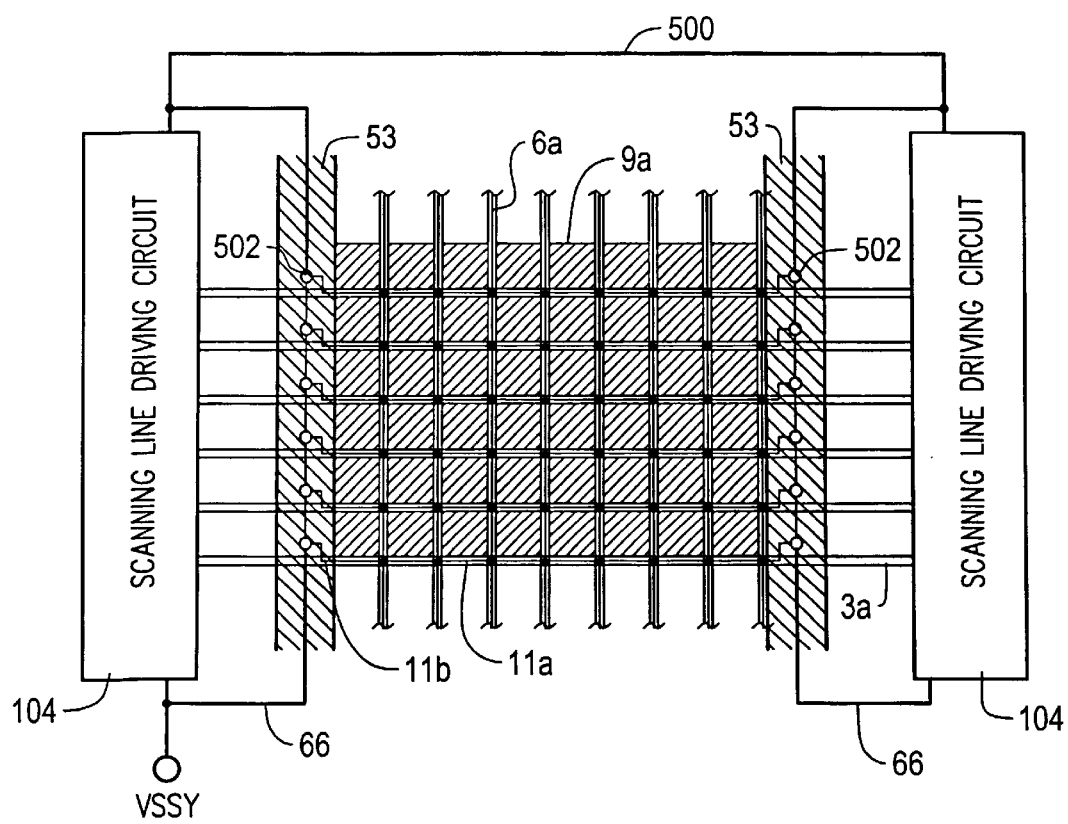
FIG. 69 is a plan view of wiring on a TFT array substrate illustrating an example of connection of a constant potential source and a light shielding film in one embodiment of the invention.

Electric connection between the constant potential line 6b and the light shielding wiring line 11b will now be described with reference to FIG. 69. FIG. 69 is a plan view of the wiring on the TFT array substrate, which illustrates an example of connection between the constant potential line 6b and the light shielding wiring 11b.

In this example, as shown in FIG. 69, scanning line driving circuit 104 is provided on both sides of the screen display area, and a constant potential power VSSY is supplied via an external input terminal and a constant potential line 6b from an external power supply. The constant potential line 6b comprises, for example, the same Al film as the data line 6a and particularly includes a portion wired along the third light shielding film 53 thereunder. The first light shielding film 11a runs along the scanning line 3a, the capacitor line 3b and the data line 6a within the screen display area, and is connected to the constant potential line 500 under the third light shielding film 53 as a frame through a contact hole 502. Effective use of the dead space under the third light shielding film 53 makes it possible to connect the constant potential line 6b and the first light shielding film 11a under the third light shielding film 53 through the contact hole 502. The constant potential line 6b does not pose any problem even when using a constant potential power supply of the data line driving circuit 101.

Figure 74:
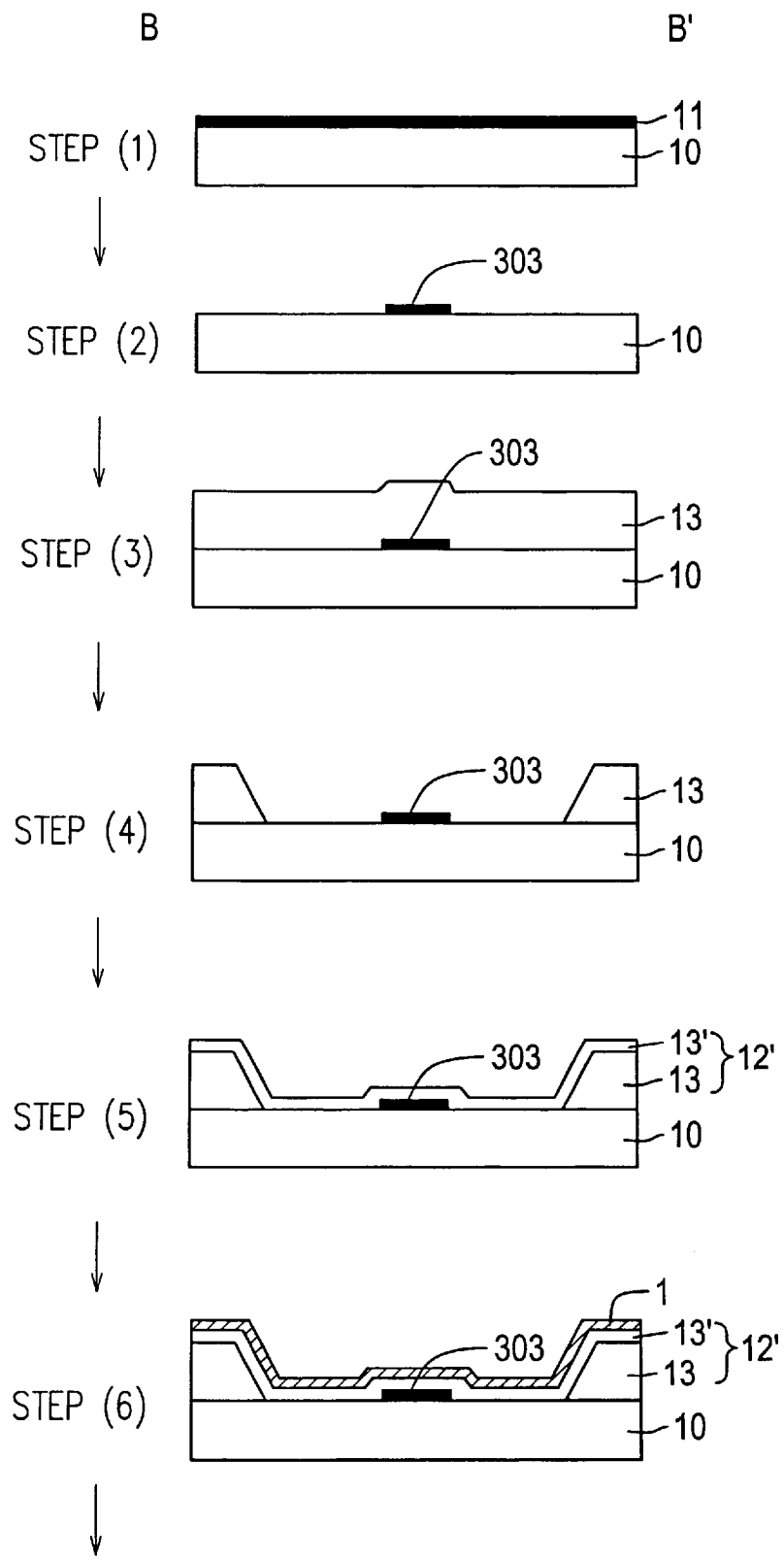
FIGS. 74(1)–74(6) are process diagrams of the portion shown in FIG. 63(3) of the manufacturing process of an embodiment of the electro-optical apparatus.
Figure 75:
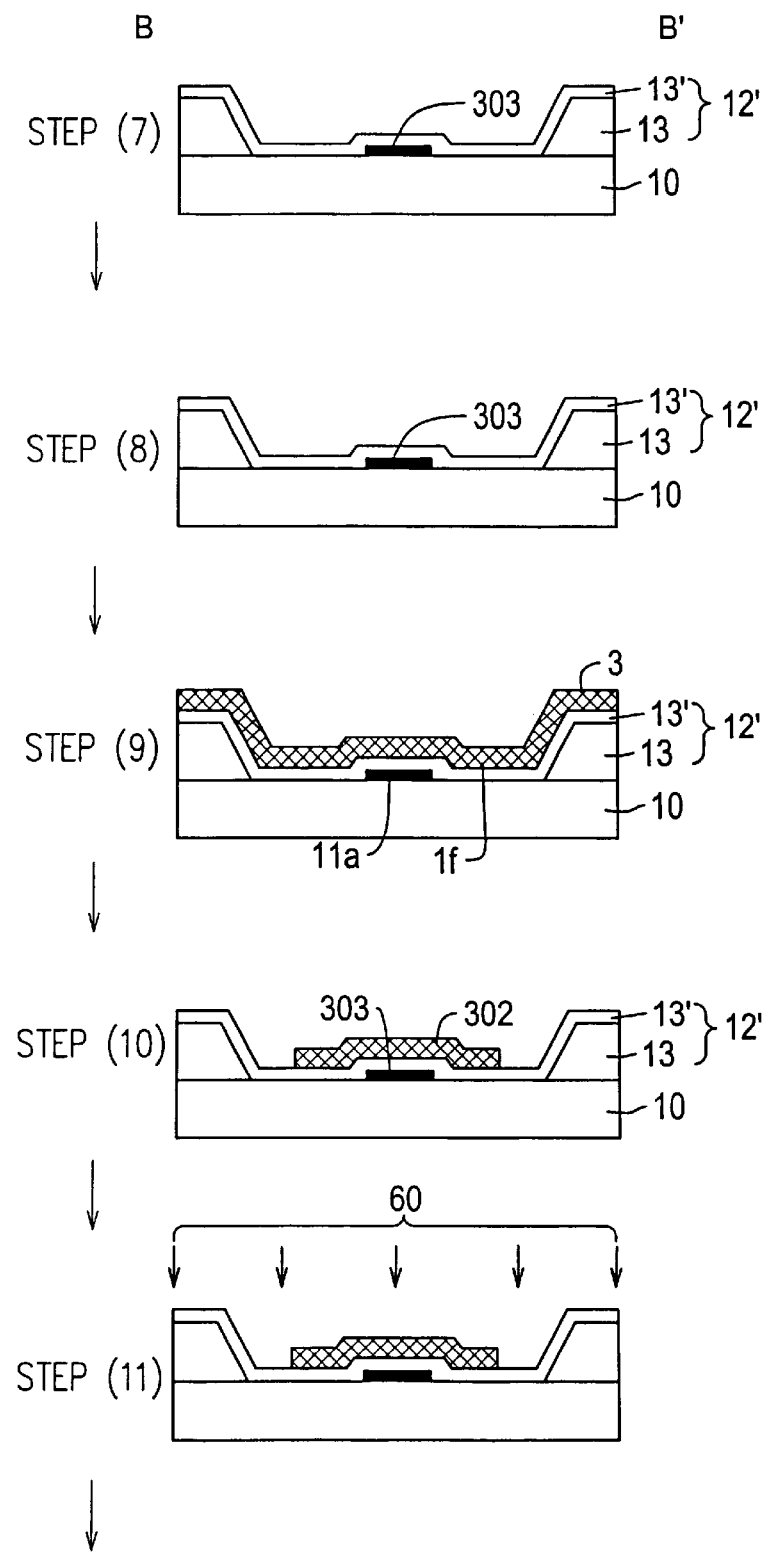
FIGS. 75(7)–75(11) are process diagrams of the portion shown in FIG. 63(3) of the manufacturing process of an embodiment of the electro-optical apparatus.
Figure 76:
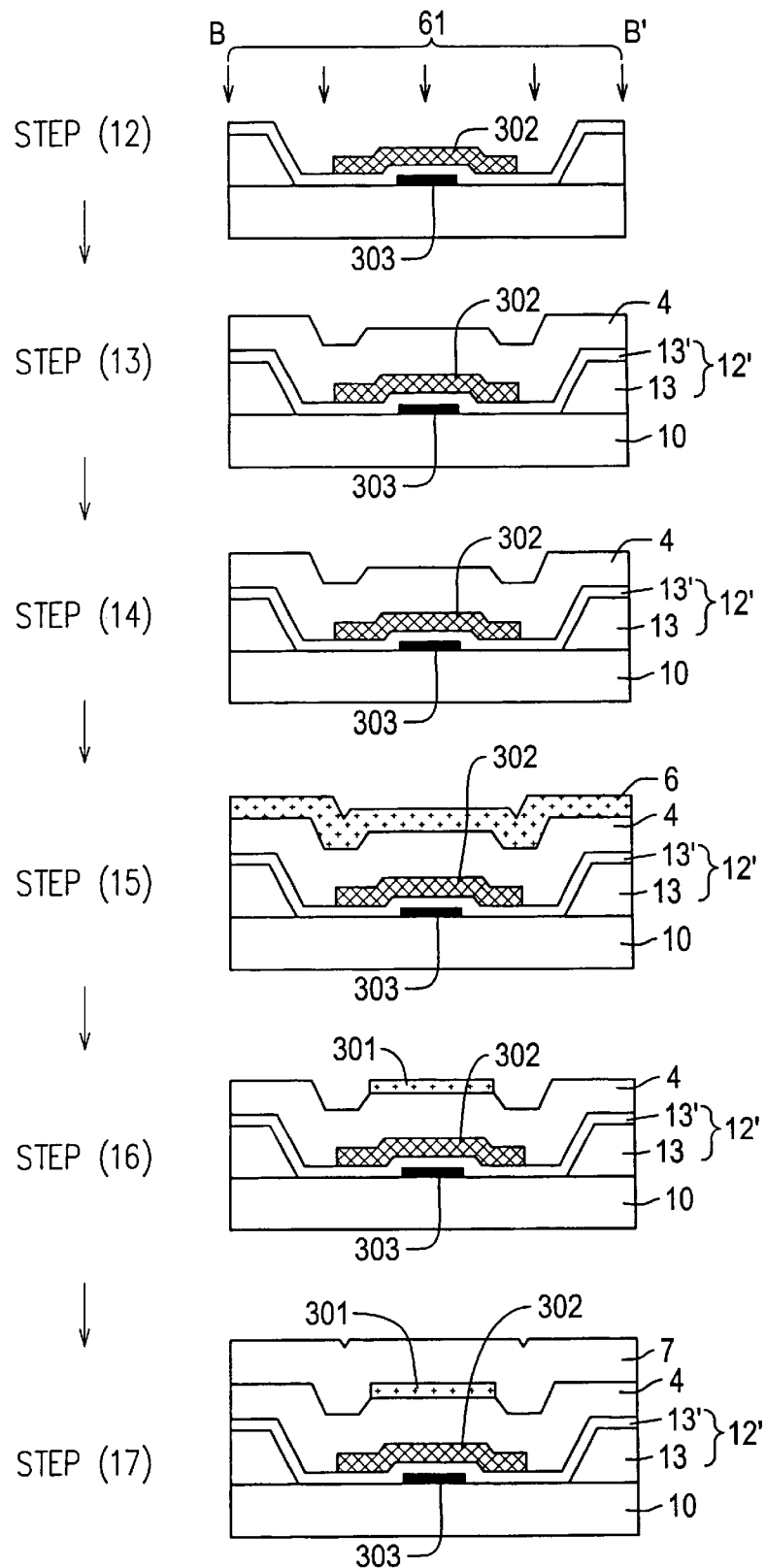
FIGS. 76(12)–76(17) are process diagrams of the portion shown in FIG. 63(3) of the manufacturing process of an embodiment of the electro-optical apparatus.

The manufacturing process of the electro-optical apparatus 100 having this configuration will now be described with reference to FIGS. 70 to 76. FIGS. 70 to 76 illustrate the individual layers on the TFT array substrate side in each step with reference to the A–A' cross section of FIG. 59. FIGS. 74 to 76 show each layer laminated on the connecting section of the data line under the sealed area in each step. Steps (1) to (17) of these drawings are performed in a lump as the same steps at different portions on the TFT array substrate.

The manufacturing process of the portion including the pixel switching TFT 30 corresponding to the A–A' cross-section of FIG. 59 will now be described with reference to FIGS. 70 to 73.

Figure 70:
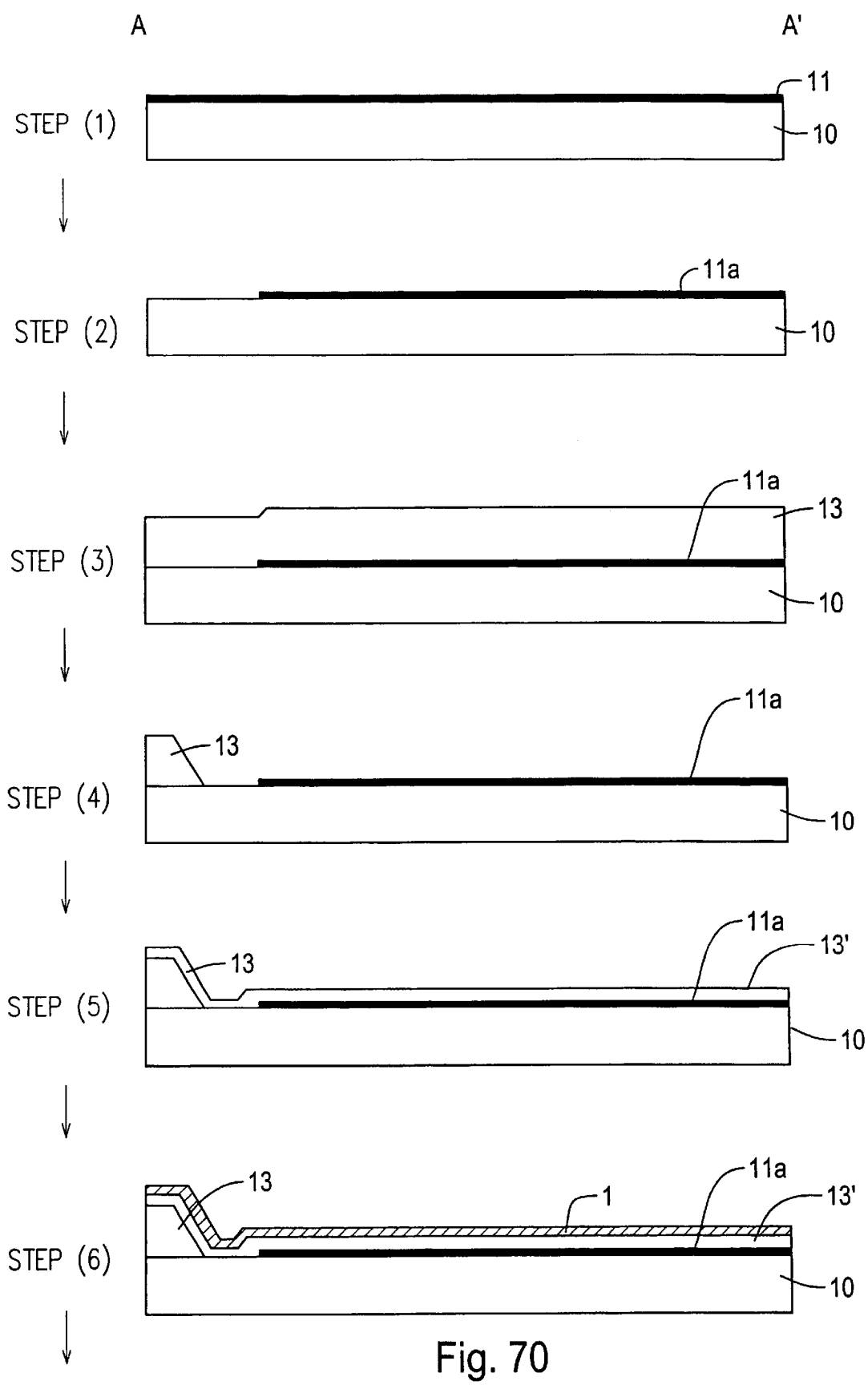
FIGS. 70(1)–70(6) are process diagrams sequentially illustrating the portion shown in FIG. 59 of the manufacturing process of an embodiment of a electro-optical apparatus.

As shown in step (1) of FIG. 70, a TFT array substrate comprising a quartz substrate or a hard glass substrate is prepared. The substrate should preferably be annealed in an inert gas atmosphere such as $N_2$ (nitrogen) and at a high temperature of from 900 to 1,300° C. as a pretreatment to minimize strain produced in the TFT array substrate 10 in subsequent high-temperature process. That is, the TFT array substrate is previously heat-treated at a temperature equal to or superior to the highest temperature in the subsequent high-temperature treatment.

A metal-alloy film made of a metal such as Ti, Cr, W, Ta, Mo or Pd or a metal silicide is formed by sputtering into a light shielding film 11 having a thickness of from 1,000 to 5,000 A, or preferably, about 2,000 A on the entire surface of the thus treated TFT array substrate.

Then, a first light shielding film 11a is formed by forming a mask corresponding to a pattern of the first light shielding film 1a by photolithography on the thus formed light shielding film 11, as shown in step (2).

Then, as shown in step (3), a first interlayer insulating film 13 (i.e, the lower layer of the double-layered first interlayer insulating film 12') comprising a silicate glass film of NSG, PSG, BSG or BPSG, a silicon nitride film or a silicon oxide film by the use of TEOS gas, TEB gas, or TMOP gas may be formed by the room-temperature or vacuum CVD process. This first interlayer insulating film 13 (i.e., lower layer of the double-layered first interlayer insulating film 12') should have a thickness within a range of from 8,000 to 12,000 A.

Then, as shown in step (4), etching is applied to an area where the pixel switching TFT 30, the data line 6a, the scanning lines 3a and the capacitor lines 3b are to be formed thereabove to remove the first insulating film 13 in this area. When a treatment is carried out by dry etching such as reactive ion etching or reactive ion beam etching, the first insulating film 13 can be removed anisotropically with substantially the same size as the resist mask formed by photolithography, thus permitting easy control as designed in size. When using wet etching, on the other hand, isotropy provides a wider aperture area of the first interlayer insulating film 13. However, because the side wall of the aperture can be tapered, the polysilicon films or the resist for forming scanning lines 3a in a subsequent step never remains on the periphery of the aperture side wall without being etched or peeled off, thus preventing the yield from decreasing. Tapering the aperture side wall of the first interlayer insulating film 13 may be accomplished by dry etching, then withdrawing the resist pattern, and then conducting dry etching once again.

When burying a part, not all, of the pixel switching TFT 30, the data line 6a, the scanning line 3a and the capacitor line 3b (for example, only part of the capacitor line) into the concave recess, it suffices to apply etching to the first insulating film 13 by the use of a mask corresponding to the wiring lines or the like to be buried.

Then, as shown in step (5), a second insulating film 13' (i.e., the upper layer of the double-layered first interlayer insulating film 12') comprising a silicate glass film, a silicon nitride film or silicon oxide film is formed in the same manner as the first insulating film 13 on the first light shielding film 11a and the first insulating film 13. The second insulating film 13' has a thickness of from 1,000 to 2,000 A. The second insulating film 3 may be annealed at about 900° C. to prevent contamination and may be flattened.

The first insulating film 13 and the second insulating film 13' forming the first interlayer insulating film 12' have such a thickness that the pixel area becomes substantially flat before formation of the pixel electrode 9a in a subsequent step.

Then, as shown in step (6), an amorphous silicon film is formed by the vacuum CVD process (for example, CVD under a pressure of from 20 to 40 Pa) using monosilane gas or disilane gas at a flow rate of from 400 to 600 cc/min in a relatively low-temperature environment at a temperature of from 450 to 500° C., or preferably at about 500° C., on the second interlayer insulating film 13'. Subsequently, a polysilicon film 1 may undergo solid-phase growth up to a thickness of from 500 to 2,000 A, or preferably, about 1,000 A by applying an annealing treatment in a nitrogen atmosphere at 600 to 700° C. for a period of from 1 to 10 hours, or preferably, from 4 to 6 hours. When preparing an n-channel type TFT 30, a slight amount of a V-family dopant such as 5b, As or P is dopped by ion injection or the like in the channel area. When preparing a p-channel type TFT 30, a slight amount of a III-family dopant such as B, Ga, or In is dopped by ion injection or the like. A polysilicon film 1 may be formed directly by the vacuum CVD process or the like without forming an amorphous silicon film. Or, a polysilicon film 1 may be formed by injecting silicon ions into a polysilicon film deposited by the vacuum CVD process or the like once to prepare a noncrystalline (amorphous film), and recrystallizing the same through an annealing treatment or the like.

Figure 71:
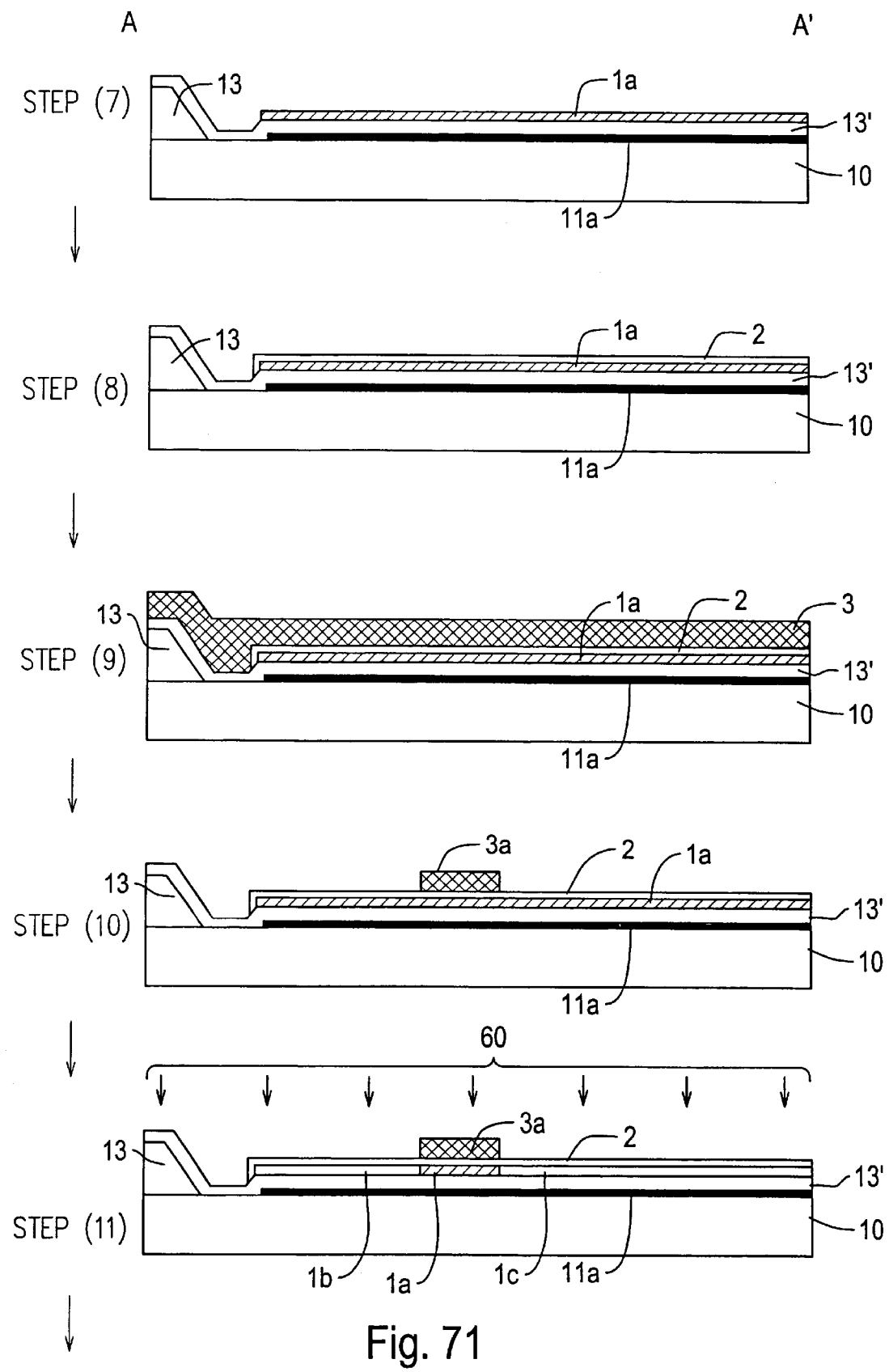
FIGS. 71(7)–71(11) are process diagrams sequentially illustrating the portion shown in FIG. 59 of the manufacturing process of an embodiment of a electro-optical apparatus.

Then, as shown in step (7) of FIG. 71, a semiconductor layer 1a of a prescribed pattern as shown in FIG. 63 may be formed through a photolithographic step or an etching step.

Then, as shown in step (8), a thermal-oxidized silicon film having a relatively small thickness of about 300 A is formed through thermal oxidation of the semiconductor layer 1a forming the pixel switching TFT 30, together with the semiconductor layer 1f, at a temperature of from 900 to 1,300° C., or preferably at about 1,000° C. Further, a high-temperature silicon oxide film (HTO film) or a silicon nitride film is deposited by the vacuum CVD process into a relatively small thickness of about 500 A. This results in a thickness of the semiconductor layer 1a within a range of from 300 to 1,500 A, or preferably from 350 to 500 A, and a thickness of the gate insulating film 2 within a range of from 200 to 1,500 A, or preferably, from 300 to 1,000 A. By reducing the high-temperature thermal oxidation time, it is possible to prevent a camber by heat when using a large-sized substrate of about 8 inches. However, the gate insulating film 2 having a single-layered structure may be formed by thermally oxidizing the polysilicon film 1.

Then, as shown in step (9), the polysilicon film 3 is made conductive by depositing the polysilicon film 3 by the vacuum CVD process or the like, and then, thermally diffusing phosphorus (P). Or, a doped polysilicon film prepared by introducing phosphorus ions simultaneously with formation of the polysilicon film 3 may be employed.

Then, as shown in step (10), a scanning line 3a of a prescribed pattern as shown in FIG. 63 is formed through a photolithographic step or an etching step using a mask. The scanning line 3a has a thickness, for example, of about 3,500 A. The scanning line 3a may be formed from a film of a high-melting-point metal such as W or Mo or a metal silicide, not a polysilicon film, or may be formed into a multilayered structure by combining a metal film or a metal silicide film and the polysilicon film. In this case, if the scanning line 3a is arranged as a light shielding film corresponding to all or part of the area covered by the second light shielding film 23, it is possible to omit all or part of the light shielding film 23 under the effect of light shielding property of the metal film or the metal silicide film. This provides a particular advantage in that it is possible to prevent a decrease in the pixel aperture ratio caused by a shift in bonding of the opposing substrate 20 and the TFT array substrate 10.

Then, as shown in step (11), when the pixel switching TFT 30 is an n-channel type TFT having an LDD structure, to form first a low-concentration source area 1b and a low-concentration drain area 1c on the semiconductor layer 1a, a V-family dopant 60 such as P is dopped in a low concentration (for example, P ions in a dose within a range of from 1 to $3 \times 10^{13}/cm^2$ with the scanning line 3a as a diffusion mask. As a result, the semiconductor layer 1a under the scanning line 3a becomes a channel area 1a'.

Figure 72:
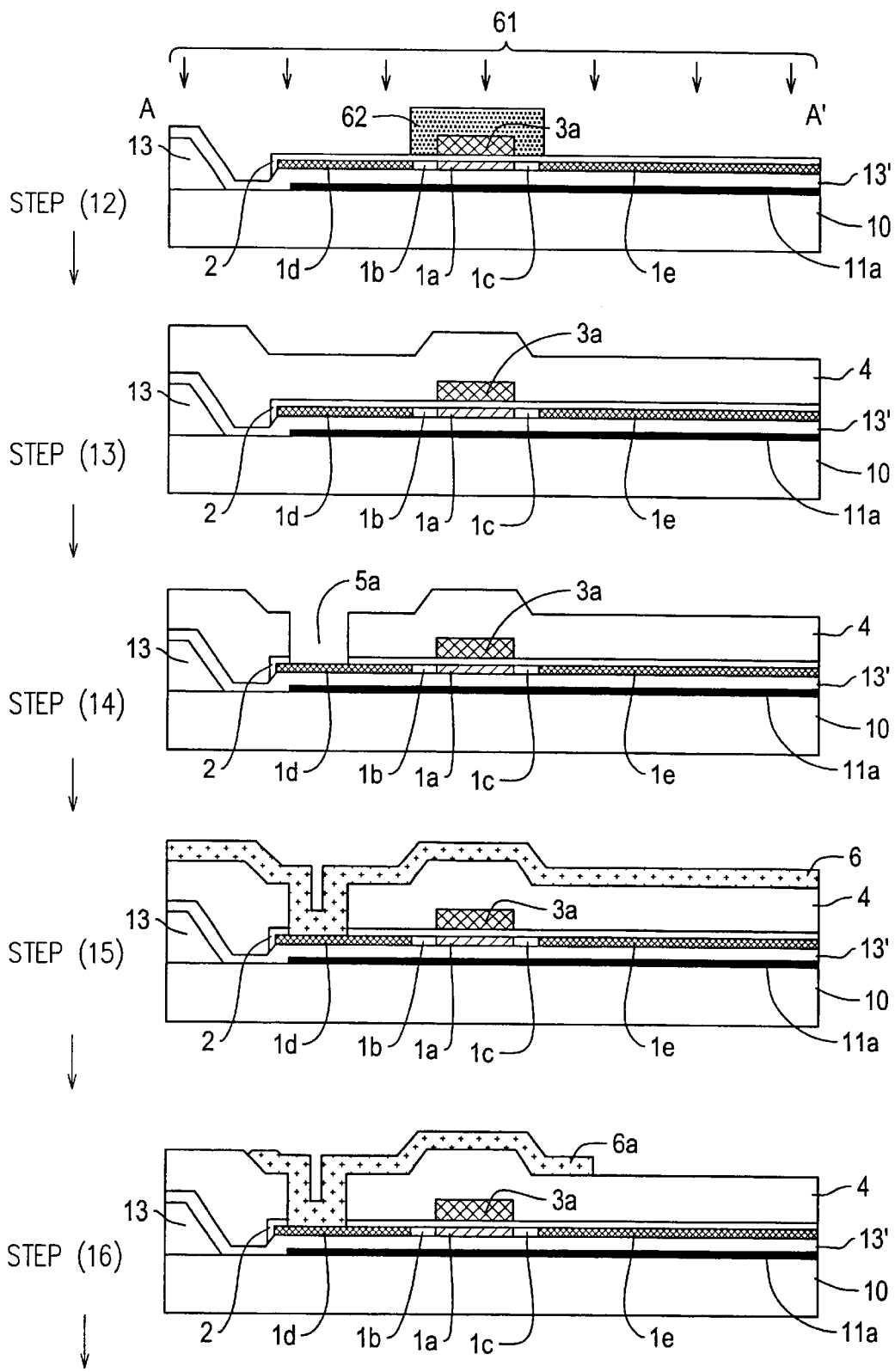
FIGS. 72(12)–72(16) are process diagrams sequentially illustrating the portion shown in FIG. 59 of the manufacturing process of an embodiment of a electro-optical apparatus.

Then, as shown in step (12) of FIG. 72, a resist layer 62 is formed with a mask having a width larger than the scanning line 3a to form a high-concentration source area 1b and a high-concentration drain area 1c forming the pixel switching TFT 30, and then a V-family dopant 201 such as P is dopped at a high concentration (for example, P ions in a dose within a range of from 1 to $3 \times 10^{15}/cm^2$). When the pixel switching TFT 30 is of the p-channel type, doping is carried out with the use of a III-family dopant such as B to form a low-concentration source area 1b, a low-concentration drain area 1e, a high-concentration source area 1d and a high-concentration drain area 1e on the n-type semiconductor layer 1a. Adoption of the LDD structure as described above of permits reduction of a channel effect. However, for example, a TFT of the offset structure may be adopted without conducting low-concentration doping, or a self-alignment type TFT may be used by the application of the ion injection technique using P ions or B ions with the scanning line 3a as a mask.

In parallel with these steps, a data line driving circuit 101 and a scanning line driving circuit 104 having the complementary structure composed of an n-channel type TFTs and a p-channel type TFTs are formed on the periphery of the TFT array substrate 10. When the semiconducor layer 1a of the pixel switching TFT 30 is made of polysilicon in this embodiment, the peripheral circuit such as the data line driving circuit 101 and the scanning line driving circuit 104 can be formed through substantially the same steps at the time of forming the pixel switching TFT 30, thus providing advantages in manufacture.

Then, as shown in step (13), a second interlayer insulating film 4 comprising a silicate glass film made of NSG, PSG, BSG or BPSG, a silicon nitride film or a silicon oxide film is formed by the use of atmospheric-pressure or vacuum CVD process or TEOS gas, for example, so as to cover the scanning line 3a. The second interlayer insulating film 4 should preferably have a thickness within a range of from 5,000 to 15,000 A.

Then, as shown in step (14), annealing is carried out at about 1,000° C. for about 20 minutes for activating the high-concentration source area 1d and the high-concentration drain area 1e, and then, a contact hole 5a for the data line 6a is formed by dry etching such as reactive ion etching or reactive ion beam etching. In this case, providing an aperture of the contact hole 5a by anitostropic etching such as reactive ion etching or reactive ion beam etching provides an advantage in that the aperture can have substantially the same shape as the mask shape. Aperturing by a combination of dry etching and wet etching, which allows to make a tapered contact hole 5a may prevent breakage upon connecting wiring lines. A contact hole for connecting the scanning line 3a to wiring lines (not shown) can be provided in the second interlayer insulating film 4 through the same step as that of the contact hole 5a.

Then, as shown in step (15), a metal film 6 made of a light-shielding low-resistance metal such as Al or metal silicide may be deposited on the second interlayer insulating film 4 by sputtering or the like to a thickness of from 1,000 to 5,000 A, or preferably, about 3,000 A, and further, as shown in step (16), data lines 6a may be formed through a photolithographic step or an etching step.

Figure 73:
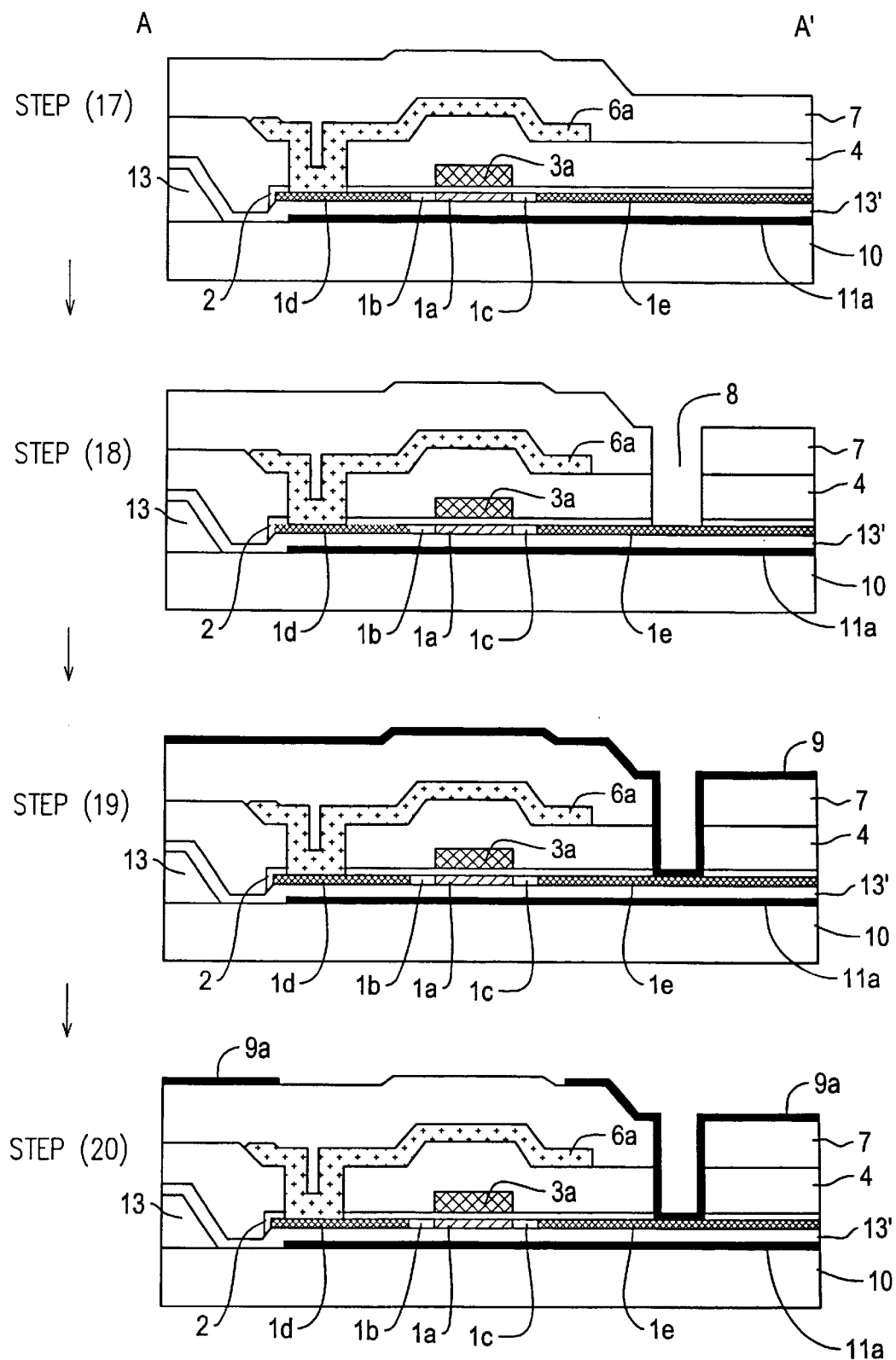
FIGS. 73(17)–73(20) are process diagrams sequentially illustrating the portion shown in FIG. 59 of the manufacturing process of an embodiment of a electro-optical apparatus.

Then, as shown in step (17) in FIG. 73, a third interlayer insulating film 7 comprising a silicate glass film made of NSG, PSG, BSG or BPSG, a silicon nitride film or a silicon oxide film may be formed by the use of the atmospheric-pressure or vacuum CVD process or TEOS gas or the like so as to cover the data lines 6a. The third interlayer insulating film 7 should preferably have a thickness of from 5,000 to 15,000 A.

In this embodiment, particularly in steps (4) and (5) shown in FIG. 70, concave recesses are formed on the first interlayer insulating film at portions where the TFT and wiring lines are to be formed. Therefore, the surface of the pixel area located above the capacitor line 3b becomes substantially flat upon completion of this step (17). In order to further flattening, a flat film may be formed by spin-coating an organic film of SOG film or applying a CMP treatment in place of, or in addition to, the silicate glass film composing the third interlayer insulating film 7.

Then, as shown in step (18), a contact hole 8 for electrically connecting the pixel electrode 9a and the high-concentration drain area 1e is formed through dry etching such as reactive ion etching or reactive ion beam etching. In this case, providing an aperture of the contact hole 8 by anisotropic etching such as reactive ion etching or reactive ion beam etching provides an advantage in that the aperture can have substantially the same shape as the mask shape. Aperturing by a combination of dry etching and wet etching, which allows to make a tapered contact hole 8 may prevent breakage upon connecting wiring lines.

Then, as shown in step (19), a transparent conductive thin film 9 such as an ITO film is deposited by sputtering or the like to a thickness of from 500 to 2,000 A on the third interlayer insulating film 7, and further as shown in step (20), a pixel electrode 9a is formed through a photolithographic step, an etching step or the like. When the electro-optical apparatus 100 is used for a reflection type electro-optical apparatus, the pixel electrode 9a may be made of a non-transparent material having a high reflectivity such as Al.

Step (1) shown in FIG. 74 to step (17) shown in FIG. 76 are performed as the same manufacturing process as step (1) shown in FIG. 70 to step (17) shown in FIG. 73.

More specifically, as shown in step (1) of FIG. 74, after forming a light shielding film 11 over the entire surface of the TFT array substrate 10, a dummy wiring line 303 comprising a light shielding film is formed through a photolithographic step or an etching step as shown in step (2).

Then, as shown in step (3), a first insulating film 13 (i.e., lower layer of the double-layered first interlayer insulating film 12') is formed on the dummy wiring line 303, and as shown in step (4), etching is applied to an area where the connecting line 301 is to be formed thereabove to remove the first insulating film 13 in this area. When dry etching such as reactive ion etching or reactive ion beam etching, the first insulating film 13 can be anisotropically removed in substantially the same size as the resist mask formed by photolithography, thus providing easy control as designed in size. When wet etching is used, on the other hand, isotropy leads to a wider aperture area of the first insulating film 13. Because the side wall of the aperture can be tapered, the polysilicon film 3 or the resist for forming the scanning line 3a in a subsequent step does not remain on or around the side wall of the aperture without being etched or peeled off, thus preventing to lead to a decrease in yield. Tapering of the aperture side wall of the first insulating film 13 may be accomplished after dry etching, withdrawing the resist pattern, and then conducting dry etching again. Dry etching and wet etching may be combined.

Then, as shown in step (5), a second insulating film 13' (i.e, upper layer of the double-layered first interlayer insulating film 12') is formed on the dummy wiring line 303 and the first insulating film 12.

Then, as shown in step (6), after forming an amorphous silicon film on the second insulating film 13 to generate a pixel switching TFT 30, the polysilicon film 1 is subjected to solid-phase growth. Since this sealed area does not require a semiconductor layer, the polysilicon film 1 is completely removed from this sealed area through an etching step or the like. When the dummy wiring line 303 is made redundant for the connecting wiring line 301 during steps (5) to (7) described above, a contact hole is provided in the second insulating film 13' above the dummy wiring line 303. The connecting wiring line 301 may be formed directly from an Al film extended from the data line.

Then, upon completion of the thermal oxidation in step (8) of the pixel section, a polysilicon film 3 is deposited as shown in step (9), and then as shown in step (10), a dummy wiring line 302 is formed from the same layer as the scanning line 3a through a photolithographic step or an etching step. The dummy wiring line 302 therefore has a thickness of, for example, about 3,500 A, as in the case of the scanning line 3a.

Then, as shown in step (11) of FIG. 75 and step (12) of FIG. 76, impurity ions are doped to reduce resistance of the dummy wiring line 302.

Then, as shown in step (13), a second interlayer insulating film 4 is formed so as to cover the dummy wiring line 302. In the etching step of step (14), when the connecting wiring line 302 of the data line is made redundant for the connecting wiring line 301, a contact hole is provided in the second interlayer insulating film 4 above the dummy wiring line 302.

Then, as shown in step (15), a metal film 6 comprising Al or the like is deposited by sputtering on the second interlayer insulating film 4. Then, as shown in step (16), an connecting wiring line 301 is formed through a photolithographic step or an etching step.

Then, as shown in step (17), a third interlayer insulating film 7 is formed so as to cover the connecting wiring line 301.

In this embodiment, the first interlayer insulating film 12' is formed into a concave recess at the portion of the connecting wiring line 301, particularly in steps (4) and (5) shown in FIG. 74. Upon completion of step (17), therefore, the surface of the pixel area becomes substantially flat.

According to the manufacturing method of the electro-optical apparatus of the embodiment described above, contact holes for connecting the light shielding wiring 11b and the constant potential line 6b are provided in the second interlayer insulating film 4 and the first insulating film 13 (i.e., upper layer of the first interlayer insulating film) up to the light shielding wiring 11b. At the same time, the contact hole 5a for connecting the pixel switching TFT 30 and the data line 6a is provided in the second interlayer insulating film 4 up to the semiconductor layer 1a. It is therefore possible to make these contact holes together, providing an advantage in manufacture. For example, it is possible to pierce these two kinds of contact hole to respective prescribed depths through wet etching by setting an appropriate value of selection ratio. Particularly, it is easier to pierce these contact holes in response to the depth of concave portion of the first interlayer insulating film 12'. Because the piercing step of the contact holes for connecting the light shielding wiring 11b and the constant potential line 6b (a photolithographic step, or an etching step) can be omitted, an increase in the manufacturing cost resulting from the increase of the processes or a decrease in yield can be avoided.

According to the manufacturing process of this embodiment, the thickness of the first interlayer insulating film 12' at the concave portion can be relatively easily, certainly and highly accurately controlled through control of the thickness of the second insulating film 13'. It is therefore possible to achieve a very small thickness at this portion of the first interlayer insulating film 12'.

When the first interlayer insulating film 12" comprises a single layer, it suffices to carry out steps by making slight modifications in steps (3), (4) and (5) shown in FIGS. 70 and 74. More specificality, in step (3), the first interlayer insulating film 12" comprising a slightly thick single layer having a thickness of from 10,000 to 15,000 A is deposited on the first light shielding film 11a or the dummy wiring line 303, and in step (4), etching is applied to an area where the pixel switching TFT 30, the data line 6a, the scanning line 3a, the capacitor line 3b and the connecting wiring line 301, 402 are to be formed thereabove to leave a thickness of from 1,000 to 2,000 A at this portion of the first interlayer insulating film 12". Step (5) is thus omitted. By forming the first interlayer insulating film 12" from a single layer, it is not necessary to increase the number of layers even compared with the conventional case, and control of the thickness of the concave portion and not-concave portion through control of the etching time is favorable for flattening.

An embodiment of an electronic device equipped with the electro-optical apparatus 100 will now be described with reference to FIGS. 77 to 81.

Figure 77:
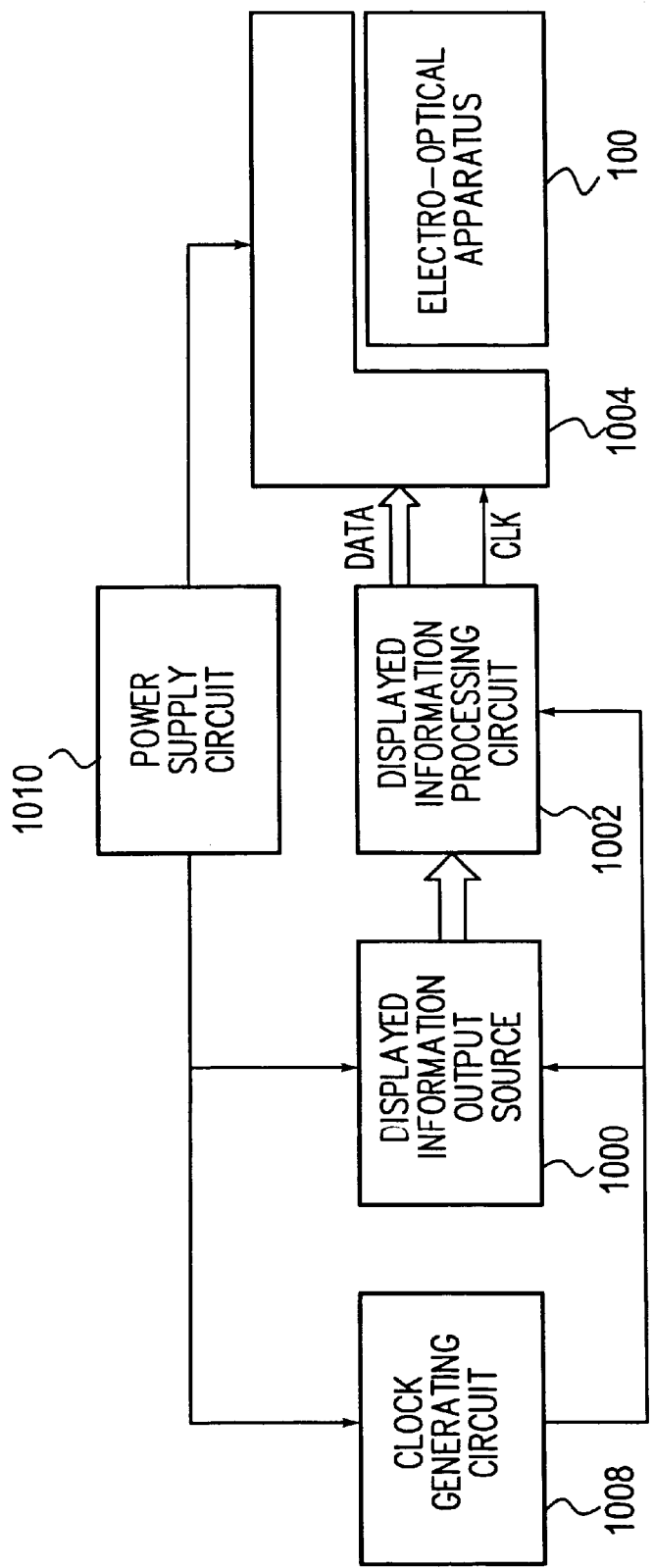
FIG. 77 is a block diagram illustrating a schematic configuration of an embodiment of the electric device of the present invention.

FIG. 77 illustrates a schematic configuration of the electronic device provided with the electro-optical apparatus 100.

In FIG. 77, the electronic device comprises a display information output source 1000, a display information processing circuit 1002, a driving circuit 1004, a electro-optical apparatus 100, a clock generating circuit 1008 and a power supply circuit 1010. The display information output source 1000 includes memories such as a ROM (Read Only Memory), a RAM (Random Access Memory), and an optical disk, and a synchronization circuit for putting out image signals in synchronization, and puts out display information such as image signals of a prescribed format to the display information processing circuit 1002 on the basis of clock signals from the clock generating circuit 1008. The display information processing circuit 1002 comprises an amplification/polarity reversing circuit, a serial-parallel conversion circuit, a rotation circuit, a gamma correction circuit, a clump circuit and other various known processing circuits. It sequentially generates digital signals from the entered display information on the basis of the clock signal and outputs the generated signals together with the clock signal CLK to the driving circuit 1004. The driving circuit 1004 drives the electro-optical apparatus 100. The power supply circuit 1010 supplies a prescribed power to the individual circuits mentioned above. The driving circuit 1004 may be mounted on the TFT array substrate 10 composing the electro-optical apparatus 100, and in addition, the display information processing circuit 1002 may also be mounted.

Because the electro-optical apparatus of the embodiments described above is applicable to a color electro-optical material projector, three electro-optical apparatuses are used as light bulbs for RGB, and the light of each color applied through dichroic mirrors for RGB resolution enters each panel. In these embodiments, therefore, the opposing substrate 20 is not provided with a color filter. However, RGB color filters, together with protection films thereof, may be formed in a prescribed area opposite to the pixel electrode 9a not having a second light shielding film 23 formed thereon on the opposing substrate 20. By adopting the configuration as described above, the electro-optical apparatus of the embodiments can be applied to color electro-optical apparatuses such as a direct-vision type or reflection type color liquid crystal television set apart from a projector. Further, micro-lenses may be formed so as to correspond to pixels on the opposing substrate 20. In this configuration, improvement of the condensing efficiency of the incident light leads to a brighter electro-optical apparatus. Moreover, a dichroic filter for creating RGB colors may be formed by the utilization of color interference by depositing interference layers having different values of refractive index on the opposing substrate 20. According to this opposing substrate with dichroic filters, it is possible to achieve a further brighter electro-optical apparatus.

In the electro-optical apparatuses of the embodiments described above, the incident light may be assumed to come from the opposing substrate 20 side as in the conventional art. Because the first light shielding film 11a is provided, the light may come from the TFT array substrate 10 side and exit from the opposing substrate 20 side. That is, even when the electro-optical apparatus is attached to a projector, it is possible to prevent light from coming into the channel area 1a' or the source side LDD area 1b and drain side LDD area 1c of the semiconductor layer 1a, and thus to display a high-quality image. In the conventional art, it has been necessary to separately arrange a polarization plate covered with AR for reflection prevention, or to stick an AR film with a view to prevention reflection on the back side of the TFT array substrate. In the embodiments of the invention, in contrast, the first light shielding films 11a are formed between the TFT array substrate 10 surface and at least the channel area 1a' and the source side LDD area 1c and drain side LDD area 1c of the semiconductor layer 1a, thus eliminating the necessity of using such an AR(Anti Reflection)-coated polarization plate or an AR film, or using an AR-treated TFT array substrate 10 itself. According to these embodiments of the invention, therefore, it is possible to cut the material cost, and the field is never reduced by dust or flaws upon attachment of the polarization plate, thus providing favorable advantages. The excellent photoresistance eliminate the risk of deterioration of image quality such as crosstalk by light even when the light utilizing efficiency by using a brighter light source or performing polarization-conversion by means of a polarization beam splitter.

In the electro-optical apparatus 100, furthermore, the electro-optical material 50 has been made of a nematic liquid crystal. Use of a polymer dispersion type liquid crystal in which the liquid crystal is dispersed in the form of fine particles eliminates the necessity of the alignment films 19 and 22, and the aforementioned polarization film and the polarization plate, and there are available advantages of a higher luminance and a lower power consumption of the electro-optical apparatus. Further, when the electro-optical apparatus 100 is applied to a reflection type liquid crystal apparatus by making the pixel electrode 9a from a metal film having a high reflectivity such as Al, it is allowed to use an SH (super-homeotropic) type liquid crystal in which liquid crystal molecules are aligned almost vertically in a state in which no voltage is impressed. In the electro-optical apparatus 100, moreover, the common (or opposing) electrode 21 is provided on the opposing substrate 20 side so as to impress an electric field at right angles to the electro-optical material 50. It is also possible to make the pixel electrodes 9a from a pair of lateral electric field generating electrodes so as to impress an electric field (lateral electric field) in parallel with the electro-optical material (i. e., providing lateral electric field generating electrodes on the TFT array substrate 10 side, without providing longitudinal electric field generating electrodes on the opposing substrate 20 side). Using a lateral electric field is more advantageous in widening the visual field angle than in the use of a longitudinal electric field. This embodiment is applicable to various liquid crystal materials (liquid crystal phase), operating modes, liquid crystal alignment and the driving method.

In the above description, the switching element provided in each pixel has been a positive stagger type or coplanar type polysilicon TFT. These embodiments are however valid also with a TFT of any other type including a reverse-stagger type TFT or a amorphous silicon TFT.

Further, as the switching element for the pixel of the electro-optical apparatus, a dual-terminal type non-linear element such as a TFD may be used. In this case, either the scanning lines or the data lines are provided on the opposing substrate to form a stripe-shaped opposing electrode, and the other lines are provided on the element array substrate so as to connect to the individual pixel electrodes via the individual TFD elements or the like. Or, a passive matrix type electro-optical apparatus may be configured without providing a switching element in each pixel of the electro-optical apparatus. At all events, flattening in the image display area and the sealed area provides advantages unique to the invention as described above.

Embodiments of the electronic device having the configuration as described above are illustrated in FIGS. 78 to 81.

Figure 78:
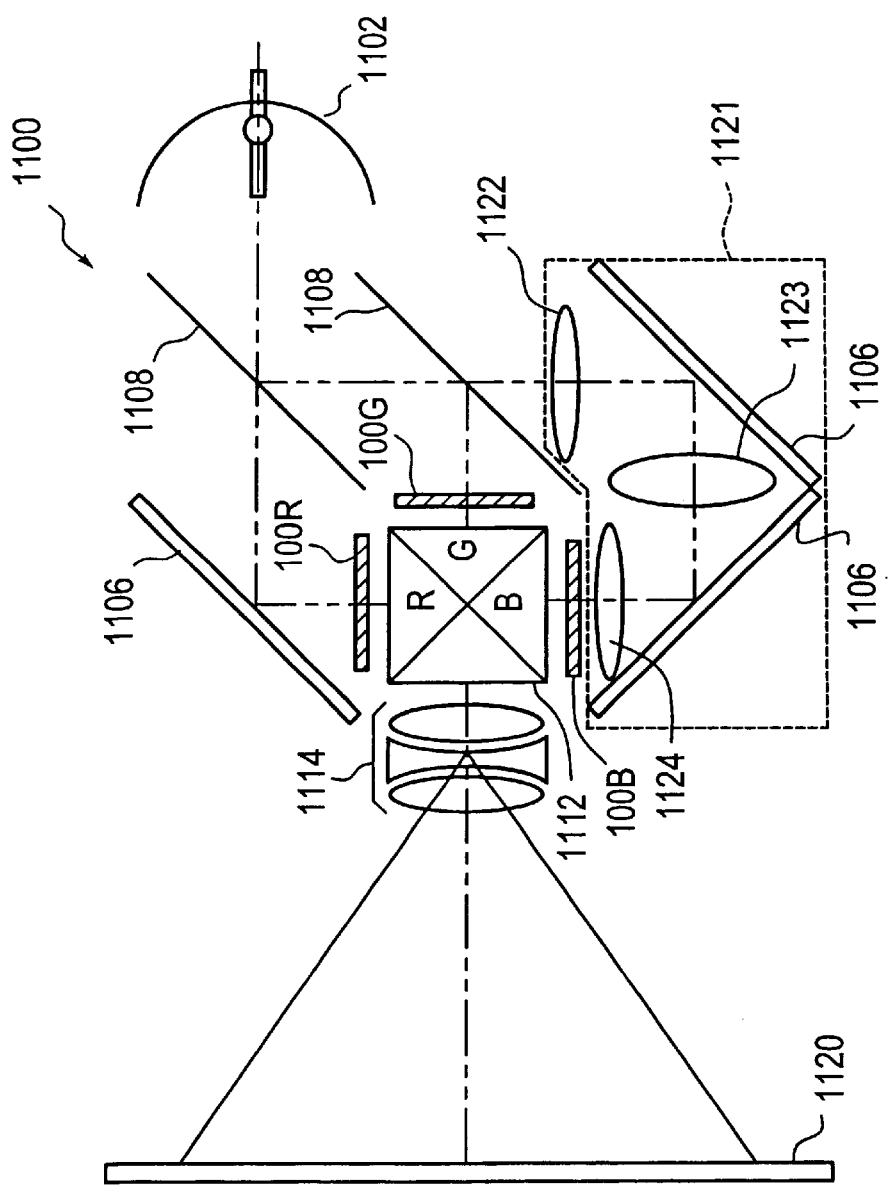
FIG. 78 is a sectional view illustrating a liquid crystal projector as an example of the electronic device.

In FIG. 78, the projector 1100, an example of the electronic device, has a configuration in which the aforementioned driving circuit 1004 provides three liquid crystal modules including the electro-optical apparatus mounted on the TFT array substrate, and serves as a projector using RGB light bulbs 100R, 100G and 100B. In the liquid crystal projector 1100, upon emission of a light from a lamp unit 1102 of a white light source such as a metal halide lamp, the light is resolved into R, G and B, optical components corresponding to the three original colors RGB by three mirrors 1106 and two dichoric mirrors 1108, and introduced into light bulbs 100R, 100G and 100B corresponding to the respective colors. Particularly, the B light is introduced via a relay lens system comprising a incident lens 1122, a relay lens 1123 and an output lens 1124 to prevent optical loss through a long optical path. Optical components corresponding to the three original colors respectively modulated by the light bulbs 100R, 100G and 100B are synthesized again by a dichroic prism 1112, and then, projected via a projecting lens 1114 onto a screen 1120 as a color image.

In this embodiment, in which the light shielding film is provided also under the TFT, even when the reflected light by the projection optical system within the liquid crystal projector resulting from the projected light from the electro-optical apparatus, the reflected light from the surface of the TFT array substrate upon transmission of projected light a part of the projected light passing through the dichroic prism 1112 after irradiation from the other electro-optical apparatuses enters from the side of the TFT array substrate as a feedback light, it is possible to satisfactorily accomplish light shielding for the channel area such as the TFT for switching the pixel electrode. Even when a prism suitable for downsizing is used in the projection optical system, therefore, it is not necessary to bond an AR film for preventing a feedback light, or apply an AR film treatment to the polarization plate between the TFT array substrate of each electro-optical apparatus and the prism, thus providing an important advantage for downsizing and simplifying the configuration.

Figure 79:
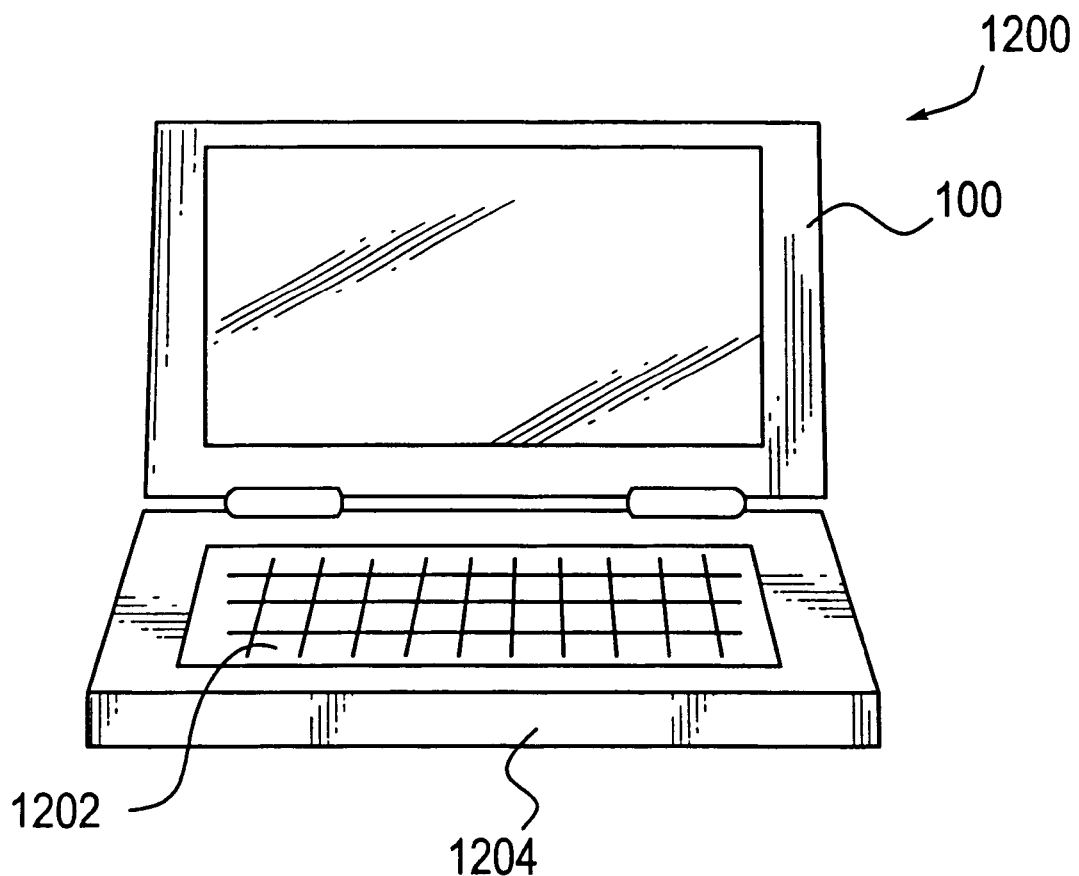
FIG. 79 is a front view illustrating a personal computer as an example of the electronic device.

In FIG. 79, the lap-top type personal computer (PC) 1200, which is another example of the electronic device, has the above electro-optical apparatus 100 housed in the top cover case, together with a CPU, a memory and a modem, and is provided with a main body 1204 having a keyboard 1202 incorporated therein.

Figure 80:
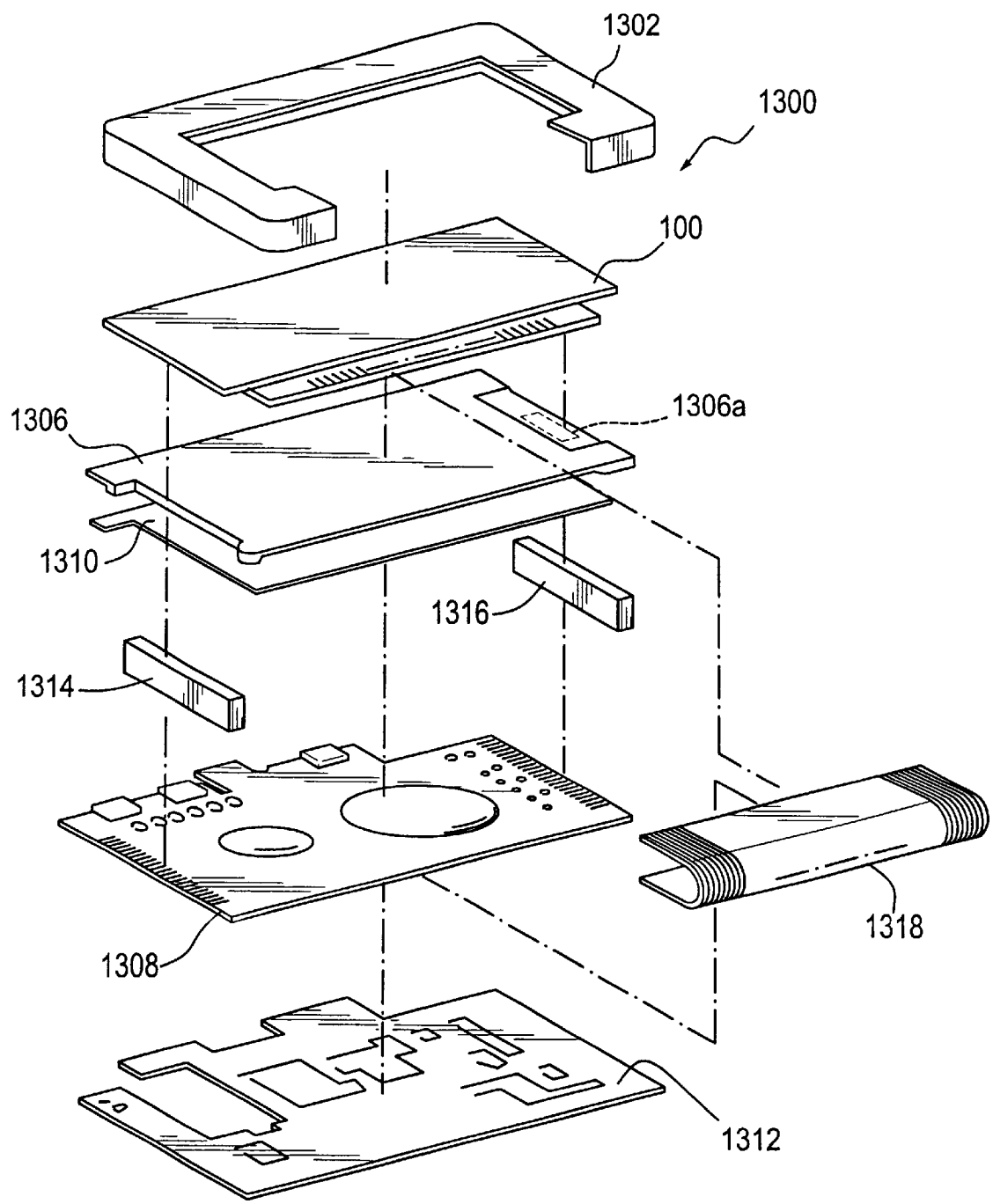
FIG. 80 is an exploded perspective view illustrating a pager as an example of the electronic device.

In FIG. 80, in a pager 1300, which is another example of the electronic device, a electro-optical apparatus 100 forming a liquid display module having the above-mentioned driving circuit 1004 mounted on the TFT array substrate in a metal frame 1302, is housed together with a light guide 1306 including a backlight 1306a, a circuit board 1308, first and second shielding plates 1310 and 1312, two elastic conductors 1314 and 1316, and a film carrier tape 1318. In the case of this example, the display information processing circuit 1002 (see FIG. 77) may be mounted on the circuit board 1308, or on the TFT array substrate of the electro-optical apparatus 100. Further, the above-mentioned driving circuit may be mounted on the circuit board 1308.

Since the example shown in FIG. 80 covers a pager, a circuit board 1308 and the like may further be provided. However in the case of a electro-optical apparatus 100 forming a liquid crystal module by mounting the driving circuit 1004 and further the display information processing circuit 1002, it is possible to produce, sell and use a metal frame 1302 having a electro-optical apparatus fixed therein, as a electro-optical apparatus, or a backlight type electro-optical apparatus incorporating a light guide in addition thereto.

Figure 81:
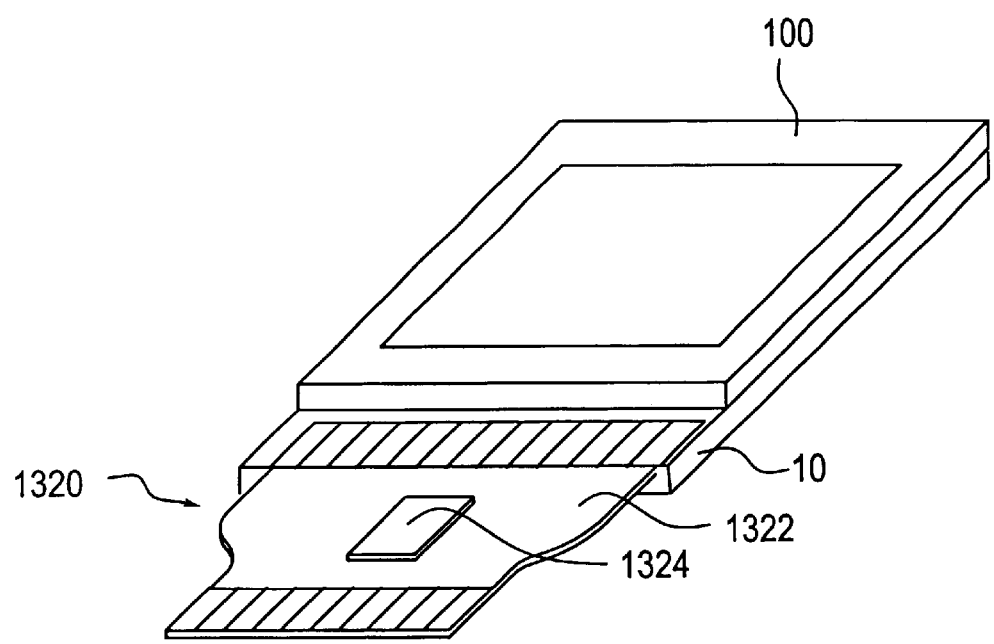
FIG. 81 is a perspective view illustrating a electro-optical apparatus using a TCP as an example of the electronic device.

As shown in FIG. 81, in the case of a electro-optical apparatus not mounting a driving circuit 1004 or a display information processing circuit 1002, it is also possible to produce, sell and use a electro-optical apparatus prepared by physically and electrically connecting, via an anisotropic conductive film provided on the periphery of the TFT array substrate 10, to a TCP (Tape Carrier Package) having an IC 1324 containing a driving circuit 1004 or a display information processing circuit 1002 mounted on a polyimide tape 1322.

Apart from the electronic devices described above with reference to FIGS. 77 to 81, examples of the electronic device shown in FIG. 77 include a liquid crystal television set, view finder type or monitor direct viewing type video recorder, a car navigator, an electronic notebook, a desktop calculator, a wordprocessor, an engineering workstation (EWS), a portable telephone, a TV telephone, a POS terminal and a device provided with a touch panel.

According to this embodiment, as described above, it is possible to achieve various electronic devices provided with the electro-optical apparatus 100 capable of displaying an image having a high contrast and a high quality, and giving a high manufacturing efficiency.

The above embodiments of the invention have been described only for the purpose of clearly presenting the technical contents of the present invention. The present invention should not therefore be construed in a narrow meaning by limiting it only to these embodiments.

What is claimed is:

1. An electro-optical device, comprising:

a substrate;

a concave recess region formed on the substrate, formed by lattice shapes:

a scanning line extending along a direction of the concave recess region;

a data line extending along another direction of the concave recess region;

a switching element electrically connected to the scanning line and the data line above the concave recess region; and a pixel electrode electrically connected to the switching element, and disposed at least in a region adjacent with the concave recess region.

2. The electro-optical device according to claim 1, further comprising:

a capacitor line extending along the direction of the concave recess region; and a capacitor electrode electrically connected to the pixel electrode via a high-concentration drain area above the concave recess region, opposed to the capacitor line.

3. The electro-optical device according to claim 1, the switching element being a thin-film transistor.

4. The electro-optical device according to claim 3, further comprising:

a light-shielding film shielding at least a channel region of the thin-film transistor.

5. The electro-optical device according to claim 4, the light-shielding film being disposed in the concave recess region.

6. The electro-optical device according to claim 1, a depth of the concave recess region having at least a thickness of the switching element.

7. The electro-optical device according to claim 1, the scanning line being disposed above the concave recess region.

8. The electro-optical device according to claim 1, the data line being disposed above the concave recess region.

9. The electro-optical device according to claim 1, further comprising:

a scanning line driving circuit; and a wiring electrically connected to the scanning line and the scanning line driving circuit, and the scanning line is disposed above a concave recess region.

10. The electro-optical device according to claim 1, further comprising:

a data line driving circuit; and a wiring electrically connected to the data line and the data line driving circuit, and the data line is disposed above a concave recess region.

11. An electro-optical apparatus, comprising:

the electro-optical device of claim 1.

* * * * *